(12) United States Patent
Fujita et al.

(10) Patent No.: US 12,059,611 B2
(45) Date of Patent: Aug. 13, 2024

(54) GAME CONTROLLER

(71) Applicant: NINTENDO CO., LTD., Kyoto (JP)

(72) Inventors: Kumpei Fujita, Kyoto (JP); Shinji Hirose, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 18/212,974

(22) Filed: Jun. 22, 2023

(65) Prior Publication Data

US 2023/0338831 A1    Oct. 26, 2023

Related U.S. Application Data

(63) Continuation of application No. 17/469,038, filed on Sep. 8, 2021, now Pat. No. 11,724,178, which is a
(Continued)

(30) Foreign Application Priority Data

Jun. 12, 2015 (JP) .................. 2015-119707
Jun. 8, 2016 (JP) .................. 2016-114668
(Continued)

(51) Int. Cl.
*A63F 13/24* (2014.01)
*A63F 13/21* (2014.01)
(Continued)

(52) U.S. Cl.
CPC .............. *A63F 13/24* (2014.09); *A63F 13/21* (2014.09); *A63F 13/213* (2014.09); *A63F 13/23* (2014.09);
(Continued)

(58) Field of Classification Search
CPC ................ A63F 13/24; A63F 13/98
See application file for complete search history.

(56) References Cited

U.S. PATENT DOCUMENTS 3,850,271 A    11/1974  Hillmann
5,046,739 A    9/1991   Reichow
(Continued)

FOREIGN PATENT DOCUMENTS

CN    1127150 A    7/1996
CN    1395159 A    2/2003
(Continued)

OTHER PUBLICATIONS

Apr. 7, 2017 Partial European Search Report issued in European Application No. 16173964.4.
(Continued)

*Primary Examiner* — James S. McClellan
(74) *Attorney, Agent, or Firm* — Nixon & Vanderhye P.C.

(57) ABSTRACT

An example game controller is removably attachable to a main unit. The game controller includes a controller-side slide member. The controller-side slide member protrudes from a first surface of the game controller and is configured to slidably engage with the main unit-side slide member in a slide direction. The controller-side slide member has a first end and a second end in the slide direction, and the game controller is configured to be attached to the main unit by inserting the controller-side slide member into the main unit-side slide member. The controller-side slide member includes a protruding portion and at least one terminal. The protruding portion protrudes from the first end side of the controller-side slide member in the slide direction and has a facing surface that faces the first surface of the game controller. The at least one terminal is between the facing surface and the first surface.

6 Claims, 65 Drawing Sheets

Related U.S. Application Data continuation of application No. 16/788,362, filed on Feb. 12, 2020, now Pat. No. 11,141,654, which is a continuation of application No. 15/629,135, filed on Jun. 21, 2017, now Pat. No. 10,661,160, which is a continuation of application No. 15/178,972, filed on Jun. 10, 2016, now Pat. No. 9,757,647.

(30) Foreign Application Priority Data

| Jun. 8, 2016 | (JP) | ................................ | 2016-114669 |
|---|---|---|---|
| Jun. 8, 2016 | (JP) | ................................ | 2016-114670 |
| Jun. 8, 2016 | (JP) | ................................ | 2016-114671 |

(51) Int. Cl.

| *A63F 13/213* | (2014.01) |
|---|---|
| *A63F 13/23* | (2014.01) |
| *A63F 13/235* | (2014.01) |
| *A63F 13/843* | (2014.01) |
| *A63F 13/92* | (2014.01) |
| *A63F 13/98* | (2014.01) |

(52) U.S. Cl.
CPC .......... *A63F 13/235* (2014.09); *A63F 13/843* (2014.09); *A63F 13/92* (2014.09); *A63F 13/98* (2014.09); *A63F 2300/1025* (2013.01); *A63F 2300/1043* (2013.01); *A63F 2300/204* (2013.01)

(56) References Cited

U.S. PATENT DOCUMENTS

| 5,052,937 | A | 10/1991 | Glen |
|---|---|---|---|
| 5,276,733 | A | 1/1994 | Uno et al. |
| 5,515,174 | A | 5/1996 | Abe et al. |
| 5,627,974 | A | 5/1997 | Watts, Jr. et al. |
| 5,657,459 | A | 8/1997 | Yanagisawa et al. |
| 5,667,220 | A | 9/1997 | Cheng |
| 5,677,827 | A | 10/1997 | Yoshioka et al. |
| 5,702,305 | A | 12/1997 | Norman et al. |
| 6,512,511 | B2 | 1/2003 | Willner et al. |
| 6,530,838 | B2 | 3/2003 | Ha et al. |
| 6,580,420 | B1 | 6/2003 | Wang |
| 6,788,285 | B2 | 9/2004 | Paolucci et al. |
| 7,095,442 | B2 | 8/2006 | van Zee |
| 7,733,637 | B1 | 6/2010 | Lam |
| 7,833,097 | B1 | 11/2010 | Maddox et al. |
| 8,057,309 | B1 | 11/2011 | Mead et al. |
| 8,298,084 | B2 | 10/2012 | Yee |
| 8,497,659 | B2 | 7/2013 | Navid |
| 8,845,425 | B2 | 9/2014 | Nogami et al. |
| 8,926,414 | B1 * | 1/2015 | Kirkpatrick ............. G06F 1/203 361/679.41 |
| 8,939,838 | B2 | 1/2015 | Alten et al. |
| 8,972,617 | B2 | 3/2015 | Hirschman |
| 9,539,507 | B2 | 1/2017 | Schoenith |
| 9,757,647 | B2 | 9/2017 | Fujita et al. |
| 9,914,060 | B1 | 3/2018 | Corigliano |
| 10,661,160 | B2 | 5/2020 | Fujita et al. |
| 2001/0003708 | A1 | 6/2001 | Aizu et al. |
| 2001/0045938 | A1 | 11/2001 | Willner et al. |
| 2002/0098887 | A1 | 7/2002 | Himoto et al. |
| 2002/0119819 | A1 | 8/2002 | Kunzle et al. |
| 2002/0145590 | A1 | 10/2002 | Paolucci et al. |
| 2002/0155890 | A1 | 10/2002 | Ha et al. |
| 2002/0167696 | A1 | 11/2002 | Edwards et al. |
| 2003/0083130 | A1 | 5/2003 | Toyoshima |
| 2003/0100263 | A1 | 5/2003 | Tanaka et al. |
| 2003/0100340 | A1 | 5/2003 | Cupps et al. |
| 2003/0109314 | A1 | 6/2003 | Ku |
| 2003/0171146 | A1 | 9/2003 | Mayer et al. |
| 2004/0001307 | A1 | 1/2004 | Takakusaki |
| 2004/0082361 | A1 | 4/2004 | Rajagopalan |
| 2004/0090416 | A1 | 5/2004 | Biheller et al. |
| 2004/0263471 | A1 | 12/2004 | Hsieh |
| 2005/0012711 | A1 | 1/2005 | Paolucci et al. |
| 2005/0059438 | A1 | 3/2005 | Jellicoe |
| 2005/0085301 | A1 | 4/2005 | Hammond et al. |
| 2006/0117623 | A1 | 6/2006 | Watanabe |
| 2006/0152484 | A1 | 7/2006 | Rolus Borgward |
| 2006/0176277 | A1 | 8/2006 | Daniel et al. |
| 2006/0237209 | A1 | 10/2006 | Horinouchi et al. |
| 2006/0279039 | A1 | 12/2006 | Krieger et al. |
| 2007/0021210 | A1 | 1/2007 | Tachibana |
| 2007/0045392 | A1 | 3/2007 | Youens et al. |
| 2007/0049374 | A1 | 3/2007 | Ikeda et al. |
| 2007/0072680 | A1 | 3/2007 | Ikeda |
| 2007/0111801 | A1 | 5/2007 | Haber et al. |
| 2007/0112989 | A1 | 5/2007 | Iwaki |
| 2007/0131727 | A1 | 6/2007 | Martuccio |
| 2007/0178966 | A1 | 8/2007 | Pohlman et al. |
| 2007/0200727 | A1 | 8/2007 | Sakamoto |
| 2007/0218988 | A1 | 9/2007 | Lucich |
| 2007/0293318 | A1 | 12/2007 | Tetterington |
| 2008/0002350 | A1 | 1/2008 | Farrugia |
| 2008/0015017 | A1 | 1/2008 | Ashida et al. |
| 2008/0064500 | A1 | 3/2008 | Satsukawa et al. |
| 2008/0113798 | A1 | 5/2008 | Miyanaga et al. |
| 2008/0153593 | A1 | 6/2008 | Ikeda et al. |
| 2008/0167740 | A1 | 7/2008 | Merrill |
| 2009/0005164 | A1 | 1/2009 | Chang |
| 2009/0036189 | A1 | 2/2009 | Wang |
| 2009/0069096 | A1 | 3/2009 | Nishimoto |
| 2009/0070093 | A1 | 3/2009 | Nakanishi et al. |
| 2009/0072784 | A1 | 3/2009 | Erickson |
| 2009/0079705 | A1 | 3/2009 | Sizelove et al. |
| 2009/0093307 | A1 | 4/2009 | Miyaki |
| 2009/0111508 | A1 | 4/2009 | Yeh et al. |
| 2009/0291760 | A1 | 11/2009 | Hepburn et al. |
| 2009/0312098 | A1 | 12/2009 | Chang |
| 2009/0318227 | A1 | 12/2009 | Nakajima |
| 2010/0007528 | A1 | 1/2010 | Urata et al. |
| 2010/0009754 | A1 | 1/2010 | Shimamura et al. |
| 2010/0064883 | A1 | 3/2010 | Gynes |
| 2010/0118195 | A1 | 5/2010 | Eom et al. |
| 2010/0178981 | A1 | 7/2010 | Holcomb et al. |
| 2010/0195279 | A1 | 8/2010 | Michael |
| 2010/0216547 | A1 | 8/2010 | Coppard et al. |
| 2010/0267454 | A1 | 10/2010 | Navid |
| 2010/0304873 | A1 | 12/2010 | Markowitz et al. |
| 2011/0018867 | A1 | 1/2011 | Shibamiya et al. |
| 2011/0059795 | A1 | 3/2011 | Kondo et al. |
| 2011/0190052 | A1 | 8/2011 | Takeda et al. |
| 2011/0216495 | A1 | 9/2011 | Marx |
| 2011/0230261 | A1 | 9/2011 | Kim |
| 2011/0260969 | A1 | 10/2011 | Workman |
| 2011/0263328 | A1 | 10/2011 | Yamashita et al. |
| 2011/0266231 | A1 | 11/2011 | Tsunezumi et al. |
| 2012/0058821 | A1 | 3/2012 | Lan |
| 2012/0063625 | A1 | 3/2012 | Barber et al. |
| 2012/0088582 | A1 | 4/2012 | Wu et al. |
| 2012/0106041 | A1 | 5/2012 | Ashida et al. |
| 2012/0106042 | A1 | 5/2012 | Ashida et al. |
| 2012/0113034 | A1 | 5/2012 | Mcdermid |
| 2012/0176369 | A1 | 7/2012 | Suzuki et al. |
| 2012/0188691 | A1 | 7/2012 | Zhou |
| 2012/0188694 | A1 | 7/2012 | Sakakibara et al. |
| 2012/0196680 | A1 | 8/2012 | Provitt |
| 2012/0202597 | A1 | 8/2012 | Yee et al. |
| 2012/0224708 | A1 | 9/2012 | Sugiyama |
| 2012/0231881 | A1 | 9/2012 | Matsunaga |
| 2012/0271967 | A1 | 10/2012 | Hirschman |
| 2012/0302347 | A1 | 11/2012 | Nicholson |
| 2012/0302348 | A1 | 11/2012 | Karacal et al. |
| 2012/0326984 | A1 | 12/2012 | Ghassabian |
| 2013/0058659 | A1 | 3/2013 | Umezu et al. |
| 2013/0076286 | A1 * | 3/2013 | Patton .................. G10K 11/161 318/471 |
| 2013/0095925 | A1 | 4/2013 | Xu |
| 2013/0106687 | A1 | 5/2013 | Baum et al. |
| 2013/0109476 | A1 | 5/2013 | Baum et al. |
| 2013/0120258 | A1 | 5/2013 | Maus |

(56) References Cited

U.S. PATENT DOCUMENTS

| | | |
|---|---|---|
| 2013/0130800 A1 | 5/2013 | Sirilux et al. |
| 2013/0154542 A1 | 6/2013 | Joynes et al. |
| 2013/0178285 A1 | 7/2013 | Joynes et al. |
| 2013/0194190 A1 | 8/2013 | Lysenko |
| 2013/0215024 A1 | 8/2013 | Nakayama et al. |
| 2013/0221923 A1 | 8/2013 | Robertson |
| 2013/0267318 A1 | 10/2013 | Pryor et al. |
| 2013/0267322 A1 | 10/2013 | South |
| 2013/0279106 A1 | 10/2013 | Ergun et al. |
| 2013/0335904 A1 | 12/2013 | Griffin |
| 2013/0341214 A1 | 12/2013 | King |
| 2014/0028247 A1 | 1/2014 | Du et al. |
| 2014/0121023 A1 | 5/2014 | Tahara et al. |
| 2014/0152531 A1 | 6/2014 | Murray et al. |
| 2014/0200085 A1 | 7/2014 | Bares et al. |
| 2014/0206451 A1 | 7/2014 | Helmes et al. |
| 2014/0221098 A1 | 8/2014 | Boulanger |
| 2014/0235359 A1 | 8/2014 | Navid |
| 2014/0247246 A1 | 9/2014 | Maus |
| 2014/0274394 A1 | 9/2014 | Willis |
| 2014/0315642 A1 | 10/2014 | Grant et al. |
| 2014/0370988 A1 | 12/2014 | Shimamura et al. |
| 2014/0374457 A1 | 12/2014 | Piccolo |
| 2014/0376182 A1 | 12/2014 | Motoishi |
| 2015/0018101 A1 | 1/2015 | Schoenith et al. |
| 2015/0031452 A1 | 1/2015 | Rundell et al. |
| 2015/0084900 A1 | 3/2015 | Hodges et al. |
| 2015/0138645 A1 | 5/2015 | Yoo et al. |
| 2015/0149668 A1 | 5/2015 | Joynes et al. |
| 2015/0281422 A1 | 10/2015 | Kessler et al. |
| 2016/0001176 A1 | 1/2016 | Chen |
| 2016/0361627 A1 | 1/2016 | Fujita et al. |
| 2016/0361632 A1 | 1/2016 | Fujita et al. |
| 2016/0361633 A1 | 1/2016 | Fujita et al. |
| 2016/0361640 A1 | 1/2016 | Iwao |
| 2016/0361641 A1 | 1/2016 | Koizumi et al. |
| 2016/0107082 A1 | 4/2016 | Song et al. |
| 2016/0149426 A1 | 5/2016 | Hodges et al. |
| 2016/0231773 A1 | 8/2016 | Inoue et al. |
| 2016/0360644 A1* | 12/2016 | Bains ..................... G06F 1/203 |
| 2017/0052750 A1 | 1/2017 | Koizumi et al. |
| 2017/0168531 A1* | 6/2017 | Casparian ............... G06F 1/206 |
| 2017/0242486 A1 | 8/2017 | Grant et al. |
| 2017/0282061 A1 | 10/2017 | Fujita et al. |
| 2018/0099225 A1 | 4/2018 | Furuike et al. |
| 2018/0250588 A1 | 9/2018 | Winick |
| 2018/0345130 A1 | 12/2018 | Wells et al. |
| 2020/0179800 A1 | 6/2020 | Fujita et al. |
| 2022/0072417 A1 | 3/2022 | Fujita et al. |

FOREIGN PATENT DOCUMENTS

| | | |
|---|---|---|
| CN | 1891322 A | 1/2007 |
| CN | 201015711 Y | 2/2008 |
| CN | 101601931 A | 12/2009 |
| CN | 101961554 A | 2/2011 |
| CN | 202259500 U | 5/2012 |
| CN | 102598126 A | 7/2012 |
| CN | 102600611 A | 7/2012 |
| CN | 202342834 U | 7/2012 |
| CN | 202355828 U | 8/2012 |
| CN | 202355829 U | 8/2012 |
| CN | 102671376 A | 9/2012 |
| CN | 102681612 A | 9/2012 |
| CN | 202817305 U | 3/2013 |
| CN | 202817828 U | 3/2013 |
| CN | 202860081 U | 4/2013 |
| CN | 103328058 A | 9/2013 |
| CN | 103736275 A | 4/2014 |
| CN | 104014129 A | 9/2014 |
| CN | 104043245 A | 9/2014 |
| CN | 203816200 U | 9/2014 |
| CN | 104107539 A | 10/2014 |
| CN | 104258565 A | 1/2015 |
| CN | 104307172 A | 1/2015 |
| CN | 104353239 A | 2/2015 |
| CN | 104368149 A | 2/2015 |
| CN | 204147522 U | 2/2015 |
| CN | 104 436 646 | 3/2015 |
| CN | 104383683 A | 3/2015 |
| CN | 204182121 U | 3/2015 |
| CN | 204208280 U | 3/2015 |
| CN | 204246818 U | 4/2015 |
| CN | 104645613 A | 5/2015 |
| CN | 204380232 U | 6/2015 |
| CN | 110280015 B | 4/2020 |
| EP | 0 695 566 A1 | 2/1996 |
| EP | 0 682 350 B1 | 10/2002 |
| EP | 1 266 678 A1 | 12/2002 |
| EP | 1 475 131 A1 | 11/2004 |
| EP | 1 759 745 | 3/2007 |
| EP | 2 018 030 | 1/2009 |
| EP | 2 258 456 A2 | 12/2010 |
| EP | 2 446 944 A1 | 8/2012 |
| EP | 2 772 825 A2 | 9/2014 |
| GB | 2 310 481 | 8/1997 |
| GB | 2 522 008 | 7/2015 |
| JP | 63-53873 A | 3/1988 |
| JP | H06-77387 U | 10/1994 |
| JP | 7-30429 U | 6/1995 |
| JP | H7-155465 | 6/1995 |
| JP | 11-76617 A | 3/1999 |
| JP | 2002-18131 A | 1/2002 |
| JP | 2002-182856 | 6/2002 |
| JP | 3089139 U | 7/2002 |
| JP | 2003-018275 | 1/2003 |
| JP | 2003-140811 | 5/2003 |
| JP | 2004-33371 | 2/2004 |
| JP | 2004-146986 | 5/2004 |
| JP | 2004-201728 A | 7/2004 |
| JP | 2004-313492 | 11/2004 |
| JP | 2007-054114 | 3/2007 |
| JP | 2007-83013 | 4/2007 |
| JP | 2007-103380 | 4/2007 |
| JP | 2007-330389 A | 12/2007 |
| JP | 4255510 | 4/2009 |
| JP | 2009-189169 A | 8/2009 |
| JP | 2010-20742 | 1/2010 |
| JP | 2011-108256 | 6/2011 |
| JP | 2011-227804 A | 11/2011 |
| JP | 2011-234744 A | 11/2011 |
| JP | 2012-232025 A | 11/2012 |
| JP | 2013-54548 | 3/2013 |
| JP | 2013-128744 | 7/2013 |
| JP | 2014-41528 A | 3/2014 |
| JP | 2014-89578 A | 5/2014 |
| JP | 2014-200620 A | 10/2014 |
| JP | 2014-209373 | 11/2014 |
| JP | 2015-41465 A | 3/2015 |
| JP | 6121034 B2 | 4/2017 |
| JP | 6153238 B1 | 6/2017 |
| KR | 2003-0021435 A | 3/2003 |
| TW | M470688 U | 1/2014 |
| TW | M474553 U | 3/2014 |
| WO | WO 2012/020409 A1 | 2/2012 |
| WO | WO 2012/105098 A1 | 8/2012 |
| WO | 2013/095703 | 6/2013 |
| WO | WO 2014/123828 A1 | 8/2014 |
| WO | 2015/006680 | 1/2015 |
| WO | 2015/014663 | 2/2015 |
| WO | 2017/088739 | 6/2017 |

OTHER PUBLICATIONS

Apr. 28, 2017 Notice of Reasons for Refusal issued in Japanese Patent Application No. 2016-233836.

BladePad. Downloaded from http://www.bladepad.com on Nov. 10, 2016 (2 pages).

Feb. 23, 2017 Extended Search Report issued in European Application No. 16173843.0.

Fujita et al., U.S. Appl. No. 15/178,972, filed Jun. 10, 2016, (320 pages).

(56) References Cited

OTHER PUBLICATIONS

Fujita et al., U.S. Appl. No. 15/178,991, filed Jun. 10, 2016, (321 pages).
Fujita et al., U.S. Appl. No. 15/179,011, filed Jun. 10, 2016, (323 pages).
Fujita et al., U.S. Appl. No. 15/411,156, filed Jan. 20, 2017 (320 pages).
Fujita et al., U.S. Appl. No. 15/413,977, filed Jan. 24, 2017 (326 pages).
Furuike et al., U.S. Appl. 15/292,359, filed Oct. 13, 2016, (93 pages).
Game grip STG-ONE. Downloaded from http://gamegrip-stone.com/en/index.php on Nov. 10, 2016 (7 pages).
Gametel bluetooth controller for Android and iOS. Downloaded from https://www.engadget.com/2012/01/09/gametel-bluetooth-controller-for-android-and-ios-hands-on/ on Nov. 10, 2016 (7 pages).
iFrogz's Caliber Advantage. Downloaded from https://www.engadget.com/2013/01/11/ifrogz-caliber-advantage-iphone-gaming-case-hands-on/ on Nov. 10, 2016 (7 pages).
Ikuta et al., U.S. Appl. No. 15/446,346, filed Mar. 1, 2017 (99 pages).
IPEGA PG-9017 Wireless Bluetooth Controller. Downloaded from http://www.infinityreviews.com/2013/04/ipega-bluetooth-controller-review.html on Nov. 10, 2016 (13 pages).
Iwao, et al., U.S. Appl. No. 15/178,984, filed Jun. 10, 2016 (358 pages).
Iwao et al., U.S. Appl. No. 15/428,188, filed Feb. 9, 2017 (351 pages).
Jan. 2, 2017 European Search Report issued in European Application No. 16193339.5 (4 pages).
Jun. 2, 2017 Office Action issued in U.S. Appl. No. 15/178,972 Notice of Allowance issued in U.S. Appl. No. 15/178,972.
Jun. 13, 2017 Notice of Allowance issued in U.S. Appl. No. 15/178,972.
Jun. 13, 2017 Notice of Allowance issued in U.S. Appl. No. 15/178,991.
Koizumi, et al., U.S. Appl. No. 15/179,022, filed Jun. 10, 2016, (210 pages).
Koizumi et al., U.S. Appl. No. 15/344,208, filed Nov. 4, 2016 (199 pages).
Koizumi et al., U.S. Appl. No. 15/344,276, filed Nov. 4, 2016 (197 pages).
Koizumi et al., U.S. Appl. No. 15/418,426, filed Jan. 27, 2017 (200 pages).
Mad Catz Gamepads for Android and IOS. Downloaded from http://madcatz.com/gamesmart_lynx_9/ on Nov. 10, 2016 (4 pages).
Mar. 13, 2017 Office Action issued in U.S. Appl. No. 15/428,188.
Mar. 15, 2017 Notice of Allowance issued in U.S. Appl. No. 15/413,977.
Mar. 20, 2017 Notice of Allowance issued in U.S. Appl. No. 15/178,991.
Mar. 31, 2017 Notice of Allowance issued in U.S. Appl. No. 15/179,011.
May 18, 2017 Office Action issued in U.S. Appl. No. 15/344,208.
May 19, 2017 Office Action issued in U.S. Appl. No. 15/344,276.
Dec. 5, 2017 Office Action issued in U.S. Appl. No. 15/344,208.
Moga Ace Power iOS Game Controller. Downloaded from http://www.ign.com/articles/2013/11/20/moga-ace-power-ios-game-controller-now-available on Nov. 10, 2016 (6 pages).
Nov. 3, 2016 European Search Report issued in European Application No. 16173841.4 (8 pages).
Nov. 16, 2016 Extended European Search Report issued in European Application No. 16173842.2 (8 pages).
Nov. 17, 2016 European Search Report issued in European Application No. 16173840.6 (4 pages).
O-iPower, Sony Official Cradle, "https://www.youtube.com/watch?v=1ly5pOxOPmU" Jan. 2, 2015.
PG-9023. Downloaded from http://www.ipega.hk/index.php?option=com_phocagallery&view=detail&catid=11%3Aiphone&id=1100%3Abluetooth-stretch-controller&Itemid=4&lang=en on Nov. 10, 2016 (2 pages).
Phonejoy Play smartphone game controller hits Kickstarter. Downloaded from http://www.slashgear.com/phonejoy-play-smartphone-game-controller-hits-kickstarter-05259565/ on Nov. 10, 2016 (9 pages).
PowerA's Moga Pro. Downloaded from http://venturebeat.com/2013/01/14/poweras-moga-pro-gives-you-a-console-gaming-experience-wherever-you-go-hands-on-video/ on Nov. 10, 2016 (5 pages).
PowerShell Controller + Battery. Downloaded from http://support.logitech.com/en_us/product/powershell-controller-and-battery on Nov. 10, 2016 (2 pages).
Razer Goes Mobile with Junglecat iOS Gaming Controller. Downloaded from http://www.razerzone.com/press/detail/press-releases/razer-goes-mobile-with-junglecat-ios-gaming-controller on Nov. 10, 2016 (5 pages).
Samsung Galaxy S4 Game Pad. Downloaded from http://www.geeky-gadgets.com/samsung-galaxy-s4-game-pad-21-03-2013/ on Nov. 10, 2016 (5 pages).
SMACON-GP. Downloaded from http://dragonquestgame.net/use-bluetooth-controller-smacon/ on Nov. 10, 2016 (9 pages).
Wikipad Gaming Tablet. Downloaded from http://www.gizorama.com/2013/news/wikipad-gaming-tablet-available-june-11 on Nov. 10, 2016 (4 pages).
Sep. 26, 2017 Office Action issued in U.S. Appl. No. 15/418,426.
Sep. 27, 2017 Office Action issued in U.S. Appl. No. 15/344,276.
Nov. 8, 2017 Extended European Search Report issued in European Application No. 17188271.5.
Dec. 8, 2017 Search Report issued in European Application No. 17191339.5.
Feb. 9, 2018 Office Action issued in U.S. Appl. No. 15/418,426.
Apr. 12, 2018 Office Action issued in U.S. Appl. No. 15/446,346.
Jun. 14, 2018 Office Action issued in U.S. Appl. No. 15/344,208.
Jun. 27, 2018 Office Action issued in U.S. Appl. No. 15/292,359.
Anonymous, "Wii Remote Configurations/Wii/Support/Nintendo". Nov. 20, 2006.
Sep. 17, 2018 Communication pursuant to Article 94(3) EPC issued in European Application No. 16 173 843.0
Aug. 3, 2018 Notice of Reasons for Refusal issued in Japanese Patent Application No. 2017-127616.
Nov. 2, 2018 First Office Action issued in Chinese Application No. 2016/0002061.9 (with translation).
Nov. 8, 2018 Notice of Reasons for Refusal issued in Japanese Application No. 2017-127616.
Jan. 11, 2019 Office Action issued in U.S. Appl. No. 15/178,984.
Feb. 4, 2019 Notice of Allowance issued in U.S. Appl. No. 15/292,359.
Feb. 27, 2019 Notice of Reasons for Refusal issued in Japanese Application No. 2017-011929.
Apr. 15, 2019 Extended European Search Report issued in European Application No. 18207863.4.
Office Action dated Jun. 21, 2019 issued in Japanese Application No. 2016-123230.
Office Action dated Jun. 21, 2019 issued in Japanese Application No. 2016-123228.
Office ACtion dated Aug. 2, 2019 issued in Japanese Application No. 2016-123229.
Office Action dated Aug. 6, 2019 issued in Japanese Application No. 2019-101136.
Decision of Refusal issued on Oct. 8, 2019 in Japanese Patent Application No. 2016-123230 with English machine translation.
Capsule Hard Case for iPhone 5: a case with cute home button which can encase iPhone completely, AppBank—iPhone, Let's find enjoyment of Smartphone, Jun. 1, 2013, searched on Sep. 26, 2019, URL, https://web.archive.org/web/20130601175553/http://appbank.net/2013/02/17/goodsbooks/547011.php.
Notice of Reasons for Refusal in Japanese Patent Application No. 2016-123229, dated Nov. 28, 2019.
U.S. Appl. No. 17/469,038, filed Sep. 8, 2021 of Fujita et al. for "Game Controller," (parent application).
Extended European Search Report mailed Apr. 2, 2020 in European Application No. 20154678.5, 11 pages.

(56) References Cited

OTHER PUBLICATIONS

Notice of Reasons for Refusal mailed Jun. 11, 2020 in Japanese Application No. 2017-062651, with English translation, 14 pages.
Yukiko SATO, "At last storing/sharing of screen shot with Xbox One is available due to the update in March", IT Media News [online], Feb. 19, 2015, [searched on May 27, 2020], Internet, URL, https://www.itmedia.co.jp/news/articles/1502/19/news088.html, 4 pages.
Wikipedia The Free Encyclopedia, Webpage regarding DualShock 1 and 2, https://en.wikipedia.org/wiki/DualShock, downloaded on Feb. 17, 2023, 4 pages.
Notice of Reasons for Refusal mailed Sep. 1, 2022 in Japanese Application No. 2020-192584, with English machine translation, 6 pages.
Try the cradle to make PSP a "stationary player", AV Watch [online], May 2, 2008, Internet <URL: https://av.watch.impress.co.jp/docs/20080502/psp.htn>, [searched on Aug. 26, 2022], 7 pages.
[HotHot Review] Fujitsu "Arrows Tab QH77/M FARQ77M", PC Watch [online], Dec. 25, 2013, Internet <: https://pc.watch.impress.co.jp/docs/column.hothot/628829.html>, [searched in Aug. 26, 2022], 11 pages.

\* cited by examiner

UNATTACHED

ATTACHED

PROTRUDING STATE

ACCOMMODATED STATE

UNATTACHED STATE

ATTACHED STATE (3) IMAGE DISPLAYED ON TV (4) START OPERATING

Fig. 41

| REGISTRATION INFORMATION | | |
|---|---|---|
| NUMBER INFORMATION | IDENTIFICATION INFORMATION | WIRELESS COMMUNICATION INFORMATION |
| 1 | ○○○○ | REGISTERED |
| 2 | × × × × | REGISTERED |
| 3 | △△△△ | UNREGISTERED |
| ⋮ | ⋮ | ⋮ |

Fig. 42

| PAIRING INFORMATION | |
|---|---|
| LEFT IDENTIFICATION INFORMATION | RIGHT IDENTIFICATION INFORMATION |
| ○○○○ | ×××× |
| △△△△ | ◆◆◆◆ |
| ⋮ | ⋮ |

GAME CONTROLLER

CROSS REFERENCE TO RELATED APPLICATIONS

This application is a continuation of U.S. application Ser. No. 17/469,038, filed Sep. 8, 2021, which is a continuation of U.S. application Ser. No. 16/788,362, filed Feb. 12, 2020, now U.S. Pat. No. 11,141,654, which is a continuation of U.S. application Ser. No. 15/629,135, filed Jun. 21, 2017, now U.S. Pat. No. 10,661,160, which is a continuation of U.S. application Ser. No. 15/178,972, filed Jun. 10, 2016, now U.S. Pat. No. 9,757,647, and claims priority to Japanese Patent Application Nos. 2015-119707 filed on Jun. 12, 2015, 2016-114668 filed on Jun. 8, 2016, 2016-114669 filed on Jun. 8, 2016, 2016-114670 filed on Jun. 8, 2016 and 2016-114671 filed on Jun. 8, 2016. The entire contents of each of which are hereby incorporated by reference.

FIELD

The present technology relates to a game controller.

BACKGROUND AND SUMMARY

There are conventional controllers capable of accommodating an information processing device therein. For example, there is a controller capable of accommodating a mobile telephone, with a left key plate and a right key plate sandwiching the mobile telephone therebetween. The controller can communicate with the mobile telephone by connecting the connection terminal of the controller to the mobile telephone.

With the controller described above, a user first needs to connect the connection terminal of the controller to the mobile telephone, and then needs to place the mobile telephone between the key plates and sandwich the mobile telephone therebetween.

Thus, the present application discloses a controller that can be easily attached to an information processing device.

An example game controller described herein is removably attachable to a main unit having a main unit-side slide member and configured to execute a game process. The game controller includes an operation section and a controller-side slide member. The controller-side slide member is provided protruding from a first surface of the game controller and configured to slidably engage with the main unit-side slide member in a slide direction. The controller-side slide member has a first end and a second end in the slide direction. The game controller is configured to be attached to the main unit by inserting the controller-side slide member into the main unit-side slide member from the first end. The controller-side slide member includes a protruding portion and at least one terminal. The protruding portion protrudes from the first end side of the controller-side slide member in the slide direction and having an facing surface that faces the first surface of the game controller. The at least one terminal is between the facing surface and the first surface, wherein the terminal is configured to be electrically connected to the main unit.

The terminal may extend along the facing surface.

The terminal may be on the facing surface.

The terminal may be configured to flex into a slot in the facing surface.

A side of the terminal that faces the first surface may be exposed.

The protruding portion may include a wall on the facing surface that protrudes from the facing surface, the wall being on one side or on both sides of the terminal with respect to a direction substantially perpendicular to the slide direction.

An inner wall of the wall portion facing the terminal may flare away from the terminal in a direction that is also toward a distal end of the protruding portion.

A distal end of the terminal may between a center of the controller-side slide member and than a distal end of the protruding portion.

The protruding portion may be tapered toward the distal end.

An end portion of the protruding portion may have a second surface that is sloped away from the first surface and toward the distal end of the protruding portion.

An intersection between the facing surface and a second surface at the distal end may be a chamfer.

The terminal is one of a plurality of terminals between the facing surface and the first surface. The plurality of terminals may be arranged next to each other in a direction that is substantially parallel to the facing surface and substantially perpendicular to the slide direction, the terminals being exposed on one side that corresponds to the first end side of the controller-side slide member.

The operation section may be on a front surface of the game controller. The first surface may be a side surface relative to the front surface.

The controller-side slide member may be a rail extending substantially parallel to the slide direction.

The rail may extend from near a first end to near a second end of the first surface in the slide direction.

A cross section of the controller-side slide member taken perpendicular to the slide direction may have a shape where a width of a first portion to the first surface is narrower than a width of a second portion that is farther away from the first surface than the first portion.

A protruding portion protruding in the slide direction may be absent at the second end of the controller-side slide member.

An end surface of the controller-side slide member at the second end may be a flat surface extending from the first surface.

The game controller may further include a stop member. The stop member resists a slide movement of the controller-side slide member against the main unit-side slide member in a direction opposite to a direction in which the controller-side slide member is inserted into the main unit-side slide member when the controller-side slide member has been inserted up to a predetermined position into the main unit-side slide member.

The game controller may further include a stop member. The stop member is configured to stop the main unit-side slide member when the controller-side slide member has been inserted up to a predetermined position into the main unit-side slide member, wherein the stop member protrudes from the controller-side slide member in a direction that is perpendicular to the slide direction and parallel to the first surface.

The stop member may be on the second end side of a center of the controller-side slide member in the slide direction.

The stop member may protrude from the first surface of the game controller or from a side surface of the controller-side slide member substantially perpendicular to the first surface.

The terminal may be on the facing surface. A surface on a reverse side of the protruding portion from the facing surface may comprise a metal member over at least a part of an area where the terminal is on the facing surface, and a remaining portion of the protruding portion may comprise a resin member.

The game controller may further comprise an insulator between the terminal and the metal member.

The game controller may further include a water-resisting member between the terminal and the metal member.

The game controller may further include an electronic circuit including a ground portion. The terminal may be a ground terminal electrically connected to the ground portion. The metal member may further include a ground connecting portion electrically connected to the ground portion.

The game controller may have side surfaces. The first surface may be one of the side surfaces. The operation section may include a first input section on one of the side surfaces that corresponds to the second end side in the slide direction.

The controller-side slide member may be configured to be inserted into the main unit-side slide member on at least one of left and right side surfaces relative to a surface of the main unit that includes a display and from an upper side of the main unit-side slide member.

The operation section may include a directional input section enabling inputs of at least four directions of up, down, left and right.

The directional input section may output a two-dimensional value representing a direction and a quantity that have been input.

The directional input section may be an input device including an input member that is configured to be tilted or slid, from a reference position, in at least four directions of up, down, left and right.

The operation section may include a save-an-image input section for giving an instruction to save an image being displayed on a display of the main unit.

The game controller may further include an infrared image-capturing device.

The operation section may include a second input section on a surface of the controller-side slide member that faces the same direction as the first surface.

The present specification also discloses an example information processing device that can be attached to the game controller, and an example controller system (referred to also as an information processing system) including the game controller and the information processing device. The present specification also discloses a method to be carried out in the information processing system. The present specification also discloses an information processing program that causes a computer to execute some of the processes to be executed on the information processing system, the information processing device or the game controller (in other words, causes a computer to function as some of the various units of the information processing system, the information processing device or the game controller).

With the game controller set forth above, a controller can be easily attached to an information processing device.

These and other objects, features, aspects and advantages will become more apparent from the following detailed description when taken in conjunction with the accompanying drawings.

BRIEF DESCRIPTION OF THE DRAWINGS

FIG. 41 is a diagram showing an example of registration information;

FIG. 42 is a diagram showing an example of pairing information;

DETAILED DESCRIPTION OF NON-LIMITING EXAMPLE EMBODIMENTS

An information processing system, an information processing device, a controller device and an accessory according to an example of the present embodiment will now be described. In the present embodiment, the information processing system includes an information processing device 1 and a cradle 5 (see FIG. 28). The information processing device 1 of the present embodiment includes a main unit 2 and controllers 3 and 4, which can be attached to and detached from each other, and the controllers 3 and 4 can be used separately from the main unit 2 (see FIG. 2). The information processing device 1 can be used both in a mode of use in which images are displayed on the main unit 2 and in another mode of use in which images are displayed on a separate display device such as a TV. The information processing device 1 is used as a portable device (e.g., a portable game device) in the former mode, and the information processing device 1 is used as a console-type device (e.g., a console-type game device) in the latter mode.

[1. External Configuration of System]

[1-1. Configuration of Information Processing Device]

Figure 1:
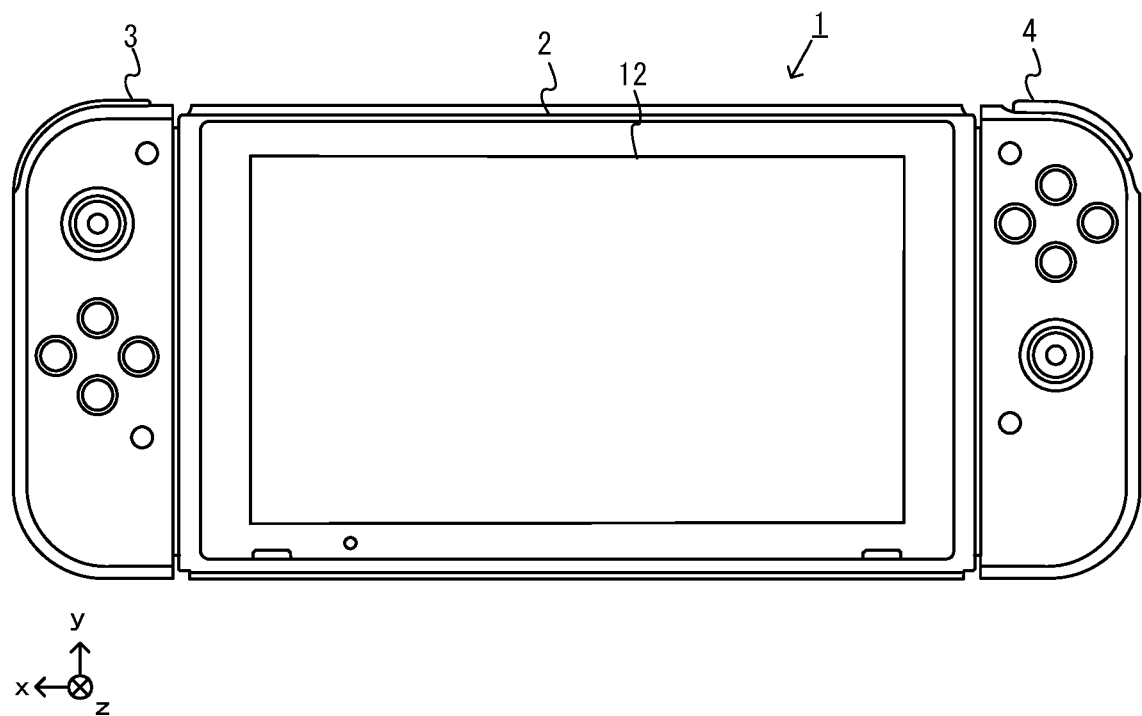
FIG. 1 is a diagram showing a non-limiting example information processing device.

FIG. 1 is a diagram showing an example information processing device 1 according to the present embodiment. As shown in FIG. 1, the information processing device 1 includes a main unit 2, a left controller 3 and a right controller 4. The main unit 2, including a display 12, executes various processes of the information processing device 1. The controllers 3 and 4 each include an operation section allowing a user to provide an input(s). The example left-right orientation shown in FIG. 1 is non-limiting.

Figure 2:
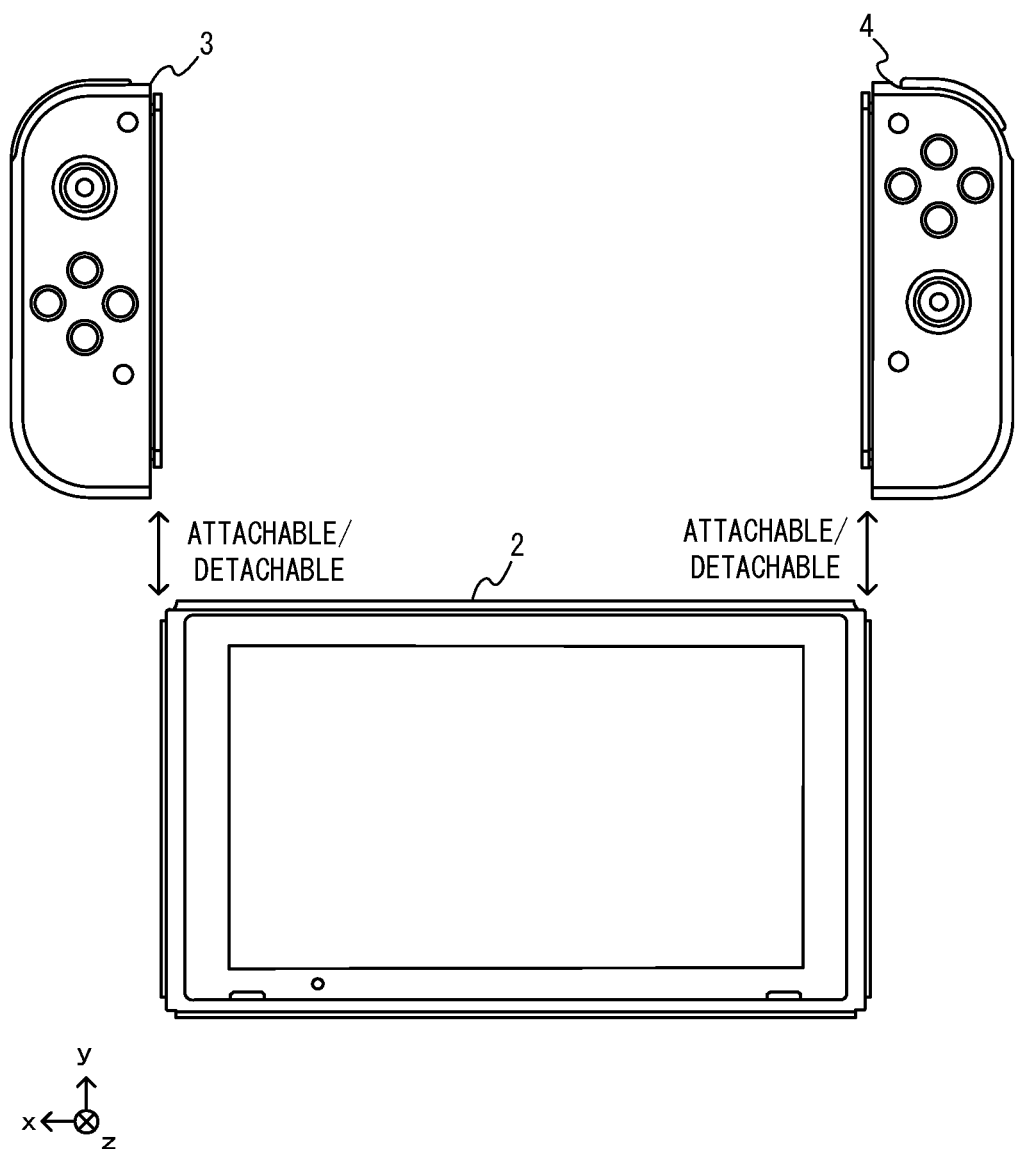
FIG. 2 is a diagram showing an example where controllers are detached from a main unit.

As shown in FIG. 1 and FIG. 2, the controllers 3 and 4 can be attached to and detached from the main unit 2. FIG. 2 is a diagram showing an example where the controllers 3 and 4 are detached from the main unit 2. The left controller 3 can be attached to the left side of the main unit 2 (the x-axis positive direction side shown in FIG. 1) and can also be detached therefrom. The right controller 4 can be attached to the right side of the main unit 2 (the x-axis negative direction side shown in FIG. 1) and can also be detached therefrom. Note that the left controller and the right controller may be referred to generally as "controllers". A specific example configuration of the main unit 2 and the controllers 3 and 4 will now be described.

[1-1-1. Configuration of Main Unit]

Figure 3:
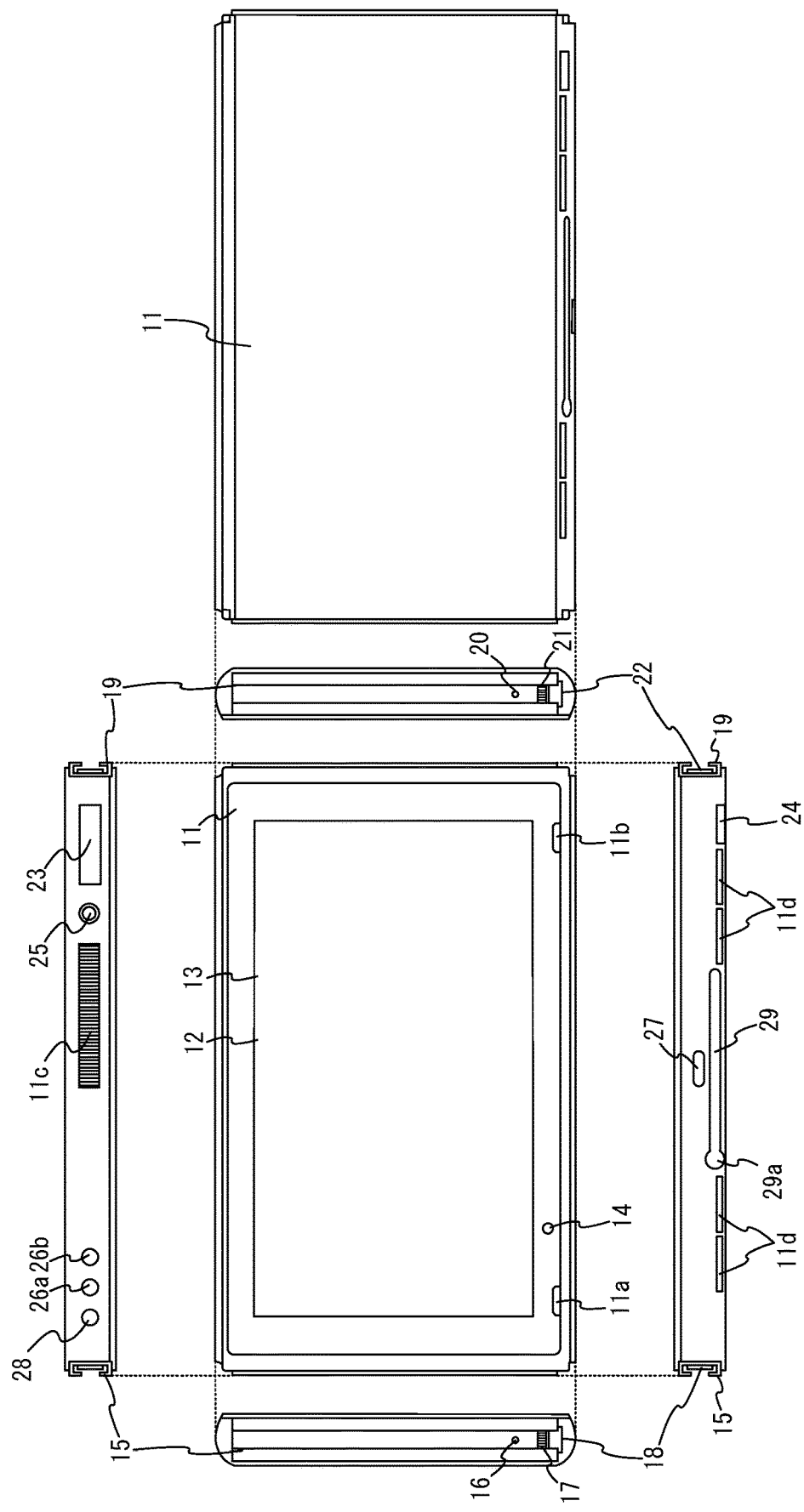
FIG. 3 is a six-sided view showing an example main unit.

FIG. 3 is a six-sided view showing an example main unit. As shown in FIG. 3, the main unit 2 includes a generally plate-shaped or planar housing 11. In the present embodiment, the primary surface (in other words, the front-side surface, i.e., the surface on which the display 12 is provided) of the housing 11 has a generally rectangular shape. In the present embodiment, the housing 11 has a horizontallyelongated shape. That is, in the present embodiment, the longitudinal direction of the primary surface of the housing 11 (i.e., the x-axis direction shown in FIG. 1) is denoted as the horizontal direction (also referred to as the left-right direction), the width direction of the primary surface (i.e., the y-axis direction shown in FIG. 1) is denoted as the vertical direction (also referred to as the up-down direction), and the direction perpendicular to the primary surface (i.e., the z-axis direction shown in FIG. 1) is denoted as the depth direction (also referred to as the front-rear direction). Note that the main unit 2 may be used in a landscape orientation or may be used in a portrait orientation.

Note that there is no particular limitation on the shape and the size of the housing 11. For example, in other embodiments, the housing 11 may include a projection or a grip portion for making it easier for a user to hold the device.

(Elements Provided on Primary Surface of Housing 11)

As shown in FIG. 3, the main unit 2 includes the display 12 provided on the primary surface of the housing 11. The display 12 displays an image (which may be a still image or a video or other moving image) obtained or produced by the main unit 2. While the display 12 is assumed to be a liquid crystal display device (LCD) in the present embodiment, it may be any type of a display device.

The main unit 2 includes a touch panel 13 on the screen of the display 12 such that display 12 functions as a touch screen. The touch panel may sense position, pressure or other characteristics of touch. In the present embodiment, the touch panel 13 is of a type (e.g., the capacitive type) that enables a multi-touch input. Note however that there is no particular limitation on the type of the touch panel 13, and the touch panel 13 may be of a type (e.g., the resistive type) that enables a single-touch input, for example.

The main unit 2 includes a speaker (i.e., a speaker 88 shown in FIG. 30) inside the housing 11. As shown in FIG. 3, speaker holes 11a and 11b are formed in the primary surface of the housing 11. Output sounds from the speaker 88 are output through these speaker holes 11a and 11b. In the present embodiment, the main unit 2 includes two speakers, and speaker holes are located respectively for the left speaker and the right speaker. The speaker hole 11a for the left speaker is formed in a left portion of the display 12. The speaker hole 11b for the right speaker is formed in a right portion of the display 12.

The main unit 2 also includes an ambient light sensor (i.e., an ambient light sensor 94 shown in FIG. 30) inside the housing 11. As shown in FIG. 3, a window portion 14 is provided in the primary surface of the housing 11 so as to allow light from outside the housing 11 to be received by the ambient light sensor 94. The window portion 14 is provided for example as a transparent member that allows light to pass therethrough, or a filter member that allows light of a predetermined wavelength(s) that can be sensed by the ambient light sensor 94 to pass therethrough.

Note that there is no particular limitation on the position, the shape and the number of the speaker holes 11a and 11b and the window portion 14. For example, in other embodiments, the speaker holes 11a and 11b may be provided on the side surface or the back surface of the housing 11. While the window portion 14 is provided on the lower left side of the display 12 in the present embodiment, it may be provided in any other position on the primary surface of the housing 11 or may be provided on the side surface of the housing 11.

(Elements Provided on Left Side Surface of Housing 11)

As shown in FIG. 3, the main unit 2 includes a left rail member 15 on the left side surface of the housing 11. The left rail member 15 is a member that allows the left controller 3 to be detachably attached to the main unit 2 so that a user can easily attach the left controller to the main unit 2 to mechanically and electrically join the two pieces together so that the pieces function as a single integrated unit, and yet the user can also easily detach the left controller from the main unit to allow the main unit and the left controller to operate while mechanically separated from one another. The left rail member 15 is provided so as to extend in the up-down direction on the left side surface of the housing 11. The left rail member 15 has such a shape that can engage with a slider of the left controller 3 (i.e., a slider 40 shown in FIG. 5). The left rail member 15 and the slider 40 together form a slide mechanism, the details of which will be described later. This slide mechanism allows the left controller 3 to be slidably and detachably attached to the main unit 2.

In the present embodiment, the left rail member 15 has a shape with a groove. In other words, the cross section (specifically, the cross section perpendicular to the up-down direction) of the left rail member 15 is C-shaped. More specifically, the cross section of the left rail member 15 is such that the end portions of the cross section extend in the outside-to-center direction. Therefore, the slider 40 in engagement with the left rail member 15 is securely locked so as not to come off in the direction perpendicular to the sliding direction (in other words, the direction in which the left rail member 15 extends) (see FIG. 7 to be discussed below).

As shown in FIG. 3, the left rail member 15 is provided with an engagement hole 16. The engagement hole 16 is located so as to face a projection 41 provided on the slider 40 when the left controller 3 is attached to the main unit 2. There is no particular limitation on the specific position of the engagement hole 16. In the present embodiment, the engagement hole 16 is provided on the bottom surface of the left rail member 15 (in other words, the bottom surface of the groove of the left rail member 15). The engagement hole 16 is shaped so that the projection (i.e., the projection 41 shown in FIG. 5) can engage with the engagement hole 16. When the left controller 3 is attached to the main unit 2, the projection 41 is inserted into and engages with the engagement hole 16, thereby locking the left controller 3 to the main unit 2, the details of which will be described later. Note that in other embodiments, the left rail member 15 may be provided with a projection and the slider 40 may be provided with an engagement hole.

The main unit 2 includes a left-side terminal 17. The left-side terminal 17 allows the main unit 2 to communicate with the left controller 3 in wired communication—in other words, when the left controller and the main unit are attached to one another, they can electrically communicate via the left side terminal. The left-side terminal 17 is located so as to be in contact with the terminal of the left controller 3 (a terminal 42 shown in FIG. 5) when the left controller 3 is attached to the main unit 2. There is no particular limitation on the specific position of the left-side terminal 17. In the present embodiment, as shown in FIG. 3, the left-side terminal 17 is provided on the bottom surface of the left rail member 15. In the present embodiment, the left-side terminal 17 is provided near the lower end on the bottom surface of the left rail member 15. The left-side terminal 17 is provided below the engagement hole 16 (in other words, on the far side with respect to the direction in which the slider 40 is inserted into the left rail member 15).

A stopper 18 is provided on the left side surface of the housing 11. As shown in FIG. 3, the stopper 18 is provided near the end (in the present embodiment, near the lower end)

of the left rail member 15. The stopper 18 is provided inside the groove of the left rail member 15. The stopper 18 is provided in order to limit the slide of the slider 40 in engagement with the left rail member 15, the details of which will be described later.

(Elements Provided on Right Side Surface of Housing 11)

As shown in FIG. 3, similar elements to those provided on the left side surface of the housing 11 are provided on the right side surface of the housing 11. That is, the main unit 2 includes a right rail member 19 on the right side surface of the housing 11. The right rail member 19 is provided so as to extend in the up-down direction on the right side surface of the housing 11. The right rail member 19 has such a shape that it can engage with a slider of the right controller 4 (i.e., a slider 62 shown in FIG. 6). The right rail member 19 and the slider 62 together form a slide mechanism, the details of which will be described later. This slide mechanism allows the right controller 4 to be slidably and detachably attached to the main unit 2.

In the present embodiment, the right rail member 19 has a similar shape to that of the left rail member 15. That is, the right rail member 19 has a shape with a groove whose cross-sectional shape is similar to that of the left rail member 15. Note however that the right rail member 19 does not need to have exactly the same shape as that of the left rail member 15. For example, in other embodiments, the groove of the left rail member 15 and the groove of the right rail member 19 may differ from each other in terms of the size and/or the shape so that the slider 62 of the right controller 4 cannot engage with the left rail member 15 (and/or so that the slider 40 of the left controller 3 cannot engage with the right rail member 19).

As shown in FIG. 3, the right rail member 19 is provided with an engagement hole 20. The engagement hole 20 is located so as to face a projection 63 provided on the slider 62 when the right controller 4 is attached to the main unit 2. There is no particular limitation on the specific position of the engagement hole 20. In the present embodiment, the engagement hole 20 is provided on the bottom surface of the right rail member 19 (in other words, the bottom surface of the groove of the right rail member 19). The engagement hole 20 is shaped so that the projection (i.e., the projection 63 shown in FIG. 6) can engage with the engagement hole 20. When the right controller 4 is attached to the main unit 2, the projection 63 is inserted into and engages with the engagement hole 20, thereby locking the right controller 4 to the main unit 2, the details of which will be described later. Note that in other embodiments, the right rail member 19 may be provided with a projection and the slider 62 with an engagement hole.

The main unit 2 includes a right-side terminal 21. The right-side terminal 21 allows the main unit 2 to communicate with the right controller 4 in wired communication. The right-side terminal 21 is located so as to be in contact with the terminal of the right controller 4 (a terminal 64 shown in FIG. 6) when the right controller 4 is attached to the main unit 2. There is no particular limitation on the specific position of the right-side terminal 21. In the present embodiment, as shown in FIG. 3, the right-side terminal 21 is provided on the bottom surface of the right rail member 19. In the present embodiment, the right-side terminal 21 is provided near the lower end on the bottom surface of the right rail member 19. The right-side terminal 21 is provided below the engagement hole 20 (in other words, on the far side with respect to the direction in which the slider 62 is inserted into the right rail member 19).

A stopper 22 is provided on the right side surface of the housing 11. As shown in FIG. 3, the stopper 22 is provided near the end (in the present embodiment, near the lower end) of the right rail member 19. The stopper 22 is provided inside the groove of the right rail member 19. The stopper 22 is provided in order to limit the slide of the slider 62 in engagement with the right rail member 19, the details of which will be described later.

As described above, in the present embodiment, the housing 11 of the main unit 2 is provided with the left rail member 15 and the right rail member 19. Thus, the housing 11 is configured on the assumption that controllers are attached thereto. Note that there is no particular limitation on the position, the shape and the size of the rail members 15 and 19. For example, in other embodiments, the rail members 15 and 19 may be provided on the left and right end portions, respectively, on the primary surface and/or the reverse surface of the housing 11. There is no particular limitation on the mechanism for allowing the controllers 3 and 4 to be detachably attached to the main unit 2, and a slider mechanism different from that of the present embodiment may be used, or a mechanism different from a slider mechanism may be used.

(Elements Provided on Upper Side Surface of Housing 11)

As shown in FIG. 3, the main unit 2 includes a first slot 23. The first slot 23 is provided on the upper side surface of the housing 11. The first slot 23 is shaped so as to accommodate a storage medium of a first type. Note that in the present embodiment, a cover that can be opened/closed is provided for the opening of the first slot 23, and a storage medium of the first type can be inserted into the first slot 23 with the cover being open. A storage medium of the first type is, for example, a dedicated storage medium (e.g., a dedicated memory card) for the information processing device 1 or other information processing devices of the same type. The storage medium of the first type is used, for example, for storing data used in the main unit 2 (e.g., application save data, etc.) and/or for storing programs to be executed on the main unit 2 (e.g., application programs, etc.).

The main unit 2 also includes a power button 28. As shown in FIG. 3, the power button 28 is provided on the upper side surface of the housing 11. The power button 28 is a button for turning ON/OFF the power of the main unit 2. Note that in the present embodiment, the power button 28 can be used to switch between the ON mode and the sleep mode. The ON mode is a mode in which the screen display of the display 12 is turned on, for example, and the sleep mode is a mode in which the screen display of the display 12 is turned off, for example. In the sleep mode, in addition to (or instead of) turning off the screen display of the display 12, a predetermined process of the application (e.g., a game process of a game application) may be stopped. When a long-press operation is performed on a power button 28 (specifically, when the power button 28 is held down for a predetermined period of time or longer), the main unit 2 executes a process of turning ON/OFF the power of the main unit 2. On the other hand, when a short-press operation is performed on the power button 28 (specifically, when the power button 28 is held down for a period of time that is shorter than the predetermined period of time), the main unit 2 executes a process of switching between the ON mode and the sleep mode.

As described above, in the present embodiment, the power button 28 can be used to turn the power ON/OFF and to switch between the ON mode and the sleep mode. Note that in other embodiments, the main unit 2 may be provided with a button only for the function of turning the power ON/OFF or only for the function of switching between the ON mode and the sleep mode.

The main unit 2 includes a sound input/output terminal (specifically, an earphone jack) 25. That is, the main unit 2 allows a microphone or an earphone to be attached to the sound input/output terminal 25. As shown in FIG. 3, the sound input/output terminal 25 is provided on the upper side surface of the housing 11.

The main unit 2 includes sound volume buttons 26a and 26b. As shown in FIG. 3, the sound volume buttons 26a and 26b are provided on the upper side surface of the housing 11. The sound volume buttons 26a and 26b are buttons for giving instructions to adjust the volume of the sound output from the main unit 2. That is, the sound volume button 26a is a button for giving an instruction to lower the sound volume, and the sound volume button 26b is a button for giving an instruction to raise the sound volume.

The housing 11 is provided with an air outlet hole 11c. As shown in FIG. 3, the air outlet hole 11c is provided on the upper side surface of the housing 11. The air outlet hole 11c is provided so as to radiate (in other words, discharge) the heat generated inside the housing 11 to the outside of the housing 11 for cooling purposes.

(Elements Provided on Lower Side Surface of Housing 11)

The main unit 2 includes a lower terminal 27. The lower terminal 27 is a terminal for allowing the main unit 2 to communicate with the cradle 5 to be described later. As shown in FIG. 3, the lower terminal 27 is provided on the lower side surface of the housing 11. The lower terminal 27 is connected to a terminal of the cradle 5 (a main body terminal 73 shown in FIG. 29) when the main unit 2 is attached to the cradle 5, the details of which will be described later. In the present embodiment, the lower terminal 27 is a USB connector (more specifically, a female-side connector).

The main unit 2 also includes a second slot 24. In the present embodiment, the second slot 24 is provided on the lower side surface of the housing 11. Note however that in other embodiments, the second slot 24 may be provided on the same surface as the first slot 23. The second slot 24 is shaped so as to accommodate a storage medium of a second type, which is different from the first type. Note that in the present embodiment, a cover that can be opened/closed is provided for the opening of the second slot 24, and a storage medium of the second type can be inserted into the second slot 24 with the cover being open. A storage medium of the second type may be, for example, a general-purpose storage medium, e.g., an SD card. As is the storage medium of the first type, the storage medium of the second type is used for storing data used in the main unit 2 (e.g., application save data, etc.) and/or for storing programs to be executed on the main unit 2 (e.g., application programs, etc.).

The housing 11 is provided with an air inlet hole 11d. As shown in FIG. 3, the air inlet hole 11d is provided on the lower side surface of the housing 11. The air inlet hole 11d is provided so as to take in (in other words, introduce) the air from the outside of the housing 11 to the inside of the housing 11. In the present embodiment, the air inlet hole 11d is provided on the surface opposite from the surface where the air outlet hole 11c is provided, thereby allowing for efficient discharge of the heat from inside the housing 11.

The main unit 2 also includes a stand member 29 used when placing the housing upright. As shown in FIG. 3, the stand member 29 is provided on the lower side surface of the housing 11. The stand member 29 is rotatably connected to the housing 11 via a pivot 29a. In FIG. 3, the stand member 29 is accommodated in the housing 11.

Figure 4:
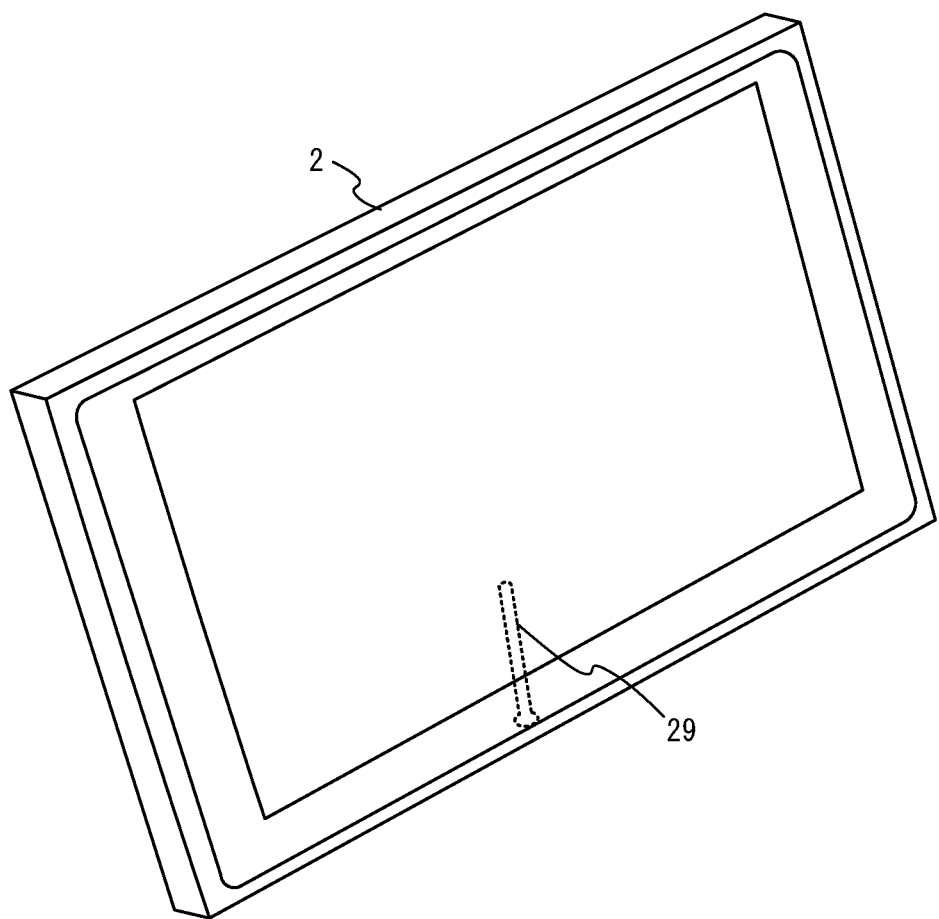
FIG. 4 is a diagram showing an example where the main unit is placed upright.

FIG. 4 is a diagram showing an example in which the main unit 2 is placed upright. Note that in order to facilitate understanding of elements of interest to be discussed in conjunction with the figure, some of the other elements of the main unit 2 are not shown in FIG. 4. The rod-shaped portion of the stand member 29 protrudes from the housing 11 after being rotated about the pivot 29a. Thus, the stand member 29 is brought into a position protruding from the housing 11, allowing the main unit 2 to be placed upright as shown in FIG. 4. Note that the mechanism for placing the main unit 2 upright is not limited to the stand member 29 shown in FIG. 3, but may be any other mechanism.

There is no particular limitation on the shape, the number and the arrangement of the various elements (specifically, the buttons, the slots, the terminals, etc.) provided on the housing 11 described above. For example, in other embodiments, some of the power button 28 and the slots 23 and 24 may be provided on another side surface or the back surface of the housing 11. In other embodiments, some of the elements described above may be absent on the main unit 2.

[1-1-2. Configuration of Left Controller]

Figure 5:
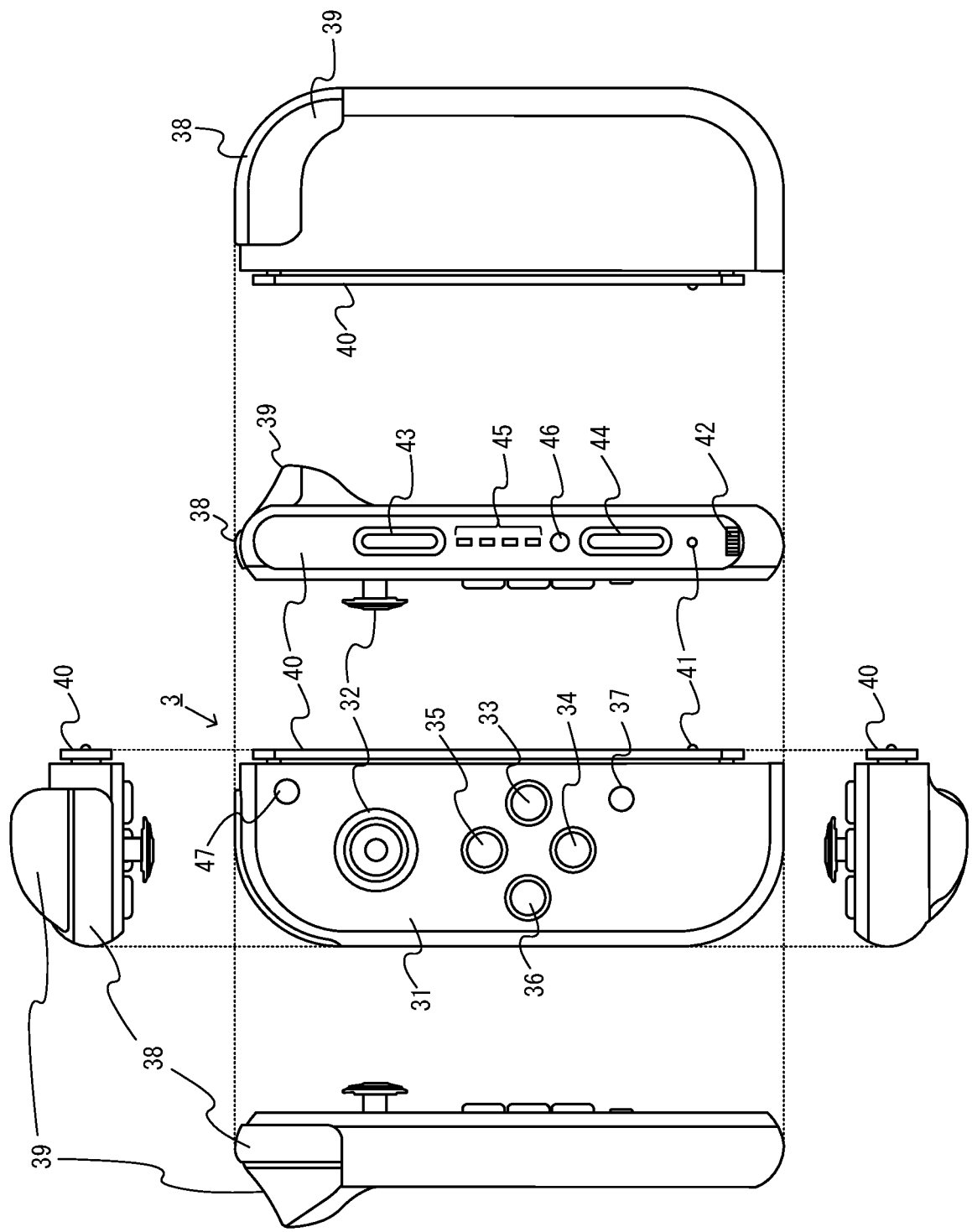
FIG. 5 is a six-sided view showing an example left controller.

FIG. 5 is a six-sided view showing an example of the left controller 3. As shown in FIG. 5, the left controller 3 includes a generally plate-shaped housing 31. In the present embodiment, the primary surface (in other words, the front-side surface, i.e., the surface on the z-axis negative direction side shown in FIG. 1) of the housing 31 has a generally rectangular shape. In the present embodiment, the housing 31 has a vertically-elongated shape, i.e., a shape that is elongated in the up-down direction (i.e., the y-axis direction shown in FIG. 1). Note that when detached from the main unit 2, the left controller 3 may be held in a portrait position (see FIG. 38) or may be held in a landscape position (see FIG. 35). Note that there is no particular limitation on the shape of the housing 31, and the housing 31 does not need to be generally plate-shaped in other embodiments. The housing 31 does not need to have a rectangular shape, but may have a semi-circular shape, or the like, for example. The housing 31 does not need to have a vertically-elongated shape.

The length of the housing 31 in the up-down direction is generally equal to the length of the housing 11 of the main unit 2 in the up-down direction. The thickness of the housing 31 (i.e., the length thereof in the front-rear direction; in other words, the length thereof in the z-axis direction shown in FIG. 1) is generally equal to the thickness of the housing 11 of the main unit 2. Therefore, when the left controller 3 is attached to the main unit 2 (see FIG. 1), a user can hold the main unit 2 and the left controller 3 as if they were an integral unit.

As shown in FIG. 5, the left-side corner portion of the primary surface of the housing 31 has a more rounded shape than the right-side corner portion thereof. That is, the connecting portion between the upper side surface and the left side surface of the housing 31 and the connecting portion between the lower side surface and the left side surface of the housing 31 are more rounded (in other words, round-cornered with a greater radius) than the connecting portion between the upper side surface and the right side surface and the connecting portion between the lower side surface and the right side surface. Therefore, when the left controller 3 is attached to the main unit 2 (see FIG. 1), the left side of the information processing device 1 will have a rounded shape, making it easier for a user to hold the device.

The left controller 3 includes an analog stick 32. As shown in FIG. 5, the analog stick 32 is provided on the primary surface of the housing 31. The analog stick 32 is an example of a directional input section allowing a user to input a direction. The analog stick 32 includes a stick member that can be tilted in any direction (i.e., 360° directions including the upper, lower, left, right and diagonal directions) parallel to the primary surface of the housing 31. A user can tilt the stick member to make a direction input based on the tilt direction (and a magnitude input based on the tilt angle). Note that the directional input section may also be a cross-shaped key, a slide stick, or the like. A slide stick is an input section including a stick member that can be slid in any direction parallel to the primary surface of the housing 31, and a user can slide the stick member to make an input based on the slide direction (and a magnitude input based on the slide amount). In the present embodiment, a user can also make an input by pressing down the stick member (in a direction vertical to the housing 31). That is, the analog stick 32 is an input section that allows a user to make a direction input and a magnitude input based on the tilt direction and the tilt amount, respectively, of the stick member, and also to make a push input by pressing down the stick member.

The left controller 3 includes four operation buttons 33 to 36 (specifically, a right direction button 33, a lower direction button 34, an upper direction button 35 and a left direction button 36). As shown in FIG. 5, these four operation buttons 33 to 36 are provided below the analog stick 32 on the primary surface of the housing 31. Note that while four operation buttons are provided on the primary surface of the left controller 3 in the present embodiment, there is no particular limitation on the number of operation buttons. These operation buttons 33 to 36 are used to give instructions in accordance with various programs executed on the main unit 2 (e.g., the OS program and application programs). Note that in the present embodiment, the operation buttons 33 to 36 can be used to make directional inputs, and the operation buttons 33 to 36 are therefore referred to as the right direction button 33, the lower direction button 34, the upper direction button 35 and the left direction button 36. Note however that the operation buttons 33 to 36 may be used to give instructions other than directional inputs.

The left controller 3 also includes a record button 37. As shown in FIG. 5, the record button 37 is provided on the primary surface of the housing 31, more specifically, in a lower right area of the primary surface. The record button 37 is a button for giving an instruction to save the image displayed on the display 12 of the main unit 2. For example, when a game image is displayed on the display 12, a user can press the record button 37 to save the game image that is displayed at the point in time when the button is pressed in a storage section of the main unit 2, for example.

The left controller 3 also includes a minus (−) button 47. As shown in FIG. 5, the minus button 47 is provided on the primary surface of the housing 31, more specifically, in an upper right area of the primary surface. The minus button 47 is used to give instructions in accordance with various programs executed on the main unit 2 (e.g., the OS program and application programs). The minus button 47 is used, for example, as a select button (e.g., a button used to move the selection through different selection items) in game applications.

Figure 33:
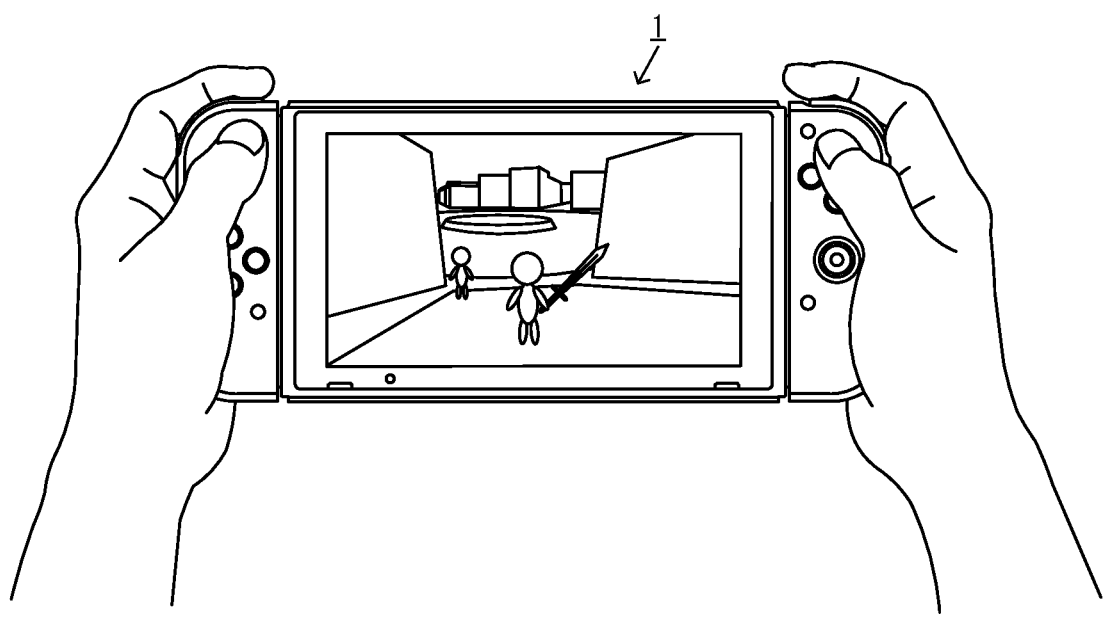
FIG. 33 is a diagram showing an example of how the information processing device is used with the controllers attached to the main unit.

When the left controller 3 is attached to the main unit 2, the operation sections provided on the primary surface of the left controller 3 (specifically, the analog stick 32 and the buttons 33 to 37 and 47) are operated with the thumb of the left hand, for example, of a user holding the information processing device 1 (see FIG. 33). When the left controller 3 is used detached from the main unit 2, the operation sections are operated with the left and right thumbs, for example, of a user holding the left controller 3 (see FIG. 34). Specifically, in such a case, the analog stick 32 is operated by the thumb of the left hand of the user, and the operation buttons 33 to 36 are operated with the thumb of the right hand of the user.

The left controller 3 includes a first L button 38. The left controller 3 also includes a ZL button 39. As are the operation buttons 33 to 36, these operation buttons 38 and 39 are used to give instructions in accordance with various programs executed on the main unit 2. As shown in FIG. 5, the first L button 38 is provided over a corner portion between the left side surface and the upper side surface of the housing 31. The ZL button 39 is provided to extend over a corner portion between the left side surface and the upper side surface of the housing 31 (strictly speaking, between the left side surface and the upper side surface as seen from the front side of the housing 31) while extending into the reverse surface of the housing 31. That is, the ZL button 39 is provided on the rear side (the z-axis positive direction side shown in FIG. 1) of the first L button 38. In the present embodiment, since the upper left corner portion of the housing 31 has a rounded shape, the first L button 38 and the ZL button 39 each have a rounded shape in conformity with the rounded shape of the upper left corner portion of the housing 31.

When the left controller 3 is attached to the main unit 2, the first L button 38 and the ZL button 39 will be placed over the upper left portion of the information processing device 1 (see FIG. 1). Therefore, a user holding the information processing device 1 is allowed to operate the first L button 38 and the ZL button 39 with the index finger or the middle finger of the left hand (see FIG. 33).

As shown in FIG. 5, a portion of the reverse surface of the housing 31 where the ZL button 39 is provided (more specifically, at least a portion of the perimeter of the ZL button 39) projects past other portions of the housing 31. The ZL button 39 is provided so as to project past the other portions of the housing 31 on the reverse surface. Therefore, when the main unit 2 with the left controller 3 attached thereto is placed on a flat surface in such an orientation that the reverse surface of the left controller 3 faces the horizontal flat surface, the projecting portions of the housing 31 are in contact with the flat surface. As a result, the information processing device 1 is placed so that the upper side of the main unit 2 is slightly raised from the lower side thereof. When the information processing device 1 is so placed, it is easy for a user to see the display 12.

Note that in other embodiments, when the main unit 2 with the left controller 3 attached thereto is placed on a flat surface in such an orientation that the reverse surface of the left controller 3 faces the horizontal flat surface, the ZL button 39 may be in contact with the flat surface. Now, in the present embodiment, the ZL button 39 can be pressed down primarily in the up-down direction (the y-axis direction). That is, the ZL button 39 is supported on the housing 31 so as to move primarily in the up-down direction. Therefore, even if the information processing device 1 is placed so that the ZL button 39 is in contact with the flat surface as described above, the ZL button 39 is unlikely to be pressed down because the ZL button 39 primarily receives a force in the front-rear direction (the z-axis direction). That is, even when the information processing device 1 is placed as described above, the ZL button 39 is unlikely to be pressed down inadvertently.

In other embodiments, the ZL button 39 may be provided so as not to project from the reverse surface of the housing 31. For example, the ZL button 39 may be provided on the side surface of the housing 31. For example, an area of the reverse surface of the housing 31 where the ZL button 39 is provided may be sunken from the remaining portion (i.e., the housing is formed to be thinner in this area) so that the ZL button 39 does not project past the remaining portion of the reverse surface.

The left controller 3 includes the slider 40 described above. As shown in FIG. 5, the slider 40 is provided so as to extend in the up-down direction on the right side surface of the housing 31. The slider 40 has such a shape that it can engage with the left rail member 15 (more specifically, the groove of the left rail member 15) of the main unit 2. Specifically, the cross section (specifically, the cross section perpendicular to the up-down direction) of the slider 40 is T-shaped. More specifically, the cross section of the slider 40 is T-shaped in conformity with the cross-sectional shape of the left rail member 15 (see FIG. 7). Therefore, the slider 40 in engagement with the left rail member 15 is locked so as not to come off in the direction perpendicular to the sliding direction (in other words, the direction in which the left rail member 15 extends) (see FIG. 7 to be discussed below).

As shown in FIG. 5, the slider 40 is provided with the projection 41. The projection 41 is arranged at such a position that allows the projection 41 to be inserted into the engagement hole 16 when the left controller 3 is attached to the main unit 2. There is no particular limitation on the specific position of the projection 41. In the present embodiment, the projection 41 is provided on the engaging surface of the slider 40. Note that the engaging surface of the slider 40 refers to a surface that faces the bottom surface of the left rail member 15 when the left controller 3 is attached to the main unit 2. The projection 41 is shaped so that the projection 41 can engage with the engagement hole 16 of the left rail member 15.

In the present embodiment, the projection 41 is biased from the inside of the slider 40 toward the outside of the slider 40. Thus, when a force from the outside of the slider 40 toward the inside of the slider 40 is applied on the projection 41, the projection 41 moves toward the inside of the slider 40 (i.e., retracts into the slider 40). There is no particular limitation on the configuration for biasing the projection 41 as described above. For example, in the present embodiment, the projection 41 is connected to an elastic member inside the slider 40, and the projection 41 is placed inside a hole in the slider 40 with a portion thereof protruding past the engaging surface of the slider 40. Note that in other embodiments, the projection 41 may be fixed to the slider 40.

The left controller 3 includes the terminal 42 for allowing the left controller 3 to communicate with the main unit 2 in wired communication. The terminal 42 is located so as to be in contact with the left-side terminal 17 of the main unit 2 (FIG. 3) when the left controller 3 is attached to the main unit 2. There is no particular limitation on the specific position of the terminal 42. In the present embodiment, as shown in FIG. 5, the terminal 42 is provided on the engaging surface of the slider 40. In the present embodiment, the terminal 42 is provided near the lower end on the engaging surface of the slider 40. The terminal 42 is provided below the projection 41 (in other words, on the front side with respect to the insertion of the slider 40 into the left rail member 15).

The left controller 3 also includes a second L button 43 and a second R button 44. As are the other operation buttons 33 to 36, these buttons 43 and 44 are used to give instructions in accordance with various programs executed on the main unit 2. As shown in FIG. 5, the second L button 43 and the second R button 44 are provided on the engaging surface of the slider 40. The second L button 43 is provided on the engaging surface of the slider 40 above the center of the engaging surface with respect to the up-down direction (the y-axis direction shown in FIG. 1). The second R button 44 is provided on the engaging surface of the slider 40 below the center of the engaging surface with respect to the up-down direction. The second L button 43 and the second R button 44 are arranged at such positions that they cannot be pressed down with the left controller 3 attached to the main unit 2. That is, the second L button 43 and the second R button 44 are buttons that are used when the left controller 3 is detached from the main unit 2. For example, the second L button 43 and the second R button 44 are operated with the index finger or the middle finger of the left hand and the right hand of a user holding the left controller 3 detached from the main unit 2 (see FIG. 35).

The left controller 3 includes an indicator LED 45. The indicator LED 45 is an indicator section for indicating predetermined information to the user. There is no particular limitation on the information to be indicated by the indicator LED 45. In the present embodiment, the indicator LED 45 shows the user identification information of the controller when the main unit 2 communicates with a plurality of controllers. Specifically, as the indicator LED 45, the left controller 3 includes a number (herein, four) of LEDs equal to the number of controllers that the main unit 2 can be simultaneously in communication with. Then, one of the four LEDs is lit, which is associated with the number assigned to the controller. Thus, it is possible with the indicator LED 45 to indicate the number to the user.

In other embodiments, the indicator LED 45 may indicate, to the user, the status of communication between the left controller 3 and the main unit 2. For example, the indicator LED 45 may be lit while a connection with the main unit 2 is established. While the number of LEDs (in other words, the light-emitting portions) serving as the indicator LED 45 is four in the present embodiment, there is no particular limitation on the number of LEDs.

In the present embodiment, the indicator LED 45 is provided on the engaging surface of the slider 40 as shown in FIG. 5. Thus, the indicator LED 45 is arranged at such a position that the indicator LED 45 cannot be seen when the left controller 3 is attached to the main unit 2. That is, the indicator LED 45 is used when the left controller 3 is detached from the main unit 2.

The left controller 3 includes a pairing button 46. In the present embodiment, the pairing button 46 is used to give an instruction for a setting (referred to also as pairing) process regarding wireless communication between the left controller 3 and the main unit 2, and to give an instruction for a resetting process of resetting the left controller 3. Note that in other embodiments, the pairing button 46 may only serve to instruct one of the setting process and the resetting process.

That is, when a short-press operation is performed on the pairing button 46 (specifically, when the pairing button 46 is pressed down for a shorter period of time than a predetermined period of time), the left controller 3 executes the setting process. Note that the details of the setting process will be described later.

When a long-press operation is performed on the pairing button 46 (specifically, when the pairing button 46 is held down for the predetermined period of time or longer), the left controller 3 executes the resetting process. The resetting process is a process of resetting the status of the left controller 3, and is a process that should be executed, for example, when the left controller 3 freezes (e.g., when the main unit 2 is no longer able to obtain data from the left controller 3). Although there is no particular limitation on the specific details of the resetting process, the resetting process may include, for example, a process of turning OFF the power of the left controller 3 and then turning it back ON, a process of disconnecting with the main unit 2 and then re-connecting with the main unit 2, a process of re-executing a process that is executed when starting communication, and/or the setting process. In the present embodiment, even when the left controller 3 freezes for some reason, the left controller 3 can be reset, using the pairing button 46, to an operative state.

In the present embodiment, the pairing button 46 is provided on the engaging surface of the slider 40 as shown in FIG. 5. Thus, the pairing button 46 is arranged at such a position that the pairing button 46 cannot be seen when the left controller 3 is attached to the main unit 2. That is, the pairing button 46 is used when the left controller 3 is detached from the main unit 2. In the present embodiment, it is assumed that the pairing button 46 is pressed down when the left controller 3 is detached from the main unit 2, and that the pairing button 46 will unlikely be pressed down when the left controller 3 is attached to the main unit 2. Thus, the pairing button 46 is arranged at such a position, thereby preventing the pairing button 46 from being operated in error when the left controller 3 is attached to the main unit 2.

Note that in the present embodiment, the buttons provided on the engaging surface of the slider 40 (specifically, the second L button 43, the second R button 44 and the pairing button 46) are provided so as not to protrude past the engaging surface. That is, the upper surface (in other words, the surface to be pressed) of these buttons is arranged flush with the engaging surface of the slider 40 or arranged at a position sunken from the engaging surface. This allows the slider 40 to slide smoothly against the left rail member 15 when the slider 40 is engaged with the left rail member 15 of the main unit 2.

[1-1-3. Configuration of Right Controller]

Figure 6:
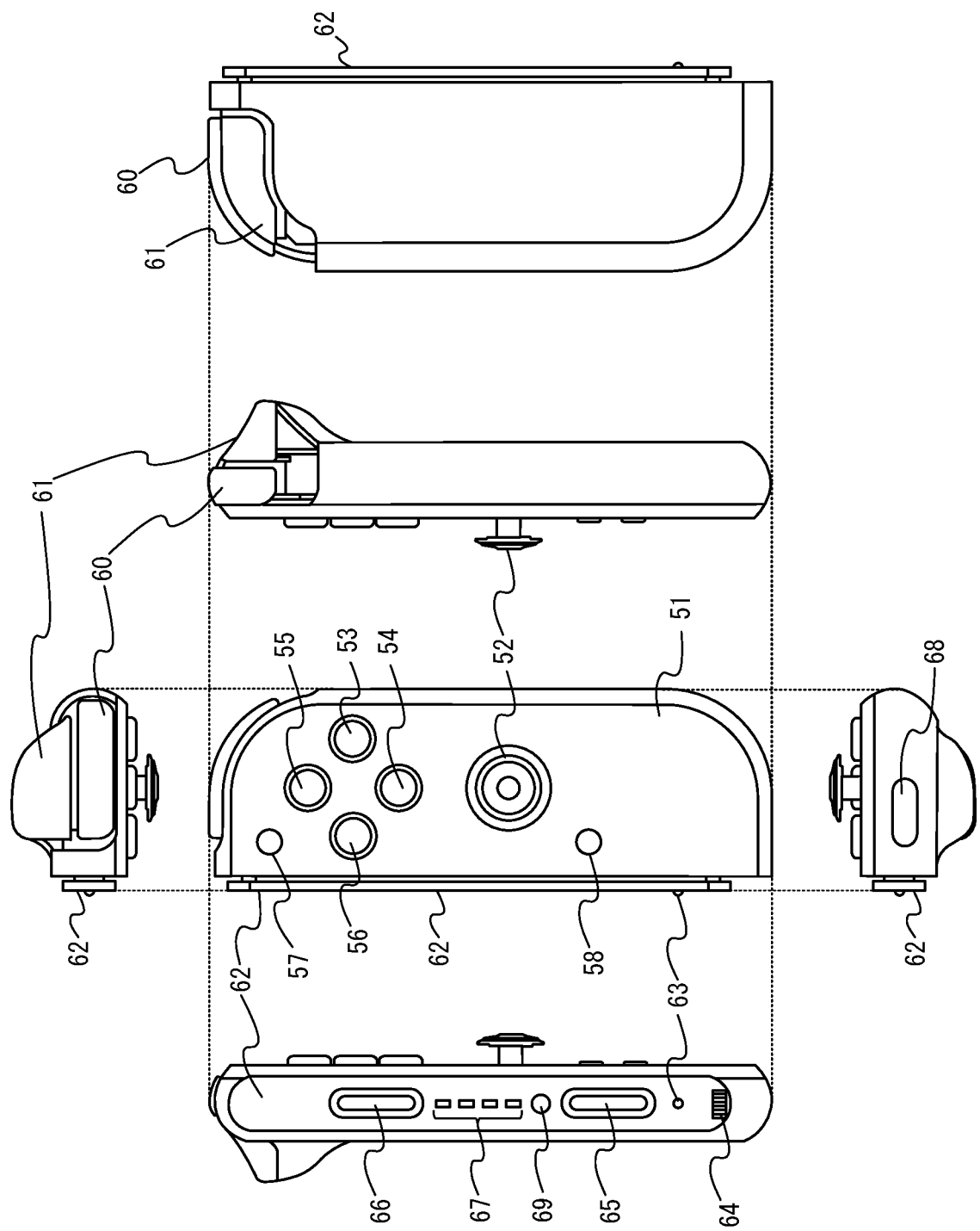
FIG. 6 is a six-sided view showing an example right controller.

FIG. 6 is a six-sided view showing an example of the right controller 4. As shown in FIG. 6, the right controller 4 includes a generally plate-shaped housing 51. In the present embodiment, the primary surface (in other words, the front-side surface, i.e., the surface on the z-axis negative direction side shown in FIG. 1) of the housing 51 has a generally rectangular shape. In the present embodiment, the housing 51 has a vertically-elongated shape, i.e., a shape that is elongated in the up-down direction. Note that when detached from the main unit 2, the right controller 4 may be held in a portrait position (see FIG. 38) or may be held in a landscape position (see FIG. 35).

As with the housing 31 of the left controller 3, the length of the housing 51 of the right controller 4 in the up-down direction is generally equal to the length of the housing 11 of the main unit 2 in the up-down direction, and the thickness thereof is generally equal to the thickness of the housing 11 of the main unit 2. Therefore, when the right controller 4 is attached to the main unit 2 (see FIG. 1), a user can hold the main unit 2 and the right controller 4 as if they were an integral unit.

As shown in FIG. 6, the right-side corner portion of the primary surface of the housing 51 has a more rounded shape than the left-side corner portion thereof. That is, the connecting portion between the upper side surface and the right side surface of the housing 51 and the connecting portion between the lower side surface and the right side surface of the housing 51 are more rounded (in other words, round-cornered with a greater radius) than the connecting portion between the upper side surface and the left side surface and the connecting portion between the lower side surface and the left side surface. Therefore, when the right controller 4 is attached to the main unit 2 (see FIG. 1), the right side of the information processing device 1 will have a rounded shape, making it easier for a user to hold the device.

As does the left controller 3, the right controller 4 includes an analog stick 52 as the directional input section. In the present embodiment, the analog stick 52 has the same configuration as the analog stick 32 of the left controller 3. As does the left controller 3, the right controller 4 includes four operation buttons 53 to 56 (specifically, the A button 53, the B button 54, the X button 55 and the Y button 56). In the present embodiment, these four operation buttons 53 to 56 are of the same mechanism as the four operation buttons 33 to 36 of the left controller 3. As shown in FIG. 6, the analog stick 52 and the operation buttons 53 to 56 are provided on the primary surface of the housing 51. Note that while the number of operation buttons provided on the primary surface of the right controller 4 is four in the present embodiment, there is no particular limitation on the number of operation buttons.

In the present embodiment, the positional relationship between the two types of operation sections (the analog stick and the operation buttons) of the right controller 4 is opposite from the positional relationship between these two types of operation sections of the left controller 3. That is, the analog stick 52 is arranged above the operation buttons 53 to 56 on the right controller 4, whereas the analog stick 32 is arranged below the operation buttons 33 to 36 on the left controller 3. With such an arrangement, the left and right controllers 3 and 4, when detached from the main unit 2, can be operated in a similar fashion, the details of which will be described later.

The right controller 4 also includes a plus (+) button 57. As shown in FIG. 6, the plus button 57 is provided on the primary surface of the housing 51, more specifically, in an upper left area of the primary surface. As are the other operation buttons 53 to 56, the plus button 57 is used to give instructions in accordance with various programs executed on the main unit 2 (e.g., the OS program and application programs). The plus button 57 is used, for example, as a start button in a game application (e.g., a button used to give an instruction to start the game).

The right controller 4 includes a home button 58. As shown in FIG. 6, the home button 58 is provided on the primary surface of the housing 51, more specifically, in a lower left area of the primary surface. The home button 58 is a button for displaying a predetermined menu screen on the display 12 of the main unit 2. The menu screen is, for example, a screen where a user can launch an application specified by the user, from among a plurality of applications that can be executed on the main unit 2. The menu screen may be displayed at the start-up of the main unit 2, for example. In the present embodiment, a predetermined control screen may be displayed on the display 12 (the menu screen may be displayed instead of the control screen) when the home button 58 is pressed while an application is executed on the main unit 2 (i.e., while images of the application are displayed on the display 12). Note that the control screen is, for example, a screen where a user can give an instruction to end an application and display the menu screen on the display 12, and an instruction to resume an application, etc.

The operation sections provided on the primary surface of the right controller 4 (specifically, the analog stick 52 and the buttons 53 to 59) are operated with the thumb of the right hand, for example, of a user holding the information processing device 1 when the right controller 4 is attached to the main unit 2 (see FIG. 33). When the right controller 4 is used detached from the main unit 2, the operation sections are operated with the left and right thumbs, for example, of a user holding the right controller 4 (see FIG. 34). Specifically, in such a case, the analog stick 52 is operated with the thumb of the left hand of the user, and the operation buttons 53 to 56 are operated with the thumb of the right hand of the user.

The right controller 4 includes a first R button 60. The right controller 4 includes a ZR button 61. As shown in FIG. 6, the first R button 60 is provided over a corner portion between the right side surface and the upper side surface of the housing 51. The ZR button 61 is provided to extend over a corner portion between the right side surface and the upper side surface of the housing 51 (strictly speaking, between the right side surface and the upper side surface as seen from the front side of the housing 51) while extending into the reverse surface of the housing 51. That is, the ZR button 61 is provided on the rear side (the z-axis positive direction side shown in FIG. 1) of the first R button 60. In the present embodiment, since the upper right corner portion of the housing 51 has a rounded shape, the first R button 60 and the ZR button 61 each have a rounded shape in conformity with the rounded shape of the upper right portion of the housing 51.

When the right controller 4 is attached to the main unit 2, the first R button 60 and the ZR button 61 will be placed over the upper right portion of the information processing device 1 (see FIG. 1). Therefore, a user holding the information processing device 1 is allowed to operate the first R button 60 and the ZR button 61 with the index finger or the middle finger of the right hand (see FIG. 34).

As shown in FIG. 6, the ZR button 61 of the right controller 4 is provided so as to project from the housing 51, as is the ZL button 39 of the left controller 3. That is, a portion of the reverse surface of the housing 51 where the ZR button 61 is provided (more specifically, at least a portion of the perimeter of the ZR button 61) projects past the remaining portion of the housing 51. The ZR button 61 is provided so as to project past the remaining portion of the housing 51 on the reverse surface. Therefore, when the right controller 4 is attached to the main unit 2, as is the case when the left controller 3 is attached to the main unit 2, when the main unit 2 is placed on a flat surface in such an orientation that the reverse surface of the right controller 4 faces the horizontal flat surface, the projecting portions of the housing 51 are in contact with the flat surface. As a result, the main unit 2 is placed so that the upper side thereof is slightly raised from the lower side thereof, and it is therefore easy for a user to see the display 12.

Note that in the present embodiment, as with the ZL button 39 of the left controller 3, the ZR button 61 of the right controller 4 can be pressed down primarily in the up-down direction (the y-axis direction). Therefore, as with the ZL button 39, the ZR button 61 is unlikely to be pressed down when the information processing device 1 is placed so that the ZR button 61 is in contact with a flat surface. Thus, the ZR button 61 is unlikely to be pressed in error. Note that in other embodiments, the housing 51 may be formed so that the reverse surface of the housing 51 projects past the ZR button 61. In other embodiments, as is the ZL button 39 of the left controller 3, the ZR button 61 may be formed so as not to project from the reverse surface of the housing 51.

In the present embodiment, the shape of the first L button 38 and the shape of the first R button 60 are not in left-right symmetry, and the shape of the ZL button 39 and the shape of the ZR button 61 are not in left-right symmetry. Note however that in other embodiments, the shape of the first L button 38 and the shape of the first R button 60 may be in left-right symmetry, and the shape of the ZL button 39 and the shape of the ZR button 61 may be in left-right symmetry.

The right controller 4 includes a similar slider mechanism to that of the left controller 3. That is, the right controller 4 includes the slider 62 described above. As shown in FIG. 6, the slider 62 is provided so as to extend in the up-down direction on the left side surface of the housing 51. The slider 62 has such a shape that it can engage with the right rail member 19 (more specifically, the groove of the right rail member 19) of the main unit 2. Specifically, the cross section (specifically, the cross section perpendicular to the up-down direction) of the slider 62 is T-shaped. More specifically, the cross section of the slider 62 is T-shaped in conformity with the cross-sectional shape of the right rail member 19 (see FIG. 7). Therefore, the slider 62 in engagement with the right rail member 19 is locked so as not to come off in the direction perpendicular to the sliding direction (in other words, the direction in which the right rail member 19 extends) (see FIG. 7).

The slider 62 is provided with the projection 63. The projection 63 is arranged at such a position that allows the projection 63 to be inserted into the engagement hole 20 when the right controller 4 is attached to the main unit 2. There is no particular limitation on the specific position of the projection 63. In the present embodiment, the projection 63 is provided on the engaging surface of the slider 62. Note that the engaging surface of the slider 62 refers to a surface that faces the bottom surface of the right rail member 19 when the right controller 4 is attached to the main unit 2. The projection 63 is shaped so that the projection 63 can engage with the engagement hole 20 of the right rail member 19.

In the present embodiment, as is the projection 41 of the left controller 3, the projection 63 of the right controller 4 is biased from the inside of the slider 62 toward the outside of the slider 62. Thus, when a force from the outside of the slider 62 toward the inside of the slider 62 is applied on the projection 63, the projection 63 moves toward the inside of the slider 62 (i.e., retracts into the slider 62). Note that there is no particular limitation on the configuration for biasing the projection 63 as described above, and it may be a similar configuration to the projection 41 of the left controller 3.

The right controller 4 includes the terminal 64 for allowing the right controller 4 to communicate with the main unit 2 in wired communication. The terminal 64 is located so as to be in contact with the right-side terminal 21 of the main unit 2 (FIG. 3) when the right controller 4 is attached to the main unit 2. There is no particular limitation on the specific position of the terminal 64. In the present embodiment, as shown in FIG. 6, the terminal 64 is provided on the engaging surface of the slider 62. In the present embodiment, the terminal 64 is provided near the lower end on the engaging surface of the slider 62. The terminal 64 is provided below the projection 63 (in other words, on the front side with respect to the insertion of the slider 62 into the right rail member 19).

As does the left controller 3, the right controller 4 also includes a second L button 65 and a second R button 66. As are the operation buttons 53 to 56, these buttons 65 and 66 are used to give instructions in accordance with various programs executed on the main unit 2. As shown in FIG. 6, the second L button 65 and the second R button 66 are provided on the engaging surface of the slider 62. The second L button 65 is provided on the engaging surface of the slider 62 below the center of the engaging surface with respect to the up-down direction (the y-axis direction shown in FIG. 1). The second R button 66 is provided on the engaging surface of the slider 62 above the center of the engaging surface with respect to the up-down direction. As are the second L button 43 and the second R button 44 of the left controller 3, the second L button 65 and the second R button 66 are arranged at such positions that they cannot be pressed down with the right controller 4 attached to the main unit 2, and they are buttons that are used when the right controller 4 is detached from the main unit 2. For example, the second L button 65 and the second R button 66 are operated with the index finger or the middle finger of the left hand and the right hand of a user holding the right controller 4 detached from the main unit 2 (see FIG. 35).

The right controller 4 includes an indicator LED 67. As is the indicator LED 45 of the left controller 3, the indicator LED 67 is an indicator section for indicating predetermined information to the user. As does the left controller 3, the right controller 4 includes four LEDs as the indicator LED 67, and one of the four LEDs is lit, which is associated with the number assigned to the right controller 4. In the present embodiment, as is the indicator LED 45, the indicator LED 67 is provided on the engaging surface of the slider 62 (FIG. 6). Thus, the indicator LED 67 is arranged at such a position that the indicator LED 67 cannot be seen with the right controller 4 attached to the main unit 2, and the indicator LED 67 is used when the right controller 4 is detached from the main unit 2.

The right controller 4 includes a pairing button 69. As is the pairing button 46 of the left controller 3, the pairing button 69 is used to give an instruction for a setting (referred to also as "pairing") process regarding wireless communication between the right controller 4 and the main unit 2, and to give an instruction for a resetting process of resetting the right controller 4. The setting process and the resetting process are the same as those for the left controller 3, and will not therefore be described in detail below. In the present embodiment, the pairing button 69 is provided on the engaging surface of the slider 62 as shown in FIG. 6. That is, for the same reason for the pairing button 46 of the left controller 3, the pairing button 69 is arranged at such a position that the pairing button 69 cannot be seen with the right controller 4 attached to the main unit 2.

With the right controller 4, as with the left controller 3, the buttons provided on the engaging surface of the slider 62 (specifically, the second L button 65, the second R button 66 and the pairing button 69) are provided so as not to protrude past the engaging surface. This allows the slider 62 to slide smoothly against the right rail member 19 when the slider 62 is engaged with the right rail member 19 of the main unit 2.

A window portion 68 is provided in the lower side surface of the housing 51. The right controller 4 includes an infrared image-capturing section (an infrared image-capturing section 123 shown in FIG. 31), the details of which will be described later, to detect a hand movement and/or the gesture, etc., of the user by means of the infrared image-capturing section 123. The window portion 68 is provided so as to allow the camera of the infrared image-capturing section 123 arranged inside the housing 51 to capture an image around the right controller 4. The window portion 68 is provided for protecting the lens of the camera of the infrared image-capturing section 123, and is made of a material (e.g., a transparent material) that allows light of a wavelength to be detected by the camera to pass therethrough. Note that the window portion 68 may be a hole formed in the housing 51. Note that in the present embodiment, the infrared image-capturing section 123 itself has a filter member for suppressing the transmission therethrough of light of wavelengths other than the light (in the present embodiment, infrared light) to be detected by the camera. Note however that in other embodiments, the window portion may have a filter function.

Note that for the controllers 3 and 4, there is no particular limitation on the shape, the number and the arrangement of the various elements (specifically, the slider, the stick, the buttons, the LEDs, etc.) provided on the housing 31 or 51. For example, in other embodiments, the controllers 3 and 4 may include a directional input section of a different type from an analog stick. The slider 40 or 62 may be arranged at a position that corresponds to the position of the rail member 15 or 19 provided on the main unit 2, and may be, for example, arranged on the primary surface or the reverse surface of the housing 31 or 51. In other embodiments, one or more of the various elements described above may be absent on the controllers 3 and 4.

[1-1-4: Attachment Action]

Next, referring to FIG. 7 and FIGS. 8(*a*) and 8(*b*), the action of attaching and detaching a controller to and from the main unit 2 will be described. Note that although the description below is directed to the action of attaching and detaching the left controller 3 to and from the main unit 2, the action of attaching and detaching the right controller 4 to and from the main unit 2 can be done in the same manner as the left controller 3.

When the left controller 3 is attached to the main unit 2, a user first inserts the lower end of the slider 40 of the left controller 3 into a groove of the left rail member 15 of the main unit 2 via the upper end of the left rail member 15. FIG. 7 is a diagram showing an example of how the left rail member 15 and the slider 40 engage with each other. Note that in order to facilitate understanding of the figure, elements of the main unit 2 are shown in phantom line in FIG. 7. As shown in FIG. 7, the slider 40 is inserted into the left rail member 15 so that the T-shaped cross section of the slider 40 engages with (or is fitted to) the C-shaped cross section of the left rail member 15 (in other words, the groove of the left rail member 15).

After inserting the lower end of the slider 40 into the groove of the left rail member 15, the user further inserts the slider 40 down the groove of the left rail member 15. That is, the user slides the left controller 3 downward against the main unit 2. Then, when the left controller 3 has been slid until the lower end of the slider 40 reaches the position of the stopper 18 of the main unit 2, the left controller 3 is locked to the main unit 2.

Figure 8A:
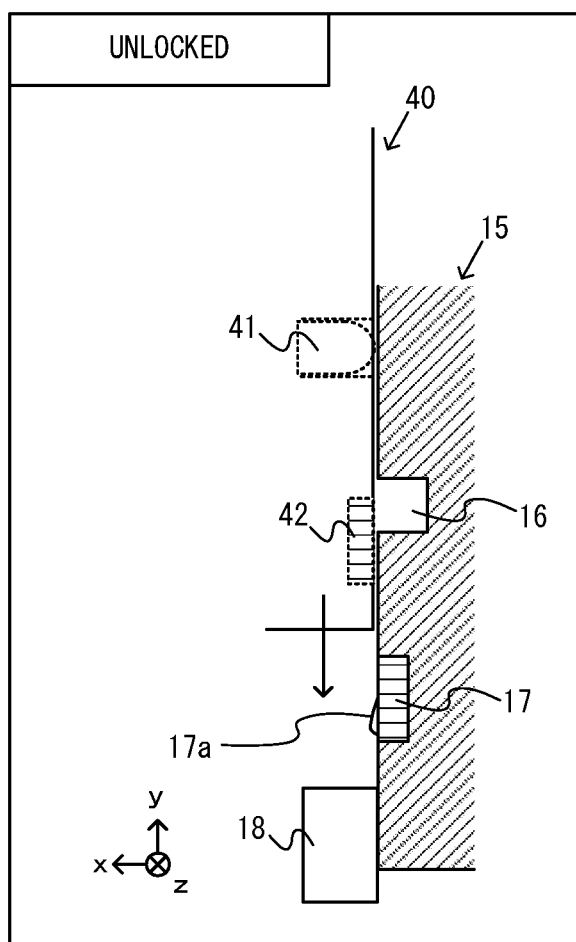
FIGS. 8(a) and 8(b) are diagrams showing an example of how the slider is locked to the left rail member.
Figure 8B:
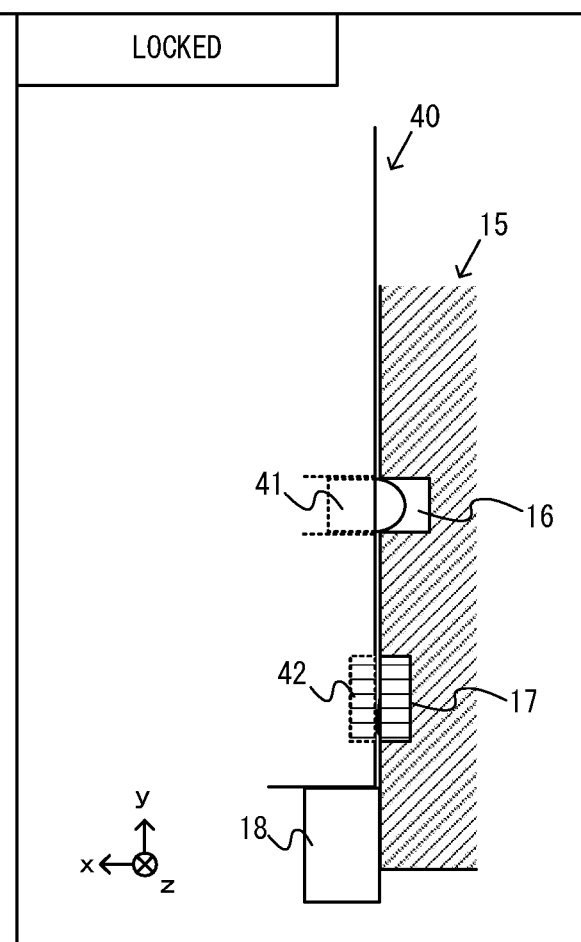

FIGS. 8(*a*) and 8(*b*) are diagrams showing an example of how the slider 40 is locked to the left rail member 15. Note that FIGS. 8(*a*) and 8(*b*) show a cross section of the left rail member 15 perpendicular to the front-rear direction (the z-axis direction). In order to facilitate understanding of elements of interest to be discussed in conjunction with the figure, the elements are shown in FIGS. 8(a) and 8(b) with different positional relationships and different sizes from FIG. 3, etc.

As shown in FIG. 8(a), when the left controller 3 is not completely attached to the main unit 2 (i.e., when the lower end of the slider 40 has not reached the stopper 18 of the main unit 2), the projection 41 of the slider 40 is retracted inside the slider 40 by being in contact with the bottom surface of the rail member 15.

After the state shown in FIG. 8(a), the slider 40 is slid further down the left rail member 15, the lower end of the slider 40 reaches the position of the stopper 18 of the main unit 2 (see FIG. 8(b)). Then, as shown in FIG. 8(b), the projection 41 of the slider 40 faces the engagement hole 16 of the left rail member 15. Therefore, the projection 41 protrudes from the engaging surface of the slider 40 to be inserted into the engagement hole 16. Thus, the projection 41 engages with the engagement hole 16, thereby locking the left controller 3 to the main unit 2 (in other words, locking the slider 40 to the left rail member 15) to such a degree that a small force will not cause the left controller 3 to come off.

When the left controller 3 is locked to the main unit 2, the terminal 42 of the slider 40 is located so as to face the left-side terminal 17 of the left rail member 15 as shown in FIG. 8(b). Thus, the terminal 42 and the left-side terminal 17 are connected together. This enables wired communication (in other words, communication via physical connection between terminals) between the left controller 3 and the main unit 2. This also allows power to be supplied from the main unit 2 to the left controller 3.

Note that one or both of the controller-side terminal (i.e., the terminal 42) and the main unit-side terminal (i.e., the left-side terminal 17) protrudes (only slightly) from the base surface. In the present embodiment, as shown in FIG. 8(a), the left-side terminal 17 on the main unit side is provided to slightly protrude from the base surface (i.e., the bottom surface of the left rail member 15). A metal portion 17a is the contact point of the terminal, is provided to protrude, and is able to deform toward its base surface. Therefore, when the terminals come into contact with each other, each terminal receives a pressing force from the other terminal so as to be biased in the direction in which it protrudes, as shown in FIG. 8(b). This as a result ensures a reliable contact between the terminals.

In the present embodiment, the left-side terminal 17 of the main unit 2 is provided below the engagement hole 16. The terminal 42 of the left controller 3 is provided below the projection 41. Therefore, when the slider 40 is inserted into the left rail member 15, the projection 41 will not come into contact with the left-side terminal 17, thereby lowering the possibility of the projection 41 damaging the left-side terminal 17.

When detaching the left controller 3 from the main unit 2, a user slides the left controller 3 upward against the main unit 2. Note that when the left controller 3 is attached to the main unit 2, the left controller 3 is locked to the main unit 2 by means of the projection 41 and the engagement hole 16. Note however that a certain force or more for sliding the left controller 3 upward will dislocate the projection 41 off the position of the engagement hole 16, thereby releasing the lock. After the lock is released, the left controller 3 can be further slid up to remove the left controller 3 from the main unit 2.

Note that in other embodiments, the left controller 3 may include a mechanism capable of retracting the projection 41 into the slider 40. The left controller 3 may include a mechanism for retracting the projection 41 into the slider 40 in response to a user pressing a predetermined button provided on the left controller 3, for example. Thus, by performing the operation described above, the user can easily release the lock of the left controller 3 to the main unit 2 by means of the projection 41.

As described above, in the present embodiment, the controllers 3 and 4 can be detachably attached to the main unit 2 by means of a slide mechanism including a rail member and a slider. With a slide mechanism, the controllers 3 and 4 can be securely locked to the main unit 2 for directions other than the slide direction. Therefore, a user can easily hold the information processing device 1 with the controllers 3 and 4 attached to the main unit 2, with little shaking of the controllers 3 and 4. In the present embodiment, also for the slide direction, the projection and the engagement hole allow the controllers 3 and 4 to be locked to the main unit 2. This also reduces the shaking of the controllers 3 and 4 attached to the main unit 2, thereby allowing a user to easily hold the information processing device 1.

[1-2. Another Configuration Example Regarding Information Processing Device]

Note that the configuration regarding the attachment of a controller to the main unit 2 may use a second configuration example to be described below, instead of the configuration example (referred to hereinafter as the "first configuration example") described above in "[1-1. Configuration of information processing device]". The second configuration example regarding the main unit 2 and the controllers 3 and 4 will now be described, focusing on differences from the first configuration example.

[1-2-1. Second Configuration Example Regarding Main Unit]

Figure 9:
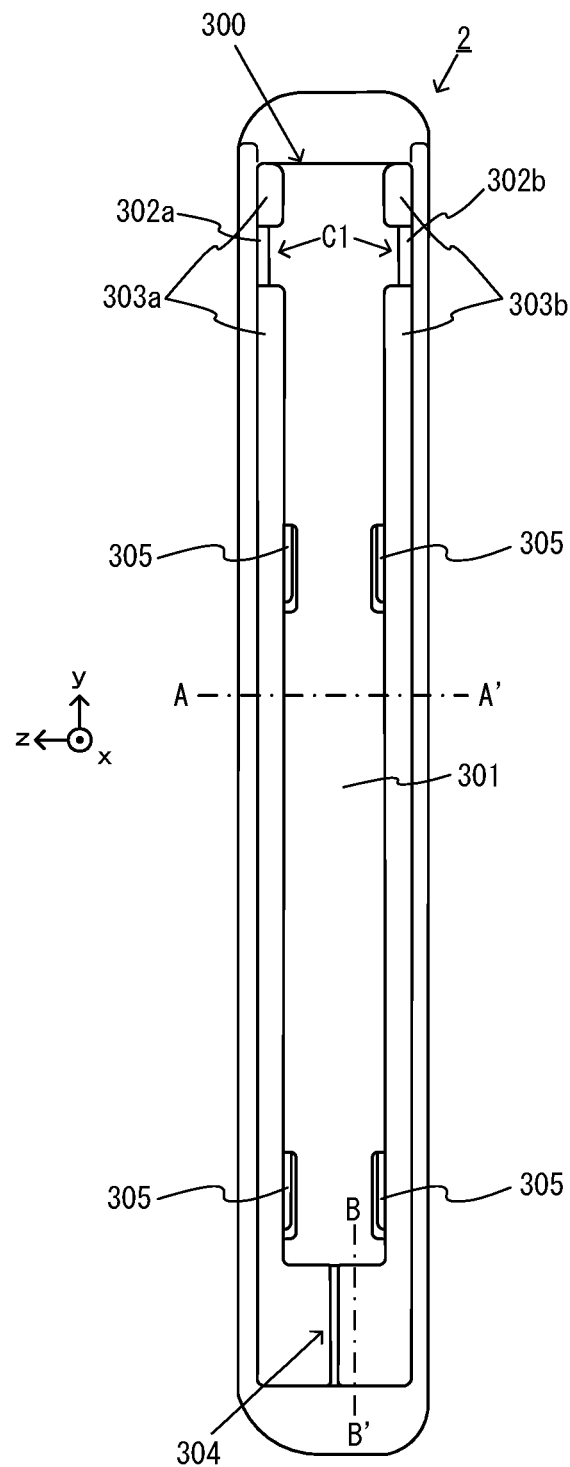
FIG. 9 is a left side view showing an example main unit according to a non-limiting second configuration example.
Figure 10:
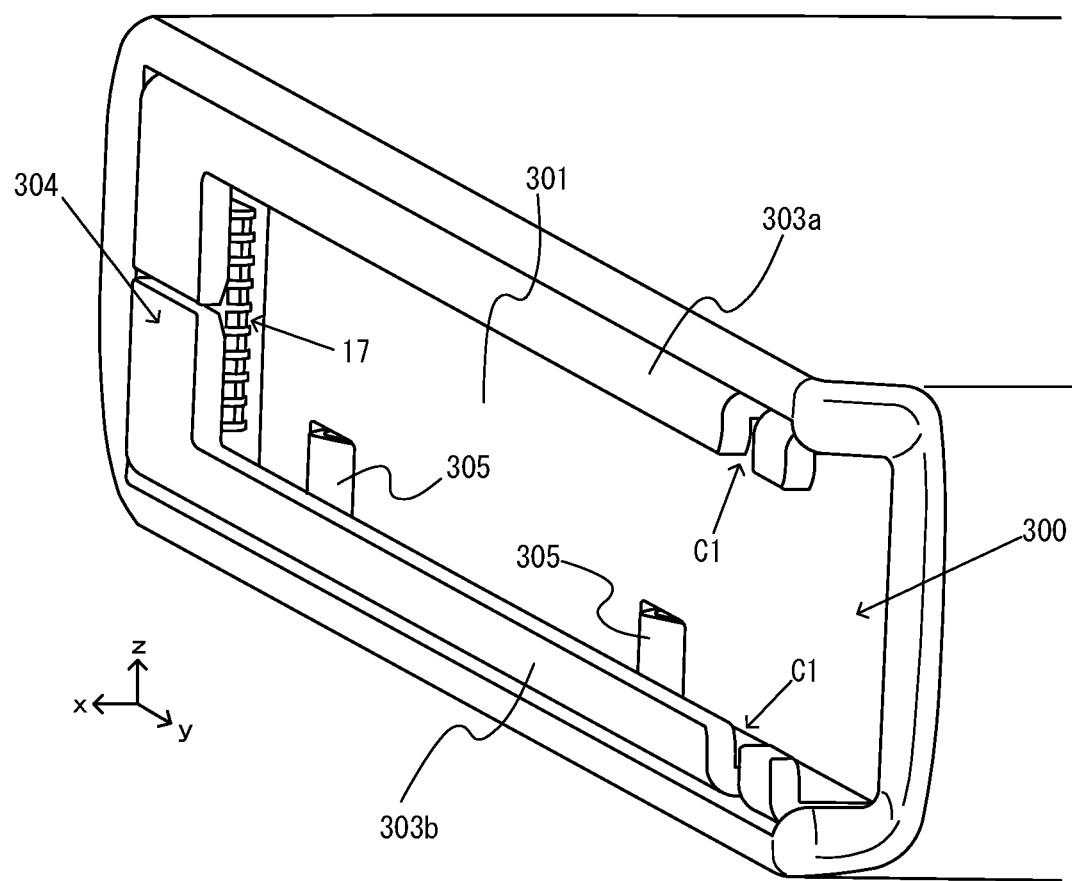
FIG. 10 is a perspective view showing an example left side surface portion of a main unit according to a non-limiting second configuration example.

FIG. 9 is a left side view showing an example main unit according to the second configuration example. FIG. 10 is a perspective view showing an example left side surface portion of the main unit according to the second configuration example. In the second configuration example, the main unit 2 includes a left rail member 300 on the left side surface of the housing 11. As shown in FIG. 9, the left rail member 300 is provided so as to extend in the up-down direction (the y-axis direction shown in FIG. 9). The left rail member 300, similar to the left rail member 15 of the first configuration example, is a member for allowing the left controller 3 to be slidably and detachably attached to the main unit 2. In the second configuration example, the left rail member 300 is capable of engaging with a slider 311 of the left controller 3 to be described later, and the left rail member 300 and the slider 311 together form a slide mechanism. The configuration of the left rail member 300 according to the second configuration example will now be described, focusing on differences from the first configuration example.

Figure 11:
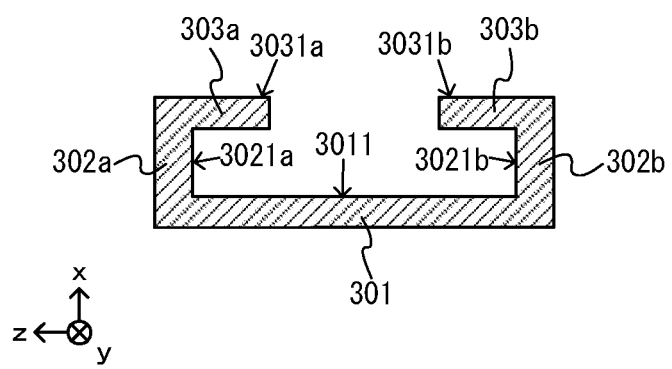
FIG. 11 is a diagram schematically showing an example cross section of the left rail member taken along line A-A' shown in FIG. 9.

FIG. 11 is a diagram schematically showing an example cross section of the left rail member taken along line A-A' shown in FIG. 9. Note that "to schematically show" as used herein means to show an element of interest (e.g., the left rail member in FIG. 11) in such a manner that its size, shape and positional relationship with other elements may be different from other figures in order to facilitate understanding of the element of interest.

As shown in FIG. 9 to FIG. 11, the left rail member 300 includes a bottom surface portion 301, side surface portions 302a and 302b and top surface portions 303a and 303b. Note that the side surface portions 302a and 302b may be referred to collectively as "a side surface portion 302". The top surface portions 303a and 303b may be referred to collectively as "a top surface portion 303". In the second configuration example, these portions 301 to 303 are generally plate-shaped members.

As shown in FIG. 9 and FIG. 10, the bottom surface portion 301 is placed on the left side surface of the housing 11 so as to be substantially parallel to the left side surface. Note that "substantially (in a certain state)" as used herein means to include cases in which that state is achieved in a strict sense and also cases in which that state is generally achieved. For example, "substantially parallel" means that they may be parallel to each other in a strict sense, and they may not be parallel to each other in a strict sense but may be generally parallel to each other.

The bottom surface portion 301 includes a bottom surface 3011 of the left rail member 300. As shown in FIG. 11, the side surface portion 302 includes side surfaces 3021 (specifically, side surfaces 3021a and 3021b) substantially perpendicular to the bottom surface 3011. The side surface portions 302 extend substantially perpendicular to the bottom surface portion 301 from the opposite ends of the bottom surface portion 301 in the front-rear direction (i.e., the z-axis direction). Specifically, the side surface portion 302a extends from the rear end side (i.e., the z-axis positive direction side) of the bottom surface portion 301, and the side surface portion 302b extends from the front end side (i.e., the z-axis negative direction side) of the bottom surface portion 301. As shown in FIG. 11, the bottom surface portion 301 and the side surface portion 302 together form a groove portion.

As shown in FIG. 11, the top surface portion 303 includes a top surface 3031 (specifically, side surfaces 3031a and 3031b) substantially parallel to the bottom surface 3011. The top surface portion 303 extends in a direction substantially parallel to the bottom surface 3011 from an end of the side surface portion 302 that is opposite to the end at which the bottom surface portion 301 is connected to the side surface portion 302 (i.e., the x-axis positive direction side). Specifically, the top surface portion 303a extends from an end portion of the side surface portion 302a on the x-axis positive direction side, and the top surface portion 303b extends from an end portion of the side surface portion 302b on the x-axis positive direction side. The top surface portion 303a and the top surface portion 303b extend toward each other from the side surface portion 302. The top surface portion 303 is arranged so as to face the bottom surface portion 301. In the second configuration example, the top surface portion 303 is arranged substantially parallel to the bottom surface portion 301. The top surface portions 303a and 303b are provided so as to protrude from the side surface portion 302 toward the inside of the left rail member 300 (in other words, so as to protrude toward each other). The top surface portion 303a and the top surface portion 303b are spaced apart from each other so that the slider 311 of the left controller 3 can be inserted into the groove formed by the bottom surface portion 301 and the side surface portion 302 (FIG. 9 to FIG. 11).

Figure 7:
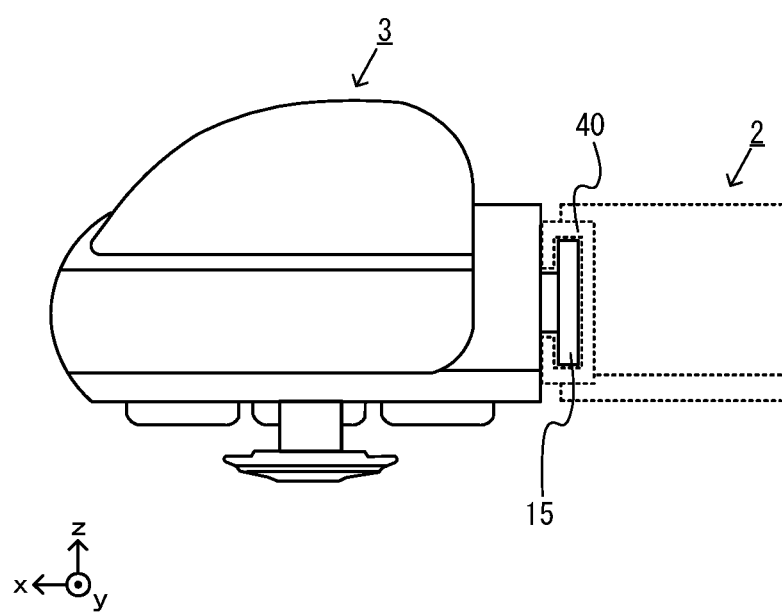
FIG. 7 is a diagram showing an example of how a left rail member and a slider engage with each other.

Thus, as in the first configuration example, when the left controller 3 is attached to the main unit 2, the slider 311 of the left controller 3 is inserted into the groove, and the left rail member 300 and the slider 311 engage with each other (see FIG. 7 in the first configuration example). Then, the slider 311 in engagement with the left rail member 300 is securely locked by the top surface portion 303 so as not to come off in the direction perpendicular to the slide direction (in other words, the direction in which the left rail member 300 extends).

As described above, the slide mechanism in the second configuration example (in other words, the mechanism for allowing the controllers 3 and 4 to be slidably attached to the main unit 2) is generally similar to that of the first configuration example.

In the second configuration example, a part of the upper end portion of the top surface portion 303 includes a cut-out portion C1, as shown in FIG. 9 and FIG. 10. The cut-out portion C1 is provided so that a stop member 319 of the left controller 3 engages with the cut-out portion C1 (strictly speaking, the top surface portion 303 around the cut-out portion C1) in a state in which the left controller 3 is attached to the main unit 2, the details of which will be described later.

Herein, the "state in which a controller is attached to the main unit 2" refers to a state in which a portion of the controller, which has been inserted into, moved down along, the rail member of the main unit 2 (e.g., a portion of the slider, or more specifically, the lower end of the slider) can no longer move by being in contact with a portion of the main unit 2 (e.g., a portion of the rail member). Such a state in which a controller is completely attached to the main unit 2 may be referred to hereinafter as the "attached state". The attached state may also be said to be a state in which a controller is connected to the main unit 2 (i.e., the connected state). When the main unit 2 and the controllers have terminals as in the present embodiment, the attached state may also be said to be "a state in which the terminals are connected to each other".

As described above, in the second configuration example, a portion of the top surface portion 303 that forms the cut-out portion C1 (in other words, a portion around the cut-out portion C1) functions as a stop-receiving portion with which the stop member is to engage. In the second configuration example, the slide movement of the left controller 3 attached to the main unit 2 is limited (or "locked") by the stop-receiving portion and the stop member 319, instead of the engagement hole 16 and the projection 41 in the first configuration example, the details of which will be described later. Note that a state in which the slide movement is limited (in other words, "locked") is a state in which the stop member 319 is interfered by the stop-receiving portion, thereby preventing the slide movement. Note that "to limit (or lock)" the slide movement means to prevent the slide movement with a force less than a certain level, and means that the slide movement may be allowed when a force greater than a certain level is applied (thereby disengaging the stop member 319 from the stop-receiving portion).

In the second configuration example, the stop-receiving portion is provided near the upper end of the left rail member 300 (i.e., an end portion on the y-axis positive direction side) (FIG. 9). Note that in other embodiments, the stop-receiving portion may be provided at any other position. For example, the stop-receiving portion may be provided near the center of the left rail member 300 in the up-down direction (i.e., the y-axis direction) or may be provided near the lower end. Alternatively, the top surface portion 303 may include no cut-out portion, and the upper end portion of the top surface portion 303 may function as the stop-receiving portion. That is, in the attached state, the stop member 319 of the left controller 3 may engage with the end portion of the top surface portion 303.

In other embodiments, the left rail member 300 may be configured without the stop-receiving portion. Note that also in such a configuration, by the contact between terminals to be described later and/or by the pressure from leaf springs 305, it is possible to apply a force to prevent the slide movement of the left controller 3 attached to the main unit 2, thereby making it difficult for the left controller 3 to come off the main unit 2.

In the second configuration example, the stop-receiving portion is provided on each of the two top surface portions 303a and 303b (FIG. 9). The stop-receiving portion on the top surface portion 303a and the stop-receiving portion on the top surface portion 303b are provided at substantially the same position with respect to the up-down direction. Thus, in the second configuration example, the shape of the left rail member 300 is substantially in left-right symmetry (FIG. 9). This allows members of the same shape to be used as the rail member provided on the left side surface of the main unit 2 and as the rail member provided on the right side surface thereof. Thus, it is possible to simplify the production of the main unit 2 and to reduce the cost thereof.

When the stop-receiving portion is provided on both sides of the top surface portion 303, the left controller 3 may include a stop member that engages with either one of the two stop-receiving portions. Therefore, according to the second configuration example, the main unit 2 is able to accommodate a wider variety of controllers. According to the second configuration example, it is possible to improve the freedom in the configuration of a controller that can be attached to the main unit 2. Note that in other embodiments, the stop-receiving portion may be provided in either one of the two top surface portions 303a and 303b.

As shown in FIG. 9 and FIG. 10, the left rail member 300 includes a facing portion 304. In the second configuration example, the facing portion 304 serves as the stopper 18 in the first configuration example (i.e., serves to stop the slide movement of the slider 311 of the left controller 3). That is, the facing portion 304 stops the slide movement of the slider 311 by being in contact with the slider 311, which is inserted from the upper side in the slide direction. In the second configuration example, the facing portion 304 is provided with the left-side terminals 17. Note that in other embodiments, the slide movement of the slider 311 may be stopped by the distal end of the slider 311 (specifically, the distal end of a protruding portion 321 to be described later) being in contact with a wall surface 306 provided on the far end of the facing portion 304 instead of (or in addition to) the facing portion 304 being in contact with the slider 311.

Figure 12:
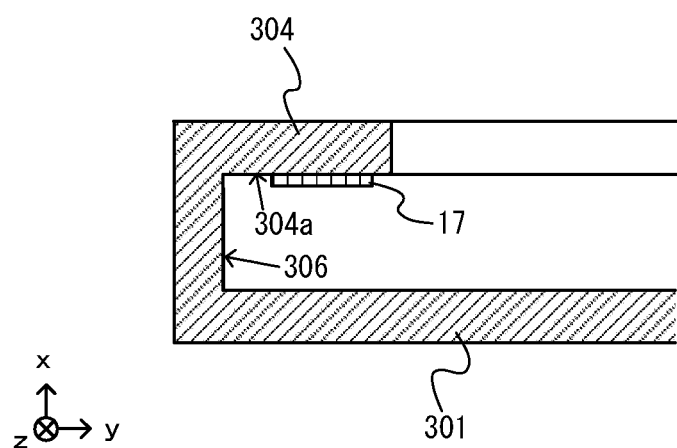
FIG. 12 is a diagram schematically showing an example cross section of the left rail member taken along line B-B' shown in FIG. 9.

FIG. 12 is a diagram schematically showing an example cross section of the left rail member taken along line B-B' shown in FIG. 9. As shown in FIG. 12, the facing portion 304 is provided, spaced apart from the bottom surface portion 301, so as to be located to face a portion of the bottom surface portion 301 (specifically, a portion near the lower end of the bottom surface portion 301). That is, the facing portion 304 includes a facing surface 304a facing toward the bottom surface portion 301. The facing surface 304a is a surface that is facing toward the housing 11 of the main unit 2. In the second configuration example, when the left controller 3 is attached to the main unit 2, (the distal end of) the slider 311 of the left controller 3 is inserted into the space between the bottom surface portion 301 and the facing portion 304.

As shown in FIG. 10 and FIG. 12, the left-side terminals 17 are provided on the facing surface 304a. Therefore, the left-side terminals 17 are arranged so that one side thereof facing the bottom surface portion 301 is exposed. Thus, in the second configuration example, the left-side terminals 17 are arranged on the reverse side (i.e., the side opposing the bottom surface portion 301) of the member (i.e., the facing portion 304) arranged spaced apart from the side surface of the main unit 2 (i.e., the bottom surface portion 301). Then, it is possible to reduce the possibility that the left-side terminals 17 come into contact with a hand of a user or other objects, thereby protecting the left-side terminals 17. According to the second configuration example, it is possible for example to reduce the possibility of a hand of a user inadvertently coming into contact with the left-side terminals 17 and the possibility of the left-side terminals 17 being damaged.

Figure 13:
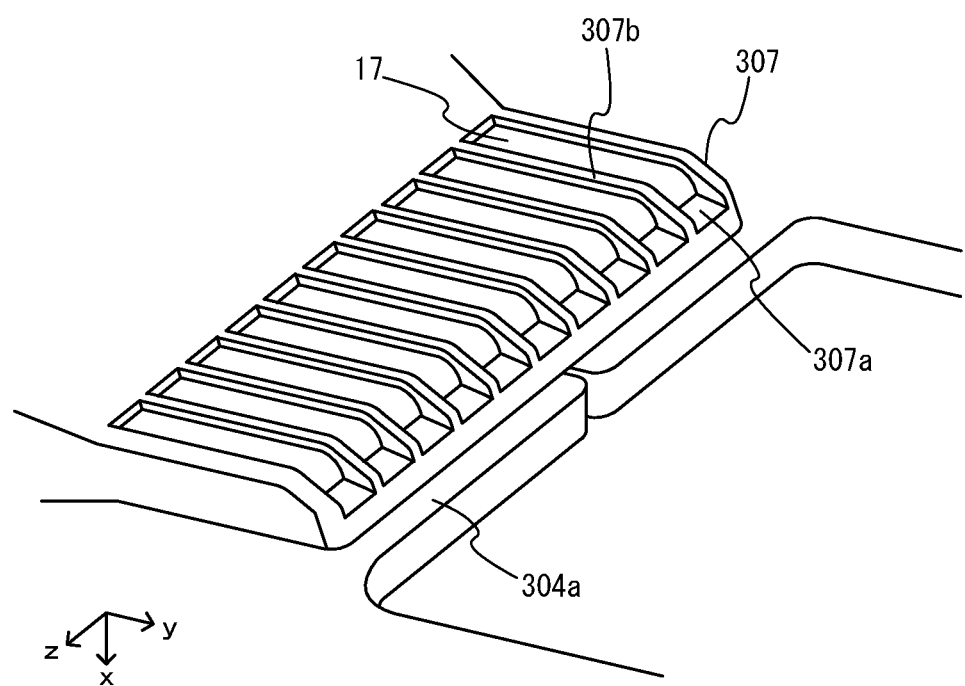
FIG. 13 is a perspective view showing an example terminal provided on a non-limiting main unit.

FIG. 13 is a perspective view showing an example of the terminals provided on the main unit 2. As shown in FIG. 13, in the second configuration example, the facing portion 304 includes a base portion 307 provided on the facing surface 304a. The left-side terminals 17 are provided on the base portion 307. In the present embodiment, the base portion 307 is provided movably (at least in the direction perpendicular to the slide direction) to such a degree that the position thereof can be slightly shifted with respect to the facing surface 304a. This is for making it easy to adjust the position of the left-side terminals 17 during the alignment between the left-side terminals 17 of the main unit 2 and the terminals 42 of the left controller 3 (the details of the alignment will be described later). Note that in other embodiments, the base portion 307 (in other words, the left-side terminals 17) does not need to be movable with respect to the facing surface 304a (i.e., it may be fixed to the facing surface 304a). Also in this case, the alignment is done through at least one of the following methods.

By deformation of any of the members (e.g., the left rail member 300 itself, the base portion 307, the left-side terminals 17, etc.) of the left rail member 300 of the main unit 2, by virtue of its elasticity.

By deformation of any of the members (e.g., the slider 311 itself, the protruding portion 321 to be described later, the terminals 42, etc.) of the slider 311 of the left controller 3, by virtue of its elasticity.

By change in the positional relationship between the left rail member 300 and the slider 311, in cases in which the left rail member 300 and the slider 311 in engagement with each other have a slight gap therebetween.

In other embodiments, the terminals 42 of the left controller 3 may be movable, instead of (or in addition to) the base portion 307 for the positional adjustment during the alignment.

As shown in FIG. 13, the base portion 307 includes the same number of slots 307a as the number (herein, ten) of the left-side terminals 17. The slots 307a are provided so as to extend in the slide direction (i.e., the y-axis direction). The slots 307a are arranged next to each other in a direction (i.e., the z-axis direction) that is substantially parallel to the facing surface 304a and substantially perpendicular to the slide direction. Therefore, it can be said that the facing portion 304 (specifically, the base portion 307) includes a wall portion 307b between slots 307a adjacent to each other.

The left-side terminals 17 are provided in the slots 307a. As shown in FIG. 13, the left-side terminals 17 are provided within the slots 307a, i.e., so that they do not protrude out of the slots 307a. Assuming that the direction perpendicular to the facing surface 304a (i.e., the x-axis direction) is the height direction, the left-side terminals 17 are provided at a position lower than the wall portion 307b (in other words, at a position closer to the facing surface 304a). When the left-side terminals 17 and the terminals 42 of the left controller 3 are connected to each other in the attached state, the terminals 42 of the left controller 3 partly come into the slots 307a. That is, the terminals 42 of the left controller 3 are partly located between two wall portions 307b. Note that a portion of a terminal 42 corresponding to a left-side terminal 17 in a slot 307a comes into the slot 307a. This reduces the possibility that the terminals 42 of the left controller 3 are shifted in the direction (i.e., the z-axis direction) in which the left-side terminals 17 of the main unit 2 are arranged next to each other. That is, it is possible to reduce the possibility that a terminal 42 of the left controller 3 contacts any left-side terminal 17 of the main unit 2 other than the correct left-side terminal 17, which may lead to errors in communication between the main unit 2 and the left controller 3 or may lead to electrical troubles due to an unexpected current flow between terminals inadvertently contacting each other. By providing the left-side terminals 17 in the slots 307a, it is possible to further reduce the possibility of the left-side terminals 17 being damaged.

If a conductive foreign substance sticks between terminals, it may lead to a short circuit. For this, according to the present embodiment, the wall portions 307b are provided between the left-side terminals 17, thereby reducing the possibility that a conductive foreign substance may straddle between terminals, thus reducing the possibility of a short circuit.

In the second configuration example, as shown in FIG. 9 and FIG. 10, the top surface portion 303 and the facing portion 304 are formed as an integral unit. In other words, the upper surface (i.e., the surface facing the x-axis positive direction side) of the facing portion 304 is continuous with the upper surface (i.e., the surface facing the x-axis positive direction side) of the top surface portion 303. This makes it possible to simplify the shape of the left rail member 300, and to facilitate the production of the rail member.

Note that in the second configuration example, the left rail member 300 including the portions 301 to 304 is formed by a metal. This makes it possible to improve the mechanical strength of the rail member. Moreover, by improving the mechanical strength of the rail member, it is also possible to contribute to improving the mechanical strength of the main unit 2 to which the rail member is attached.

As described above, in the present embodiment, the facing portion 304 also serves to stop the slide movement of the slider 311 of the left controller 3. In the second configuration example, as shown in FIG. 9 and FIG. 10 the facing portion 304 includes a first portion arranged on one side of an axis (i.e., the y axis) extending along the slide direction and a second portion arranged on the other side thereof. In the present embodiment, the first portion and the second portion are spaced apart from each other. The gap between the first portion and the second portion is so small that the slider 311 cannot be inserted therethrough. Therefore, when the slider 311 is inserted into the left rail member 300, the slide movement of the slider 311 is stopped with a portion of the slider 311 near the distal end thereof (specifically, the distal end of a shaft 325 to be described later) being in contact with the facing portion 304 (the details will be described later). Note that in other embodiments, there may be no gap between the first portion and the second portion. That is, the first portion and the second portion may be formed as an integral unit.

In the second configuration example, as shown in FIG. 9, the left-side terminals 17 and the stop-receiving portion (in other words, the cut-out portion C1) are provided on opposite sides with respect to the slide direction of the left rail member 300. That is, the left-side terminals 17 are provided on one side (i.e., on the y-axis negative direction side) with respect to the slide direction of the left rail member 300, and the stop-receiving portion is provided on the other side (i.e., the y-axis positive direction side) with respect to the slide direction of the left rail member 300. In the attached state, the slide movement of the left controller 3 is prevented by means of the stop member 319 and the stop-receiving portion, and also by means of the terminals being in contact with each other, the details of which will be described later. Therefore, in the second configuration example, it is possible to prevent the slide movement on both sides with respect to the slide direction of the left rail member 300, allowing the force for preventing the slide movement to be applied in a well-balanced manner. That is, it is possible to disperse the force acting upon the left rail member 300, thereby reducing the possibility of the left rail member 300 being damaged. As with the left rail member 300, it is also possible to disperse the force acting upon the slider 311 of the left controller, thereby reducing the possibility of the slider 311 being damaged.

As shown in FIG. 9 and FIG. 10, the left rail member 300 include the leaf spring 305. The leaf spring 305 is provided on the bottom surface portion 301 of the left rail member 300. The leaf spring 305 is an example of an elastic member for applying a force in a direction away from the main unit 2 (the x-axis positive direction) onto the left controller 3 in a state in which the left controller 3 is attached to the main unit 2. In other embodiments, an elastic member of a rubber, or the like, may be used instead of the leaf spring.

In the attached state, the leaf spring 305 is in contact with the slider 311 of the left controller 3, pushing (in other words, biasing) the left controller 3 in a direction away from the main unit 2 (i.e., the x-axis positive direction), the details of which will be described later. Then, it is possible to reduce the looseness between the main unit 2 and the left controller 3. Therefore, the main unit 2 and the left controller 3 can be connected together more firmly. It is also possible to reduce the noise (so-called "chattering") produced when the left controller 3 is vibrated by a vibrator 107 to be described later.

Note that as shown in FIG. 9, in the second configuration example, two of the four leaf springs 305 are arranged on the upper side (i.e., the y-axis positive direction side) of the center of the bottom surface portion 301, with the other two arranged on the lower side (i.e., the y-axis negative direction side) of the center of the bottom surface portion 301. Two of the four leaf springs 305 are arranged on the front side (i.e., the z-axis positive direction side) of the center of the bottom surface portion 301, with the other two arranged on the rear side (i.e., the z-axis negative direction side) of the center of the bottom surface portion 301. Thus, a plurality (herein, four) of leaf springs 305 are provided on both sides of the center of the left rail member 300 with respect to the up-down direction (the y-axis direction) and/or with respect to the front-rear direction (the z-axis direction). Then, it is possible to apply a force on the left controller 3 attached to the main unit 2 in a well-balanced manner by means of the leaf springs 305, thereby effectively reducing the looseness between the main unit 2 and the left controller 3 and/or the chattering.

Note that although the number of leaf springs 305 is four in the second configuration example, there may be any number of leaf springs in other embodiments. In other embodiments, the arrangement of the leaf springs 305 may be any arrangement, and the positions thereof are not limited to those shown in FIG. 9. Note that in the second configuration example, in the attached state, the leaf springs 305 are arranged so as to be in contact with an upper-tier surface 311d (see FIG. 24) of the slider 311 of the left controller 3.

Although not shown in the figure, the main unit 2 includes a right rail member on the right side surface of the housing 11. The right rail member is capable of engaging with a slider 331 of the right controller 4 to be described later, and the right rail member and the slider 331 together form a slide mechanism. Similar to the right rail member 19 in the first configuration example, the right rail member in the second configuration example is a member that allows the right controller 4 to be slidably and detachably attached to the main unit 2, and can be said to be a slide member. In the second configuration example, the mechanism (including the right rail member) on the right side surface of the main unit 2 is in left-right symmetry (though this is not so in terms of the functions to be assigned to terminals) with the mechanism on the left side surface including the left rail member 300.

In the second configuration example, the right rail member (including the base portion and the right-side terminals provided on the right rail member) has a similar configuration to the left rail member 300 described above. As described above, in the second configuration example, since the shape of the left rail member 300 is symmetric with respect to the axis (i.e., the y axis) parallel to the front-rear direction, the same member can be used for the right rail member and for the left rail member. That is, in the second configuration example, a right rail member having the same shape as the left rail member 300 is provided on the right side surface of the main unit 2. Thus, it is possible to simplify the production of the main unit 2 and to reduce the cost thereof.

Note that in the second configuration example, elements of the main unit 2 other than those described above (e.g., elements to be arranged on the primary surface, the back surface, the upper surface and the lower surface of the housing) may be the same as those of the first configuration example.

[1-2-2. Second Configuration Example Regarding Left Controller]

Figure 14:
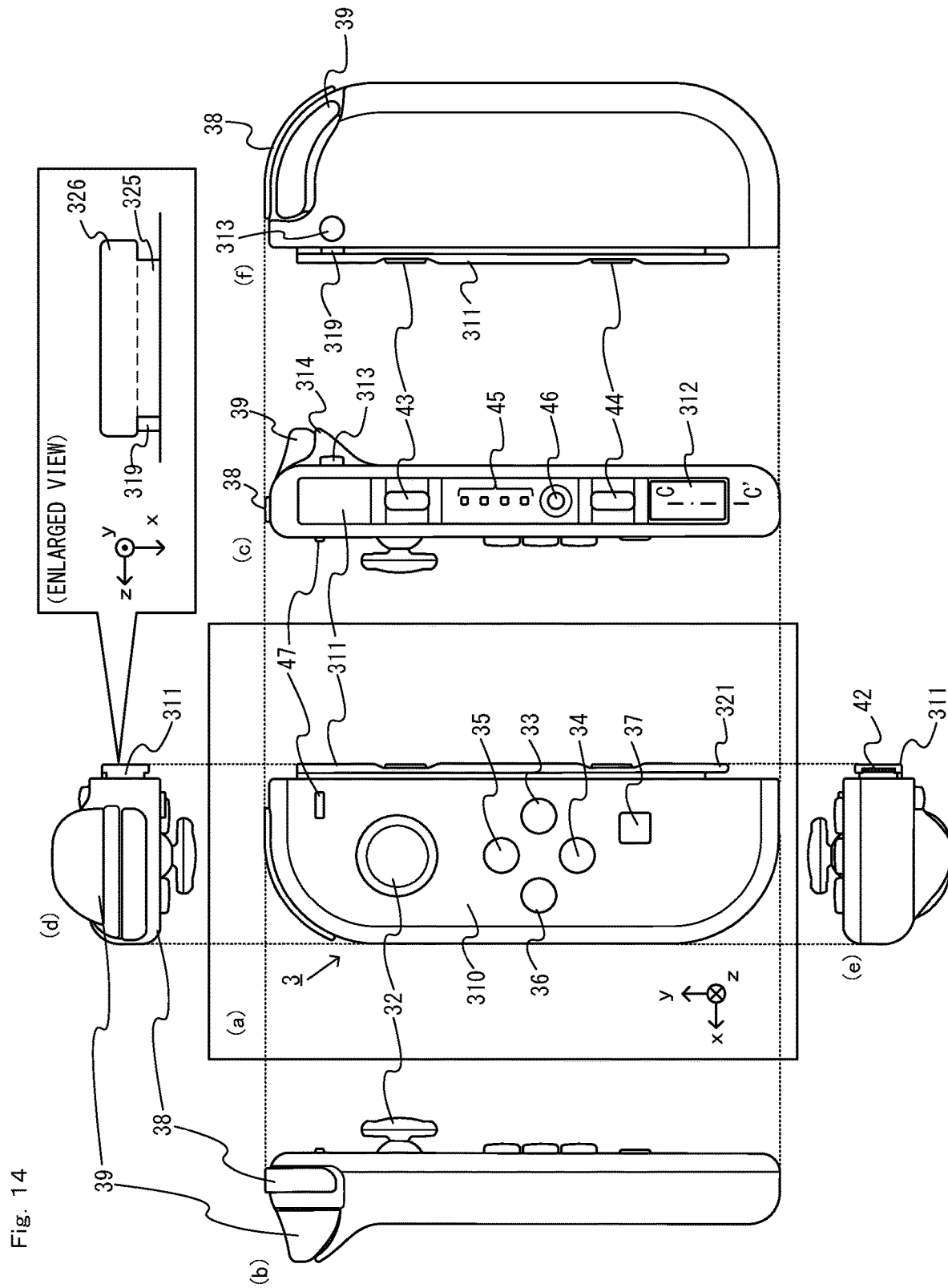
FIG. 14 is a six-sided view showing an example left controller according to a non-limiting second configuration example.

FIG. 14 is a six-sided view showing an example left controller according to the second configuration example. The left controller 3 of the second configuration example is different from that of the first configuration example in terms of the slider 311 and various portions thereof. The configuration of the left controller 3 of the second configuration example will now be described, focusing on differences from the first configuration example. In FIG. 14, like elements to those shown in FIG. 5 are denoted by like reference numerals and will not be described in detail below. Note that in FIG. 14, some operation sections (e.g., the record button 37, the minus button 47, etc.) have different shapes than those of FIG. 5, but these operation sections have the same functions as those of like reference numerals of the first configuration example.

As shown in FIG. 14, in the second configuration example, the left controller 3 includes a main section 310 and the slider 311. The main section 310 may have similar functions to those of the housing 31 of the first configuration example, and may be the same as the housing 31. As is the slider 40 of the first configuration example, the slider 311 is a member that allows the left controller 3 to be slidably and detachably attached to the main unit 2.

As shown in FIG. 14, the slider 311 is provided on the right side surface (i.e., the side surface on the x-axis negative direction side) of the main section 310 of the left controller 3 so as to extend in the up-down direction (i.e., the y-axis direction). The slider 311 has a shape such that it can engage with the left rail member 300 of the main unit 2 (more specifically, the portions 301 to 303 of the left rail member 300). Specifically, a cross section of the slider 311 (specifically, a cross section perpendicular to the up-down direction) has a shape protruding from the main section 310, as in the first configuration example, and specifically has a T shape in conformity with the cross-sectional shape of the left rail member 300 (see "(ENLARGED VIEW)" shown in FIG. 14).

As shown in the "(ENLARGED VIEW)" in FIG. 14, the slider 311 includes the shaft 325 and a top surface portion 326. The shaft 325 is provided so as to protrude from the main section 310. The top surface portion 326 is provided on one side of the shaft 325 that is away from the main section 310 (i.e., the x-axis negative direction side). As described above, the cross section of the slider 311 taken along a direction perpendicular to the y-axis direction is T-shaped. That is, the width of the top surface portion 326 (i.e., the length with respect to the z-axis direction) is greater than the width of the shaft 325. The end of the top surface portion 326 in the z-axis direction is located so as to protrude past (in other words, located on the outer side of) the end of the shaft 325 in the z-axis direction.

Thus, the cross section of the slider 311 taken along a direction perpendicular to the slide direction has a shape such that the width of the first portion (the shaft 325) protruding from the right side surface of the main section 310 (in other words, the first portion adjacent to the right side surface) is less than the width of the second portion (the top surface portion 326) farther away from the right side surface of the main section 310 than the first portion. Therefore, the slider 311 having been inserted into the groove of the left rail member 300 engages with the left rail member 300, as in the engaged state shown in FIG. 7 in the first configuration example. Then, the slider 311 in engagement with the left rail member 300 is securely locked so as not to come off the left rail member 300 in the direction perpendicular to the slide direction (in other words, the direction in which the left rail member 300 extends).

(Elements Regarding Terminals)

As shown in FIG. 14, also in the second configuration example, as in the first configuration example, the terminals 42 are provided at the lower end of the slider 311. That is, the terminals 42 are provided at one end of the slider 311 that can be inserted into the main unit 2 (in other words, the distal end portion in the insertion direction in which the slider 311 can be inserted into the left rail member 300 of the main unit 2, i.e., the lower end). Thus, as the slider 311 is inserted toward the distal end of the left rail member 300 (i.e., the y-axis negative direction), the terminals 42 move toward the left-side terminals 17 of the left rail member 300. Therefore, the terminals 42 can be guided toward the left-side terminals 17 to which the terminals 42 should be connected, thereby making it possible to easily connect the terminals to each other. When the slider 311 is completely (or generally completely) inserted into the left rail member 300 of the main unit 2, the terminals 42 of the slider 311 and the left-side terminals 17 of the main unit 2 are in contact with each other. Thus, when the left controller 3 is attached to the main unit 2, a user inserts the slider 311 completely into the left rail member 300 of the main unit 2 to connect the terminals to each other, thereby allowing the left controller 3 to be attached to the main unit 2 in the correct manner of attachment.

The second configuration example is different from the first configuration example in terms of the arrangement of the terminals 42, etc. The details of the arrangement of the terminals 42 in the second configuration example will be described.

Figure 15:
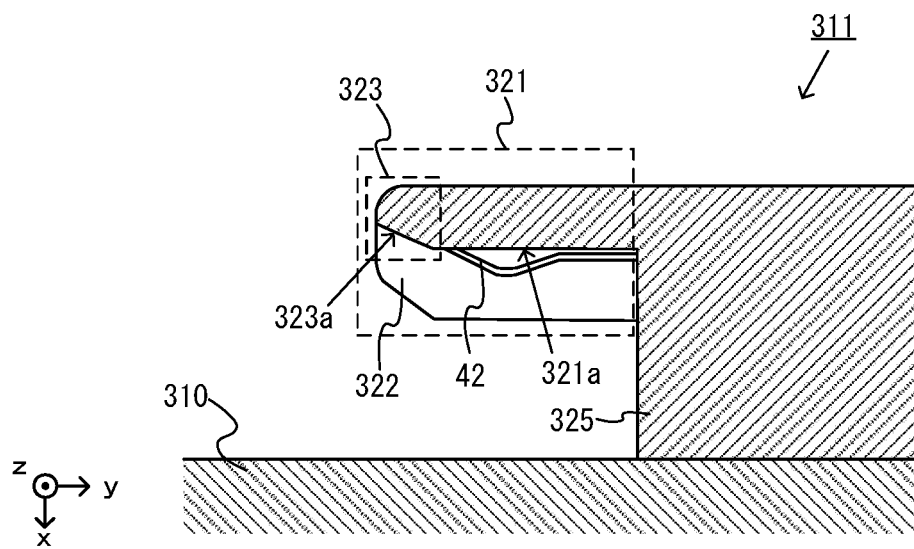
FIG. 15 is a diagram schematically showing an example cross section near a lower end portion of a slider according to a non-limiting second configuration example.

FIG. 15 is a diagram schematically showing an example cross section of the slider 311 near the lower end thereof according to the second configuration example. FIG. 15 is a diagram schematically showing an example partial cross section of the slider 311 taken along line C-C' shown in FIG. 14. As shown in FIG. 14 and FIG. 15, the slider 311 includes the protruding portion 321 on the lower end side of the slider 311. The protruding portion 321 is provided on the lower end side of the slider 311 so as to protrude in the slide direction (more specifically, in the lower direction, i.e., the y-axis negative direction). The protruding portion 321 is provided on the slider 311 on one side away from the main section 310 (i.e., the x-axis negative direction side). That is, the protruding portion 321 is provided, spaced apart from the right side surface of the main section 310. The protruding portion 321 includes a facing surface 321a facing toward the main section 310 of the left controller 3. The facing surface 321a faces a predetermined surface of the left controller 3 (specifically, the right side surface).

Note that in the second configuration example, the protruding portion 321 is absent at the upper end portion (i.e., the end portion on the y-axis positive direction side) of the slider 311 (see FIG. 14). When the slider 311 is inserted into the left rail member 300 of the main unit 2, a user may inadvertently insert the slider 311, from the upper end thereof, into the left rail member 300. Even in such a case, according to the second configuration example, the upper end of the slider 311 cannot reach the left-side terminals 17 of the left rail member 300, thus reducing the possibility that the left-side terminals 17 are damaged by the upper end of the slider 311.

The terminals 42 are provided on the facing surface 321a of the protruding portion 321. Therefore, the terminals 42 are arranged so that one side thereof facing the main section 310 is exposed. Thus, in the second configuration example, the terminals 42 are arranged on the reverse side of the engaging surface of the slider 311 (specifically, the protruding portion 321). With the terminals 42 arranged so that one side thereof facing the main section 310 is exposed, as described above, it is possible to reduce the possibility that the terminals 42 come into contact with a hand of a user or other objects, thereby protecting the terminals 42. According to the second configuration example, it is possible for example to reduce the possibility of a hand of a user inadvertently coming into contact with the terminals 42 and the possibility of the terminals 42 being damaged. Note that in other embodiments, the terminals 42 may be provided on a slope 323a of a distal end portion 323 to be described later (FIG. 15). Since the slope 323a is facing toward the main section 310, as is the facing surface 321a, it is possible to realize the effect of protecting the terminals 42.

As shown in FIG. 15, the terminals 42 is provided, spaced apart from the right side surface of the main section 310. When the left controller 3 is attached to the main unit 2, the facing portion 304 of the main unit 2 is inserted into the space between the terminals 42 (in other words, the protruding portion 321) and the right side surface of the main section 310 (FIG. 26), the details of which will be described later. By arranging the terminals 42 and the main section 310 so as to form the space described above, the facing portion 304 will be inserted into the space, thus allowing the terminals 42 of the left controller 3 to be in contact with the left-side terminals 17 of the main unit 2 when the left controller 3 is attached to the main unit 2.

Figure 16:
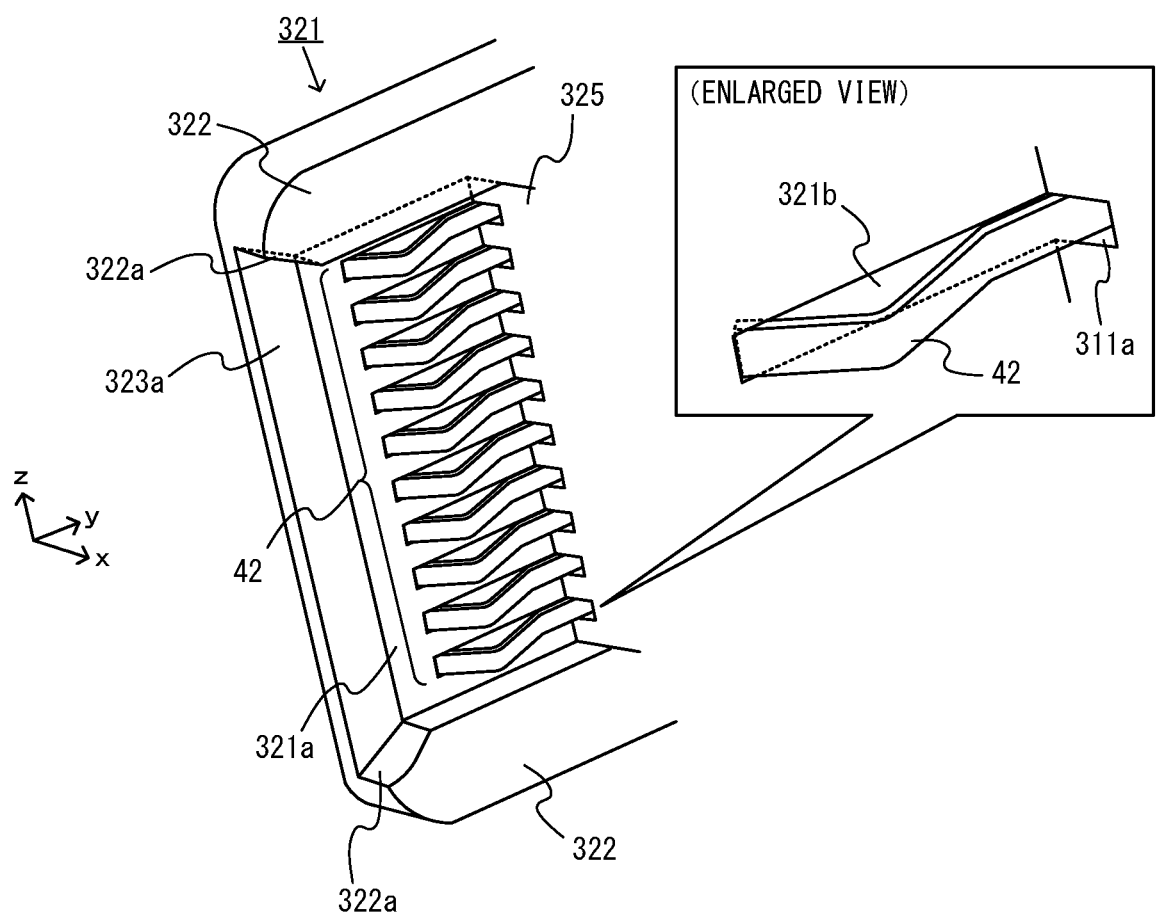
FIG. 16 is a perspective view showing an example protruding portion of a slider according to a non-limiting second configuration example.

FIG. 16 is a perspective view showing an example of the protruding portion 321 of the slider 311 according to the second configuration example. FIG. 16 shows the protruding portion 321 as seen from the reverse side (i.e., the side of the facing surface 321a). As shown in "(ENLARGED VIEW)" in FIG. 16, a hole 311a is provided on a surface of the shaft 325 of the slider 311 on which the protruding portion 321 is provided (i.e., the end surface on the y-axis negative direction side). The terminals 42 is provided so as to protrude from the inside of the slider 311 via the hole 311a. The same number of slots 321b as the number (herein, ten) of the terminals 42 are formed on the facing surface 321a of the protruding portion 321. The slots 321b are connected to the holes 311a. The slots 321b are provided so as to extend in the slide direction (i.e., the y-axis direction). As shown in FIG. 16, the slots 321b are arranged next to each other in a direction (i.e., the z-axis direction) that is parallel to the facing surface 321a and perpendicular to the slide direction.

As shown in FIG. 16, the terminals 42 are provided on the facing surface 321a along the slots 321b. The terminals 42 are arranged next to each other in a direction perpendicular to the slide direction (i.e., the z-axis direction), as are the slots 321b. In the second configuration example, the terminals 42 are provided so that a portion thereof (e.g., a distal end portion) is in the slot 321b while the other portion is outside the slot 321b (FIG. 15 and FIG. 16). When the terminals 42 of the left controller 3 are connected to the left-side terminals 17 of the main unit 2 in the attached state, the terminals 42 are pressed and deformed by the left-side terminals 17 to move in the direction toward the slots 321b (i.e., the x-axis negative direction), the details of which will be described later. That is, at least a part of each terminal 42 flexes into the slot 321b in the facing surface 321a. It can be said that the slots 321b allow the terminals 42 being deformed to be retracted so that the terminals 42 will not be in contact with the facing surface 321a. Thus, although the terminals 42 are not in contact with the facing surface 321a in the second configuration example, they are provided at positions corresponding to the slots 321b provided on the facing surface 321a, and are provided at such positions that they would be in contact with the facing surface 321a without the slots 321b. In this sense, in the second configuration example, it can be said that the terminals 42 are provided on the facing surface 321a. Note that in other embodiments, the slots 321b may be absent on the facing surface 321a, and the terminals 42 may be provided so as to be in contact with the facing surface 321a. As shown in FIG. 16, the terminals 42 extend along the facing surface 321a.

As shown in FIG. 15 and FIG. 16, the terminals 42 are provided so as to protrude past the facing surface 321a (specifically, so as to protrude on the x-axis positive direction side). As described above, when the terminals 42 of the left controller 3 are connected to the left-side terminals 17 of the main unit 2 in the attached state, a part of each terminal 42 comes into the slot 307a on the main unit 2 side (see FIG. 13) (in other words, between two wall portions 307b). The terminals 42 are provided so as to protrude past the facing surface 321a to prevent the facing surface 321a from contacting the wall portions 307b to hinder the terminals 42 from coming into the slots 307a.

As shown in FIG. 15 and FIG. 16, the terminals 42 are bent into an upward angular shape so as to protrude away from the facing surface 321a (i.e., in the x-axis positive direction). With such a shape, the apex portion of the angular shape can easily come into contact with the left-side terminals 17 of the main unit 2. In other words, the surface of the terminals 42 to be in contact with the left-side terminals 17 of the main unit 2 (i.e., the surface facing toward the main section 310) can be viewed from the slide direction, and it can therefore be said that the lower end side (i.e., the y-axis negative direction side) of the slider 311 is exposed. This makes it easy for the terminals 42 to be in contact with the left-side terminals 17 of the main unit 2.

In the second configuration example, the protruding portion 321 includes wall portions 322 (see FIG. 16). The wall portions 322 are provided on the facing surface 321a on opposite sides with respect to the direction (i.e., the z-axis direction) parallel to the facing surface 321a and substantially perpendicular to the slide direction. With the wall portions 322, it is possible to further reduce the possibility that the terminals 42 come into contact with a hand of a user or other objects, thereby more reliably protecting the terminals 42. As shown in FIG. 16, in the present embodiment, the wall portions 322 are provided so as to protrude up to the distal end of the protruding portion 321. That is, the wall portions 322 extend up to a position that is closer to the distal end of the protruding portion 321 than the terminals 42. Thus, it is possible to more reliably protect the terminals 42. Note that in other embodiments, the wall portions 322 do not need to extend up to the distal end of the protruding portion 321.

Note that as described above, the terminals 42 are provided protruding from the facing surface 321a. The wall portions 322 are provided to extend higher than the height to which the terminals 42 protrude from the facing surface 321a (see FIG. 15). Thus, the terminals 42 can be more reliably protected by the wall portions 322. Note that in other embodiments, the wall portions 322 may be provided to extend to a height that is less than or equal to the height to which the terminals 42 protrude from the facing surface 321a. The wall portion 322 may be provided only on one side of the terminals 42 with respect to the front-rear direction (i.e., the z-axis direction). Even in such an embodiment, the wall portions 322 provide a certain level of protection for the terminals 42. In other embodiments, the protruding portion 321 may have no wall portion 322.

In the second configuration example, at the distal end portion of the protruding portion 321 (in other words, the lower end portion of the slider 311, i.e., the end portion on the y-axis negative direction side), the wall portions 322 are formed so that the interval between two inner walls 322a thereof gradually increases toward the distal end of the protruding portion 321 (FIG. 16). Thus, when the left controller 3 is attached to the main unit 2, the left-side terminals 17 of the main unit 2 are guided into correct position with respect to the terminals 42 of the left controller 3. That is, when the left controller 3 is attached to the main unit 2, if the position of the left-side terminals 17 is slightly shifted from the terminals 42 (with respect to the z-axis direction), the position of the left-side terminals 17 is corrected as the base portion 307 of the left-side terminals 17 comes into contact with the inner walls of the wall portions 322. Thus, the left-side terminals 17 are aligned into correct position with respect to the terminals 42. As described above, the wall portions 322 have the function of aligning together the left-side terminals 17 and the terminals 42. Note that the slope 323a may be a curved surface, and an intersection between the facing surface 321a and the slope 323a may be a chamfer.

As shown in FIG. 15 and FIG. 16, the protruding portion 321 includes the distal end portion 323. The distal end portion 323 is provided on the distal end side (i.e., the y-axis negative direction side) of the terminals 42 with respect to the slide direction of the slider 311 (i.e., the y-axis direction). Thus, the terminals 42 are arranged slightly on the proximal side of the distal end (specifically, the distal end on the y-axis negative direction side) of the slider 311. Therefore, when the controller 3 is attached to the main unit 2, for example, even if the distal end of the slider 311 comes into contact with another object, the possibility of the terminals 42 being in contact with the object can be reduced. Thus, the terminals 42 can be protected by the distal end portion 323.

As shown in FIG. 15, the distal end portion 323 has a shape such that the thickness thereof decreases toward the distal end (specifically, the distal end on the lower end side of the slider 311). More specifically, the distal end portion 323 has the slope 323a, which is sloping from the facing surface 321a on which the terminals 42 are provided toward the surface on the reverse side of the facing surface 321a (in other words, away from the right side surface of the main section 310) (FIG. 15). Therefore, when the left controller 3 is attached to the main unit 2, the left-side terminals 17 of the main unit 2 (in other words, the facing portion 304) are guided into correct position with respect to the terminals 42 of the left controller 3 (in other words, the protruding portion 321). That is, when the left controller 3 is attached to the main unit 2, if the position of the left-side terminals 17 is slightly shifted from the terminals 42 (with respect to the x-axis direction), the position of the left-side terminals 17 is corrected as the base portion 307 of the left-side terminals 17 or the facing portion 304 comes into contact with the slope 323a. Thus, the left-side terminals 17 are aligned into correct position with respect to the terminals 42. As described above, the slope 323a of the distal end portion 323 has the function of aligning together the left-side terminals 17 and the terminals 42.

As shown in FIG. 14, the slider 311 includes a reinforcement member 312. The reinforcement member 312 is provided on the engaging surface of the slider 311. Specifically, the reinforcement member 312 is provided at least in a portion of the engaging surface that corresponds to the facing surface 321a on which the terminals 42 are provided (in other words, a portion on the reverse side from the facing surface 321a (see FIG. 17). In other words, the reinforcement member 312 is provided at least in the position of the protruding portion 321. That is, a portion of the protruding portion 321 is formed by the reinforcement member 312. In the second configuration example, the member forming the surface of the slider 311 is formed by a resin except for the reinforcement member 312. On the other hand, the reinforcement member 312 is formed by a metal. Therefore, it is possible, with the reinforcement member 312, to increase the mechanical strength of a portion of the slider 311 where the terminals 42 are provided (i.e., the protruding portion 321). The reinforcement member 312 also suppresses the wear of the slider 311 being rubbed against the left rail member 300 when the slider 311 is inserted into the left rail member 300 of the main unit 2. Note that in the second configuration example, the protruding portion 321 is formed to be thin so as to form the slide mechanism to be thin in order to reduce the size of the device. Even if the protruding portion 321 is thus formed to be thin, the mechanical strength of the protruding portion 321 can be maintained by the provision of the reinforcement member 312. If the protruding portion 321 is formed thin and of a resin, it may be difficult to mold the protruding portion 321. In contrast, according to the second configuration example, it is possible to easily produce the protruding portion 321 including the portion described above.

Figure 17:
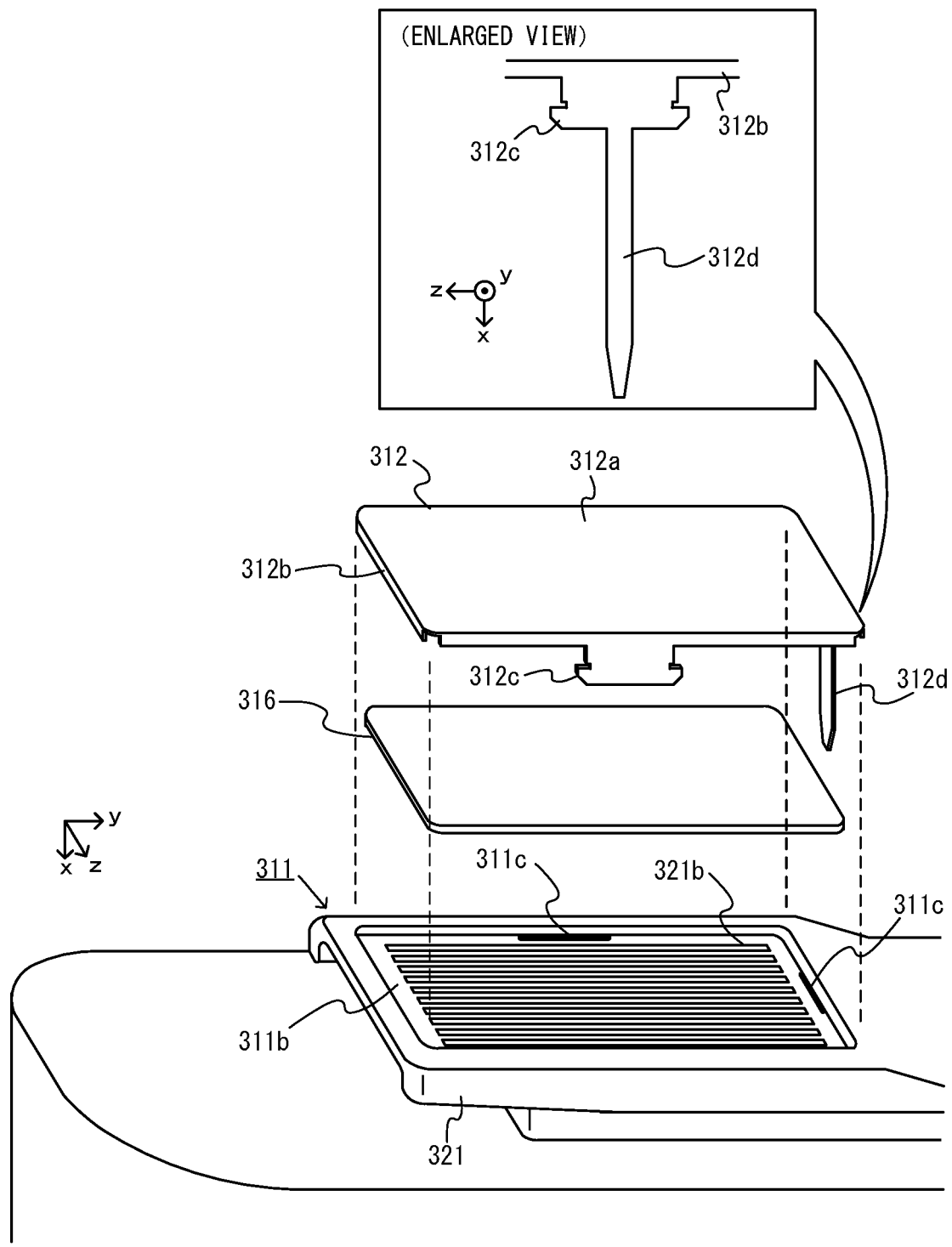
FIG. 17 is an exploded view showing an example of a reinforcement member and an insulation sheet provided on a slider.

FIG. 17 is an exploded view showing an example of a reinforcement member and an insulation sheet provided on a slider. As shown in FIG. 17, a sunken portion 311b, which is sunken from the engaging surface, is formed near the lower end portion (i.e., the end portion on the y-axis negative direction side) of the engaging surface of the slider 311. The reinforcement member 312 is attached to the sunken portion 311b. In the second configuration example, an insulation sheet 316 is first inserted into the sunken portion 311b, and the reinforcement member 312 is attached over the insulation sheet 316, thereby attaching the reinforcement member 312 on the slider 311 (more accurately, a portion of the slider 311 other than the reinforcement member 312). Note that the sunken portion 311b is provided to extend not only over the protruding portion 321 but also over a portion of the slider 311 that is not the protruding portion 321. Thus, in the second configuration example, the reinforcement member 312 is provided over the protruding portion 321 and over a portion (of the slider 311) that is continuous with the protruding portion 321. Thus, it is possible to reinforce the protruding portion 321, and to reduce the possibility that the protruding portion 321 is snapped off the main part of the slider 311 (i.e., the portion other than the protruding portion 321).

As shown in FIG. 17, the slots 321b described above are formed on the bottom surface of the sunken portion 311b. That is, the slots 321b provided on the facing surface 321a are running through to reach the bottom surface of the sunken portion 311b on the reverse side of the facing surface 321a. Note that the terminals 42 extend not only over the protruding portion 321 but also over the inner portion of the slider 311. The slots 321b on the bottom surface side of the sunken portion 311b are formed along the terminals 42. That is, the slots 321b on the bottom surface side of the sunken portion 311b extend not only the reverse side of the protruding portion 321 but also over the main part of the slider 311. Thus, when the terminals 42 are pressed and deformed by the left-side terminals 17 of the main unit 2 in the attached state, it is possible to reduce the possibility that a large force is applied upon the terminals 42 as the terminals 42 come into contact with the bottom surface of the sunken portion 311b (accurately, what would be the bottom surface if the slots 321b were not provided on the sunken portion 311b and if the bottom surface were provided at the position of the slots 321b).

As shown in FIG. 17, the reinforcement member 312 includes a top surface portion 312a, side surface portions 312b, a hook portion 312c and a ground connection portion 312d. Note that in the second configuration example, the reinforcement member 312 having the portions 312a to 312d can be produced by bending a single metal plate, and it is possible to easily produce the reinforcement member 312.

The top surface portion 312a is a portion having the top surface to be a part of the engaging surface of the slider 311 when the reinforcement member 312 is attached to the slider 311. In the second configuration example, the top surface portion 312a has a generally rectangular shape. The reinforcement member 312 has four side surface portions 312b, and the side surface portions 312b extend, substantially perpendicular to the top surface, from the four sides of the top surface portion 312a. The side surface portions 312b are in contact with the side surfaces of the sunken portion 311b when the reinforcement member 312 is attached to the sunken portion 311b of the slider 311.

The hook portion 312c is provided so as to protrude from the side surface portion 312b. In the second configuration example, the hook portion 312c is provided on three of the four side surface portions 312b, i.e., two side surface portions 312b extending from the long sides of the top surface portion 312a and one side surface portion 312b where the ground connection portion 312d is provided. Note that as shown in the enlarged view in FIG. 17, the ground connection portion 312d is provided so as to protrude from the hook portion 312c. There may be any number of hook portions 312c, and they may be provided on two side surface portions 312b or on four side surface portions 312b. The bottom surface of the sunken portion 311b has a rectangular shape that is substantially the same as that of the top surface portion 312a, and slots 311c are provided along those of the four sides of the bottom surface that correspond to those side surface portions 312b where the hook portions 312c are provided. That is, in the second configuration example, the slots 311c are provided along three sides of the bottom surface of the sunken portion 311b. When the reinforcement member 312 is attached to the slider 311, the hook portions 312c are inserted into the slots 311c, thereby attaching the reinforcement member 312 to the slider 311.

Figure 18A:
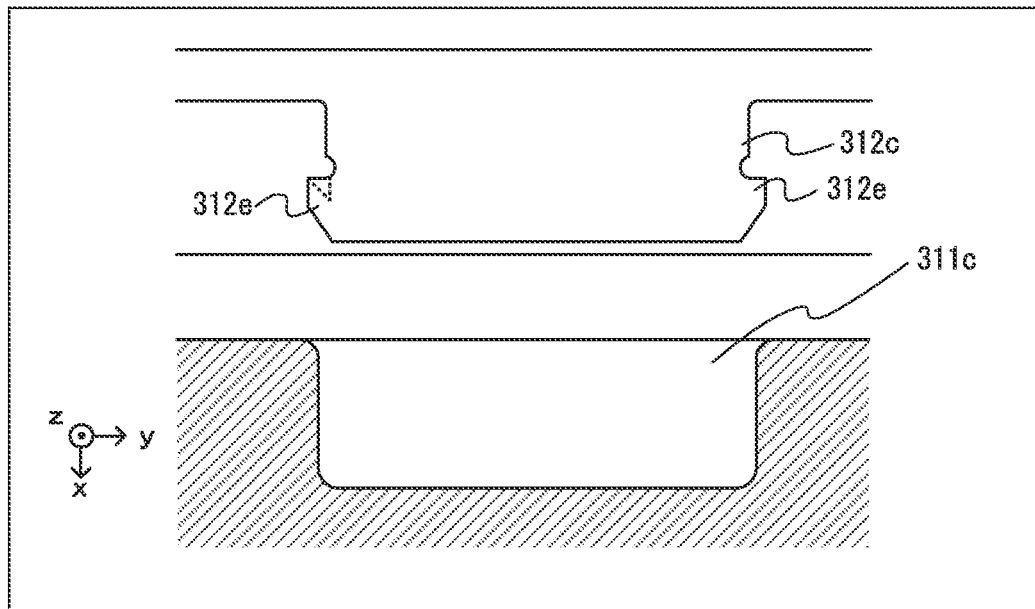
FIGS. 18(a) and 18(b) are diagrams showing an example of how a hook portion is inserted into a slot.

FIG. 18 is a diagram showing an example of how the hook portion 312c is inserted into the slot 311c. FIG. 18(a) shows an example before the hook portion 312c is inserted into the slot 311c. As shown in FIG. 18, the hook portion 312c includes claws 312e on both sides of a direction that is perpendicular to the insertion direction (i.e., the x-axis positive direction) in which the reinforcement member 312 is inserted into the slots 311c. The first end portion of the claw 312e in the insertion direction is formed so that the width of the hook portion 312c decreases toward the distal end in the insertion direction. The second end portion of the claw 312e, opposite from the first end portion, in the insertion direction is formed to have a side extending substantially perpendicular to the insertion direction. Note that in other embodiments, the side of the second end portion may be formed to extend toward the inner side of the hook portion 312c toward the distal end in the insertion direction (see the dotted line shown in FIG. 18(a)). Thus, the claw 312e has such a shape that the hook portion 312c moves relatively easily in the insertion direction, and the hook portion 312c moves less easily in the opposite direction to the insertion direction as the second end portion hooks on the slot 311c.

Figure 18B:
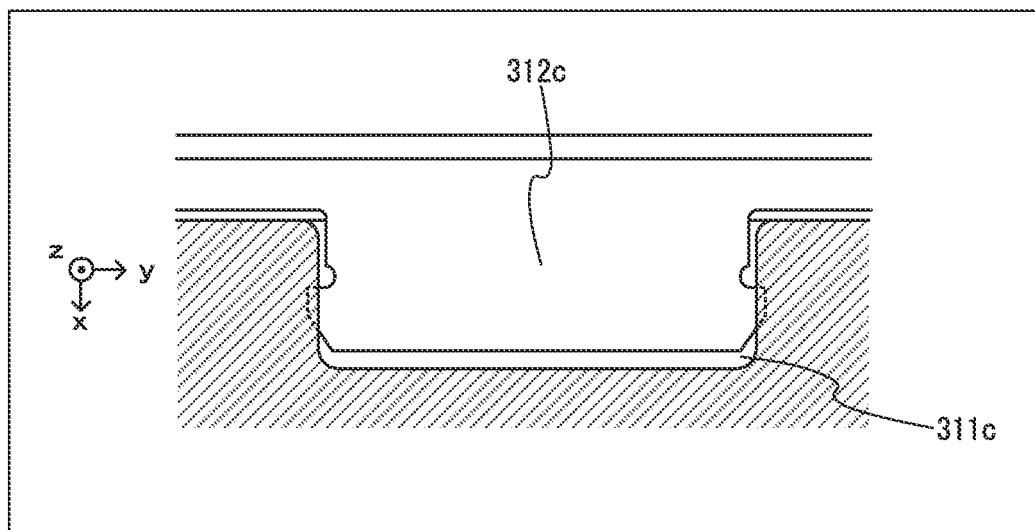

FIG. 18(b) shows an example where the hook portion 312c has been inserted into the slot 311c. As shown in FIG. 18(b), in this state, the claw 312e hooks on a side portion of the slot 311c. In FIG. 18(b), a portion of the claw 312e bites into the slider 311 (specifically, the side portion of the slot 311c formed in the slider 311). Thus, with the hook portion 312c inserted into the slot 311c, the second end portion of the claw 312e hooks on the side portion of the slot 311c, thus making it difficult for the hook portion 312c to come off the slot 311c. That is, the reinforcement member 312 is unlikely to come off the slider 311.

As described above, in the second configuration example, the terminals 42 are placed relatively close to the reinforcement member 312 which is a metal member. If the terminals 42 and a metal member are placed close to each other, there may be errors in communication between the left controller 3 and the main unit 2 via the terminals 42 and there may be an unexpected current flow, or the like, therebetween, as the terminals 42 are electrically affected by inadvertent contact with the metal member. For example, as described above, in the attached state, the terminals 42 may be pressed and deformed by the left-side terminals 17 of the main unit 2 to move into the slot 321b. In such a case, if the terminals 42 contact the reinforcement member 312, which is a metal member, there may be errors in communication between the left controller 3 and the main unit 2 via the terminals 42 and there may be an unexpected current flow, or the like, therebetween.

In order to reduce such a possibility as described above, in the second configuration example, the insulation sheet 316 is provided between the terminals 42 and the reinforcement member 312 (FIG. 17). That is, in the second configuration example, the reinforcement member 312 is attached to the slider 311 after the insulation sheet 316 is inserted into the sunken portion 311b. Then, it is possible to reduce the possibility that the terminals 42 are affected by the reinforcement member 312, and it is therefore possible to improve the accuracy of communication between the left controller 3 and the main unit 2.

Note that in the present embodiment, the insulation sheet 316 also provides a water-resisting function. Specifically, the insulation sheet 316 can suppress entry into the slots 321b of water that has come in through the gap between the reinforcement member 312 and the slider 311, and can reduce the possibility that water comes into the slots 321b and touches the terminals 42. Since the insulation sheet 316 has a water-resisting function, the insulation sheet 316 can be said to be a water-resisting sheet. Note that the insulation sheet 316 may be of a water-absorbing material or a water-repelling material. If the insulation sheet 316 is of a water-absorbing material, it is possible to absorb moisture by the insulation sheet 316 and to reduce the possibility that water touches the terminals 42. When the insulation sheet 316 is of a water-repelling material, it is possible to cover the slots 321b with the insulation sheet 316 and to reduce the possibility that water comes into the slots 321b.

Note that even if the terminals 42 do not come into contact with the reinforcement member 312 which is a metal member (due to the provision of the insulation sheet 316), the reinforcement member 312 may possibly be electrically charged due to current flow through the terminals 42, static electricity from outside, etc. If the reinforcement member 312 is electrically charged, the terminals 42 may be affected by the reinforcement member 312. Therefore, in the second configuration example, the reinforcement member 312 is controlled at the reference potential (ground) by using the ground connection portion 312d described above.

Figure 19:
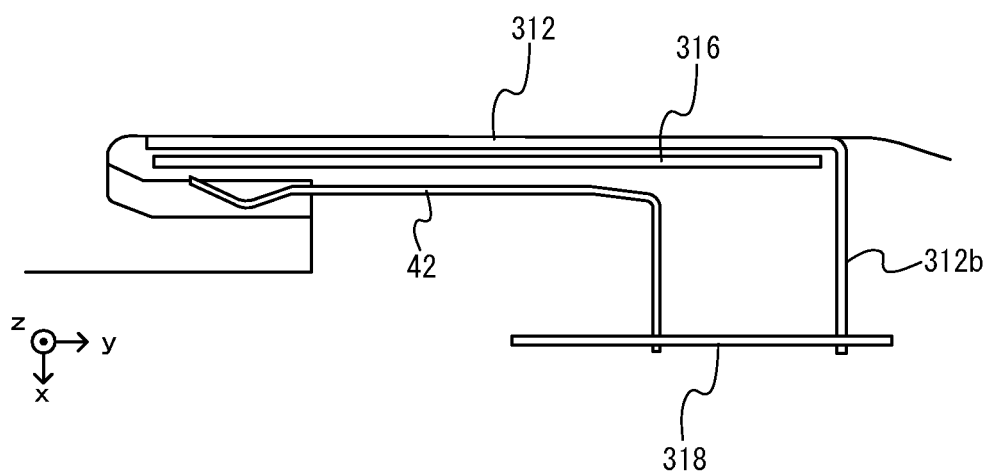
FIG. 19 is a diagram schematically showing an example arrangement of elements inside a non-limiting left controller.

FIG. 19 is a diagram schematically showing an example arrangement of elements inside the left controller 3. As shown in FIG. 19, the left controller 3 includes an electronic circuit 318 therein. The electronic circuit 318 is a printed board, for example, and may be a flexible printed circuit board formed by a film substrate. The terminal 42 and the ground connection portion 312d are connected to the electronic circuit 318.

Figure 20:
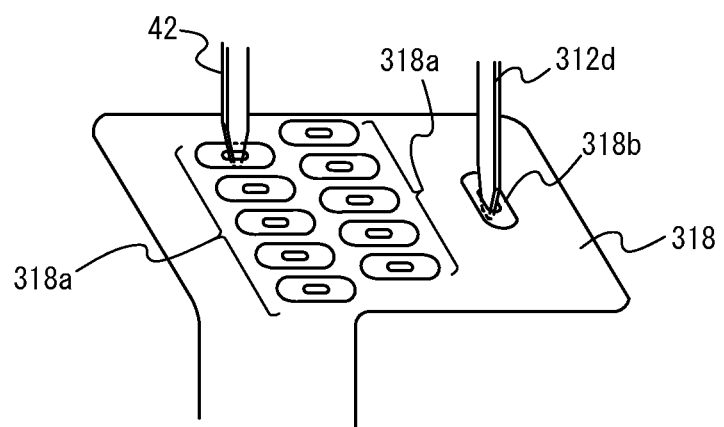
FIG. 20 is a diagram showing an example of how a terminal and a ground connection portion are connected to an electronic circuit.

FIG. 20 is a diagram showing an example of how the terminal 42 and the ground connection portion 312d are connected to the electronic circuit 318. Note that FIG. 20 only shows through holes and lands formed around the through holes of the electronic circuit 318, and printed wiring, etc., are not shown. As shown in FIG. 20, the electronic circuit 318 includes terminal land portions 318a to which the terminal 42 is connected. The terminal 42 is inserted into the through hole of the terminal land portion 318a and is (electrically) connected to the terminal land portion 318a by way of soldering, or the like. Note that although FIG. 20 shows a state in which one terminal 42 is connected to one terminal land portion 318a, ten terminals 42 are connected to ten terminal land portions 318a in practice.

The electronic circuit 318 includes a ground land portion 318b to which the ground connection portion 312d is connected. The ground connection portion 312d is inserted into the through hole of the ground land portion 318b, and is (electrically) connected to the ground land portion 318b by way of soldering, or the like. The ground land portion 318b is a ground portion that is connected to the reference potential (in other words, has the reference potential). Although not shown in the figure, in the electronic circuit 318, the terminal land portion 318a, to which the ground terminal (of the ten terminals 42) is connected, is electrically connected to the ground land portion 318b via printed wiring. That is, the ground terminal is electrically connected to the ground land portion 318b.

As described above, in the second configuration example, since the reinforcement member 312 is electrically connected to the ground portion, it is possible to reduce the possibility that the reinforcement member 312 is electrically charged. Then, it is possible to reduce the possibility that the terminals 42 are affected by the reinforcement member 312, and it is therefore possible to improve the accuracy of communication between the left controller 3 and the main unit 2.

(Elements Regarding Stop Member)

As shown in FIG. 14, in the second configuration example, the left controller 3 includes the stop member 319. The stop member 319 is a member for resisting the slide movement of the slider 311 of the left controller 3 against the main unit 2 in the attached state. That is, the second configuration example uses the stop member 319, instead of the projection 41 in the first configuration example, to resist (in other words, lock) the slide movement of the slider 311.

As shown in FIG. 14, the stop member 319 is provided on the upper side (i.e., the y-axis positive direction side) of the center of the slider 311 with respect to slide direction. More specifically, the stop member 319 is provided in the upper end portion of the slider 311. Note that the position of the stop member 319 along the slider 311 is determined based on the position of the stop-receiving portion along the left rail member 300 of the main unit 2. That is, the position of the stop member 319 is determined so that the stop member 319 is located at the cut-out portion C1 of the top surface portion 303 of the left rail member 300 in the attached state (FIG. 27). The stop member 319 is closer to the upper end portion of the slider 311 than the lower end portion of the slider 311 with respect to slide direction. For example, when the stop-receiving portion is arranged at the upper end of the left rail member 300, the stop member 319 may be provided at the upper end of the slider 311.

If the stop member 319 is provided in an upper portion along the slider 311 as in the second configuration example, it is possible to shorten the period of time over which the stop member 319 is in contact with the left rail member 300 when the slider 311 is inserted into the left rail member 300. Thus, a user can smoothly slide the slider 311. Note that there is no particular limitation on the position of the stop member 319, and the stop member 319 may be provided in a lower portion along the slider 311 in other embodiments.

Figure 21A:
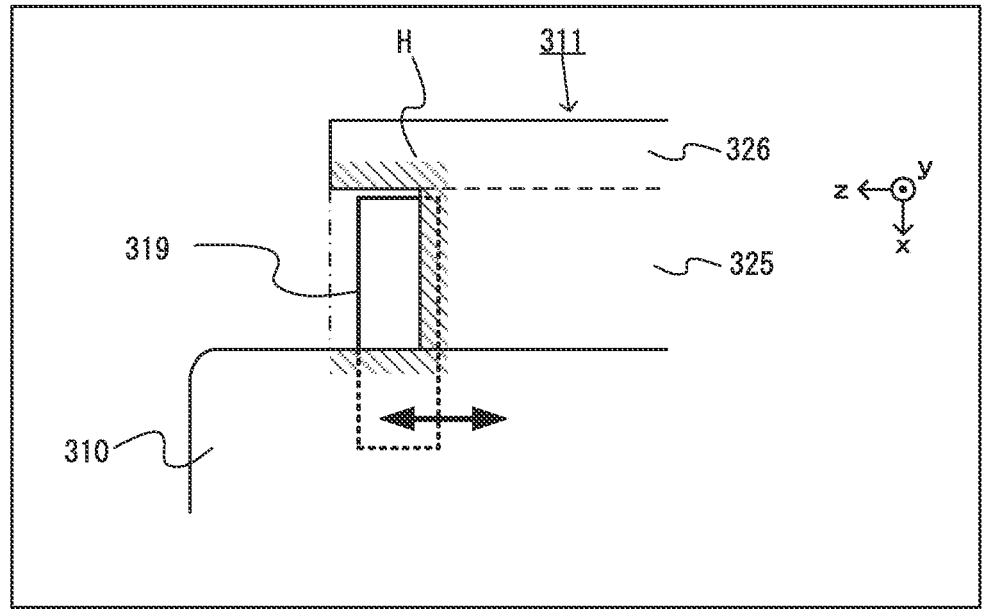
FIGS. 21(a) and 21(b) are diagrams schematically showing an example positional relationship between a slider and a stop member according to a non-limiting second configuration example.

FIG. 21 is a diagram schematically showing an example positional relationship between the slider 311 and the stop member 319 according to the second configuration example. As shown in FIG. 21(a), the stop member 319 is provided so as to protrude from the slider 311 (specifically, from the side surface portion of the slider 311). The stop member 319 is provided so as to also protrude from the right side surface of the main section 310. Thus, in the second configuration example, the stop member 319 is provided so as to protrude from the side surface portion of the slider 311 and from the right side surface of the main section 310.

As described above, the slider 311 includes the shaft 325, and the top surface portion 326 having a greater width than the shaft 325. In the second configuration example, the stop member 319 is provided so that at least a portion thereof protrudes from a hole 325a (see FIG. 23) formed in the side surface of the shaft 325. The stop member 319 is provided so that at least a portion thereof protrudes from a hole (not shown) formed in the right side surface of the main section 310.

Note that the stop member 319 may be provided at any position such that the stop member 319 can engage with the stop-receiving portion of the left rail member 300 in the attached state. Therefore, instead of protruding from a side surface portion of the shaft 325, the stop member 319 may be provided so as to protrude from any position of the left controller 3 except for the side surface portion. For example, the stop member 319 may be provided so as to protrude from a surface defining a depressed portion H (see FIG. 21), which is defined by the main section 310 and the slider 311 of the left controller 3. Note that the depressed portion H is a portion whose cross section along a direction perpendicular to the slide direction the slider 311 is defined in a depressed shape by one or both of the main section 310 and the slider 311 of the left controller 3.

Figure 22:
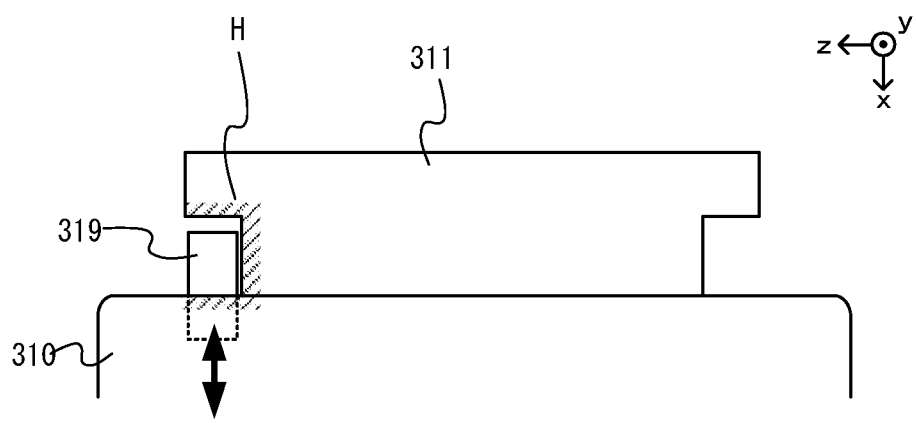
FIG. 22 is a diagram schematically showing an example positional relationship between a slider and a stop member according to another embodiment.

In other embodiments, the stop member 319 may be provided at the position shown in FIG. 22, for example. FIG. 22 is a diagram schematically showing an example positional relationship between the slider 311 and the stop member 319 according to another embodiment. As shown in FIG. 22, the stop member 319 may be provided so as to protrude (only) from the main section 310. Although not shown in the figure, the stop member 319 may be provided so as to protrude (only) from the side surface of the slider 311. The stop member 319 may be provided so as to protrude from the top surface portion 326 defining the depressed portion H (more specifically, from the hole provided in the top surface portion 326). The stop member 319 may be provided so as to protrude from the side surface of the main section 310, the side surface of the shaft 325 and the top surface portion 326. For example, the stop member 319 may be provided so as to be inside of the top surface portion 326, in addition to the side surface of the main section 310 and the side surface of the shaft 325, in the state shown in FIG. 21(a).

As described above, according to the second configuration example, the stop member 319 is provided so as to protrude from a surface defining the depressed portion, and it is therefore possible to reduce the possibility that the stop member 319 is damaged by being in contact with other objects. Thus, according to the second configuration example, it is possible to protect the stop member 319 by the depressed portion.

The stop member 319 is provided so as not to protrude from the space in the depressed portion (the area surrounded by a one-dot-chain line and hatching in FIG. 21(a)) into the space outside the left controller 3. Then, it is possible to further reduce the possibility that the stop member 319 is damaged by being in contact with other objects, and to more reliably protect the stop member 319.

Figure 21B:
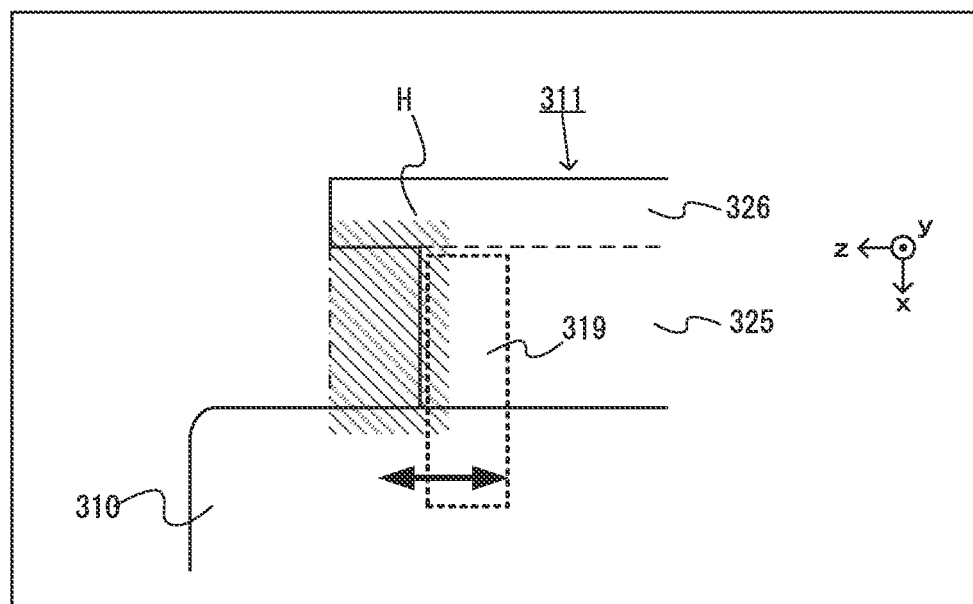

In the second configuration example, the stop member 319 is movable, and can move into a state in which the stop member 319 is accommodated inside the left controller 3 (specifically, inside the slider 311 or the main section 310) as shown in FIG. 21(b). That is, the stop member 319 can assume two different states, i.e., the protruding state shown in FIG. 21(a) and the accommodated state shown in FIG. 21(b). When the stop member 319 moves into the accommodated state, while in the attached state, the stop member 319 is disengaged from the stop-receiving portion of the left rail member 300 (i.e., no longer engaged with the stop-receiving portion), the details of which will be described later. This releases the lock (of the slider 311 for the slide movement) by means of the stop member 319.

In the second configuration example, the stop member 319 is movable in a direction (i.e., the z-axis direction) parallel to the right side surface of the left controller 3 as shown in FIG. 21. Specifically, the stop member 319 moves into the accommodated state by moving in the direction (i.e., the z-axis negative direction) toward the inside of the slider 311. Note that the direction in which the stop member 319 is movable may be any direction perpendicular to the slide direction. For example, in other embodiments, the stop member 319 can be movable in a direction (i.e., the x-axis direction) perpendicular to the right side surface of the left controller 3 as shown in FIG. 22. Then, the stop member 319 moves into the accommodated state by moving in the direction (i.e., the x-axis positive direction) toward the inside of the main section 310.

Note that in the second configuration example, the stop member 319 is movable into a position where the stop member 319 is entirely accommodated inside the left controller 3. That is, in the accommodated state, the entirety of the stop member 319 is accommodated inside the left controller 3. In other embodiments, in the accommodated state, the stop member 319 does not need to be entirely accommodated inside the left controller 3. That is, the stop member 319 may be movable between the first position at which the stop member 319 protrudes from a surface defining the depressed portion and the second position at which the stop member 319 is more into the left controller 3 than at the first position (the second position may be where the stop member 319 partly protrudes from the left controller 3). The stop member 319 may be a member that is provided protruding from a surface defining the depressed portion and that is capable of being deformed by an external force.

Figure 23:
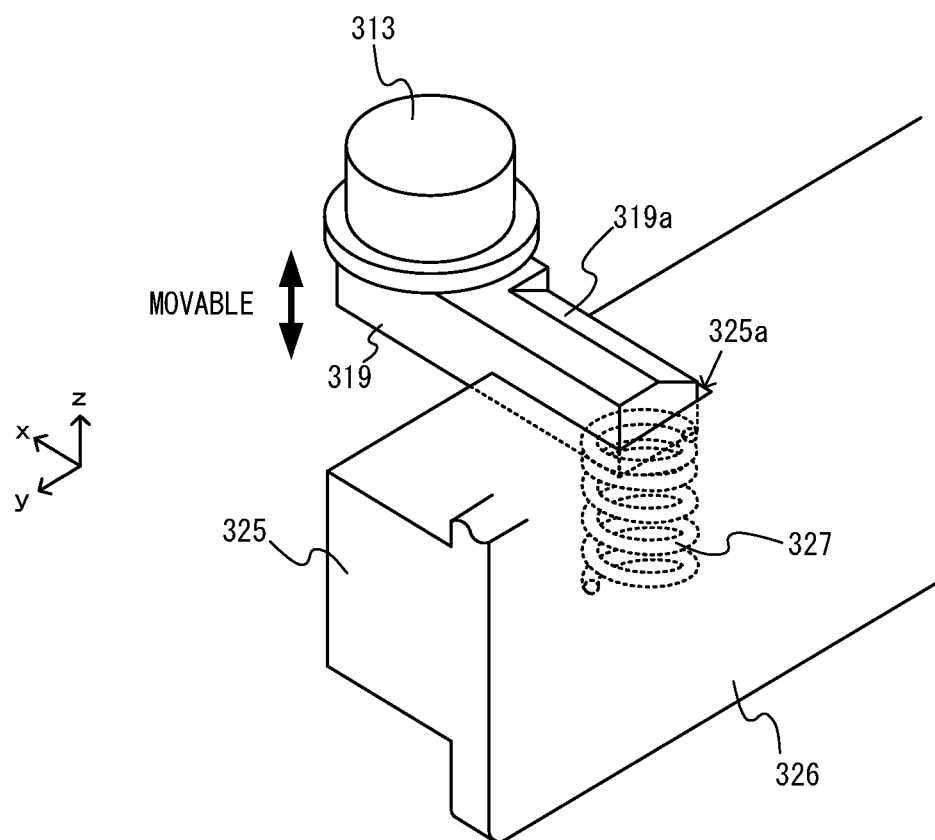
FIG. 23 is a perspective view schematically showing an example of a stop member and a release button.

FIG. 23 is a perspective view schematically showing an example of a stop member and a release button. Note that FIG. 23 does not show some elements (the main section 310, etc.) in order to facilitate understanding of those elements to be discussed (i.e., the stop member 319, a release button 313, the slider 311 and a spring 327). For the same purpose, a part of the top surface portion 326 of the slider 311 is not shown.

The stop member 319 is biased by an elastic member (specifically, the spring 327) into the protruding state. Specifically, the left controller 3 includes the spring 327 therein. The spring 327 is provided more into the slider 311 than the stop member 319. The spring 327 is in contact with the stop member 319, biasing the stop member 319 toward the outer side of the slider 311.

In the second configuration example, the left controller 3 includes the release button 313 (FIG. 14 and FIG. 23). A user can press the release button 313 to transition the stop member 319 into the accommodated state, thereby releasing the lock by the stop member 319. The configuration for transitioning the stop member 319 into the accommodated state will now be described.

As shown in FIG. 23, the release button 313 is provided so as to be in contact with the stop member 319. That is, the release button 313 is connected to the stop member 319. The stop member 319 is coupled to the release button 313. Note that the stop member 319 and the release button 313 may be formed as an integral unit. Note that although not shown in the figure, a groove (in other words, a space) along which the stop member 319 and the release button 313 can move is provided in the main section 310 and the slider 311. The stop member 319 and the release button 313 are provided so as to be movable in the front-rear direction (i.e., the z-axis direction) along the groove. Therefore, when the release button 313 is pressed (i.e., moved in the z-axis negative direction), the stop member 319 also moves, together with the release button 313, in the button-pressing direction. As described above, the stop member 319 is biased by the spring 327 in the rear direction (i.e., the z-axis positive direction). Therefore, in a state in which no force other than the spring 327 is applied (e.g., a state in which the release button 313 is not pressed), the stop member 319 is in the protruding state described above, and the release button 313 is in a state of being pushed up from the reverse surface of the main section 310 (specifically, a state in which it is pushed up in the direction from the inside toward the outside of the main section 310 so as to protrude from the reverse surface of the main section 310; referred to as the "pushed-up state"). That is, the release button 313 is biased in the rear direction by the spring 327, as is the stop member 319.

A user can push down the release button 313 in the pushed-up state. In response to the release button 313 being pushed down, the release button 313 and the stop member 319 move toward the inside of the left controller 3. As a result, the release button 313 is in the state in which it is pushed lower than in the pushed-up state (referred to as the "pushed-down state"). The stop member 319 moves into the slider 311 through the hole 325a, thereby moving into the accommodated state. As described above, a user can push down the release button 313 to bring the stop member 319 into the accommodated state, thereby releasing the lock by the stop member 319.

In the second configuration example, the stop member 319 includes a slope 319a at the lower end (i.e., the end portion on the y-axis negative direction side) (FIG. 23). That is, the lower end of the stop member 319 is tapered toward the distal end. Specifically, the slope 319a is sloped toward the distal end so that the position of the upper surface thereof gradually changes in the direction in which the stop member 319 is movable (in other words, in the moving direction from the protruding state to the accommodated state, i.e., the z-axis negative direction side). The slope 319a is provided so that the stop member 319 is unlikely to be interfered by the top surface portion 303 of the left rail member 300 when inserting the slider 311 into the left rail member 300 of the main unit 2, the details of which will be described later.

Note that an end surface substantially perpendicular to the slide direction is provided at the upper end (i.e., the end portion on the y-axis positive direction side) of the stop member 319 (FIG. 23). That is, the slope is not provided at the upper end, as opposed to the lower end, and the upper end is not as sloped as the lower end. Therefore, the upper end is shaped so that it can easily be interfered by the top surface portion 303 of the left rail member 300, as compared with the lower end.

Also in the second configuration example, as in the first configuration example, the ZL button 39 is provided on the reverse surface of the main section 310 so as to project from the reverse surface. The left controller 3 includes a projection portion 314 in the vicinity of the ZL button 39, the projection portion 314 projecting with respect to other portions of the reverse surface of the main section 310 (FIG. 14). As shown in FIG. 14, the release button 313 is provided near the ZL button 39 (in other words, near the projection portion 314) on the reverse surface of the main section 310. Note that according to the second configuration example, the ZL button 39 and the projection portion 314 are provided so as to extend higher than the release button 313 with respect to the "other portions of the reverse surface" described above. Therefore, when the left controller 3 is seen from a predetermined direction parallel to the reverse surface (e.g., when seen from the left side as shown in FIG. 14(*b*) or when seen from the upper side as shown in FIG. 14(*d*)), at least a portion of the release button 313 can no longer be seen. Therefore, in the second configuration example, it is possible to reduce the possibility of inadvertently pressing the release button 313 or hitting the release button 313 against another object, resulting in the release button 313 being pressed. Thus, the ZL button 39 and/or the projection portion 314 function as a projection for protecting the release button 313. With the provision of the projection, it is possible to reduce the possibility of inadvertently operating the release button 313 and releasing the lock, resulting in the left controller 3 coming off of the main unit 2. Note that in other embodiments, the ZL button 39 and/or the projection portion 314 may be provided so as to extend lower than the release button 313 with respect to the other portions of the reverse surface. Also in such a case, as long as it is projecting from the reverse surface of the main section 310, it is possible to realize the effect of protecting the release button 313.

In the second configuration example, the release button 313 is provided on the reverse surface of the main section 310 (FIG. 14). Therefore, when a user holds the information processing device 1 (with the left controller 3 attached thereto) in such a manner that the operation sections 32 to 36 on the primary surface (i.e., the surface on the front side) can be operated using the thumb (see FIG. 33), the release button 313 can easily be operated using the index finger. That is, according to the second configuration example, it is possible to provide the information processing device 1 having a high usability, in which the release button 313 can easily be operated while holding the information processing device 1.

Note that there is no particular limitation on the arrangement of the release button 313. For example, in other embodiments, the release button 313 may be provided on the primary surface of the main section 310. Then, a user can view the release button 313 while holding the information processing device 1, and it is therefore possible to provide a controller with an easy-to-operate release button 313.

In other embodiments, the release button 313 may be provided both on the primary surface and on the reverse surface of the main section 310. Then, the mechanism for moving the stop member 319 into the accommodated state in response to the release button 313 being pressed may be (a) a mechanism for moving the stop member 319 into the accommodated state in response to pressing of either one of the two release buttons 313, or (b) a mechanism for moving the stop member 319 into the accommodated state in response to pressing of both of the two release buttons 313. With the configuration (a), a user can operate one of the two release buttons 313 that the user feels easier to operate, thus improving the usability of the information processing device. With the configuration (b), the lock is not released when one of the two release buttons 313 is inadvertently operated, and it is therefore possible to reduce the possibility that the lock is released inadvertently.

In other embodiments, the left controller 3 may not include the release button 313. Then, a user is allowed to release the lock by the stop member 319 to thereby remove the left controller 3 from the main unit 2 by applying, on the left controller 3, a certain force or more for sliding the left controller 3 upward.

(Elements on Engaging Surface of Slider 311)

As shown in FIG. 14, also in the second configuration example, as in the first configuration example, the second L button 43, the second R button 44, the indicator LED 45 and the pairing button 46 are provided on the engaging surface of the slider 311. In the second configuration example, depressed portions are provided at two positions on the engaging surface of the slider 311, and the second L button 43 and the second R button 44 are provided in the depressed portions, respectively.

Figure 24:
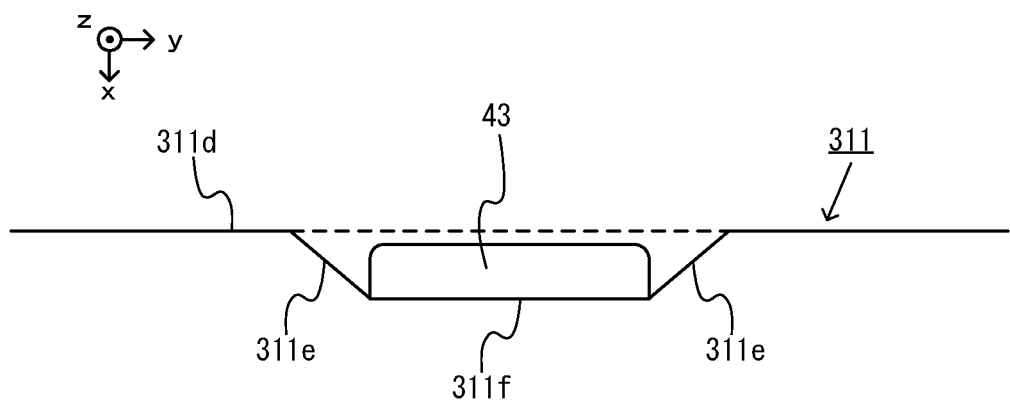
FIG. 24 is a diagram schematically showing an example configuration of a slider near a second L button according to a non-limiting second configuration example.

FIG. 24 is a diagram schematically showing an example configuration of the slider 311 near the second L button according to the second configuration example. FIG. 24 is a diagram showing the slider 311 as seen from the front side (i.e., as seen from the z-axis positive direction side toward the z-axis negative direction side). Note that although FIG. 24 shows a configuration of the slider 311 near the second L button 43, the configuration of the slider 311 near the second R button 44 is similar to that shown in FIG. 24.

As shown in FIG. 24, the engaging surface of the slider 311 includes the upper-tier surface 311d, a slope 311e and a lower-tier surface 311f. The upper-tier surface 311d is a surface that is farther away from the main section 310 of the left controller 3 (i.e., than the other surfaces 311e and 311f). The lower-tier surface 311f is a surface that is closer to the main section 310 of the left controller 3 (i.e., than the upper-tier surface 311d). In other words, the lower-tier surface 311f is provided at a lower position than the upper-tier surface 311d. The slope 311e is a surface connecting between the upper-tier surface 311d and the lower-tier surface 311f. In the second configuration example, the slope angle of the slope 311e is less than 90° (e.g., less than 45°).

As shown in FIG. 24, the second L button 43 is arranged on the lower-tier surface 311f. In the second configuration example, (as opposed to the first configuration example), the lower-tier surface 311f and the slopes 311e extend from one end to the other end in the width direction of the slider 311 (i.e., the z-axis direction). In other words, the depressed portion, which is defined by the lower-tier surface 311f and the slopes 311e, extends from one end to the other end in the width direction of the slider 311. Thus, in the second configuration example, the second L button 43 can be seen when the slider 311 is viewed from the width direction.

Note that in the second configuration example, the depressed portion, which is defined by the lower-tier surface 311f and the slopes 311e, is provided at a position different from an end portion of the slider 311 in the slide direction. In other embodiments, the depressed portion may be provided at an end of the slider 311 in the slide direction. That is, an end of the engaging surface in the slide direction may be formed by the lower-tier surface.

Also in the second configuration example, as in the first configuration example, the second L button 43 is provided so as not to protrude past the upper-tier surface 311d (FIG. 24). For example, the second L button 43 extends away from the right side surface of the left controller 3 by a distance greater than a first distance from the right side surface to the lower-tier surface 311f and less than or equal to a second distance from the right side surface to the upper-tier surface 311d. Thus, it is possible to reduce the possibility that the second L button 43 comes into contact with the bottom surface of the left rail member 300 when the slider 311 is attached to the left rail member 300 of the main unit 2. This allows the slider 311 to be smoothly slid against the left rail member 300.

As described above, in the second configuration example, a slope is provided on both sides of the operation section (the second L button 43 and the second R button 44), making it easier to press the operation section. Since the finger of the user pressing the operation section touches the slope, it is possible to reduce the awkwardness to be felt by the user if the finger touched a step between the lower-tier surface and the upper-tier surface. Thus, according to the second configuration example, it is possible to improve the controllability of the left controller 3.

Note that the slope 311e may be a flat surface as shown in FIG. 24, or a curved surface across which the slope angle varies. The slope angle may smoothly vary at the boundary portion between the lower-tier surface 311f and the slope 311e and at the boundary portion between the upper-tier surface 311d and the slope 311e. Then, it is possible to further reduce the awkwardness to be felt by the user.

As described above, in the second configuration example, the lower-tier surface of each of the depressed portions where the second L button 43 and the second R button 44 are provided extends to the perimeter of the engaging surface (FIG. 24). In contrast, the pairing button 46 in the second configuration example is formed as in the first configuration example. That is, for the pairing button 46, the lower-tier surface is absent along the perimeter of the engaging surface, and the upper-tier surface is formed along the entire circumference of the pairing button 46. Note that also in the second configuration example as in the first configuration example, the pairing button 46 is provided so as not to protrude past the upper-tier surface. The pairing button 46 is a button used to instruct the pairing process described above, and is not expected to be pressed frequently during use of the information processing device 1 (e.g., during game operations). Therefore, in the second configuration example, the pairing button 46 is less easy to press than the second L button 43 and the second R button 44 as described above so as to reduce the possibility that the pairing button 46 is inadvertently operated during use of the information processing device 1.

[1-2-3. Second Configuration Example Regarding Right Controller]

Figure 25:
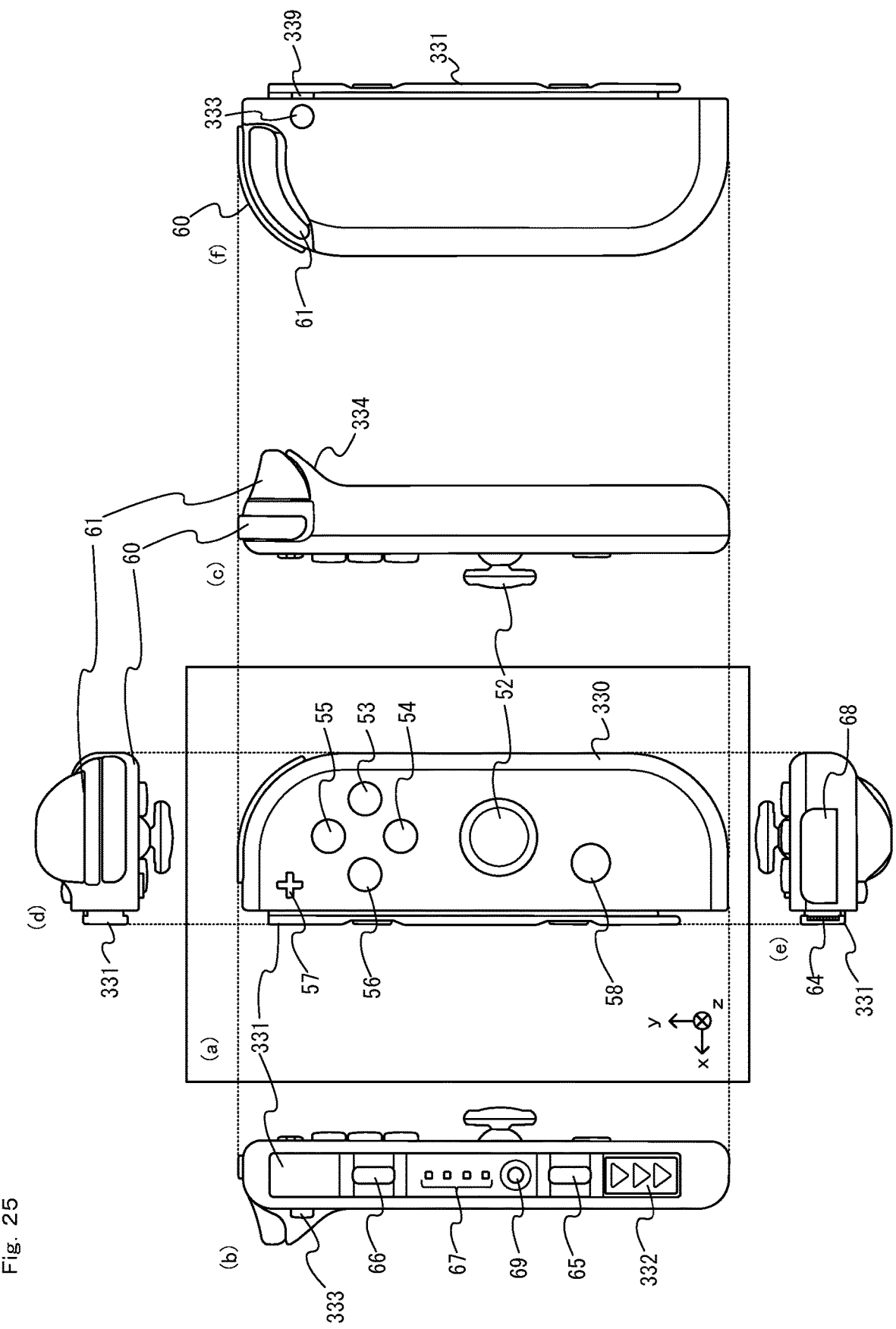
FIG. 25 is a six-sided view showing an example right controller according to a non-limiting second configuration example.

FIG. 25 is a six-sided view showing an example of the right controller 4 according to the second configuration example. In the second configuration example, the slider of the right controller 4 and various sections provided thereon are configured differently from the first configuration example. The configuration of the right controller 4 according to the second configuration example will now be described, focusing on differences from the first configuration example. In FIG. 25, like elements to those shown in FIG. 6 are denoted by like reference numerals and will not be described in detail below. Note that in FIG. 25, some operation sections (e.g., the plus button 57, etc.) have different shapes than those of FIG. 6, but these operation sections have the same functions as those of like reference numerals of the first configuration example.

In the second configuration example, the right controller 4 includes a main section 330. The main section 330 may have similar functions to those of the housing 51 of the first configuration example, and may be the same as the housing 51. The right controller 4 has a similar configuration to that of the left controller 3 as the configuration for the attachment to the main unit 2. As shown in FIG. 25, the right controller 4 includes the slider 331. As is the slider 62 of the first configuration example, the slider 331 is a member that allows the right controller 4 to be slidably and detachably attached to the main unit 2.

The slider 331 is provided so as to extend in the up-down direction (i.e., the y-axis direction) on the left side surface (i.e., the side surface on the x-axis positive direction side) of the main section 330 of the right controller 4. In the second configuration example, the configuration of the slider 331 of the right controller 4 (including the shape of the slider 331 and various members provided on the slider 331) is the same as that of the slider 311 of the left controller 3, except for the position of the hole for the stop member. The hole 325a is formed in one side surface of the shaft 325 of the slider 311 of the left controller 3, whereas the hole is formed in the other side surface of the shaft of the slider 331 of the right controller 4. Thus, a hole is formed on the reverse surface side (i.e., the surface on the z-axis positive direction side) of the controller for both of the controllers 3 and 4.

Note that the slider 311 used for the left controller 3 and the slider 331 used for the right controller 4 do not need to completely coincide with each other. For example, the left controller 3 and the right controller 4 may be different from each other in terms of the positions of operation sections (e.g., the second L button, the second R button, etc.) provided thereon.

In other embodiments, the slider 311 used for the left controller 3 and the slider 331 used for the right controller 4 may be the same. Then, the same slider can be commonly used for the left controller 3 and for the right controller 4, thereby improving the efficiency of the production of the controller.

As shown in FIG. 25, the right controller 4 includes a stop member 339 and a release button 333, as does the left controller 3. The shapes of the stop member 339 and the release button 333 of the right controller 4 are the same as those of the stop member 319 and the release button 313 of the left controller 3 (see FIG. 23), except for they are reversed in the left-right direction. The position of the stop member 339 of the right controller 4 is similar to that of the stop member 319 of the left controller 3. That is, the stop member 339 is provided on the upper side of the center of the slider 331 (i.e., the y-axis positive direction side) with respect to the slide direction. The stop member 339 is provided so as to protrude from a surface defining the depressed portion, which is defined by the main section 330 (specifically, the left side surface of the main section 330) of the right controller 4 and the slider 331, and provided so as not to protrude from the space in the depressed portion into the space outside the right controller 4.

The position of the release button 333 on the right controller 4 is similar to the position of the release button 313 on the left controller 3. That is, the release button 333 is provided near the ZR button 61 (in other words, near a projection portion 334) formed on the reverse surface of the main section 330 (FIG. 14). Therefore, for the right controller 4, the ZR button 61 and/or the projection portion 334 function as a projection for protecting the release button 333.

As described above, the stop member 339 and the release button 333 of the right controller 4 have a similar mechanism to that of the stop member 319 and the release button 313 of the left controller 3. Therefore, when the right controller 4 is attached to the main unit 2, the stop member 339 engages with the stop-receiving portion of the right rail member of the main unit 2, thereby locking the slide movement of the right controller 4 attached to the main unit 2. In this state, in response to the release button 333 being pressed, the stop member 339 moves into the accommodated state, thereby releasing the lock by the stop member 339.

[1-2-4. Attachment Operation in Second Configuration Example]

Next, referring to FIG. 26 and FIG. 27, the operation of attaching a controller to the main unit 2 according to the second configuration example will be described. Note that although the following description is directed to an example operation of attaching the left controller 3 to the main unit 2, the operation of attaching the right controller 4 to the main unit 2 can be performed in a similar manner.

(Operation Regarding Connection Between Terminals)

Also in the second configuration example as in the first configuration example, in order to attach the left controller 3 to the main unit 2, a user first inserts the lower end of the slider 311 of the left controller 3 into the groove of the left rail member 300 of the main unit 2 via the upper end of the left rail member 300. Thus, the slider 311 and the left rail member 300 (slidably) engage with each other. Also in the second configuration example as in the first configuration example, the engagement between the slider 311 and the left rail member 300 is generally as shown in FIG. 7. The user further moves the slider 311, which has been inserted into the left rail member 300, toward the distal end of the left rail member 300 (i.e., downward).

FIG. 26 is a diagram schematically showing an example of the mechanism around the left-side terminals 17 and 42 before and after the slider 311 is attached to the left rail member 300. Note that FIG. 26 is a cross-sectional view taken along a direction perpendicular to the front-rear direction (i.e., the z-axis direction) (for the slider 311, a cross-sectional view taken along the same direction as the C-C' cross section shown in FIG. 14), and FIG. 26 shows elements of the left controller 3 hatched for the purpose of making it easier to distinguish between elements of the main unit 2 and elements of the left controller 3.

Figure 26A:
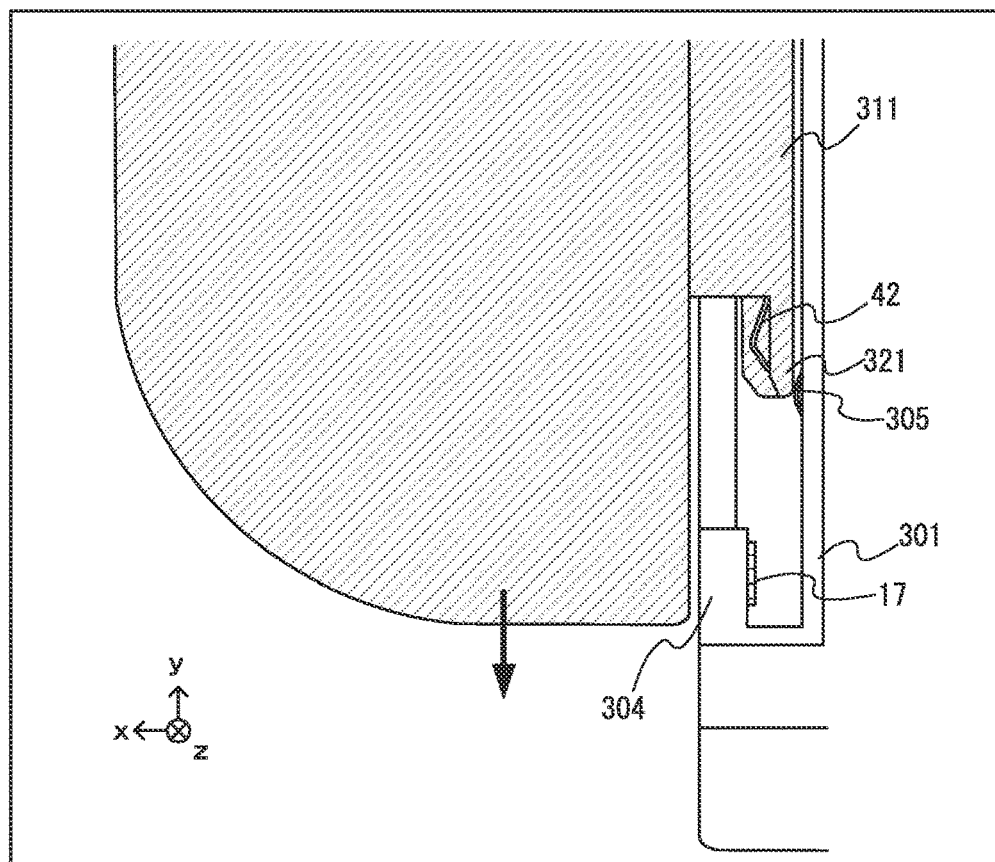
FIGS. 26(a) and 26(b) are diagrams schematically showing an example of the mechanism around left-side terminals before and after a slider is attached to a left rail member.
Figure 26B:
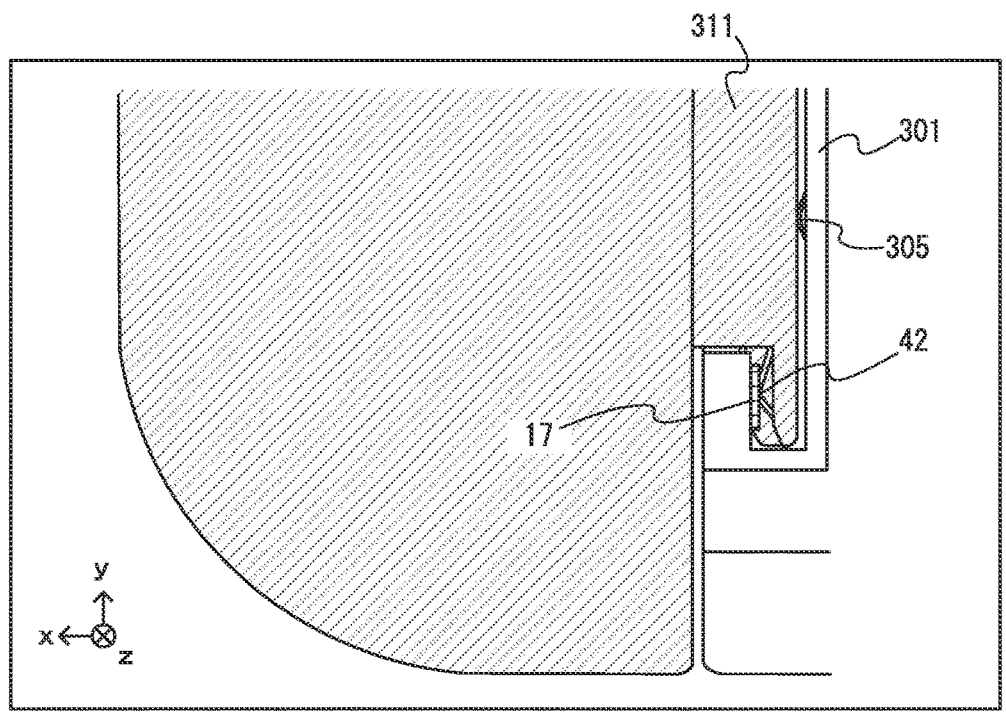

FIG. 26(a) shows a state in which the left controller 3 has not been attached to the main unit 2 (i.e., a state in which the lower end of the slider 311 has not reached the distal end of the left rail member 300 of the main unit 2). FIG. 26(b) shows a state in which the left controller 3 has been attached to the main unit 2 (the attached state described above). The attached state shown in FIG. 26(b) is achieved, from the state shown in FIG. 26(a), by sliding the slider 311 toward the distal end of the left rail member 300 (i.e., downward).

Note that as described above, the protruding portion 321 includes members (specifically, the wall portions 322 and the distal end portion 323) having the function of aligning the left-side terminals 17 and the terminals 42 with each other. Therefore, according to the second configuration example, in the attached state, the terminals can be in contact with each other in a correct positional relationship.

In the attached state, the protruding portion 321 of the slider 311 is inserted between the bottom surface portion 301 of the left rail member 300 and the facing portion 304. Then, the terminals 42 of the left controller 3 come into contact with the left-side terminals 17 of the main unit 2. Thus, the terminals 42 of the left controller 3 and the left-side terminals 17 of the main unit 2 are electrically connected to each other.

Note that as described above, in the attached state, the terminals 42 of the left controller 3 partially come between the wall portions 307b provided on the left rail member 300 of the main unit 2. Therefore, according to the second configuration example, it is possible to reduce the possibility that the terminals 42 of the left controller 3 are shifted in the direction (i.e., the z-axis direction) in which the left-side terminals 17 of the main unit 2 are arranged next to each other.

In the attached state, since the terminals 42 of the left controller 3 and the left-side terminals 17 of the main unit 2 are in contact with each other, the frictional force between the terminals gives a force inhibiting the slide movement of the slider 311 in the removal direction thereof (i.e., the direction in which the slider 311 is removed from the left rail member 300, in other words, the direction opposite to the direction in which the slider 311 is inserted into the left rail member 300).

In the attached state, the leaf spring 305 provided on the left rail member 300 is in contact with the slider 311 (specifically, the upper-tier surface 311d of the slider 311), thereby pressing the left controller 3 in the direction away from the main unit 2 (i.e., the x-axis positive direction). Then, it is possible to reduce the looseness between the main unit 2 and the left controller 3, and it is possible to firmly connect the main unit 2 and the left controller 3 to each other. Moreover, the frictional force between the leaf spring 305 and the slider 311 gives a force inhibiting the slide movement of the slider 311 in the removal direction thereof.

As described above, in the second configuration example, the attached state of the left controller 3 to the main unit 2 can be maintained not only by the stop member 319 to be described later but also by the terminals 17 and 42 and the leaf spring 305.

(Operation Regarding Stop Member 319)

Next, referring to FIG. 27, the operation of the stop member 319 when attaching the left controller 3 to the main unit 2 will be described. FIG. 27 is a diagram schematically showing an example of the mechanism around the stop member 319 before and after the slider 311 is attached to the left rail member 300. Note that FIG. 27 only shows those elements to be discussed, and does not show those elements not to be discussed, for the purpose of making it easier to understand the description of the operation of the stop member 319.

Figure 27A:
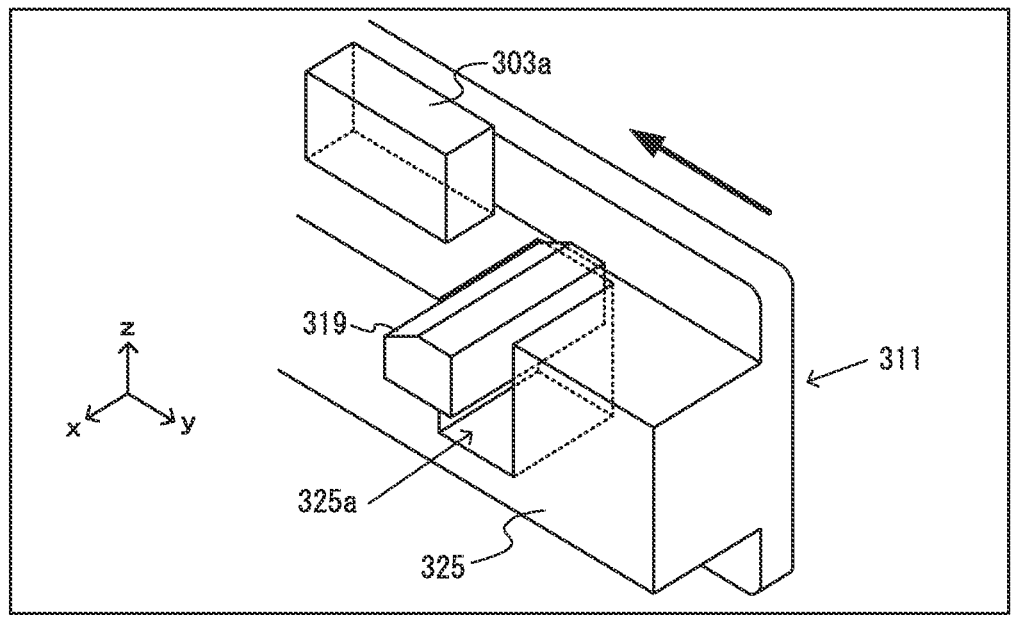
FIGS. 27(a), 27(b) and 27(c) are diagrams schematically showing an example of the mechanism around a stop member and a sequence before, during and after a slider is attached to a left rail member.

When the left controller 3 is attached to the main unit 2, the slider 311 of the left controller 3 is inserted into the groove of the left rail member 300 of the main unit 2 and moved toward the distal end of the left rail member 300 (i.e., downward). FIG. 27(a) shows a state before the stop member 319 provided in an upper end portion of the slider 311 reaches the upper end of the top surface portion 303a of the left rail member 300. As described above, the stop member 319 is biased into the protruding state, the stop member 319 is in the protruding state when the top surface portion 303a is not in contact with the stop member 319.

Figure 27B:
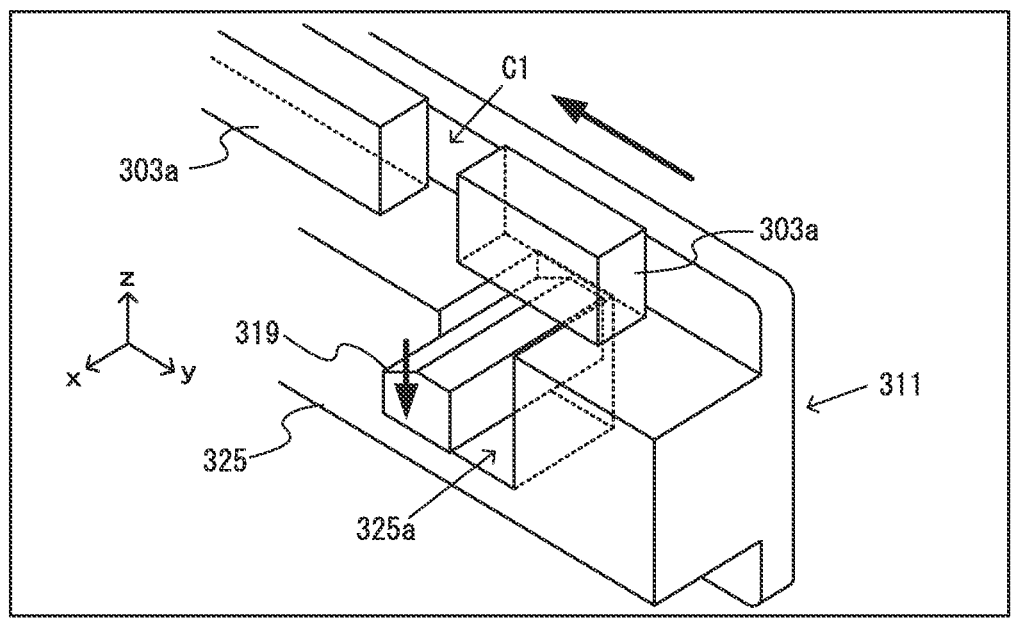

When the slider 311 moves toward the distal end of the left rail member 300, from the state shown in FIG. 27(a), the top surface portion 303a comes into contact with the stop member 319. FIG. 27(b) shows a state in which the top surface portion 303a is in contact with the stop member 319. In the state in which the top surface portion 303a is in contact with the stop member 319, the stop member 319 is pushed by the top surface portion 303a into the accommodated state, in which the stop member 319 is accommodated in the hole 325a provided in the shaft 325 of the slider 311. Note that the slope 319a is provided on the lower end side of the stop member 319 as described above. Therefore, the top surface portion 303a approaching the stop member 319 comes into contact with the slope 319a of the stop member 319. Thus, when the slider 311 is inserted into the left rail member 300, the stop member 319 can smoothly move into the accommodated state without being substantially interfered by the top surface portion 303a.

Figure 27C:
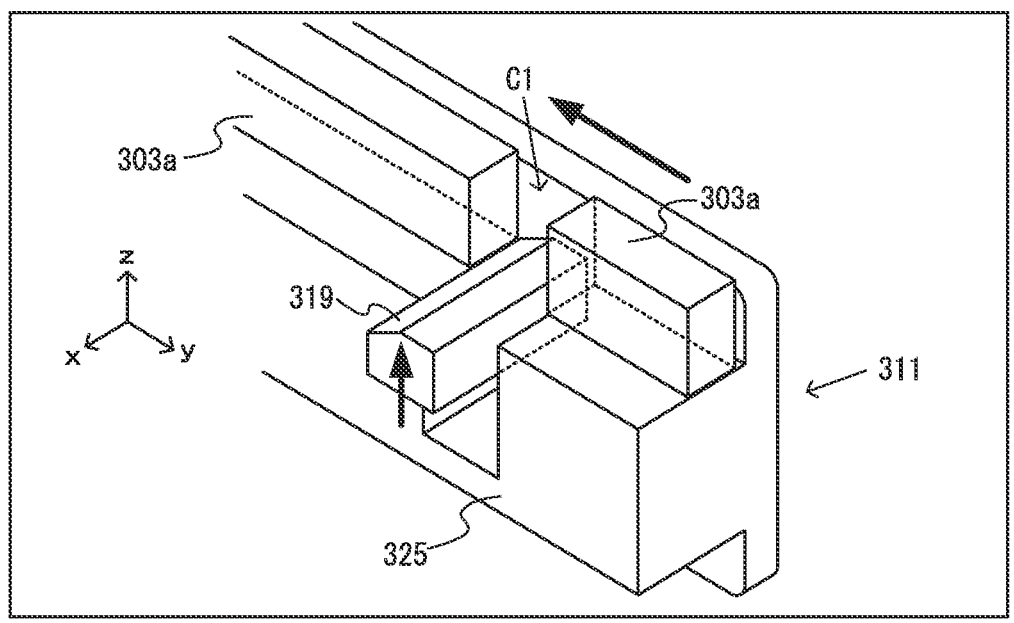

When the slider 311 moves toward the distal end of the left rail member 300 from the state (FIG. 27(b)) in which the stop member 319 is moved into the accommodated state or a nearly accommodated state by the top surface portion 303a, the attached state is achieved in which the left controller 3 is attached to the main unit 2. FIG. 27(c) shows the attached state. In the attached state, the stop member 319 is located corresponding to the cut-out portion C1 formed in the top surface portion 303a. Therefore, the stop member 319 moves back into the protruding state as shown in FIG. 27(c). Then, the end of the stop member 319 on the upper end side (i.e., the y-axis positive direction side) engages with (in other words, comes into contact with) the stop-receiving portion of the top surface portion 303a. That is, the stop member 319 generally prevents the slide movement of the slider 311 in the removal direction. Thus, with the stop member 319, it is possible to secure (in other words, lock) the controller 3 to the main unit 2.

Note that as described above, the stop member 319 may be provided so as to protrude at least from the side surface of the main section 310 and from the top surface portion 326. That is, in the protruding state, a portion of the stop member 319 may be in a hole provided in the side surface of the main section 310 and in a hole provided in the top surface portion 326. Then, there is no gap between the stop member 319 and the main section 310 or the top surface portion 326, and it is possible to reduce the possibility that the top surface portion 303a of the left rail member 300 passes through the gap. That is, it is possible to reduce the possibility that even though the stop member 319 is still in the protruding state, the top surface portion 303a passes through the gap, and the stop member 319 fails to engage with the top surface portion 303a, resulting in the slider 311 coming off of the left rail member 300.

When removing the left controller 3 from the main unit 2, a user presses the release button 313 described above. In response to the release button 313 being pressed, the stop member 319 moves into the accommodated state, thereby releasing the state in which the stop member 319 is resisting the slide movement of the slider 311 in the removal direction. Therefore, the user can relatively easily (as compared with a state in which the stop member 319 is resisting the slide movement) slide the left controller 3 in the removal direction so as to remove the left controller 3 from the main unit 2.

[1-3. Function of Terminals on Main Unit and Controllers]

Next, functions of the terminals (in other words, the content of signals and/or information to be exchanged using the terminals) of the main unit 2 and the controllers 3 and 4 will be described. Note that the arrangement of the terminals differs between the first configuration example and the second configuration example described above. Note however that the terminals can be assigned different functions as follows even if the configuration of the terminals is different from either of these two configuration examples.

In the present embodiment, the left-side terminals 17 on the left rail member 300 of the main unit 2, the right-side terminals 21 on the right rail member, the terminals 42 on the left controller 3, and the terminals 64 on the right controller 4 each include ten terminals. These ten terminals will be referred to as the first to tenth terminals. The first to tenth terminals are assigned the following functions.

Terminal for charging the controller

Terminal for transferring the data communication signal from the controller to the main unit 2

Terminal for transferring the data communication signal from the main unit 2 to the controller and for transferring the signal for the main unit 2 to detect the connection (in other words, attachment) of the controller Terminal for transferring the control signal from the controller to the main unit 2

Terminal for transferring the control signal from the main unit 2 to the controller Terminal for detecting the signal for the main unit 2 to detect the connection (in other words, attachment) of the controller Terminal for detecting the signal for the controller to identify the extension device (e.g., an extension grip to be described later)

Terminal for supplying power from the controller to the extension device

Ground terminal

Note that of the nine functions listed above, any terminal may be assigned any function. In the present embodiment, two of the first to tenth terminals are assigned the function as a ground terminal. In other embodiments, some of these functions may not be assigned to terminals, or some terminals may be assigned functions other than those listed above.

[1-4. Configuration of Cradle]

Figure 28:
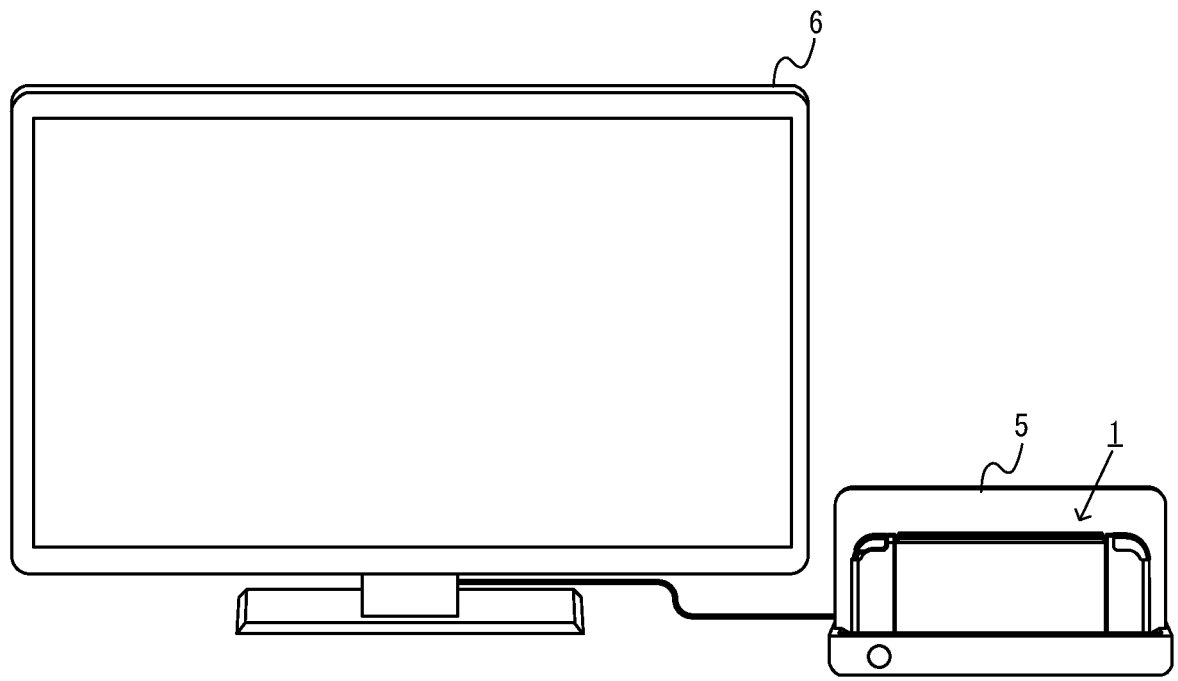
FIG. 28 is a diagram showing an overall configuration of a non-limiting example information processing system.

FIG. 28 is a diagram showing an overall configuration of an example information processing system according to the present embodiment. As described above, the information processing system includes the information processing device 1 and the cradle 5. As shown in FIG. 28, the information processing device 1 can be placed in the cradle 5. The cradle 5 can communicate (either via wired communication or wireless communication) with a TV 6, which is an example of an external display device separate from the display 12. When the information processing device 1 is placed in the cradle 5, the information processing system can display images obtained or produced by the information processing device 1 on the TV 6, the details of which will be described later. In the present embodiment, the cradle 5 has a function of charging the information processing device 1 placed therein and a function as a hub device (specifically, a USB hub), the details of which will be described later.

Figure 29:
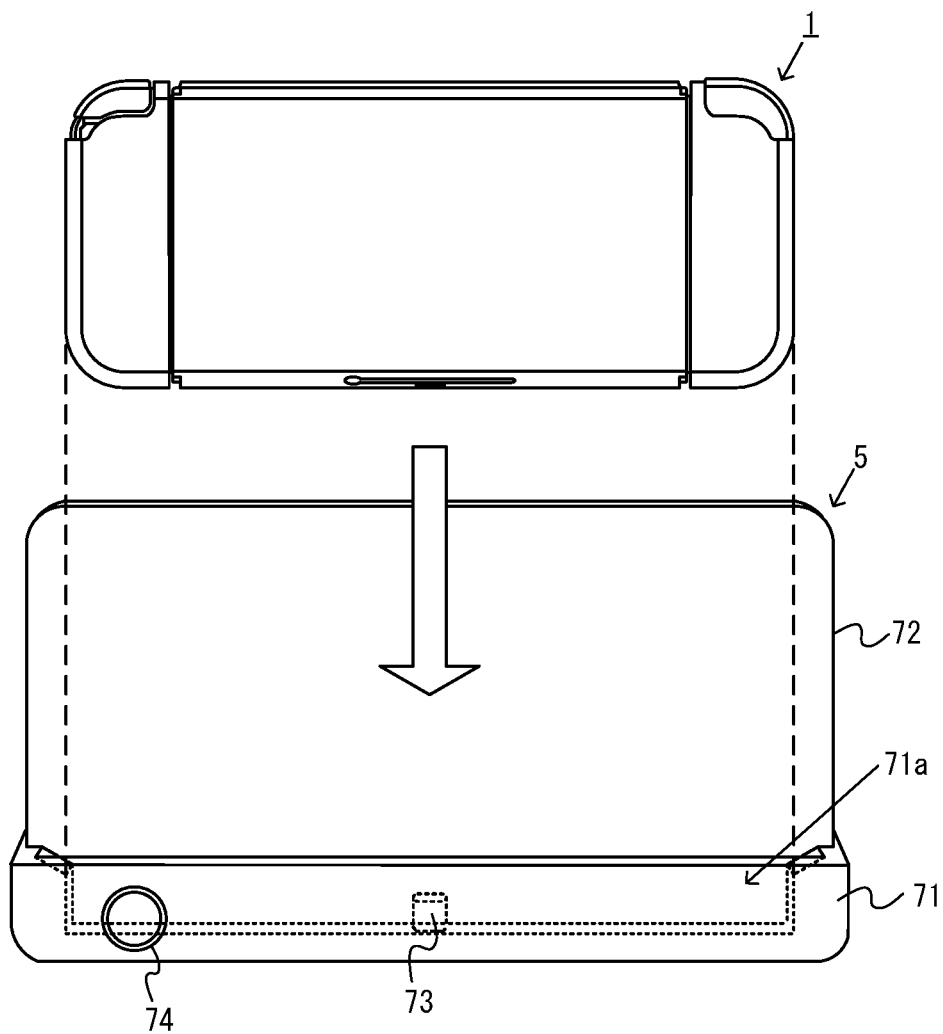
FIG. 29 is a diagram showing an external configuration of an example cradle.

FIG. 29 is a diagram showing an external configuration of an example of the cradle 5. The cradle 5 has a housing such that the information processing device 1 can be placed therein (or attached thereto, in other words). In the present embodiment, the housing includes a first support 71 provided with a groove 71a, and a generally-planar second support 72, as shown in FIG. 29.

As shown in FIG. 29, the groove 71a provided in the first support 71 is shaped in conformity with the shape of the lower portion of the information processing device 1. Specifically, the groove 71a is shaped so as to allow the lower portion of the information processing device 1 to be inserted into the groove 71a, and more specifically is shaped to generally match the shape of the lower portion of the information processing device 1. Thus, the information processing device 1 can be placed in the cradle 5 by inserting the lower portion of the information processing device 1 into the groove 71a. The second support 72 supports the surface (i.e., the surface on which the display 12 is provided) of the information processing device 1, of which the lower portion has been inserted into the groove 71a. With the second support 72, the cradle 5 can more stably support the information processing device 1. Note that the shape of the housing shown in FIG. 29 is merely an example, and the housing of the cradle 5 may have any other shape in other embodiments that allows the information processing device 1 to be placed in the cradle 5.

Note that in FIG. 29, the information processing device 1 is placed in the cradle 5 so that the primary surface of the main unit 2 (i.e., the surface of the display 12) faces the second support 72. Note however that in the present embodiment, the information processing device 1 may be placed in the cradle 5 so that the reverse surface of the main unit 2 faces the second support 72. That is, in the present embodiment, a user can place the information processing device 1 in the cradle 5 in the front-facing orientation (i.e., an orientation such that the display 12 can be seen), or place the information processing device 1 in the cradle 5 in the back-facing orientation (i.e., an orientation such that the display 12 is hidden).

As shown in FIG. 29, the cradle 5 also includes the main body terminal 73 for allowing the cradle 5 to communicate with the information processing device 1. As shown in FIG. 29, the main body terminal 73 is provided on the bottom surface of the groove 71a formed in the first support 71. More specifically, the main body terminal 73 is located so as to be in contact with the lower terminal 27 of the information processing device 1 when the information processing device 1 is attached to the cradle 5. In the present embodiment, the main body terminal 73 is a USB connector (more specifically, a male-side connector). Note that in the present embodiment, the information processing device 1 can be attached to the cradle 5 either in the front-facing orientation or in the back-facing orientation, as described above. Thus, the lower terminal 27 of the information processing device 1 and the main body terminal 73 of the cradle 5 are each symmetric with respect to the depth direction (i.e., the z-axis direction shown in FIG. 1), allowing them to communicate with each other whether they are connected in one orientation or the other with respect to the depth direction.

As shown in FIG. 29, the cradle 5 includes a sleep button 74. The sleep button 74 is button for switching between the ON mode and the sleep mode of the main unit 2 attached to the cradle 5. Note that in other embodiments, the sleep button 74 may have the function of turning ON/OFF the power of the main unit 2, in addition to (or instead of) the function of switching between the ON mode and the sleep mode of the main unit 2.

Note that in the present embodiment, the sleep button 74 is provided on the front surface of the first support 71. The sleep button 74 may be provided at any position such that the sleep button 74 can be pressed down with the information processing device 1 attached to the cradle 5. For example, the sleep button 74 may be provided on the side surface of the housing of the cradle 5 or on the back surface of the second support 72.

In the present embodiment, the sleep button 74 includes a light-emitting portion (specifically, LED). The light-emitting portion of the sleep button 74 is used to indicate, to the user, the status of the main unit 2 attached to the cradle 5. That is, the light-emitting portion varies how light is emitted (in other words, how it is lit) depending on the status of the main unit 2 attached to the cradle 5. For example, in the present embodiment, the light-emitting portion is lit when the main unit 2 attached to the cradle 5 is in the ON mode, and the light-emitting portion is turned OFF when the main unit 2 is in the sleep mode or in the power-off mode. Moreover, when the main unit 2 has information that should be indicated to the user (e.g., program update information, announcement, advertisement, etc.), the light-emitting portion blinks. Note that the light-emitting portion does not need to be provided on the sleep button 74, but it may be provided at any position on the housing of the cradle 5, for example.

Figure 32:
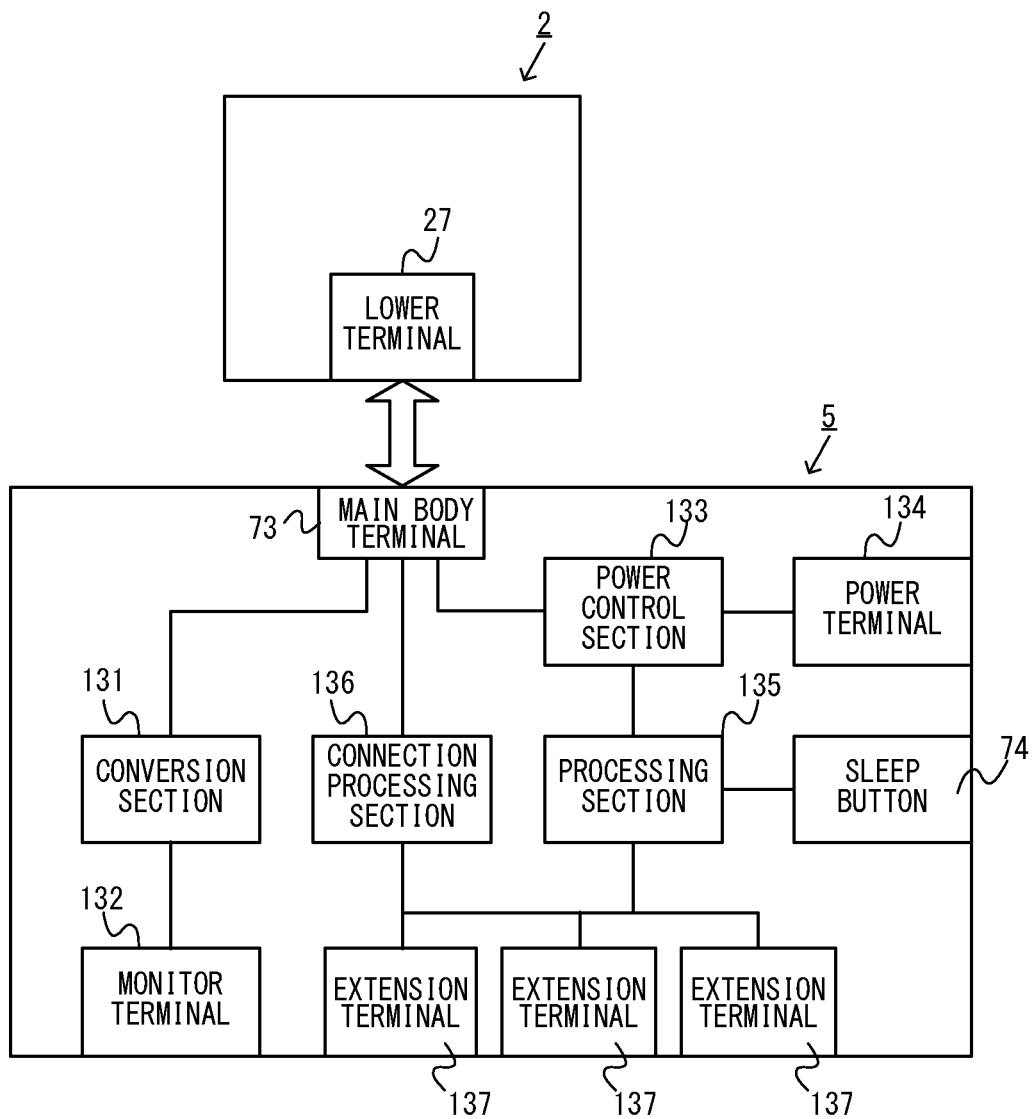
FIG. 32 is a block diagram showing an example internal configuration of the cradle.

Although not shown in FIG. 29, the cradle 5 includes a terminal (in the present embodiment, a plurality of terminals, specifically, a monitor terminal 132, a power terminal 134 and extension terminals 137 shown in FIG. 32) provided on the back surface of the housing. The details of these terminals will be described later.

There is no particular limitation on the shape, the number and the arrangement of the various elements provided on the cradle 5 (specifically, the housing, the terminals and the button) described above. For example, in other embodiments, the housing may have any other shape such that the information processing device 1 can be supported by the housing. Some of the terminals provided on the housing may be provided on the front surface of the housing. In other embodiments, some of the various elements described above may be absent from the cradle 5.

[2. Internal Configuration of Various Units]

[2-1. Internal Configuration of Main Unit 2]

Figure 30:
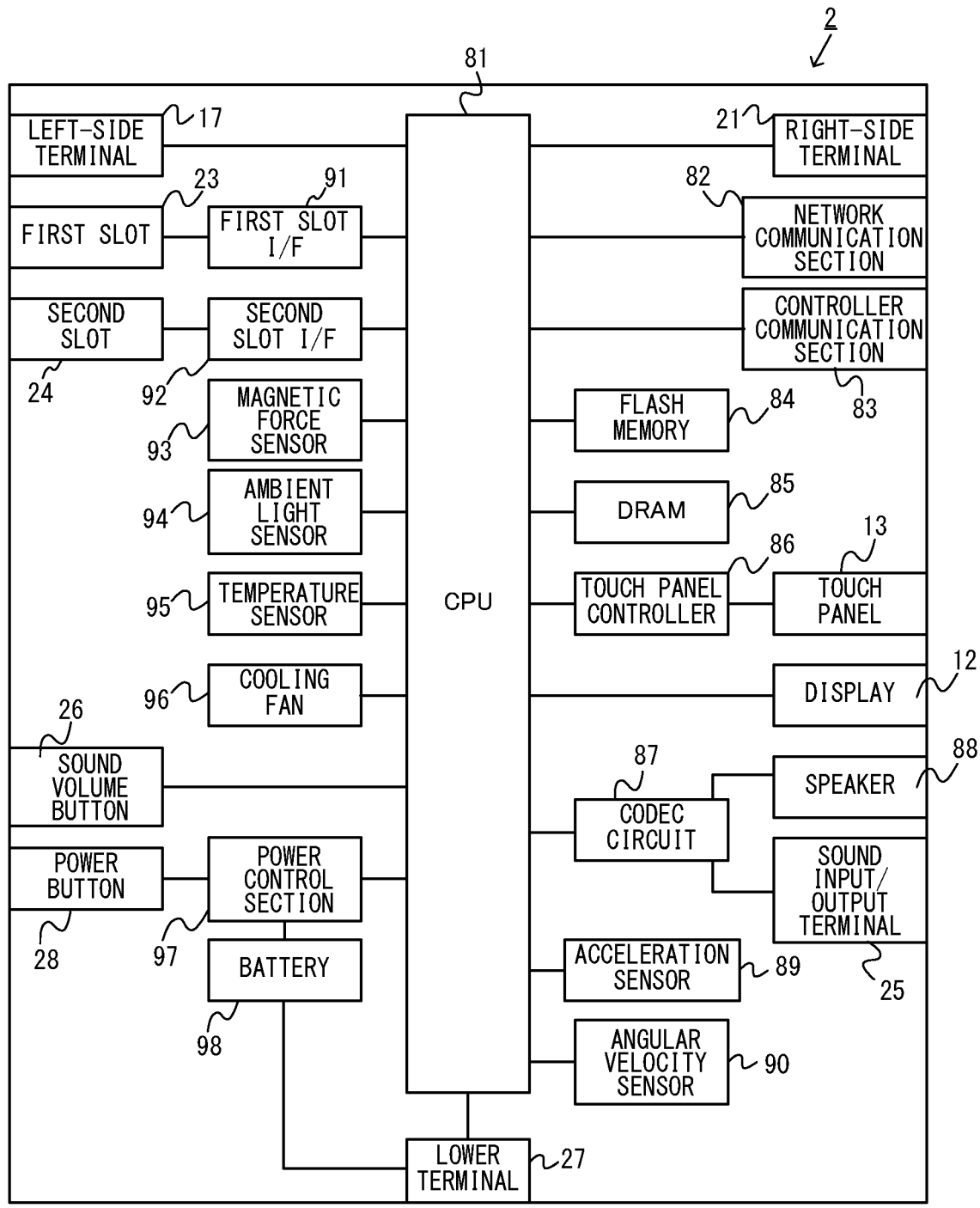
FIG. 30 is a block diagram showing an example internal configuration of the main unit.

FIG. 30 is a block diagram showing an example internal configuration of the main unit 2. In addition to the elements shown in FIG. 3, the main unit 2 also includes elements 81 to 98 shown in FIG. 30. Some of these elements 81 to 98 may be mounted, as electronic components, on an electronic circuit board and accommodated in the housing 11.

(Elements Regarding Execution of Information Process)

The main unit 2 includes a CPU (Central Processing Unit) 81. The CPU 81 is an information processing section for executing various information processes to be executed on the main unit 2. The CPU 81 executes various information processes by executing an information processing program stored in a storage section that can be accessed by the CPU 81 (specifically, an internal storage medium such as a flash memory 84 or external storage media attached to the slots 23 and 24, etc.).

The main unit 2 includes, as an example internal storage medium provided in the main unit 2, the flash memory 84 and a DRAM (Dynamic Random Access Memory) 85. The flash memory 84 and the DRAM 85 are connected to the CPU 81. The flash memory 84 is a memory used primarily for storing various data (which may be programs) saved on the main unit 2. The DRAM 85 is a memory used for temporarily storing various data and instructions used in information processes.

The main unit 2 includes a first slot interface (hereinafter abbreviated as "I/F") 91. The main unit 2 also includes a second slot I/F 92. The slot I/Fs 91 and 92 are connected to the CPU 81. The first slot IF 91 is connected to the first slot 23, and reads and writes data from and to a storage medium of the first type (e.g., an SD card) inserted in the first slot 23, in response to an instruction from the CPU 81. The second slot IF 92 is connected to the second slot 24, and reads and writes data from and to a storage medium of the second type (e.g., a dedicated memory card) inserted in the second slot 24, in response to an instruction from the CPU 81.

The CPU 81 executes the information processes described above by reading and writing data from and to the memories 84 and 85 and the storage media.

(Elements Regarding Communication)

The main unit 2 includes a network communication section 82. The network communication section 82 includes, for example, communication circuitry configured for network communication and is connected to the CPU 81. The network communication section 82 communicates (specifically, in wireless communication) with an external device via a network. In the present embodiment, the network communication section 82 is a Wi-Fi certified communication module, for example, and communicates with an external device via a wireless LAN. Note that in other embodiments, the main unit 2 may have the function of implementing communication by connecting to a mobile communication network (in other words, a mobile telephone communication network), in addition to (or instead of) the function of implementing communication by connecting to a wireless LAN.

The main unit 2 includes a controller communication section 83. The controller communication section 83 includes, for example, circuitry configured for communication with controllers 3 and 4 and is connected to the CPU 81. The controller communication section 83 communicates with the controllers 3 and/or 4 in wireless communication. While there is no particular limitation on the communication scheme between the main unit 2 and the controllers, the controller communication section 83 communicates with the controllers in accordance with the Bluetooth (registered trademark) standard in the present embodiment.

The CPU 81 is connected to the left-side terminal 17, the right-side terminal 21 and the lower terminal 27 described above. When communicating with the left controller 3 in wired communication, the CPU 81 transmits data to the left controller 3 via the left-side terminal 17. When communicating with the right controller 4 in wired communication, the CPU 81 transmits data to the right controller 4 via the right-side terminal 21. When communicating with the cradle 5, the CPU 81 transmits data to the cradle 5 via the lower terminal 27.

Thus, in the present embodiment, the main unit 2 is capable of communicating with the left and right controllers 3 and 4 either in wired communication or in wireless communication. Note that the process of switching between wired communication and wireless communication will be described later.

The main unit 2 can communicate with a plurality of left controllers simultaneously (in other words, in parallel). The main unit 2 can communicate with a plurality of right controllers simultaneously (in other words, in parallel). Therefore, users can make inputs to the information processing device 1 by using a plurality of left controllers and a plurality of right controllers.

(Elements Regarding Input/Output to/from Main Unit 2)

The main unit 2 includes a touch panel controller 86, which is a circuit for controlling the touch panel 13. The touch panel controller 86 is connected to the touch panel 13, and is connected to the CPU 81. Based on a signal from the touch panel 13, for example, the touch panel controller 86 generates data representing the position at which the touch input has been performed, and outputs the data to the CPU 81.

The display 12 described above is connected to the CPU 81. The CPU 81 displays images generated and/or images obtained from outside on the display 12 (e.g., by executing the information processes described above).

The main unit 2 includes a codec circuit 87 and a speaker (specifically, a left speaker and a right speaker) 88. The codec circuit 87 is connected to the speaker 88 and the sound input/output terminal 25, and is also connected to the CPU 81. The codec circuit 87 is a circuit for controlling the input/output of sound data to/from the speaker 88 and the sound input/output terminal 25. That is, when sound data is received from the CPU 81, the codec circuit 87 outputs, to the speaker 88 or the sound input/output terminal 25, a sound signal obtained by performing a D/A conversion on the sound data. Thus, sound is output from the speaker 88 or a sound output section (e.g., an earphone) connected to the sound input/output terminal 25. When a sound signal is received from the sound input/output terminal 25, the codec circuit 87 performs an A/D conversion on the sound signal and outputs sound data of a predetermined format to the CPU 81.

The sound volume button 26 described above (specifically, the sound volume buttons 26a and 26b shown in FIG. 3) is connected to the CPU 81. The CPU 81 controls the sound volume of the output from the speaker 88 or the sound output section based on an input to the sound volume button 26.

The main unit 2 includes an inertial sensor such as an acceleration sensor 89. In the present embodiment, the acceleration sensor 89 detects the magnitude of the linear acceleration along directions of three predetermined axes (e.g., the xyz axes shown in FIG. 1). Note that the acceleration sensor 89 may detect acceleration in one axis direction or two axis directions.

The main unit 2 includes an angular velocity sensor 90. In the present embodiment, the angular velocity sensor 90 detects the angular velocity about three predetermined axes (e.g., the xyz axes shown in FIG. 1). Note that the angular velocity sensor 90 may detect the angular velocity about one axis or two axes.

The acceleration sensor 89 and the angular velocity sensor 90 are connected to the CPU 81, and the detection results of the acceleration sensor 89 and the angular velocity sensor 90 are output to the CPU 81. Based on the detection results of the acceleration sensor 89 and the angular velocity sensor 90, the CPU 81 can calculate information regarding movement and/or attitude (e.g., orientation in three dimensions) of the main unit 2.

(Elements Regarding Power)

The main unit 2 includes a power control section 97 and a battery 98. The power control section 97 includes, for example, circuitry configured for power control and is connected to the battery 98 and the CPU 81. Although not shown in the figure, the power control section 97 is connected to various sections of the main unit 2 (specifically, various sections receiving power supply from the battery 98, the left-side terminal 17 and the right-side terminal 21). The power control section 97 controls the power supply from the battery 98 to the various sections based on an instruction from the CPU 81. The power control section 97 is connected to the power button 28. The power control section 97 controls the power supply to the various sections based on an input on the power button 28. That is, when the power-OFF operation is performed on the power button 28, the power control section 97 stops the power supply to some or all of the various sections, and when the power-ON operation is performed on the power button 28, the power control section 97 starts the power supply to some or all of the various sections. When an instruction to switch to the sleep mode is given to the power button 28, the power control section 97 stops the power supply to some elements, including the display 12, and when an instruction to switch to the ON mode is given to the power button 28, the power control section 97 starts the power supply to the elements. The power control section 97 also outputs, to the CPU 81, information representing the input on the power button 28 (specifically, information indicating whether or not the power button 28 is being pressed).

The battery 98 is connected to the lower terminal 27. When an external charging device (e.g., the cradle 5) is connected to the lower terminal 27, and power is supplied to the main unit 2 via the lower terminal 27, the battery 98 is charged with the power supplied thereto. Note that in the present embodiment, the charging capacity of the battery 98 of the main unit 2 is larger than the charging capacity of the battery of the controllers 3 and 4 to be described later.

(Other Elements)

The main unit 2 includes a magnetic force sensor (referred to also as a magnetic sensor) 93 for detecting the intensity and/or the direction of a magnetic field. The magnetic force sensor 93 is connected to the CPU 81, and the detection results of the magnetic force sensor 93 are output to the CPU 81. In the present embodiment, the magnetic force sensor 93 is used to detect whether a protection cover (not shown) is attached to the information processing device 1 is open or closed. For example, the protection cover is provided with a magnet, and the CPU 81 detects when the primary surface of the main unit 2 is covered by the protection cover based on the detection results of the magnetic force sensor 93. Note that when such a state is detected, the CPU 81 turns OFF the display of the display 12, for example.

The main unit 2 includes the ambient light sensor 94 for detecting the intensity of the ambient light around the main unit 2. The ambient light sensor 94 is connected to the CPU 81, and the detection results of the ambient light sensor 94 are output to the CPU 81. In the present embodiment, the ambient light sensor 94 is used to adjust the brightness of the display 12. That is, the CPU 81 controls the brightness of the display 12 based on the detection results of the ambient light sensor 94.

The main unit 2 includes a cooling fan 96 for radiating heat from inside the main unit 2. With the cooling fan 96 in operation, the air outside the housing 11 is introduced into the housing 11 through the air inlet hole 11d and the air inside the housing 11 is discharged through the air outlet hole 11c, thereby discharging heat from inside the housing 11. The cooling fan 96 is connected to the CPU 81, and the operation of the cooling fan 96 is controlled by the CPU 81. The main unit 2 includes a temperature sensor 95 for detecting the temperature inside the main unit 2. The temperature sensor 95 is connected to the CPU 81, and the detection results of the temperature sensor 95 are output to the CPU 81. The CPU 81 controls the operation of the cooling fan 96 based on the detection results of the temperature sensor 95.

[2-2. Internal Configuration of Left Controller 3]

Figure 31:
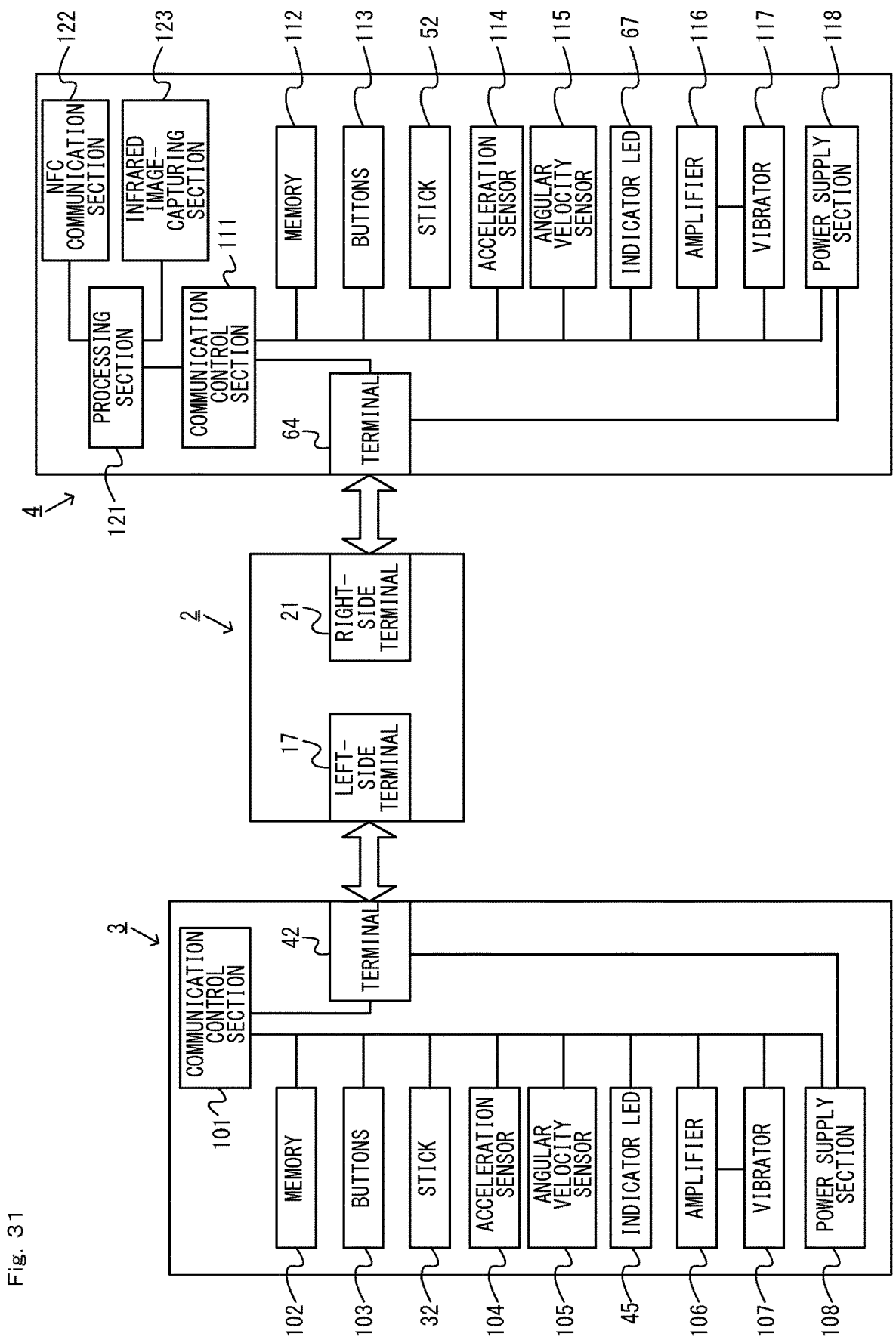
FIG. 31 is a block diagram showing an example internal configuration of the information processing device.

FIG. 31 a block diagram showing an example internal configuration of the information processing device 1. Note that the details of the internal configuration of the information processing device 1 that are related to the main unit 2 are shown in FIG. 30, and are therefore not shown in FIG. 31.

(Elements Regarding Communication)

The left controller 3 includes a communication control section 101 for communicating with the main unit 2. As shown in FIG. 31, the communication control section 101 is connected to various elements including the terminal 42 described above. In the present embodiment, the communication control section 101 is capable of communicating with the main unit 2 both in wired communication via the terminal 42 and in wireless communication without using the terminal 42. The communication control section 101 controls the communication method used by the left controller 3 for communicating with the main unit 2. That is, when the left controller 3 is attached to the main unit 2, the communication control section 101 communicates with the main unit 2 via the terminal 42. When the left controller 3 is detached from the main unit 2, the communication control section 101 communicates with the main unit 2 (specifically, with the controller communication section 83) in wireless communication. The wireless communication between the controller communication section 83 and the communication control section 101 is in accordance with the Bluetooth (registered trademark) standard.

The left controller 3 includes a memory 102 such as a flash memory, for example. The communication control section 101 is a microcomputer (referred to also as a microprocessor), for example, and executes various processes by executing firmware stored in the memory 102.

(Elements Regarding Input)

The left controller 3 includes the buttons 103 (specifically, the buttons 33 to 39, 43 and 44). The left controller 3 includes the analog stick (labeled "stick" in FIG. 31) 32 described above. The buttons 103 and the analog stick 32 repeatedly output, with appropriate timing, information regarding operations performed thereon to the communication control section 101.

The left controller 3 includes an acceleration sensor 104. In the present embodiment, the acceleration sensor 104 detects the magnitude of the linear acceleration along directions of three predetermined axes (e.g., the xyz axes shown in FIG. 1). Note that the acceleration sensor 104 may detect acceleration in one axis direction or two axis directions.

The left controller 3 includes an angular velocity sensor 105. In the present embodiment, the angular velocity sensor 105 detects the angular velocity about three predetermined axes (e.g., the xyz axes shown in FIG. 1). Note that the angular velocity sensor 105 may detect the angular velocity about one axis or two axes.

The acceleration sensor 104 and the angular velocity sensor 105 are connected to the communication control section 101. The detection results of the acceleration sensor 104 and the angular velocity sensor 105 are repeatedly output, with appropriate timing, to the communication control section 101.

The communication control section 101 obtains input-related information (specifically, information regarding operations or detection results of sensors) from the input sections (specifically, the buttons 103, the analog stick 32 and the sensors 104 and 105). The communication control section 101 transmits operation data including the obtained information (or information obtained by performing a predetermined process on the obtained information) to the main unit 2. Note that operation data is transmitted repeatedly once per a predetermined period of time. Note that the interval at which the input-related information is transmitted to the main unit 2 may or may not be the same among different input sections.

As the operation data is transmitted to the main unit 2, the main unit 2 can know the input that has been performed on the left controller 3. That is, the main unit 2 can determine operations performed on the buttons 103 and the analog stick 32 based on the operation data. The main unit 2 can calculate information regarding movement and/or attitude of the left controller 3 based on the operation data (specifically, the detection results of the sensors 104 and 105).

(Elements Regarding Output)

The indicator LED 45 described above is connected to the communication control section 101. In the present embodiment, the indicator LED 45 is controlled by an instruction from the main unit 2. That is, when the instruction is received from the main unit 2, the communication control section 101 outputs, to the indicator LED 45, a control signal for controlling the lighting of the indicator LED 45 in accordance with the instruction.

Note that the communication control section 101 may determine whether or not to cause the indicator LED 45 to emit light based on whether the left controller 3 is attached to the main unit 2. That is, the indicator LED 45 may be controlled not to emit light when the left controller 3 is attached to the main unit 2 and controlled to emit light on the condition that the left controller 3 is not attached to the main unit 2. This is because, for example, when the left controller 3 is attached to the main unit 2, there is little need to emit light since the indicator LED 45 cannot be seen.

The left controller 3 includes a vibrator 107 for indications to the user through vibration. In the present embodiment, the vibrator 107 is controlled by an instruction from the main unit 2. That is, when the instruction is received from the main unit 2, the communication control section 101 drives the vibrator 107 in accordance with the instruction. The left controller 3 includes an amplifier 106. When the instruction is received, the communication control section 101 outputs a control signal in accordance with the instruction to the amplifier 106. The amplifier 106 amplifies the control signal from the communication control section 101 and generates a driving signal for driving the vibrator 107 to give the driving signal to the vibrator 107. This actuates the vibrator 107.

(Elements Regarding Power)

The left controller 3 includes a power supply section 108. In the present embodiment, the power supply section 108 includes a battery and a power control circuit. Although not shown in the figure, the power control circuit is connected to the battery and is connected to the various sections of the left controller 3 (specifically, various sections receiving power supply from the battery). The power control circuit controls the power supply from the battery to the various sections.

The battery is also connected to the terminal 42. In the present embodiment, when the left controller 3 is attached to the main unit 2, the battery is charged with the power supply from the main unit 2 via the terminal 42 under a predetermined condition, the details of which will be described later.

[2-3. Internal Configuration of Right Controller 4]

(Elements Regarding Communication)

As shown in FIG. 31, the right controller 4 includes a communication control section 111 for communicating with the main unit 2. The right controller 4 includes a memory 112 connected to the communication control section 111. The communication control section 111 is connected to various elements including the terminal 64 described above. The communication control section 111 and the memory 112 have similar functions to the communication control section 101 and the memory 102 of the left controller 3. Therefore, the communication control section 111 is capable of communicating with the main unit 2 both in wired communication via the terminal 64 and in wireless communication without using the terminal 64 (specifically, communication in accordance with the Bluetooth (registered trademark) standard), and controls the communication method by which the right controller 4 communicates with the main unit 2.

(Elements Regarding Input)

The right controller 4 includes similar input sections (specifically, the buttons 113, the analog stick 52, an acceleration sensor 114 and an angular velocity sensor 115) to those of the left controller 3. These input sections have similar functions and operate in a similar fashion to the input sections of the left controller 3.

(Elements Regarding Output)

The indicator LED 67 of the right controller 4 operates in a similar fashion to the indicator LED 45 of the left controller 3. That is, when the instruction from the main unit 2 is received, the communication control section 111 outputs, to the indicator LED 67, a control signal for controlling the lighting of the indicator LED 67 in accordance with the instruction.

The right controller 4 includes a vibrator 117 and an amplifier 116. The vibrator 117 and the amplifier 116 operate in a similar fashion to the vibrator 107 and the amplifier 106 of the left controller 3. That is, the communication control section 111 actuates the vibrator 117 using the amplifier 116 in accordance with an instruction from the main unit 2. As discussed above, various implementations for vibrator 117 are possible.

(Elements Regarding Power)

The right controller 4 includes a power supply section 118. The power supply section 118 has a similar function and operates in a similar fashion to the power supply section 108 of the left controller 3. That is, the power supply section 118 controls the power supply to the various sections receiving power supply from the battery. When the right controller 4 is attached to the main unit 2, the battery is charged with the power supply from the main unit 2 via the terminal 64 under a predetermined condition.

(Other Elements)

The right controller 4 includes an NFC communication section 122. The NFC communication section 122 implements near-field wireless communication in accordance with a conventional NFC (Near Field Communication) standard. The NFC communication section 122 has the function of a so-called NFC reader/writer. For example, the NFC communication section 122 includes an antenna used for the near-field wireless communication, and a circuit (e.g., an NFC chip) for generating a signal (radio wave) to be transmitted from the antenna. Note that the near-field wireless communication is not limited to those based on the NFC standard, but may also be any proximity communication (referred to also as non-contact communication). The proximity communication for example includes communication schemes in which one device generates an electromotive force on the other device by radio waves therefrom (e.g., through electromagnetic induction).

The right controller 4 includes the infrared image-capturing section 123. The infrared image-capturing section 123 includes an infrared camera for capturing an image in a region around the right controller 4. In the present embodiment, the infrared image-capturing section 123 is used to capture an image of a hand of a user. The information processing device 1 identifies an input made with the hand (e.g., a gesture input, etc.) based on information (e.g., the position, the size, the shape, etc.) of the hand of which the image has been captured. The infrared image-capturing section 123 can rely on ambient infrared illumination, or in one example includes an illuminating section for outputting infrared light. The illuminating section outputs infrared light in synchronism with the timing at which the infrared camera captures an image, for example. The infrared light output from the illuminating section is reflected by an object (e.g., a hand of a user), and the reflected infrared light is received by the infrared camera, thus obtaining an image of the infrared light. Thus, it is possible to obtain a clearer infrared light image. Note that while the infrared image-capturing section 123 including an infrared camera is used in the present embodiment, a visible light camera (a camera using a visible light image sensor) or other image sensor may be used, instead of an infrared camera, as an image-capturing device, in other embodiments.

The right controller 4 includes a processing section 121. The processing section 121 is connected to the communication control section 111 and also connected to the NFC communication section 122. The processing section 121 includes, for example, processing circuitry and executes a management process for the NFC communication section 122 in response to an instruction from the main unit 2. For example, the processing section 121 controls the action of the NFC communication section 122 in response to an instruction from the main unit 2. The processing section 121 also controls the activation of the NFC communication section 122, and controls the action (specifically, reading and writing, etc.) of the NFC communication section 122 on a communication partner (e.g., an NFC tag). The processing section 121 also receives information to be transmitted to the communication partner from the main unit 2 via the communication control section 111 to pass this information to the NFC communication section 122, and obtains from the NFC communication section 122 information received from the communication partner to transmit this information to the main unit 2 via the communication control section 111.

The processing section 121 executes a management process for the infrared image-capturing section 123 in response to an instruction from the main unit 2. For example, the processing section 121 causes the infrared image-capturing section 123 to perform an image-capturing operation, and obtains information based on the image-capturing result (information of the captured image or information calculated from such information, etc.) to transmit this information to the main unit 2 via the communication control section 111.

[2-4. Internal Configuration of Cradle 5]

FIG. 32 is a block diagram showing an example internal configuration of the cradle 5. Note that the details of the internal configuration regarding the main unit 2 are shown in FIG. 30 and are therefore not shown in FIG. 32.

(Elements Regarding Image Conversion)

As shown in FIG. 32, the cradle 5 includes a conversion section 131 and the monitor terminal 132. The conversion section 131 includes, for example, circuitry configured for performing video and sound conversion and is connected to the main body terminal 73 and the monitor terminal 132. The conversion section 131 converts a signal format regarding images (referred to also as video) and sound received from the main unit 2 into a format to be output to the TV 6. In the present embodiment, the main unit 2 outputs image and sound signals to the cradle 5 as a display port signal (i.e., a signal in accordance with the DisplayPort standard). In the present embodiment, communication based on the HDMI (registered trademark) standard is used for communication between the cradle 5 and the TV 6. That is, the monitor terminal 132 is an HDMI terminal, and the cradle 5 and the TV 6 are connected together by an HDMI cable. Thus, the conversion section 131 converts the display port signal (specifically, a signal representing video and sound) received from the main unit 2 via the main body terminal 73 into an HDMI signal. The converted HDMI signal is output to the TV 6 via the monitor terminal 132.

The cradle 5 includes a processing section 135 for executing various information processes on the cradle 5. The processing section 135 includes, for example, processing circuitry and is connected to the sleep button 74 described above, and is connected to the main body terminal 73 via a connection processing section 136 (the details of which will be described later). The processing section 135 detects an operation performed on the sleep button 74, and notifies the main unit 2 of the operation. When receiving such a notification, the main unit 2 switches between the ON mode and the sleep mode thereof. Thus, in the present embodiment, when the main unit 2 is attached to the cradle 5, the ON mode and the sleep mode of the information processing device 1 are switched from one to another in response to the sleep button 74 being pressed down.

(Elements Regarding Charging)

The cradle 5 includes a power control section 133 and the power terminal 134. The power terminal 134 is a terminal for connecting a charging device (not shown) (e.g., an AC adaptor, etc.). In the present embodiment, it is assumed that an AC adaptor is connected to the power terminal 134, and the cradle 5 is receiving commercial power supply.

When the main unit 2 is attached to the cradle 5, the power control section 133 supplies power from the power terminal 134 to the main unit 2 via the main body terminal 73. Thus, the battery 98 of the main unit 2 is charged as described above.

Note that in the present embodiment, the power terminal 134 is a connector (i.e., a female-side USB terminal) of the same shape as the lower terminal 27 of the information processing device 1. Therefore, in the present embodiment, the charging device may be connected to the cradle 5 to charge the information processing device 1 via the cradle 5, or the charging device may be connected directly to the main unit 2 to charge the information processing device 1.

(Other Elements)

The cradle 5 includes the connection processing section 136 and the extension terminals 137. The extension terminals 137 are terminals for connecting other devices. In the present embodiment, the cradle 5 includes a plurality (more specifically, three) of USB terminals as the extension terminals 137. The connection processing section 136 includes, for example, processing circuitry and is connected to the main body terminal 73 and the extension terminals 137. The connection processing section 136 has a function of a USB hub, and manages the communication between devices connected to the extension terminals 137 and the main unit 2 connected to the main body terminal 73, for example, (i.e., a signal from one device is appropriately distributed among other devices). As described above, in the present embodiment, the information processing device 1 is capable of communicating with other devices via the cradle 5. Note that the connection processing section 136 may be capable of converting the communication speed or supply power to devices connected to the extension terminals 137.

[3. Outline of Operation of Information Processing System]

As described above, in the present embodiment, the left and right controllers 3 and 4 can be attached to and detached from the information processing device 1. By being attached to the cradle 5, the information processing device 1 is capable of outputting images (and sound) to the TV 6. Therefore, the information processing device 1 can be used in various modes of use as will be described below. The operation of the information processing system in primary modes of use will now be described.

[3-1. Mode in which Controller is Used Attached to Main Unit]

FIG. 33 is a diagram showing an example of how the information processing device 1 is used with the controllers 3 and 4 attached to the main unit 2 (referred to as the "attached state"). As shown in FIG. 33, when the controllers 3 and 4 are attached to the main unit 2, the information processing device 1 can be used as a portable device (e.g., a portable game device).

In the attached state, the main unit 2 and the controllers 3 and 4 communicate with each other in wired communication (i.e., communication between devices connected together via terminals). That is, the main unit 2 receives operation data from the controllers 3 and 4 attached thereto, and executes an information process based on the received operation data (specifically, by using operation data as an input).

Note that in other embodiments, the main unit 2 and the controllers may communicate with each other in wireless communication in the attached state. In the attached state, wireless communication may not work properly because the main unit 2 and the controllers are too close to each other. In contrast, in the present embodiment, the main unit 2 and the controllers communicate with each other in wired communication in the attached state, thereby improving the reliability of communication.

Note that in the attached state, the four operation buttons 33 to 36 of the left controller 3 may be used to give a directional input (in other words, a directional instruction). Then, a user can make a directional input by using the analog stick 32 or can make a directional input by using the operation buttons 33 to 36. A user is allowed to make a directional input by using a preferred operation mechanism, thereby improving the controllability. Note however that the instruction each operation button is assigned can be freely determined by the program executed on the main unit 2.

In the present embodiment, the arrangement of the analog stick and the four operation buttons (i.e., A, B, X and Y buttons) is reversed between the left controller 3 and the right controller 4. That is, in the attached state, the analog stick 32 is arranged above the four operation buttons 33 to 36 on the left controller 3, whereas the four operation buttons 53 to 56 are arranged above the analog stick 52 on the right controller 4. Therefore, as shown in FIG. 33, when the information processing device 1 is held with the left hand and the right hand at the same height (in other words, at the same position with respect to the up-down direction), it will be easier for one hand to operate the analog stick and for the other hand to operate the four operation buttons. That is, in the present embodiment, it is possible to provide an information processing device, with which it is easy to operate an analog stick and four operation buttons.

Note that controllers of different configurations (e.g., configurations having different functions, configurations where operation sections are arranged differently, etc.) from the present embodiment may be provided as the left controller and/or the right controller (see "[5-1. Other types of controllers]), the details of which will be described later. Then, it is possible to provide an information processing device that can be operated in a different fashion from the present embodiment (i.e., the information processing device 1 shown in FIG. 33) by attaching the left controller and/or the right controller having a different configuration to the main unit 2, instead of the left controller 3 and/or the right controller 4 of the present embodiment.

[3-2. Mode in which a Pair of Controllers are Used Detached]

As described above, in the present embodiment, the information processing device 1 can be used with the left and right controllers 3 and 4 detached from the main unit 2 (referred to as the "detached state). Possible modes in which the information processing device 1 is used in the detached state include at least two modes, one in which a single user uses two controllers 3 and 4, and another in which two users each use one controller.

(Mode in which Single User Uses Two Controllers)

Figure 34:
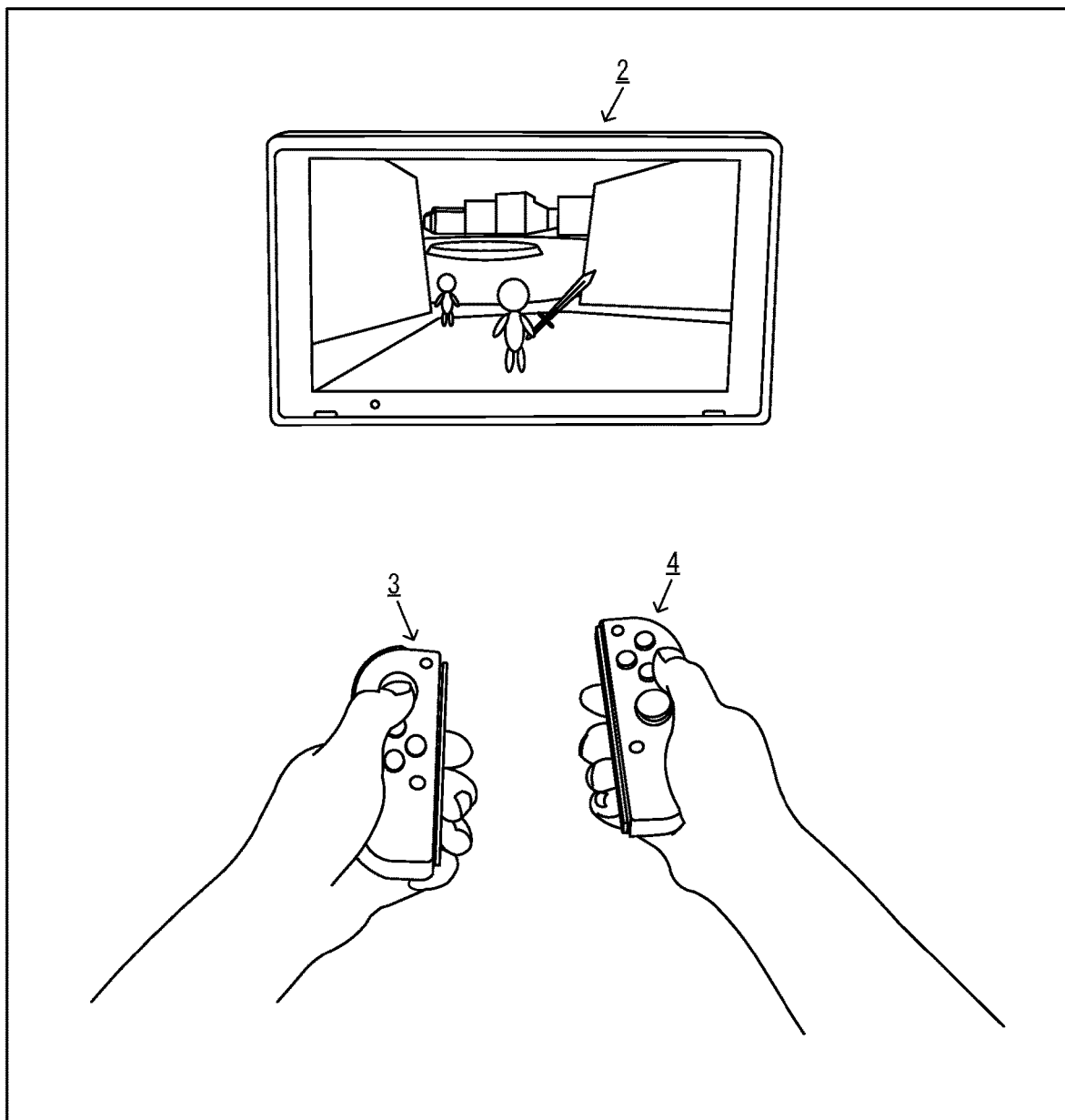
FIG. 34 is a diagram showing an example of a single user holding two controllers to use the information processing device in a detached state.

FIG. 34 is a diagram showing an example of a single user holding two controllers 3 and 4 to use the information processing device 1 in the detached state. As shown in FIG. 34, in the detached state, a user can operate one set of two controllers 3 and 4 by holding them respectively in the left hand and the right hand.

Note that in the present embodiment, it is possible to calculate information regarding the movement and/or the attitude of a controller based on the detection results of the acceleration sensor and/or the angular velocity sensor provided in the controller. Therefore, the information processing device 1 can accept, as an input, the operation of moving the controller. A user is allowed to not only perform an operation on the operation sections (the operation buttons and the analog stick) of the controller but also perform an operation of moving the controller. That is, in the present embodiment, the information processing device 1, being a portable device, can allow a user to perform an operation of moving the controller (without moving the display). Also, the information processing device 1, being a portable device, can allow a user to perform an operation away from the display 12.

Note that the information processing device 1 can calculate information regarding movement and/or attitude of the information processing device 1 based on the detection results of the acceleration sensor 89 and/or the angular velocity sensor 90 provided in the main unit 2 not only in the detached state but also in the attached state.

In the detached state, the main unit 2 and the controllers 3 and 4 communicate with each other using wireless communication. That is, the main unit 2 receives operation data from the controllers 3 and 4 with which a wireless connection has been established (i.e., which have been paired with the main unit 2), and executes an information process based on the received operation data (specifically, using the operation data as an input).

In the present embodiment, for wireless communication, the main unit 2 distinguishes between multiple controllers which it is in communication with. For example, the main unit 2 identifies whether the received operation data is from the left controller 3 or from the right controller 4. The method for distinguishing between controllers will be described later.

(Mode in which Two Users Each Use One Controller)

Figure 35:
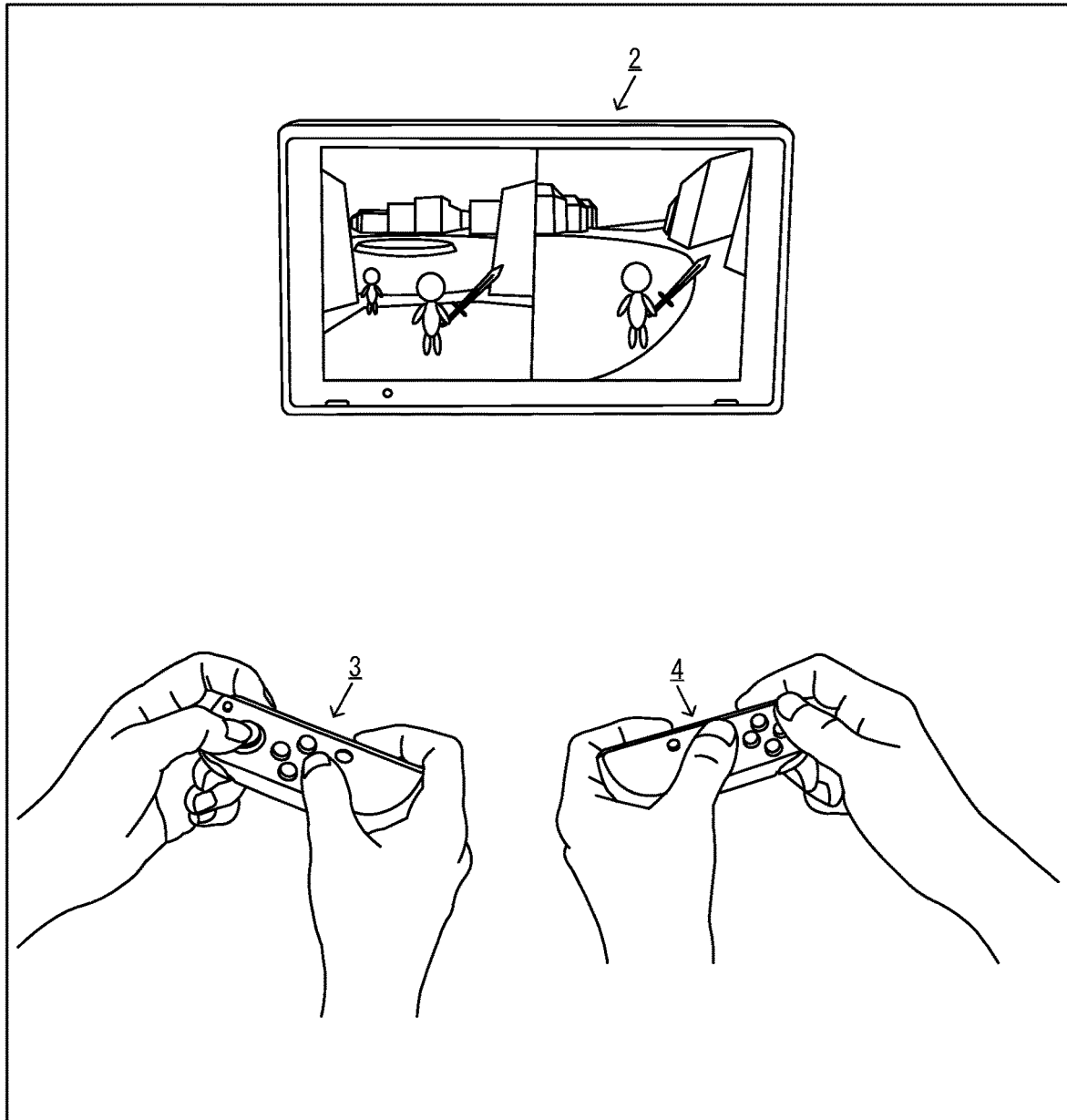
FIG. 35 is a diagram showing an example of two users each holding one controller to use the information processing device in a detached state.

FIG. 35 is a diagram showing an example of two users each holding one controller to use the information processing device 1 in the detached state. As shown in FIG. 35, in the detached state, two users can each perform operations by providing inputs via the controller they are holding in their respective hands. Specifically, one user (referred to as the "first user") can perform an operation by using and operating the left controller 3 while the other user (referred to as the "second user") can perform an operation by using and operating the right controller 4. For example, the information processing device 1 executes an information process of controlling the action of a first object (e.g., the player character) in a virtual space based on an operation performed on the left controller 3, and controlling the action of a second object in the virtual space based on an operation performed on the right controller 4. Note that as in the mode shown in FIG. 34, also in the mode shown in FIG. 35, a user can operate the operation sections provided on the controller and/or perform an operation of moving the controller itself.

In the present embodiment, the positional relationship between the analog stick 52 and the operation buttons 53 to 56 on the right controller 4 is opposite from the positional relationship between these two types of operation sections on the left controller 3. Therefore, if two users hold the left controller 3 and the right controller 4 in the same orientation, as shown in FIG. 35, for example, the positional relationship between the two types of operation sections on one of the two controllers will be the same as that on the other controller. That is, in the present embodiment, users can use the left controller 3 and the right controller 4 detached from the main unit 2 in the same fashion with respect to the two types of operation sections. Thus, it is possible to improve the controllability of the controller.

In the detached state, the four operation buttons 33 to 36 of the left controller 3 may be used for the same function as the four operation buttons 53 to 56 of the right controller 4 (in other words, they may be used for giving the same instructions). Specifically, the right direction button 33 may be used for the same function as the Y button 56, the lower direction button 34 for the same function as the X button 55, the upper direction button 35 for the same function as the B button 54, and the left direction button 36 for the same function as the A button 53. Thus, in the present embodiment, the function of the operation buttons 33 to 36 may vary between the attached state and the detached state. Note however that the instruction each operation button is assigned can be freely determined by the program executed on the main unit 2.

Note that in FIG. 35, the information processing device 1 divides the display area of the display 12 into two display areas to display an image for the first user (e.g., an image including the first object) in one of the display areas and an image for the second user (e.g., an image including the second object) in the other display area. Note however that depending on the application running on the information processing device 1, the information processing device 1 may display an image for two users (e.g., an image including both the first object and the second object) without dividing the display area of the display 12.

As in the mode shown in FIG. 34, also in the mode shown in FIG. 35, the main unit 2 and the controllers 3 and 4 communicate with each other in wireless communication. Then, the main unit 2 distinguishes between controllers each being a communication partner.

(Other Modes)

In the present embodiment, the right controller 4 includes the infrared image-capturing section 123. Therefore, with the right controller 4 detached from the main unit 2, the information processing device 1 may execute an information process based on the image-capturing results (referred to also as detection results) from the infrared image-capturing section 123. Examples of the information process include the following processes.

For example, when an attachment including an operation section (hereinafter referred to as an "extension controller") is attached to the right controller 4, the main unit 2 can detect an operation performed on the operation section based on the image-capturing results from the infrared image-capturing section 123. Therefore, the main unit 2 can execute an information process in accordance with an operation performed on the operation section by using the image-capturing results.

Specifically, the extension controller can be attached to and detached from the right controller 4, and include buttons and a movable operation section such as a stick, for example. The extension controller includes, inside the housing, a movable portion that moves (herein, the movement includes rotation) in response to an operation performed on an operation section. For example, the movable portion is a member configured to move in response to a button, which is an operation section, being pressed down. Here, the extension controller is attached to the right controller 4 so that the infrared image-capturing section 123 can capture an image of the movable portion inside the housing. For example, the housing of the extension controller is provided with a window portion, and the infrared image-capturing section 123 can capture an image of the movable portion via the window portion, with the extension controller attached to the right controller 4. Then, the main unit 2 can identify an operation performed on an operation section of the extension controller based on the position and/or the attitude of the movable portion in the image captured by the infrared image-capturing section 123. Thus, by using captured images, the main unit 2 may execute an information process in response to an operation performed on the operation section.

The main unit 2 may detect a gesture input by using a hand of a user based on the image-capturing results from the infrared image-capturing section 123 so as to execute an information process in accordance with the gesture input. For example, a user holds the right controller 4 in one hand, and an image is captured of the other hand of the user using the infrared camera of the infrared image-capturing section 123. Note that in the present embodiment, the infrared camera is arranged so as to capture an image of an area under the right controller 4. Therefore, a user makes a gesture input by placing the other hand under the right controller 4. The main unit 2 obtains information based on the image-capturing results from the right controller 4 so as to identify a gesture input made by a user. Then, the main unit 2 executes an information process based on the gesture input.

A gesture input may be any input made by using an operation object to be operated (moved) by a user. An operation object may be a body of a user (which may be a part of the body, such as a hand or the face, or may be the whole body), may be an object held by a user, or may include both. The information processing device 1 may recognize the shape of the operation object as a gesture input, may recognize the position, the orientation and/or the movement of the operation object as a gesture input, or may recognize a combination thereof as a gesture input. For example, a user can make a gesture input by using the shape of a hand, the movement of a hand, the position of a hand (with respect to the right controller 4), the orientation (attitude) of a hand, etc.

In addition to (or instead of) identifying a gesture input, the infrared image-capturing section 123 may be used to calculate the position and/or the orientation of the right controller 4 with respect to a predetermined marker. For example, a user may place a marker at an intended position (e.g., around the display 12 or around the TV 6), and perform an operation of moving the right controller 4 within such a range that the infrared camera can capture an image of the marker. Note that the marker may be made of a material that reflects infrared light, for example. Then, the information processing device 1 can calculate the position and/or the orientation of the right controller 4 with respect to the marker based on the image-capturing results from the infrared image-capturing section 123. Moreover, the information processing device 1 can execute an information process by using the calculated information as a user's operation input.

The main unit 2 can also capture an image of a hand of a user (specifically, the vein pattern of the hand) by means of the infrared image-capturing section 123, to thereby authenticate (specifically, by vein authentication) a user based on the captured image. Moreover, the main unit 2 can also measure the pulse of a user by capturing an image of a hand of the user by means of the infrared image-capturing section 123. That is, where infrared light output onto and reflected by a hand of a user is detected by the infrared image-capturing section 123, the main unit 2 can calculate the pulse of the user based on changes in the reflected waves.

Note that the above description has been directed to an example where the infrared image-capturing section 123 is used when the right controller 4 is detached from the main unit 2. Now, the information processing device 1 can also execute an information process based on the image-capturing results from the infrared image-capturing section 123 with the right controller 4 attached to the main unit 2.

In the present embodiment, the main unit 2 is provided with input sections (specifically, the touch panel 13, the acceleration sensor 89, the angular velocity sensor 90, etc.). Therefore, a user can use only the main unit 2 with the controllers 3 and 4 detached therefrom. Then, a user can use the information processing device 1 while the weight thereof is reduced.

In the present embodiment, the information processing device 1 may be used with one of the left controller 3 and the right controller 4 detached from the main unit 2 and with the other controller attached to the main unit 2. Then, the main unit 2 may communicate with the first controller in wireless communication and communicate with the second controller in wired communication.

Note that when controllers are removed from the main unit 2, a user can hold one controller with both hands (see for example FIG. 35), or a user can hold one controller in one hand (see for example FIG. 34). While a user can hold a controller in one hand in any manner, a user can hold a controller in such a manner that the operation sections provided on the primary surface (in other words, on the front surface, i.e., the surface on the front side) of the controller can be operated using the thumb, as shown in FIG. 34, for example. For example, as shown in FIG. 33, controllers can be held in such a manner that operation sections provided on the primary surface of the controllers are operated using the thumb while operation sections provided on the side surface of the controllers (e.g., the first L button 38, the ZL button 39, the first R button 60 and the ZR button 61) are operated using the index finger and/or the middle finger. Note that while FIG. 33 shows controllers attached to the main unit 2, it is understood that the controllers can be held in the same manner as FIG. 33 even when the controllers are removed from the main unit 2.

Figure 36:
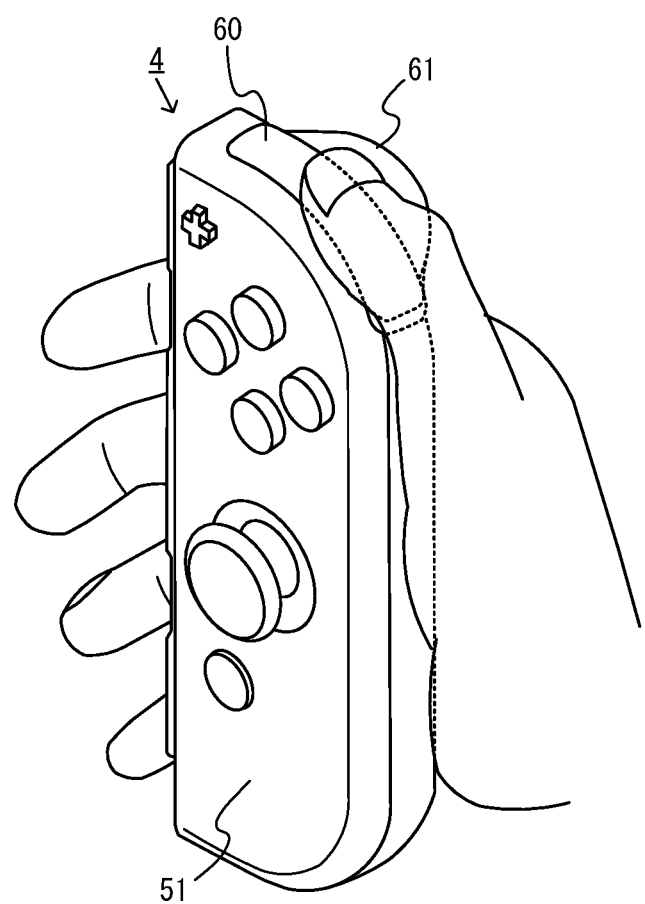
FIG. 36 is a diagram showing an example of how a non-limiting right controller is held in one hand.

Moreover, when a user holds a controller in one hand, the controller can be held in such a manner that operation sections provided on the side surface of the controller are operated using the thumb. FIG. 36 is a diagram showing an example of how the right controller 4 is held in one hand. As shown in FIG. 36, a user can hold the right controller 4 by holding the housing 51 in the palm in such a manner that the first R button 60 and the ZR button 61 can be operated using the thumb. That is, it can be said that the first R button 60 and the ZR button 61 are provided at such positions that they can be operated using the thumb when the housing 51 is held in the palm of the user. In such a manner, a user can use the controller as if it were the control stick of an airplane, for example.

In the present embodiment, the first R button 60 and the ZR button 61 are arranged at different positions from each other with respect to the front-rear direction (in other words, the direction perpendicular to the primary surface, i.e., the z-axis direction). In other words, the first R button 60 and the ZR button 61 are shifted from each other in the front-rear direction. This allows a user to operate these two buttons while easily distinguishing them from each other.

Moreover, in the present embodiment, the first R button 60 is provided on the side surface of the right controller 4, and the ZR button 61 is provided in an area extending over the side surface and the reverse surface of the right controller 4. The length of the ZR button 61 in the front-rear direction is greater than that of the first R button 60. Thus, in the present embodiment, the ZR button 61, which is arranged at a position slightly shifted from the side surface of the right controller 4, is so shaped that a user can easily press the ZR button 61 when the right controller 4 is held as shown in FIG. 36.

While FIG. 36 shows an example in which the right controller 4 is held, this similarly applies also to the left controller 3, and the left controller 3 can be held in such a manner that the operation sections provided on the side surface of the left controller 3 (i.e., the first L button 38 and the ZL button 39) are operated using the thumb.

When a user holds the controller in one hand as shown in FIG. 36, the user can operate another controller using the other hand. Then, the controller can be held in the other hand in the same manner as shown in FIG. 36 or in another manner.

Note that with the manner of holding shown in FIG. 36, the operation sections (e.g., the second L button 65 and the second R button 66), which are provided on a side surface different from the side surface where the operation sections operated using the thumb are provided, can be operated using fingers other than the thumb (e.g., the index finger, the middle finger and the ring finger). With the manner of holding shown in FIG. 36, a user can also perform an operation of moving the controller and/or an operation using a gesture input. With these operations, combined with operations using the thumb, somewhat complicated operations can be performed with the manner of holding shown in FIG. 36.

[3-3. Mode in which Three or More Controllers are Used]

As described above, in the present embodiment, the main unit 2 can communicate with a plurality of left controllers. The main unit 2 can also communicate with a plurality of right controllers. Therefore, in the present embodiment, three or more controllers can be used simultaneously.

Figure 37A:
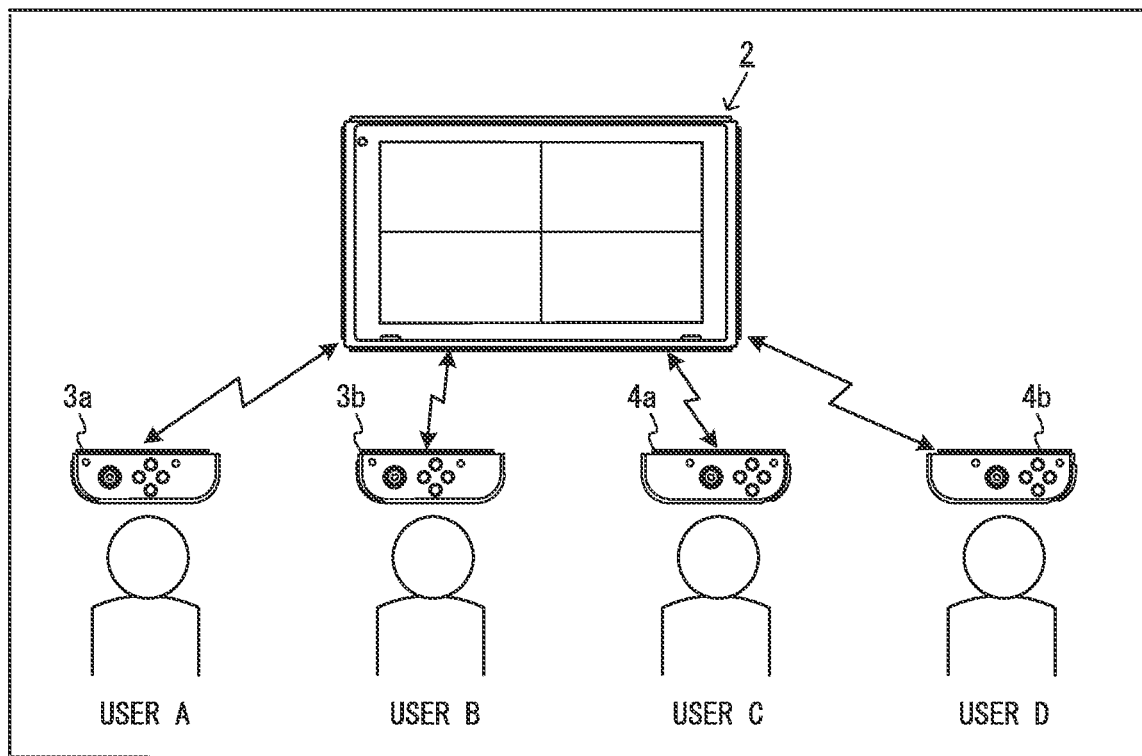
FIGS. 37(a) and 37(b) are diagrams showing example modes of use where three or more controllers are used.
Figure 37B:
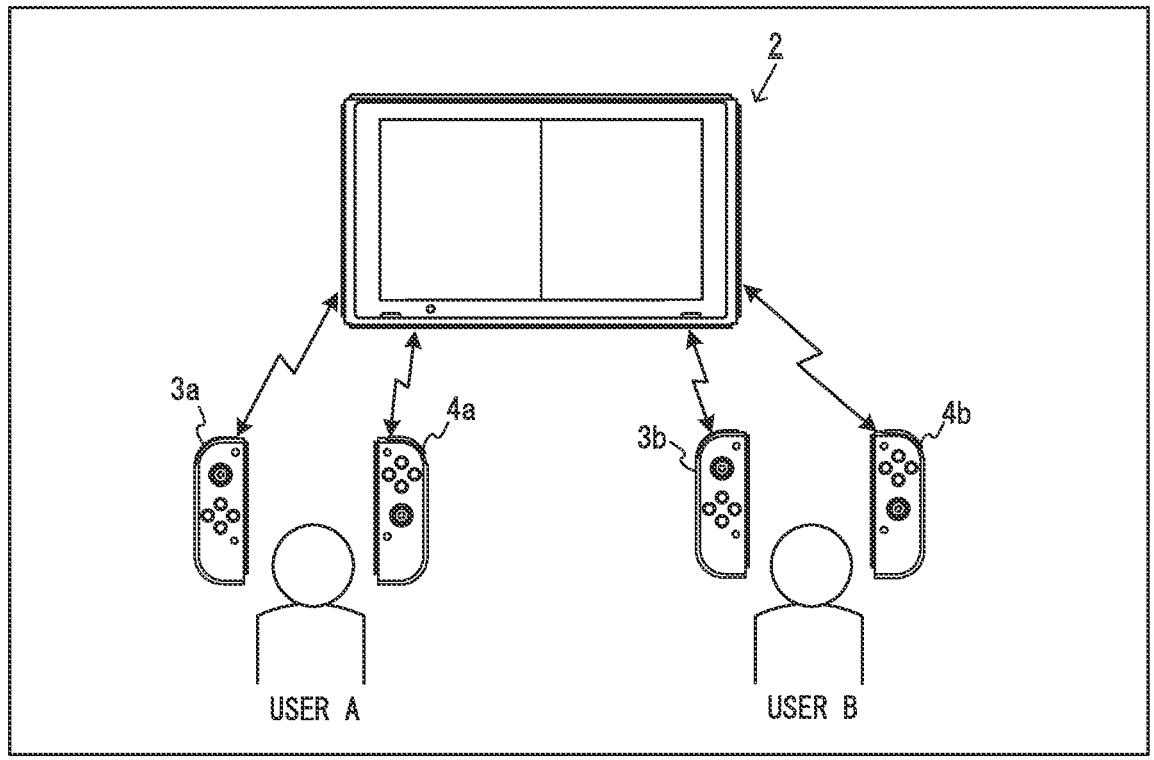

FIGS. 37(a) and 37(b) are diagrams showing example modes of use where three or more controllers are used. FIGS. 37(a) and 37(b) show cases in which a total of four controllers, i.e., two left controllers 3a and 3b and two right controllers 4a and 4b, are used. Note that it is assumed here that the controllers are detached from the main unit 2. When four controllers are used, one can possibly conceive at least a mode in which four users each use one controller (FIG. 37(a)), and a mode in which two users each use two controllers (specifically, a pair of left and right controllers) (FIG. 37(b)).

(Mode in which Each User Uses One Controller)

In FIG. 37(a), each user uses one of the four controllers 3a, 3b, 4a and 4b. That is, in the present embodiment, where four controllers are provided, four users, User A to User D, are allowed to perform operations each using a respective controller. For example, based on an operation performed on a controller, the information processing device 1 executes an information process of controlling the action of an object associated with that controller. Note that also in the modes of use shown in FIGS. 37(a) and 37(b), as in the modes of use shown in FIG. 34 and FIG. 35, each user is enabled to perform an operation on an operation section provided on the controller and/or to perform an operation of moving the controller itself.

In FIG. 37(a), the main unit 2 communicates, in wireless communication, with each of the four controllers 3a, 3b, 4a and 4b. In the present embodiment, the main unit 2 distinguishes the four controllers 3a, 3b, 4a and 4b from one another. That is, the main unit 2 identifies from which of the four controllers the operation data has been received. Note that in the case of FIG. 37(a), the main unit 2 distinguishes between the left controller 3a and the left controller 3b, and distinguishes between the right controller 4a and the right controller 4b. Note that the method for distinguishing each controller will be described later.

(Mode in which Each User Uses a Pair of Controllers)

In FIG. 37(b), each user uses a pair of controllers out of the four controllers 3a, 3b, 4a and 4b. That is, User A uses a pair of the left controller 3a and the right controller 4a, and User B uses a pair of the left controller 3b and the right controller 4b. Thus, in the present embodiment, where four controllers are provided, two users can each operate a pair of controllers (which can also be referred to as a set of controllers).

The information processing device 1 executes an information process using, as a set of data, two pieces of operation data received from a pair of controllers. For example, based on operations performed on a pair of controllers, the information processing device 1 executes an information process of controlling the action of an object associated with the pair of controllers. Specifically, the action of the first object is controlled based on operations performed on the left controller 3a and the right controller 4a, and the action of the second object is controlled based on operations performed on the left controller 3b and the right controller 4b.

Now, in the present embodiment, in the mode of use shown in FIG. 37(b), the main unit 2 registers each pair of a left controller and a right controller used by a single user. The main unit 2 executes an information process by using operation data from the two controllers included in the registered pair as a set of data (e.g., as operation data for controlling one control object).

While there is no particular limitation on the method for registering a pair of controllers, a left controller and a right controller can be attached to the main unit 2 so as to register the controllers as a pair, in the present embodiment. That is, the main unit 2 registers, as a pair of controllers, a left controller and a right controller that are attached thereto at the same time. For example, when registering pairs of controllers shown in FIG. 37(b), a user first attaches the left controller 3a and the right controller 4a to the main unit 2 and detaches these two controllers, i.e., the left controller 3a and the right controller 4a from the main unit 2, after which the other controllers, i.e., the left controller 3b and the right controller 4b, are attached to the main unit 2. Then, a pair of the left controller 3a and the right controller 4a and a pair of the left controller 3b and the right controller 4b can be registered with the main unit 2. Note that the details of the pairing process will be described later.

Note that where three or more controllers are used, the information processing system can be used in various other modes, other than the modes of use shown in FIGS. 37(a) and 37(b). For example, the information processing system can be used in a mode in which a user uses a pair of left and right controllers while another user uses one controller. For example, a user can use a controller or controllers attached to the main unit 2 while another user uses a controller or controllers detached from the main unit 2.

[3-4. Mode in which Image is Displayed on TV]

Figure 38:
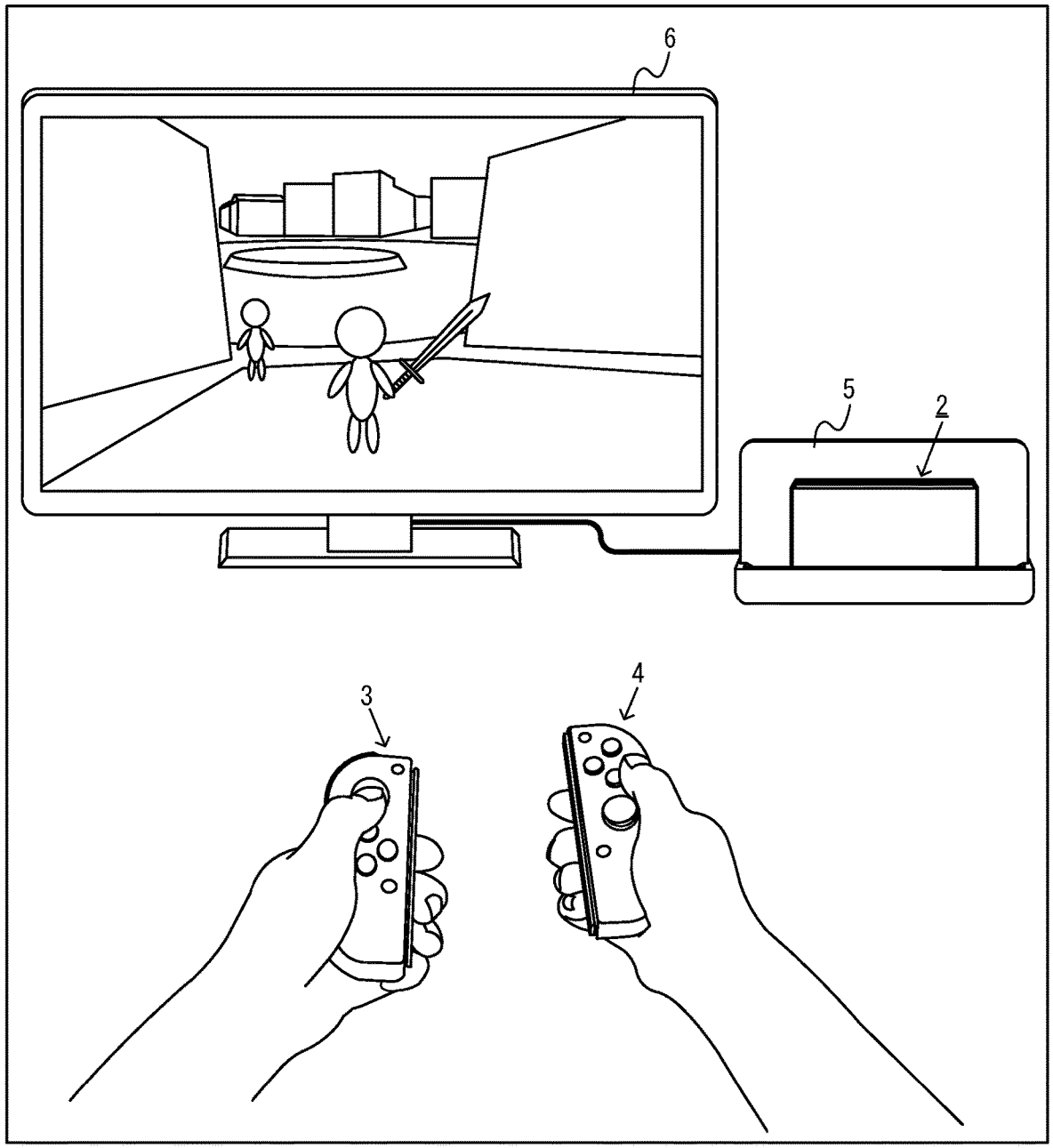
FIG. 38 is a diagram showing an example mode of use in which images are displayed on a TV.
Figure 39A:
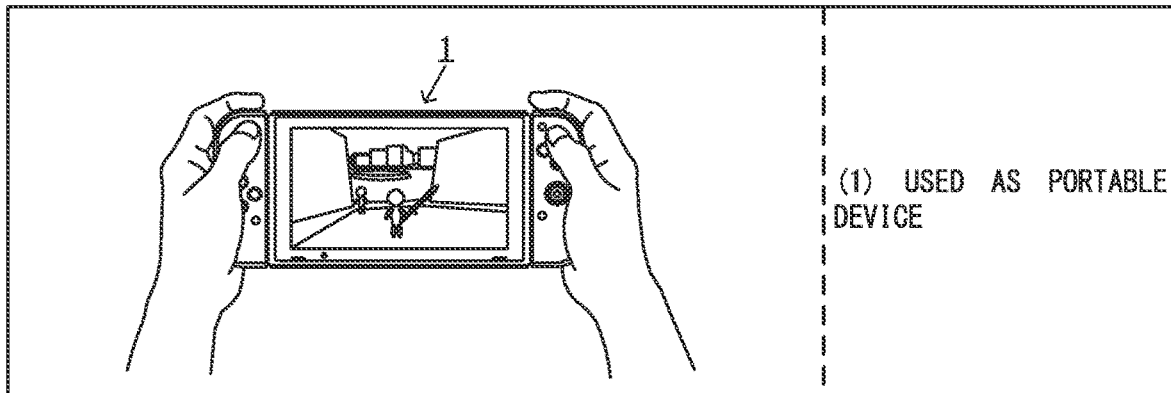
FIGS. 39(a), 39(b), 39(c), and 39(d) are diagrams showing an example sequence of operation flow in which images are displayed on a TV.
Figure 39B:
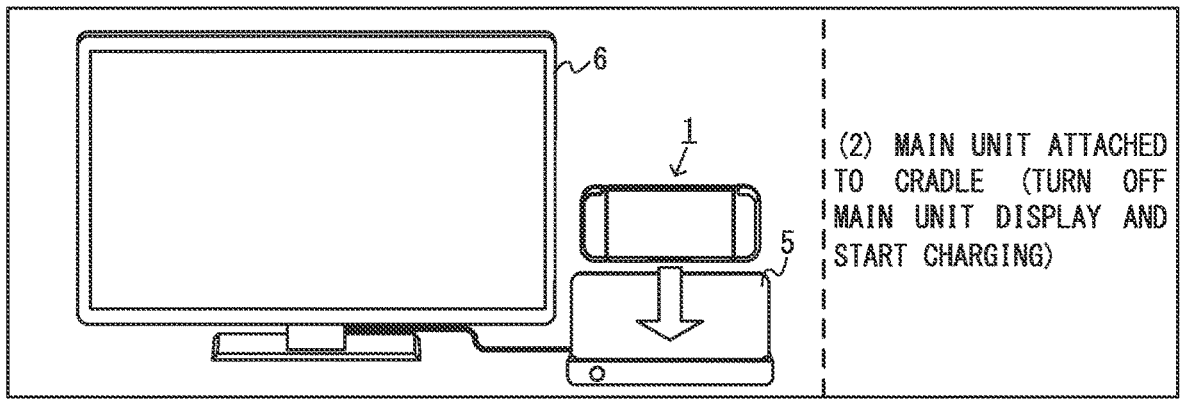
Figure 39C:
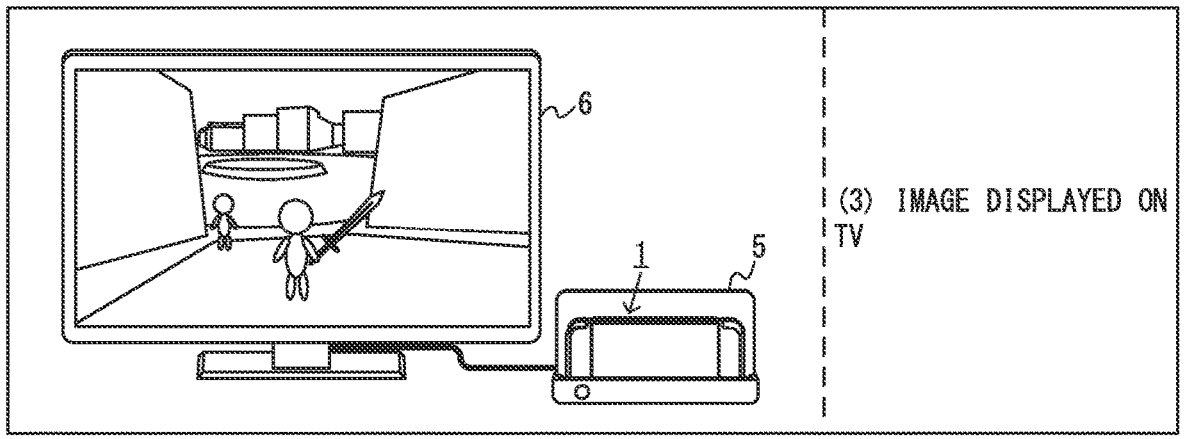
Figure 39D:
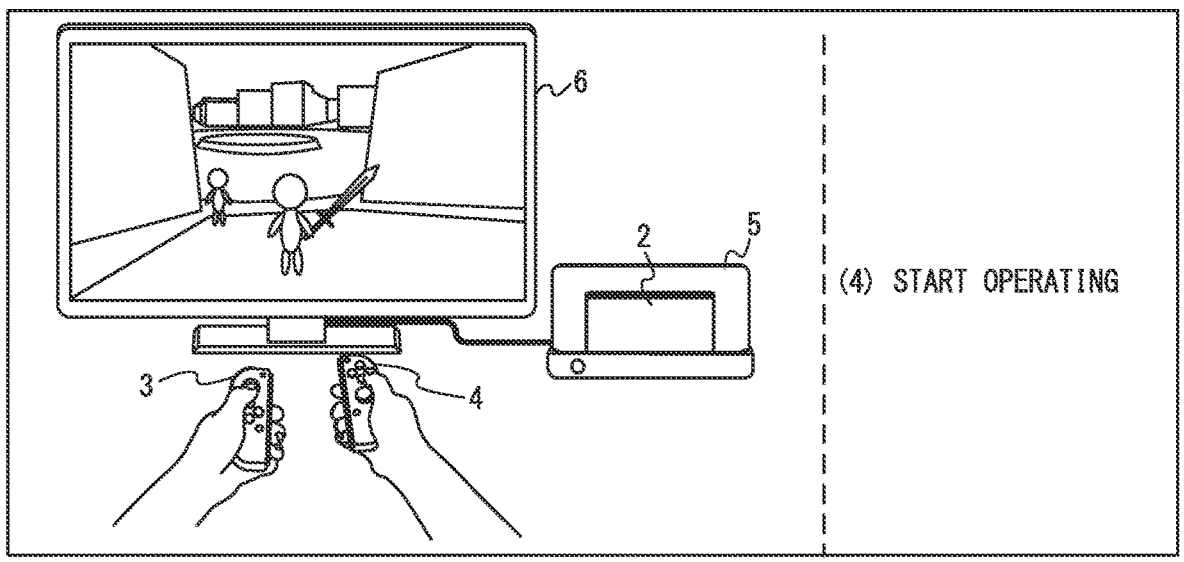

As described above, in the present embodiment, when the information processing device 1 is attached to the cradle 5, the information processing device 1 can output images (and sound) to the TV 6 via the cradle 5. FIG. 38 is a diagram showing an example mode of use in which images are displayed on a TV. As shown in FIG. 38, the information processing system in the present embodiment can use the TV 6 as a display device (and a sound output device).

[3-4-1. Operation when Image is Displayed on TV]

FIGS. 39(a)-39(d) are diagrams showing an example operation flow in which images are displayed on a TV. The operation of switching from a mode in which the information processing device 1 is used as a portable device to a mode in which it is used as a console device (i.e., using the TV 6 as a display device) will be described. Note that it is assumed here that the cradle 5 is connected to the TV 6 in advance. It is also assumed that a charging device (not shown) (e.g., an AC adaptor) is connected to the power terminal 134 of the cradle 5, and the cradle 5 is receiving commercial power supply.

First, a user uses the information processing device 1 as a portable device, i.e., in a state in which it is not attached to the cradle ((1) shown in FIG. 39(*a*)). In this state, when switching to a mode in which the information processing device 1 is used as a console device, the user attaches the information processing device 1 to the cradle 5 ((2) shown in FIG. 39(*b*)). Thus, the lower terminal 27 of the information processing device 1 and the main body terminal 73 of the cradle 5 are connected together. In this process, the information processing device 1 with the controllers 3 and 4 attached thereto may be attached to the cradle 5, or the information processing device 1 with the controllers 3 and 4 detached therefrom (i.e., the main unit 2) may be attached to the cradle 5.

Note that in the present embodiment, upon detecting the attachment of the information processing device 1 to the cradle 5, the information processing device 1 turns off the display 12, the details of which will be described later. Thus, in the present embodiment, the display 12 of the main unit 2 is not used when attached to the cradle 5. Note that in other embodiments, the main unit 2 may still display images on the display 12 when attached to the cradle 5. In the present embodiment, upon detecting the detachment of the information processing device 1 from the cradle 5, the information processing device 1 turns on the display 12.

As described above, in the present embodiment, the information processing device 1 can be attached to the cradle 5 either in the front-facing orientation or in the back-facing orientation. This allows a user to place the information processing device 1 in any orientation, thereby facilitating the attachment to the cradle 5.

Note that in other embodiments, the cradle 5 may be capable of supporting the information processing device 1 in the back-facing orientation (i.e., in an orientation in which the display 12 is hidden facing the second support 72) and not capable of supporting the information processing device 1 in the front-facing orientation (i.e., in an orientation in which the display 12 is not hidden). In the present embodiment, the display 12 is turned off when the information processing device 1 is placed in the cradle 5. Although turning off the display 12 is the intended operation by the information processing device 1, a user may possibly mistake the display 12 being turned off for a breakdown or a malfunction. This can be avoided by not allowing the information processing device 1 to be placed in the cradle 5 in the front-facing orientation.

In the present embodiment, upon detecting the attachment of the information processing device 1 to the cradle 5, the cradle 5 starts charging the information processing device 1. That is, upon detecting the attachment of the information processing device 1 to the cradle 5, the processing section 135 instructs the power control section 133 to perform an operation of supplying power from the power terminal 134 to the main unit 2. As the power control section 133 starts this operation, the cradle 5 starts charging the main unit 2. That is, the battery 98 in the main unit 2 is charged by the power supplied from the cradle 5 via the lower terminal 27.

If a controller (specifically, the left controller 3 and/or the right controller 4) is attached to the main unit 2 while the main unit 2 is charged by the cradle 5, the main unit 2 charges the controller attached thereto. That is, in such a case, the power control section 97 of the main unit 2 supplies the power from the cradle 5 via the lower terminal 27 to the controller via a terminal corresponding to the controller attached to the main unit 2 (specifically, the left-side terminal 17 and/or the right-side terminal 21). Thus, the controller is charged. That is, when the left controller 3 is charged, the battery of the power supply section 108 is charged by the power supplied via the terminal 42. When the right controller 4 is charged, the battery of the power supply section 118 is charged by the power supplied via the terminal 64.

Note that in other embodiments, the cradle 5 may charge the main unit 2 under a predetermined condition. For example, the power control section 133 of the cradle 5 may perform charging on the condition that the remaining charge of the battery 98 of the main unit 2 attached to the cradle 5 is less than or equal to a predetermined level. Similarly, the main unit 2 may charge a controller under a predetermined condition. For example, the power control section 97 of the main unit 2 may perform charging on the condition that the remaining charge of the battery of a controller attached to the main unit 2 is less than or equal to a predetermined level.

The above operation regarding charging may be executed even when the power of the information processing device 1 is off. That is, even when the information processing device 1 is attached to the cradle 5 when the power of the information processing device 1 is off, the cradle 5 may charge the information processing device 1 (i.e., charge the main unit 2 and/or controllers).

Moreover, in other embodiments, the main unit 2 may charge controllers when the main unit 2 is not attached to the cradle 5. This reduces the possibility that a user can no longer play because the battery of the controller has run out even though the battery 98 of the main unit 2 is still charged sufficiently. As described above, in the present embodiment, the battery 98 of the main unit 2 has a greater charging capacity than the battery of a controller. Thus, it is possible to further reduce such a possibility described above.

When the information processing device 1 is attached to the cradle 5, under a predetermined condition, the information processing device 1 outputs images (and sound) to the TV 6 and causes the TV 6 to output the images (and the sound) ((3) shown in FIG. 39(*c*)). That is, the information processing device 1 transmits data of the images and the sound to be output to the cradle 5 under a predetermined condition. Note that "the images and the sound to be output" in the present embodiment, refer to the images and the sound that are produced or obtained by a program (e.g., an OS program or an application program) running at a point in time when the information processing device 1 is attached to the cradle 5. For example, if a game application is running at such a point in time, the information processing device 1 outputs, to the cradle 5, data of the images and the sound that are produced by the game application. For example, if an application for obtaining and reproducing video images from the Internet is running at such a point in time, the information processing device 1 transmits, to the cradle 5, data of the images and sound that are obtained by the application.

Note that there is no particular limitation on the condition for images and sound to be output to be transmitted to the cradle 5 (referred to as the "image output condition"), but the image output condition in the present embodiment is the satisfaction of Conditions 1 to 3 below.

Condition 1: the cradle 5 is connected to the TV 6.
Condition 2: the cradle 5 is receiving power supply.

Condition 3: the cradle 5 is an authorized product (or a genuine product) (in other words, the cradle 5 is a product that is authorized by the manufacturer of the information processing device 1).

When these three conditions are satisfied, the information processing device 1 determines that the image output condition is satisfied. In this case, the information processing device 1 transmits, to the cradle 5, images and sound to be output. Note that in other embodiments, the information processing device 1 may use, as the image output condition, one or two conditions of Conditions 1 to 3 above, or may use other conditions, as the image output condition, in addition to (or instead of) Conditions 1 to 3 above.

Upon receiving data of the images and the sound from the information processing device 1, the cradle 5 transmits data of the images and the sound to the TV 6. Thus, "the images and the sound to be output" are output from the TV 6 ((3) shown in FIG. 39(*c*)). When the TV 6 is ready to output the images and the sound, a user is allowed to perform operations using controllers ((4) shown in FIG. 39(*d*)).

Note that when no image is displayed on the display 12 of the information processing device 1 (i.e., when the power is off, or when in the sleep mode), no image is displayed on the TV 6 even if the information processing device 1 is attached to the cradle 5.

In the present embodiment, even if the image output condition is not satisfied, the information processing device 1 turns off the image display on the display 12 while attached to the cradle 5. Note however that in other embodiments, if the image output condition is not satisfied, the information processing device 1 may resume the image display on the display 12.

As described above, in the present embodiment, the image display output can be switched from the display 12 to the TV 6 by attaching the information processing device 1 to the cradle 5 while images are displayed on the display 12 of the information processing device 1. That is, in the present embodiment, a user can easily (and seamlessly) switch the image display output only by placing the information processing device 1 on the cradle 5.

Note that as described above, in the present embodiment, the information processing device 1 can be used in a mode of use in which the images are displayed on the display 12 and a mode of use in which the images are displayed on the TV 6. Now, in the present embodiment, the information processing device 1 changes its operation mode depending on these two modes of use. That is, the information processing device 1 can operate at least in two different modes of the portable mode and the console mode. In the portable mode, some of the functions of the information processing device 1 are limited, the details of which will be described later. Note that the switching of the operation mode will be described later (see "[3-5. Changing operation mode]" and "[4-3. Mode setting process]").

Note that in other embodiments, the information processing device 1 may be allowed to communicate directly with the TV 6 (i.e., with no cradle 5 interposed therebetween). Then, the information processing device 1 can transmit images and/or sound directly to the TV 6. Note that there is no particular limitation on the communication method used between the information processing device 1 and the TV 6, and it may be, for example, wired communication using a cable (e.g., an HDMI cable) or wireless communication. If the information processing device 1 communicates directly with the TV 6, the cradle 5 may be used for the purpose of charging the information processing device 1, for example. Also in such a case, as in the case of the embodiment described above, the information processing device 1 may transmit the images and/or the sound to the TV 6 at least on the condition that the information processing device 1 is attached to the cradle 5.

[3-4-2. Mode of Use in which Image is Displayed on TV]

When images and sound are output from the TV 6, a user can perform operations by using a controller or controllers ((4) shown in FIG. 39). In the case described above, since the main unit 2 is attached to the cradle 5, it is difficult to use the controllers 3 and 4 while the controllers 3 and 4 are attached to the main unit 2. Therefore, in the case described above, a user may perform operations by using a controller or controllers detached from the main unit 2. For example, a user detaches the left controller 3 and/or the right controller 4 from the main unit 2 as necessary, and performs operations. Now, in the present embodiment, the controllers 3 and 4 can be detached from the main unit 2 by sliding them upward against the main unit 2. Therefore, a user can conveniently detach the controllers 3 and 4 from the main unit 2 while the main unit 2 remains attached to the cradle 5.

Note that if controllers other than the controllers 3 and 4 attached to the main unit 2 can communicate with the main unit 2 in wireless communication, such other controllers may be used.

If a controller detached from the main unit 2 is used in a mode of use in which images are displayed on the TV 6, the controller and the main unit 2 communicate with each other in wireless communication.

The mode of use in which the TV 6 is used as a display device is similar to the modes of use described above in "[3-2. Mode in which a pair of controllers are used detached]" and "[3-3. Mode in which three or more controllers are used]", except that the TV 6 is used instead of the display 12. That is, in the present embodiment, also in the case in which the TV 6 is used as a display device, as in the case in which the display 12 is used, one user may perform operations using a pair of controllers (see FIG. 38), or two users may perform operations each using one controller. When controllers other than the left controller 3 and the right controller 4 are provided, three or more users may perform operations each using one controller, or two or more users may perform operations each using a pair of controllers.

[3-5. Changing Operation Mode]

As described above, in the present embodiment, the information processing device 1 can be used in a mode of use in which images are displayed on the display 12 and a mode of use in which images are displayed on the TV 6. In the present embodiment, the information processing device 1 changes its operation mode depending on these two modes of use. That is, the information processing device 1 can operate at least in two different modes of the portable mode and the console mode.

The portable mode is a mode in which the information processing device 1 is used as a portable device. In the portable mode, images obtained or produced by the information processing device 1 are displayed on the display 12. Sound obtained or produced by the information processing device 1 is output from the speaker 88. In the portable mode, settings of the information processing device 1 are changed as shown in (a) and (b) below.

(a) Setting for Limiting Processing Power of Main Unit 2

In the present embodiment, in the portable mode, the clock frequency range over which the CPU 81 is allowed to operate is limited. In the present embodiment, the clock frequency at which the CPU 81 is allowed to operate can be specified within a predetermined range by the program executed on the main unit 2. In the portable mode, the range over which a clock frequency can be specified by the program is limited as compared with that in the console mode. For example, the range over which a clock frequency can be specified in the console mode is X1 [Hz] or less, whereas it is limited to X2 (<X1) [Hz] in the portable mode. Note that if the main unit 2 includes a GPU (Graphics Processing Unit) in addition to a CPU, the range of processing power (i.e., clock frequency) may be limited for the CPU and/or for the GPU.

In the present embodiment, in the portable mode, the image rendering capacity (which can also be referred to as the image generating capacity) is limited. Specifically, in the portable mode, the resolution (in other words, the number of pixels) of images generated by the main unit 2 is lower than that in the console mode.

With the limitation (a) above, the amount of computation to be executed on the main unit 2 is limited in portable mode, and it is therefore possible to reduce the heat generation and the power consumption of the main unit 2.

(b) Setting for Limiting Operation of Cooling Fan 96

In the present embodiment, in the portable mode, the operation of the cooling fan 96 is limited. Specifically, in the portable mode, the rotations per minute (rpm) at which the cooling fan 96 is allowed to operate (in other words, the fan speed) is limited to be lower than the highest rpm at which the cooling fan 96 is allowed to operate in the console mode. For example, in the portable mode, the cooling fan 96 is controlled to operate at a predetermined rpm or less, which is lower than the maximum rpm.

With the limitation (b) above, it is possible to reduce the operation noise of the cooling fan 96. In the portable mode, it is assumed that a user uses the main unit 2 close to the user. In view of this, in the present embodiment, since the operation noise of the cooling fan 96 can be reduced in the portable mode, it is possible to reduce the possibility that the user may feel the operation noise is too loud.

On the other hand, the console mode is a mode in which the information processing device 1 is used as a console-type device. In the console mode, images obtained or produced by the information processing device 1 are displayed on the TV 6. The sound obtained or produced by the information processing device 1 is output from the speaker of the TV 6. In the console mode, the function suppressions in the portable mode are lifted. That is, in the console mode, the limitations (a) and (b) described above are lifted. Therefore, in the console mode, a program running on the information processing device 1 can make better use of the processing power of the CPU 81. The information processing device 1 can display, on the TV 6, images of a higher resolution than in the portable mode. The information processing device 1 can be cooled by the cooling fan 96 more effectively than in the portable mode.

In the present embodiment, the switching between the portable mode and the console mode is done as follows. That is, when the information processing device 1 is attached to the cradle 5 and the image output condition described above is satisfied, the information processing device 1 switches the operation mode to the console mode. On the other hand, when the information processing device 1 is detached from the cradle 5, the information processing device 1 switches the operation mode to the portable mode. Note that the switching of the operation mode will be described later (see FIG. 44).

Note that differences between settings in the portable mode and those in the console mode are not limited to those described above. For example, in other embodiments, the information processing device 1 may impose only one of the limitations (a) and (b) described above in the portable mode. For example, in other embodiments, the information processing system may use different communication methods for the communication with external devices via a network (e.g., the Internet) (in other words, may switch between different communication methods) in the portable mode and in the console mode. For example, consider a case in which a predetermined network connection device is connected to the cradle 5, the predetermined network connection device having a function of connecting to and communicating with the network. In such a case, in the portable mode, the information processing device 1 may communicate with the network using the network communication section 82. On the other hand, in the console mode, the information processing device 1 may communicate with the network via the cradle 5 and the network connection device.

For example, in an application executed by the information processing device 1, settings in the application may be changed between the portable mode and the console mode. For example, in a game application, particulars of the game (e.g., the rules, the operation method, etc., of the game) may be changed between the portable mode and the console mode (see FIG. 45).

Note that the operation mode (the portable mode and the console mode) is of a different level from the ON mode and the sleep mode. That is, the main unit 2 may be either in the ON mode or in the sleep mode when the operation mode is the portable mode. Or, the main unit 2 may be either in the ON mode or in the sleep mode when the operation mode is the console mode.

[4. Specific Example of Process of Information Processing System]

Next, some processes to be executed when the information processing system operates as described above will be described by way of more specific examples.

[4-1. Registration Process]

As described above, in the present embodiment, the main unit 2 and the controllers 3 and 4 communicate with each other. Thus, the main unit 2 executes a registration process for registering controllers so that the main unit 2 can identify controllers to communicate with the main unit 2. Note that those controllers offered (specifically, sold) together with the main unit 2 may be pre-registered with the main unit 2 at the time of offering.

Figure 40:
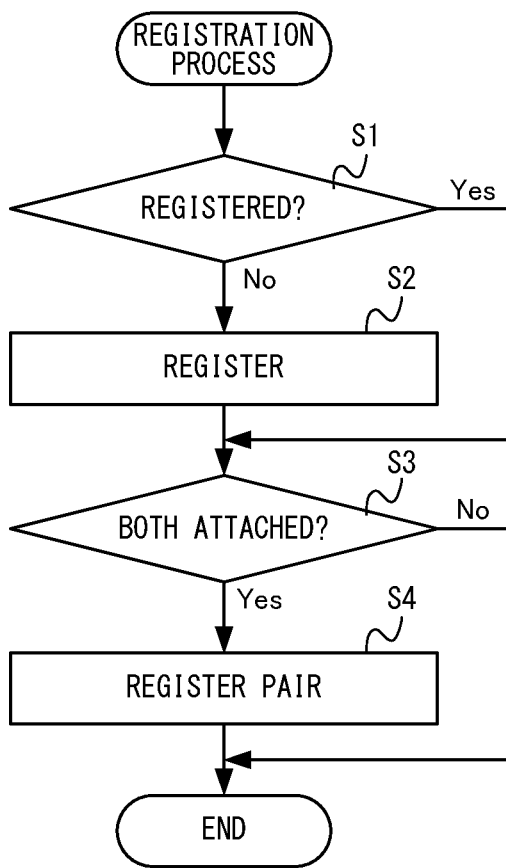
FIG. 40 is a flow chart showing an example flow of a registration process executed on the main unit.

FIG. 40 is a flow chart showing an example flow of a registration process executed on the main unit 2. In the present embodiment, the registration process is executed in response to a controller being attached to the main unit 2. That is, the main unit 2 detects the attachment of the left controller 3 or the right controller 4, and starts executing the registration process shown in FIG. 40 in response to detecting the attachment.

There is no particular limitation on the method for detecting a controller being attached to the main unit 2. For example, the sensing method may be a method based on a signal state (e.g., a voltage state) at a predetermined pin included in the terminal of the main unit 2 and/or controller. For example, the sensing method may be a method in which the subject device mechanically senses the connection of a terminal of another device thereto. The main unit 2 and a controller may both have the sensing function described above, or either one of them may have the sensing function. When only one of the devices has the sensing function, that device may indicate, to the other device, that the connection has been sensed, as necessary.

Note that the processes of the steps of the flow chart shown in FIG. 40 (this similarly applies to the flow charts in FIG. 43 to FIG. 47 to be discussed later) are merely illustrative, and the order of steps may be switched around as long as similar results are obtained, and other processes may be executed in addition to (or instead of) the process of any step. While the present embodiment is described assuming that the processes of the steps of the flow chart are executed by the CPU 81 of the main unit 2, processes of some of the steps of the flow chart may be executed by a processor or a dedicated circuit other than the CPU 81. Some of the processes executed by the main unit 2 may be executed by another information processing device capable of communicating with the main unit 2 (e.g., a server capable of communicating with the main unit 2 via a network). That is, the processes shown in FIG. 40, FIG. 43 to FIG. 47 may be executed through a cooperation of a plurality of information processing devices including the main unit 2.

In the registration process shown in FIG. 40, first, in step S1, the CPU 81 determines whether or not the controller sensed to have been attached to the main unit 2 has been registered. Now, in the present embodiment, the main unit 2 stores, in a storage section thereof (e.g., the flash memory 84), registration information representing controllers that have been registered. The determination of step S1 is based on this registration information.

FIG. 41 is a diagram showing an example registration information. In the present embodiment, the registration information is information in which number information, identification information and wireless communication information are associated together, as shown in FIG. 41. The number information is a number assigned to a registered controller. The indicator LED described above on the controller may be controlled to represent a value based on this number.

The identification information is information representing a value (e.g., an ID) that is uniquely assigned to a controller. With this identification information, it is possible to uniquely identify a controller. In the present embodiment, identification information includes information representing whether a controller is a left controller or a right controller. That is, the main unit 2 can determine whether a controller is a left controller or a right controller based on the identification information assigned to the controller. Note that in other embodiments, the identification information does not need to include information representing whether a controller is a left controller or a right controller. In such a case, the registration information may include information representing whether a controller is a left controller or a right controller (separately from the identification information). Note that the CPU 81 can determine whether a controller is a left controller or a right controller based on whether the identification information of the controller has been obtained through the left-side terminal 17 or through the right-side terminal 21.

The wireless communication information indicates whether or not the connection setting (i.e., pairing) of the device for wireless communication with the main unit 2 has been done. That is, if the pairing between the main unit 2 and the controller has been done, information representing "registered" is stored as the wireless communication information of the controller. On the other hand, if the pairing between the main unit 2 and the controller has not been done, information representing "unregistered" is stored as the wireless communication information of the controller. Note that the main unit 2 may store information regarding the connection setting for wireless communication (separately from the registration information) so as to eliminate the need to perform pairing again for a controller for which pairing has been done.

Note that a part of the registration information may be deleted or changed in response to an instruction from a user. For example, the main unit 2 may delete information regarding a specified controller or change a number assigned to the controller, in response to an instruction from a user.

Referring back to FIG. 40, in step S1 described above, the CPU 81 first obtains identification information from a controller sensed to have been attached. Note that it is assumed that a memory of a controller (e.g., the memories 102 and 112) stores, in advance, identification information assigned to the controller. A controller transmits the identification information thereof to the main unit 2 in response to the controller being connected to the main unit 2 or in response to a request from the CPU 81. The CPU 81 determines whether or not a controller sensed to have been attached has been registered based on whether or not the obtained identification information is included in the registration information. If the determination result of step S1 is negative, the process of step S2 is executed. On the other hand, if the determination result of step S1 is affirmative, the process of step S3 is executed, skipping the process of step S2.

In step S2, the CPU 81 registers a controller sensed to have been attached. That is, the CPU 81 updates the registration information stored in the storage section so that the number information, the identification information and the wireless communication information of the controller are associated together and added to the registration information. The number information may be, for example, information representing a number that has not been used for any other registered controller. The identification information may be identification information obtained from the controller in step S1 described above. The wireless communication information is set to "unregistered" since pairing has not been done at this point in time. Following step S2, the process of step S3 is executed.

In step S3, the CPU 81 determines whether or not both a left controller and a right controller are attached to the main unit 2. That is, it is determined whether or not the attachment of the left controller 3 and the right controller 4 to the main unit 2 can be sensed at the present point in time. If the determination result of step S3 is affirmative, the process of step S4 is executed. On the other hand, if the determination result of step S3 is negative, the CPU 81 ends the registration process, skipping the process of step S4.

In step S4, the CPU 81 registers the left controller 3 and the right controller 4 attached to the main unit 2 as a pair. Now, in the present embodiment, the main unit 2 stores pairing information representing a pair of a left controller and a right controller in the storage section (e.g., the flash memory 84).

FIG. 42 is a diagram showing an example of pairing information. In the present embodiment, as shown in FIG. 42, the pairing information is information in which left identification information and right identification information are associated together. The left identification information is identification information of a left controller registered as a pair, from among registered controllers (in other words, controllers represented by identification information included in the registration information). The right identification information is identification information of a right controller registered as a pair, from among registered controllers (in other words, controllers represented by identification information included in the registration information).

Left identification information and right identification information that are associated together in the pairing information represent a pair of a left controller and a right controller.

In step S4 described above, the CPU 81 first obtains identification information of the left controller and the right controller attached to the main unit 2. Note that for a controller whose identification information has been obtained in step S1 described above, the identification information does not need to be obtained again. Next, the CPU 81 adds, to the pairing information, the obtained identification information of the left controller and that of the right controller, while they are associated together. That is, the CPU 81 updates pairing information so as to add the pair of two identification information obtained to the pairing information (strictly speaking, unupdated pairing information). Then, the updated pairing information is stored in the storage section. Note that if information representing the pair of two identification information is already included in the pairing information, the CPU 81 does not need to update the pairing information. If information representing a pair including one of the two identification information is already included in the pairing information, the CPU 81 deletes such a pair from the pairing information. Thus, any pair including one of two controllers that are included in a pair to be registered is unregistered (i.e., deleted from the pairing information). After step S4, the CPU 81 ends the registration process.

As described above, in the present embodiment, in response to a controller being attached to the main unit 2, the controller is registered with the main unit 2. Thus, a user can easily register controllers. In the present embodiment, since the registration process is executed when the main unit 2 and the controllers communicate with each other in wired communication, it is possible to reduce the possibility that the main unit 2 cannot obtain information (specifically, identification information) from controllers, and to reduce the possibility that registration fails.

In the present embodiment, in response to a left controller and a right controller being both attached to the main unit 2, these two controllers are registered as a pair. A user can attach any two controllers that the user wishes to use as a pair to the main unit 2, and the user can therefore register a pair through an easy and straightforward operation.

Note that in the present embodiment, an accessory (see FIG. 52) may be provided to which a left controller and a right controller can be attached at the same time, the details of which will be described later. Then, when a left controller and a right controller are both attached to the accessory, the main unit 2 registers these two controllers as a pair, as when a left controller and a right controller are both attached to the main unit 2. The details of such a pairing process will be described in "[5-2. Accessory for controllers]" below.

Note that the main unit 2 may register, as a pair, two controllers attached to the main unit 2 at the same time as in the embodiment described above, or may register, as a pair, two controllers that are not attached to the main unit 2 at the same time, unlike in the embodiment described above. For example, the main unit 2 may register, as a pair, a left controller last attached thereto and a right controller last attached thereto.

Note that in other embodiments, any other pairing method may be used for registering pairs of controllers. For example, the main unit 2 may register, as a pair, two controllers on which a predetermined operation is performed within a predetermined period of time. Specifically, the main unit 2 prompts a user to perform a predetermined operation in response to satisfaction of a predetermined condition (e.g., a pairing instruction has been received from a user). Then, the main unit 2 registers, as a pair, two controllers on which the predetermined operation is performed within a predetermined period of time from the prompting, from among two or more controllers being in communication with the main unit 2. Note that the "predetermined operation" may be, for example, an operation of pressing A button, or may be an operation of bumping two controllers against each other (this operation can be determined, for example, based on detection results of an acceleration sensor).

[4-2. Wireless Setting Process]

As described above, in the present embodiment, the main unit 2 and the controllers 3 and 4 may communicate with each other in wireless communication. Therefore, in the present embodiment, the information processing device 1 performs a registration (referred to also as pairing) for enabling wireless communication between the main unit 2 and the controllers. Note that those controllers offered (specifically, sold) together with the main unit 2 may be pre-registered with the main unit 2 for wireless communication at the time of offering.

Figure 43:
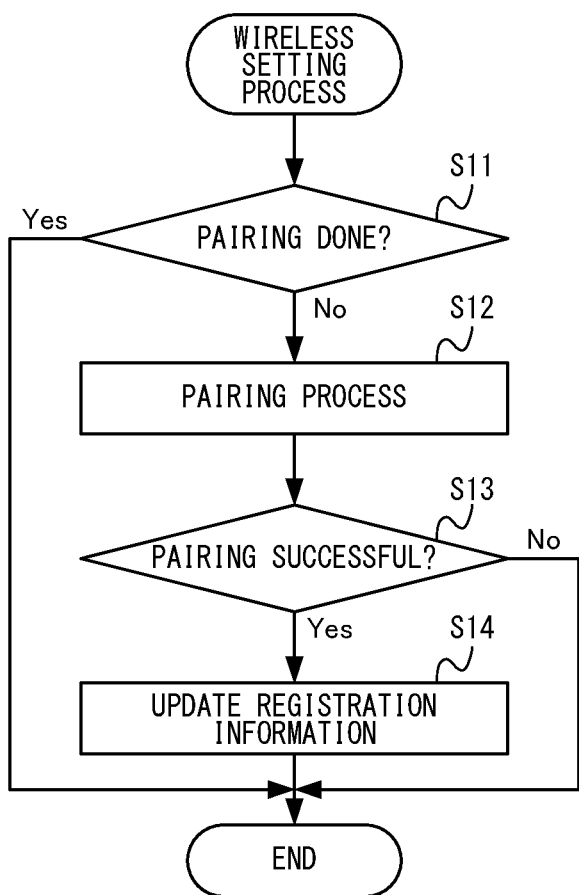
FIG. 43 is a flow chart showing an example flow of a wireless setting process executed on the main unit.

In the present embodiment, the main unit 2 executes a wireless setting process for enabling wireless communication with controllers. FIG. 43 is a flow chart showing an example flow of a wireless setting process executed on the main unit 2. In the present embodiment, the wireless setting process is executed in response to a controller being removed from the main unit 2. That is, the main unit 2 senses the removal of the left controller 3 or the right controller 4, and starts executing the wireless setting process shown in FIG. 43 in response to the removal (referred to as "detachment"). Note that although there is no particular limitation on the method for sensing the detachment of a controller from the main unit 2, a similar method to the method for sensing the attachment of a controller to the main unit 2 may be used, for example.

In the wireless setting process, first, in step S1$i$, the CPU 81 determines whether or not the controller sensed to have been detached from the main unit 2 has been paired for wireless communication. This determination can be done by using the registration information described above. That is, if wireless communication information included in the registration information indicates "registered" for the controller sensed to have been detached, the CPU 81 determines that the controller has been paired for wireless communication. On the other hand, if wireless communication information included in the registration information indicates "unregistered" for the controller sensed to have been detached, the CPU 81 determines that the controller has not been paired for wireless communication. If the determination result of step S11 is negative, the process of step S12 is executed. On the other hand, if the determination result of step S11 is affirmative, the CPU 81 ends the wireless setting process, skipping the process of step S12.

In step S12, the CPU 81 executes a pairing process for enabling wireless communication with a controller sensed to have been detached. The pairing process in the present embodiment may be similar to a pairing process of a conventional communication technique in accordance with the Bluetooth (registered trademark) standard. Note that in the present embodiment, a controller executes the pairing process in response to being removed from the main unit 2, the details of which will be described later. Thus, the main unit 2 and the controller are paired together, establishing a wireless connection therebetween. Following step S12, step S13 is executed.

In step S13, the CPU 81 determines whether or not the pairing with the controller sensed to have been detached has succeeded. Note that the process of step S13 is executed after lapse of a predetermined period of time from the execution of step S12. If the determination result of step S13 is affirmative, the process of step S14 is executed. On the other hand, if the determination result of step S13 is negative, the CPU 81 ends the wireless setting process, skipping the process of step S14.

In step S14, the CPU 81 updates the registration information. That is, the CPU 81 changes the wireless communication information included in the registration information to "registered" for the controller sensed to have been detached. Following step S14, the CPU 81 ends the wireless setting process.

In the present embodiment, for the wireless setting process, the controllers 3 and 4 execute a similar process (referred to as a "controller-side wireless setting process") to that of the main unit 2. Specifically, a controller stores registration information in a storage section (e.g., the memories 102 and/or 112), wherein identification information of the main unit to which the controller is attached and wireless communication information indicating that whether or not the controller has been paired with the main unit are associated together in the registration information. A controller (specifically, the communication control section 101 or 111) determines whether or not it has been paired with the main unit 2 in response to the removal from the main unit 2. If it has not been paired, the controller executes the pairing process. Moreover, the controller determines whether or not the pairing has succeeded, and updates the registration information if the pairing has succeeded. Thus, in the present embodiment, when a controller is removed from the main unit 2, the main unit 2 and the controller each perform the pairing process, and a wireless connection is established upon successful pairing.

As described above, in the present embodiment, in response to the removal of a controller from the main unit 2, a setting process for wireless communication between the main unit 2 and the controller is executed to establish a wireless connection. In the present embodiment, a controller communicates in wired communication while it is attached to the main unit 2, and in wireless communication while it is removed from the main unit 2. Therefore, by executing the setting process when the controller is removed from the main unit 2, it is possible to establish a wireless connection with appropriate timing. Note that in the present embodiment, since a controller is registered when the controller is attached to the main unit 2 for the first time, the setting process is executed when the controller is removed from the main unit 2 for the first time. Then, it is possible to reduce the possibility that "the wireless connection is not established when a registered controller is removed from the main unit 2", thus providing the information processing device 1 that is easy to use for a user. Moreover, according to the present embodiment, a user can easily cause the information processing device 1 to execute the setting process described above by removing a controller from the main unit 2.

Note that the condition on which the setting process for wireless communication is executed on the information processing device 1 may be any condition, and it not limited to the removal of a controller from the main unit 2. For example, in other embodiments, the setting process may be executed in response to a controller being attached to the main unit 2. For example, in other embodiments, the setting process may be executed in response to an instruction from a user. Specifically, the main unit 2 may execute the wireless setting process (FIG. 43) in response to a predetermined instruction from a user. The predetermined instruction may be given by a user selecting a predetermined item displayed on a menu screen, or may be given by a user pressing a predetermined button provided on the main unit 2. Moreover, in response to a predetermined instruction from a user, a controller may execute the "controller-side wireless setting process" described above. This predetermined instruction may be given by pressing down a predetermined button provided on the controller.

In the present embodiment, when a controller is removed from the main unit 2, the main unit 2 and the controller each determine whether or not the controller and the main unit 2 have been paired together, so that the pairing process is executed if they have not been paired together. In other embodiments, the main unit 2 and the controller may execute the pairing process, upon removal of the controller from the main unit 2, without performing the determination process.

(Operation on Controller)

In the present embodiment, if a controller is attached to the main unit 2, the controller regards the main unit 2 as its communication partner. That is, the controller transmits operation data in wired communication to the main unit 2, to which the controller is attached. On the other hand, if a controller is not attached to the main unit 2 but the controller has been paired with another main unit 2, the controller regards the other main unit 2 as its communication partner. That is, the controller transmits operation data in wireless communication to the other main unit 2, with which the controller has been paired. Thus, in the present embodiment, the controller transmits operation data to the main unit 2, irrespective of whether it is attached to the main unit 2. Note that in the present embodiment, if a controller has been paired with a plurality of main units 2, the controller regards one main unit that satisfies a predetermined condition as its communication partner. Although there is no particular limitation on the predetermined condition, it may be, for example, "being the main unit with which the controller has last been paired". Note that if a controller is not attached to the main unit 2 and there is no main unit 2 with which the controller has been paired, the controller does not transmit operation data.

If a controller is able to communicate with a main unit 2, the controller repeatedly transmits operation data to the main unit 2, as its communication partner, at a rate of once per a predetermined period of time. If there is no main unit 2 with which a controller is able to communicate (i.e., when the main unit 2 as its communication partner has been turned OFF or set in the sleep mode), the controller stops transmitting operation data to a main unit 2. If there is newly a main unit 2 with which a controller is able to communicate (i.e., when the main unit 2 as its communication partner has been turned ON or set in the ON mode), the controller resumes transmitting operation data to the main unit 2.

[4-3. Mode Setting Process]

As described above, in the present embodiment, the information processing device 1 operates in the portable mode and in the console mode. Therefore, the information processing device 1 executes a process (referred to as the "mode setting process") of switching the operation mode between the portable mode and the console mode.

Figure 44:
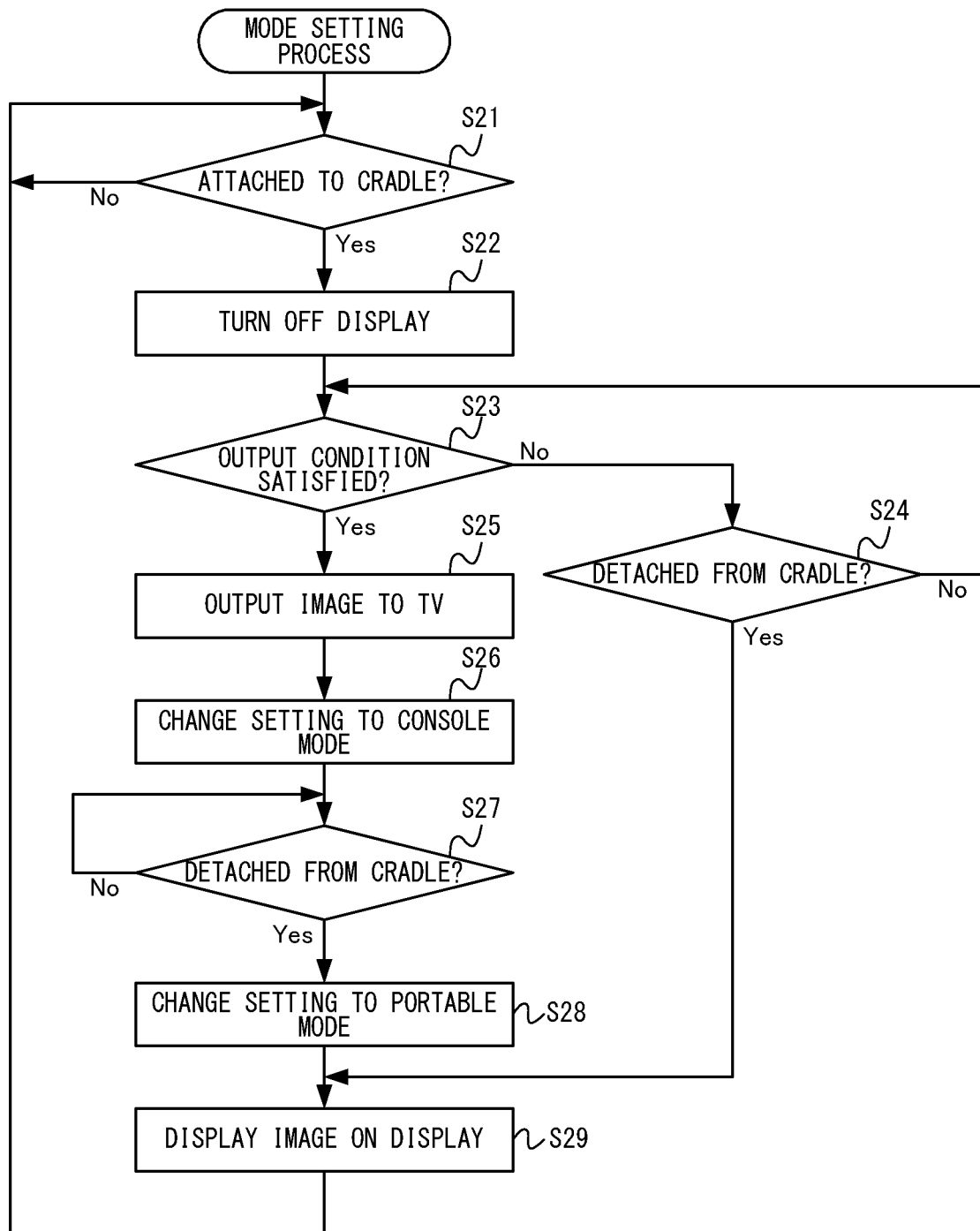
FIG. 44 is a flow chart showing an example flow of a mode setting process executed on the main unit.

FIG. 44 is a flow chart showing an example flow of a mode setting process executed on the main unit 2. In the present embodiment, while the power of the main unit 2 is ON, a series of processes of steps S21 to S29 shown in FIG. 44 is executed repeatedly. Note that in the present embodiment, it is assumed that at the start of the process (i.e., when the power is turned ON), the operation mode of the main unit 2 is set to the portable mode.

In the mode setting process, first, in step S21, the CPU 81 determines whether or not the main unit 2 is attached to the cradle 5. Note that there is no particular limitation on the method for sensing the attachment of the main unit 2 to the cradle 5. For example, the CPU 81 may perform the sensing based on a signal state (e.g., a voltage state) at a predetermined pin included in the terminal of the main unit 2 and/or the cradle 5. If the determination result of step S21 is affirmative, the process of step S22 is executed. On the other hand, if the determination result of step S21 is negative, the process of step S21 is executed again. That is, while the operation mode is the portable mode and the main unit 2 is not attached to the cradle 5, the CPU 81 repeatedly executes the process of step S21. The process of step S21 is executed at a rate of once per a predetermined period of time, for example.

In step S22, the CPU 81 turns off the display 12. Specifically, the CPU 81 stops supplying power to the display 12. The CPU 81 also stops outputting image data to the display 12. Following step S22, the process of step S23 is executed.

As described above, the main unit 2 turns OFF the display 12 at a point when the main unit 2 is attached to the cradle 5. Note that in other embodiments, the main unit 2 may turn OFF the display 12 at a point when the image is output from the main unit 2 to the TV 6, rather than turning OFF the display 12 (i.e., the display 12 is left ON) at the point when the main unit 2 is attached to the cradle 5. In other embodiments, the main unit 2 may not turn OFF the display 12 even when the image is output from the main unit 2 to the TV 6 so that the image is displayed both on the display 12 and on the TV 6. Then, the cradle 5 may be configured so that the display 12 can be viewed while the main unit 2 is attached to the cradle 5. The main unit 2 may generate two different images so that different images are displayed on the TV 6 and on the display 12.

In step S23, the CPU 81 determines whether or not the image output condition is satisfied. That is, the CPU 81 determines whether or not Conditions 1 to 3 described above are satisfied. Note that Conditions 1 to 3 can be determined based on information obtained from the cradle 5. Specifically, for "Condition 1: the cradle 5 is connected to the TV 6", the CPU 81 may obtain information from the cradle 5 that indicates whether or not the cradle 5 is connected to the TV 6, and make the determination based on the obtained information. For "Condition 2: the cradle 5 is receiving power supply", the CPU 81 may obtain information from the cradle 5 that indicates whether or not power is supplied from the power terminal 134 to the cradle 5, and make the determination based on the obtained information. For "Condition 3: the cradle 5 is an authorized product", the CPU 81 may obtain predetermined information with which it is possible to identify an authorized product, and make the determination based on the obtained information. Note that the predetermined information may for example be identification information assigned to the cradle or information that shows predetermined content if the product is an authorized product (in other words, information that shows different content if the product is not an authorized product). The CPU 81 obtains the information at a predetermined timing from the cradle 5, and determines whether or not the image output condition is satisfied based on the obtained information. There is no particular limitation on the predetermined timing, but it may be, for example, when the main unit 2 is attached to the cradle 5 or when step S23 is executed.

If the determination result of step S23 is affirmative, the process of step S25 to be described later is executed. On the other hand, if the determination result of step S23 is negative, the process of step S24 is executed. Note that in this case, no image will be displayed on the TV 6 even though a user has attached the information processing device 1 to the cradle 5. Therefore, the information processing device 1 may indicate to the user that no image will be displayed on the TV 6. For example, the information processing device 1 may indicate by outputting sound from the speaker 88 or by displaying an image on the display 12. For example, if the cradle 5 includes an indicator light-emitting portion (e.g., an LED provided on the sleep button 74), the information processing device 1 may indicate by controlling the light-emitting portion. If an indicator light-emitting portion is provided on the cradle 5, the information processing device 1 may control the light-emitting portion so as to indicate whether the operation mode is the portable mode or the console mode.

In step S24, the CPU 81 determines whether or not the main unit 2 has been removed from the cradle 5. If the determination result of step S24 is affirmative, the process of step S29 to be described later is executed. On the other hand, if the determination result of step S24 is negative, the process of step S23 described above is executed again. That is, while the main unit 2 is attached to the cradle 5 and the image output condition is not satisfied, the CPU 81 repeatedly executes a series of processes of steps S23 and S24. The series of processes is repeatedly executed at a rate of once per a predetermined period of time.

In step S25, the CPU 81 outputs images to the TV 6. That is, the CPU 81 outputs data of "the images and the sound to be output" to the cradle 5 via the lower terminal 27. The cradle 5 transfers the data to the TV 6. That is, the format of the data is converted through the conversion section 131 of the cradle 5, and the data is output to the TV 6 via the monitor terminal 132. Thus, the images and the sound are output from the TV 6. After the process of step S25, the CPU 81 repeatedly executes the process of outputting the images to the TV 6. This process is continued until the information processing device 1 ends the image display (e.g., the power of the information processing device 1 is turned OFF, or the information processing device 1 is set in the sleep mode), or until the operation mode is changed to the portable mode. Following step S25, the process of step S26 is executed.

In step S26, the CPU 81 changes the operation mode to the console mode. That is, the CPU 81 changes the settings of the main unit 2 so as to lift the functional limitations of the main unit 2 in the portable mode as described in "[3-5. Changing operation mode]" above. Following step S26, the process of step S27 is executed.

In step S27, the CPU 81 determines whether or not the main unit 2 has been removed from the cradle 5. If the determination result of step S27 is affirmative, the process of step S28 is executed. On the other hand, if the determination result of step S27 is negative, the process of step S27 is executed again. That is, while the operation mode is the console mode, the CPU 81 repeatedly executes the process of step S27. The process of step S27 is executed at a rate of once per a predetermined period of time, for example.

In step S28, the CPU 81 changes the operation mode to the portable mode. That is, the CPU 81 changes the settings of the main unit 2 so as to impose functional limitations on the main unit 2 as described in "[3-5. Changing operation mode]" above. The CPU 81 also stops the image output to the TV 6. Following step S28, the process of step S29 is executed.

In step S29, the CPU 81 outputs images to the display 12. That is, the CPU 81 displays the "images to be output" on the display 12. The CPU 81 also outputs the "sound to be output" from the speaker 88 (or the sound input/output terminal 25). After the process of step S29, the CPU 81 repeatedly executes the process of outputting images to the display 12. Following step S29, the process of step S21 is executed again.

As described above, in the present embodiment, the information processing device 1 can switch between the portable mode, in which images are displayed on the display 12, and the console mode, in which images are displayed on the TV 6. Now, the condition for changing the operation mode to the console mode (in other words, the image output condition) may be any condition. For example, the condition may be as follows.

In other embodiments, the image output condition may include a condition that "there has been a user instruction to output images to the TV 6". For example, the cradle 5 may include an output instruction button for giving an instruction to output the images obtained or produced by the information processing device 1 to the TV 6. Then, the information processing device 1 may use, as one of the image output conditions, a condition that "the output instruction button has been pressed while the information processing device 1 is attached to the cradle 5".

In other embodiments, the image output condition may include a condition that "the TV 6 is capable of displaying the images from the cradle 5". Specifically, this condition is that the power of the TV 6 is ON and the input select setting thereof is such that input images from the cradle 5 are displayed. By using image output conditions including the condition described above, it is possible to avoid a situation in which no image is displayed on the TV 6 even though images are output from the information processing device 1 via the cradle 5.

In addition, the information processing device 1 may further perform a control, over the TV 6, to turn ON the power of the TV 6, and/or to switch the input select so as to display an input from the cradle 5. Then, a user does not need to operate the TV 6 so as to satisfy the condition described above (i.e., that the TV 6 is able to display the images from the cradle 5), and it is possible to easily display the image on the TV 6. Note that the information processing device 1 can perform a control as described above by causing the cradle 5 to transmit a control signal (e.g., a CEC command of the HDMI standard) to the TV 6.

The information processing device 1 may change the image output condition in response to an instruction from a user. For example, the information processing device 1 may present a plurality of different conditions, as the image output conditions, on a predetermined setting changing screen, and allow a user to select one of the conditions. This is convenient for a user because the user can choose a condition that suits the user's way of using the device.

For example, when the cradle 5 is provided with an output instruction button as described above, information processing system may use a switching-type button as the output instruction button so as to allow a user to change the condition. That is, a first state and a second state can be switched from one to another by pressing the output instruction button of the cradle 5. Then, if the output instruction button is in the first state, the information processing device 1 interprets this to mean that there is a user instruction to output the images on the TV 6, whereas if the output instruction button is in the second state, the information processing device 1 interprets this to mean that there is no user instruction to output the images on the TV 6. Thus, a user can cause the images to be output on the TV 6 (under a certain condition) in response to the attachment of the main unit 2 to the cradle, by leaving the output instruction button in the first state.

In the description above, it can be said that based on the presence/absence of the user instruction described above, the information processing device 1 determines whether a user has attached the information processing device 1 to the cradle 5 merely for charging, or has attached the information processing device 1 to the cradle 5 to display the images on the TV 6. Now, in other embodiments, the information processing device 1 may make the determination above by any other method.

For example, the information processing device 1 may make the determination described above based on the state of the information processing device 1 regarding the execution of an application. Now, "the state of the information processing device 1 regarding the execution of an application" is, for example, a state regarding whether an application is running on the information processing device 1 or a state regarding whether the images produced or obtained by a running application are displayed on the display 12. Specifically, if an application is running or if the images produced or obtained by a running application are displayed on the display 12, the information processing device 1 may determine that a user has attached the information processing device 1 to the cradle 5 in order to display the images on the TV 6. Therefore, in such a case, the information processing device 1 may output the images to the TV 6 on the condition that the image output condition is satisfied. That is, the images output condition may include a condition that "an application is running or the image produced or obtained by a running application are displayed on the display 12".

In other embodiments, the information processing device 1 may store, in a storage section (e.g., the flash memory 84), the operation mode at the point in time when the power of the information processing device 1 is turned OFF. Then, when the power of the information processing device 1 is turned ON, if the operation mode stored in the storage section indicates the portable mode, the information processing device 1 may execute the mode setting process from step S21, whereas if the operation mode stored in the storage section indicates the console mode, the information processing device 1 may execute the mode setting process from step S27. Thus, the operation mode of the information processing device 1 at the time of power-off can be carried on when the power is next turned ON.

[4-4. Example of Executing Information Process Depending on Operation Mode]

As described above, in the present embodiment, the information processing device 1 operates one of operation modes including the portable mode and the console mode. Therefore, in the information processing device 1, information processes executed by various programs executed on the main unit 2 (e.g., the OS program and application programs) may be of different content between the portable mode and the console mode. An example information process, in which a different process is executed depending on the operation mode, will now be described.

Figure 45:
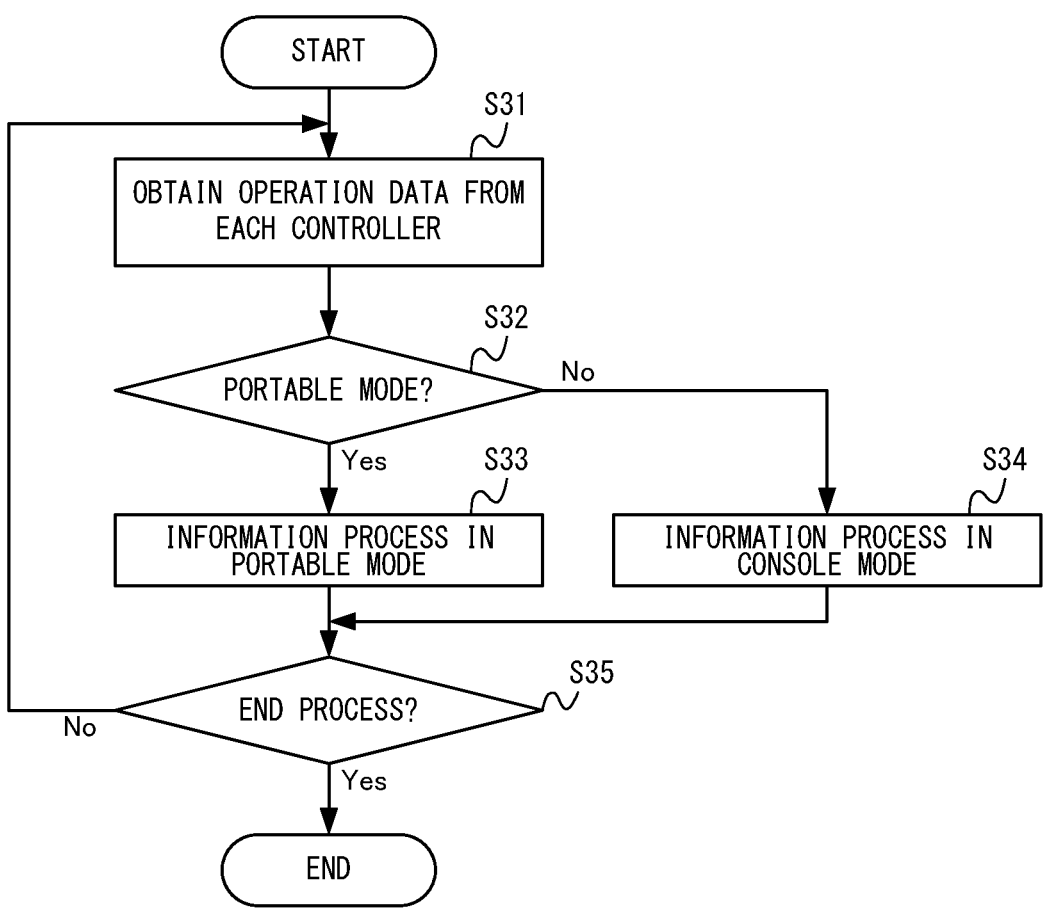
FIG. 45 is a flow chart showing an example flow of an information process executed on the main unit.

FIG. 45 is a flow chart showing an example flow of an information process executed on the main unit 2. A series of information processes shown in FIG. 45 is performed as the CPU 81 executes a program (e.g., an application program or an OS program) that is executable by the information processing device 1, for example. For example, if a program to be executed is an application program, the series of information processes shown in FIG. 45 is started in response to a user instruction to launch the application program. For example, if a program to be executed is an OS program, the series of information processes shown in FIG. 45 is started in response to the power of the main unit 2 being turned ON.

In the series of information processes shown in FIG. 45, first, in step S31, the CPU 81 obtains operation data from each controller. For example, the CPU 81 may obtain operation data from any controller with which the CPU 81 can communicate whether in wired communication or wireless communication. Note that the main unit 2 may obtain operation data with substantially the same frequency from controllers it is communicating in wired communication and from controllers it is communicating in wireless communication. Then, since there is no difference between controllers depending on their communication method, it is possible to improve the controllability of controllers. Following step S31 described above, the process of step S32 is executed.

Depending on the program related to the series of information processes, the CPU 81 may obtain operation data from controllers that satisfy a predetermined condition and not obtain operation data from controllers that do not satisfy the condition. For example, the predetermined condition may be a communication-related condition. That is, the CPU 81 may obtain operation data from controllers that communicate with the main unit 2 in wired communication and not obtain operation data from controllers that communicate with the main unit 2 in wireless communication. For example, the predetermined condition may be a condition regarding the function of a controller. That is, the CPU 81 may obtain operation data from controllers having a predetermined function (e.g., controllers having an analog stick, controllers having the NFC communication function, controllers having an acceleration sensor, etc.) and not obtain operation data from controllers not having these predetermined functions. If there is a controller that is capable of communication but that does not obtain operation data, the main unit 2 may indicate to the user that the controller is not available for use on the running program.

Note that in other embodiments, instead of the CPU 81 not obtaining operation data from controllers that do not satisfy a predetermined condition, the CPU 81 may not use the operation data obtained from the controllers that do not satisfy the predetermined condition in the process or step S33 or S34 to be described later.

In step S32, the CPU 81 determines whether or not the operation mode of the information processing device 1 is the portable mode (i.e., whether it is the portable mode or the console mode). The information processing device 1 has information indicating the current operation mode stored in a predetermined storage section (e.g., the flash memory 84). The determination of step S32 is made based on this information. If the determination result of step S32 is affirmative (i.e., if the operation mode is the portable mode), the process of step S33 is executed. On the other hand, if the determination result of step S32 is negative (i.e., if the operation mode is the console mode), the process of step S34 is executed again.

In step S33, the CPU 81 executes an information process based on operation data in accordance with settings in the portable mode. As described above, in the portable mode, the processing power of the main unit 2 is limited. That is, the CPU 81 executes the information process under such a limitation. For example, the CPU 81 executes a predetermined process (e.g., a game process) using, as an input, the operation data obtained in step S31, and produces images representing the process results, which are displayed on the display 12. Following step S33, the process of step S35 to be described later is executed.

On the other hand, in step S34, the CPU 81 executes an information process based on operation data in accordance with settings in the console mode. As described above, in the console mode, the limitation on the processing power of the main unit 2 is lifted. For example, the CPU 81 may execute a predetermined process (e.g., a game process) using, as an input, the operation data obtained in step S31, and produces images representing the process results, which are displayed on the TV 6. Following step S33, the process of step S35 to be described later is executed.

Depending on the program related to the series of information processes, the CPU 81 may use different content of the predetermined process to be executed in steps S33 and S34 described above depending on the operation mode. For example, if the program is a game program (i.e., if a game application is executed), the information processing device 1 may use different game content depending on the operation mode. Specifically, levels that can be played may differ between the portable mode and the console mode, and there may be levels that can only be played in the portable mode or there may be levels that can only be played in the console mode. Also, the game mode may differ in the portable mode and in the console mode.

For example, if the screen display settings can be changed, the information processing device 1 may use different screen display settings for each operation mode. Note that the "screen display settings" refer, for example, to those settings that are directed to the size of icons on the menu screen and various information to be displayed together with images representing the game space (e.g., images representing the status of the player character, the map image, etc.). Therefore, in the portable mode, for example, since the images are displayed on the display 12 whose screen size is assumed to be small, graphical symbols such as icons are displayed to be larger with respect to the displayed images (in other words, the display screen), whereas in the console mode, since the images are displayed on the TV 6 whose screen size is assumed to be large, those graphical symbols may be displayed to be smaller with respect to the displayed images.

In step S35, the CPU 81 determines whether or not to end the series of information processes shown in FIG. 45. This determination is made based on whether or not there has been a user instruction to end, for example. If the determination result of step S35 is negative, the process of step S31 is executed again. Thereafter, the series of processes of steps S31 to S35 is repeatedly executed until it is determined in step S35 that the series of information processes is to be ended. On the other hand, if the determination result of step S35 is affirmative, the CPU 81 ends the series of information processes shown in FIG. 45.

As described above, in the present embodiment, the information processing device 1 may be configured so that the OS or an application may execute a different process depending on the operation mode. Then, for example, it is possible to give the user a different kind of entertainment (e.g., a different game level or a different game mode) for each operation mode. For example, it is possible to save the trouble for the user to change settings by automatically changing settings (e.g., the screen display settings) depending on the operation mode.

[4-5. Example of Executing Information Process Depending on Attached State of Controller]

As described above, in the present embodiment, the information processing device 1 can be used both in a state in which a controller is removed from the main unit 2 and a state in which they are attached to the main unit 2. Therefore, the information processing device 1 may be configured so that the content of information processes to be executed by various programs executed on the main unit 2 (e.g., the OS program and application programs) may be different from each other depending on the attached state of a controller to the main unit 2 (i.e., whether the controller is attached to or removed from the main unit 2). Examples of information processes depending on the attached state of a controller will now be described below.

Figure 46:
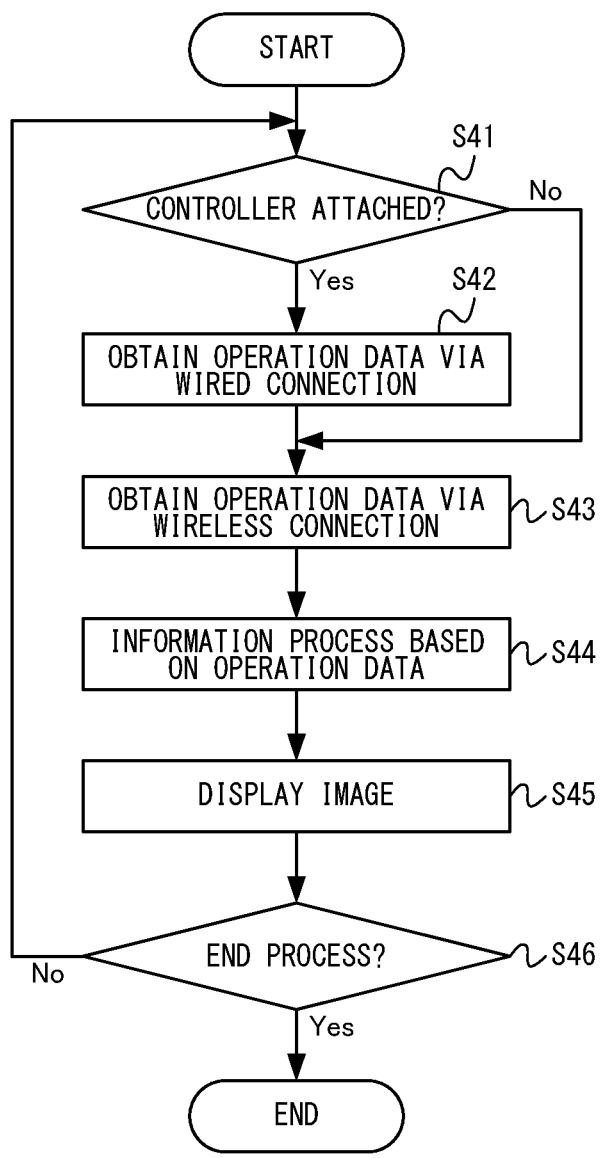
FIG. 46 is a flow chart showing an example flow of an information process executed on the main unit.

FIG. 46 is a flow chart showing an example flow of an information process executed on the main unit 2. As is the series of processes shown in FIG. 45, the series of information processes shown in FIG. 46 is executed by an application program or an OS program executable on the information processing device 1, for example. As is the series of processes shown in FIG. 45, the series of information processes shown in FIG. 46 is also started in response to a user instruction to launch an application program or in response to the power of the main unit 2 being turned ON.

In the series of information processes shown in FIG. 46, first, in step S41, the CPU 81 determines whether or not a controller is attached to the main unit 2. In the present embodiment, the CPU 81 determines whether or not a controller is attached to the main unit 2 for each of the left and right controllers 3 and 4. If it is determined that at least one of the left and right controllers 3 and 4 is attached to the main unit 2, the determination result of step S41 is affirmative. If the left and right controllers 3 and 4 are both removed from the main unit 2, the determination result of step S41 is negative. If the determination result of step S41 is affirmative, the process of step S42 is executed. On the other hand, if the determination result of step S41 is negative, the process of step S43 to be described later is executed.

In step S42, the CPU 81 obtains operation data from a controller attached to the main unit 2 via a wired connection. That is, the CPU 81 obtains operation data received via the left-side terminal 17 and the right-side terminal 21. Note that when only one of the left and right controllers 3 and 4 is attached, the CPU 81 obtains operation data only from the terminal corresponding to that controller. Note that the obtained operation data is stored in a predetermined storage section (e.g., the DRAM 85). Following step S42, the process of step S43 is executed.

In step S43, the CPU 81 obtains operation data from a controller removed from the main unit 2 via a wireless connection. That is, the CPU 81 obtains operation data received via the controller communication section 83. Note that if there are no controllers that are capable of wireless communication (in other words, controllers that are transmitting operation data to the main unit 2) at the point of step S43, the CPU 81 may skip the process of step S43 since no operation data is received by the controller communication section 83. Following step S43, the process of step S44 is executed.

In step S44, the CPU 81 executes a predetermined information process based on the operation data obtained in steps S42 and S43. Note that there is no particular limitation on the content of the information process. For example, if the running program is an OS program, the CPU 81 may move a cursor across the menu screen based on the operation data, or identify an application selected by a user based on the operation data to launch the identified application. If the running program is an application program, the CPU 81 may execute a process according to the application by using the operation data as an input to the application. Following step S44, the process of step S45 is executed.

In step S45, the CPU 81 outputs an image representing the result of the information process of step S44 to a display device (the display 12 or the TV 6). For example, if the running program is an OS program, the menu screen described above is displayed on the display device. For example, if the running program is an application program, an image of the application (e.g., a game image in the game application) is displayed on the display device. Following step S45, the process of step S46 is executed.

In step S46, the CPU 81 determines whether or not to end the series of information processes shown in FIG. 46. This determination is made based on whether or not there has been a user instruction to end, for example. If the determination result of step S46 is negative, the process of step S41 executed again. Thereafter, the series of processes of steps S41 to S46 is repeatedly executed until it is determined in step S46 that the series of information processes is to be ended. On the other hand, if the determination result of step S46 is affirmative, the CPU 81 ends the series of information processes shown in FIG. 46.

As described above, in the present embodiment, the main unit 2 varies the content of the process to be executed depending on the attached state of the controller. That is, if no controller is attached to the main unit 2, the main unit 2 skips the process of obtaining operation data via wired communication. Thus, it is possible to simplify the process to be executed on the main unit 2.

Note that in the series of processes shown in FIG. 46, the main unit 2 executes the process of obtaining operation data via wireless communication (step S43), irrespective of the attached state of the controller. Now, depending on the application executed on the main unit 2, if the determination result of step S41 is affirmative (i.e., if a controller is attached to the main unit 2), the process of step S43 does not need to be executed. That is, depending on the running application, if a controller is attached, the main unit 2 may receive operation data only from the controller attached thereto while not accepting operation data from the other, un-attached controller (via wireless communication).

Figure 47:
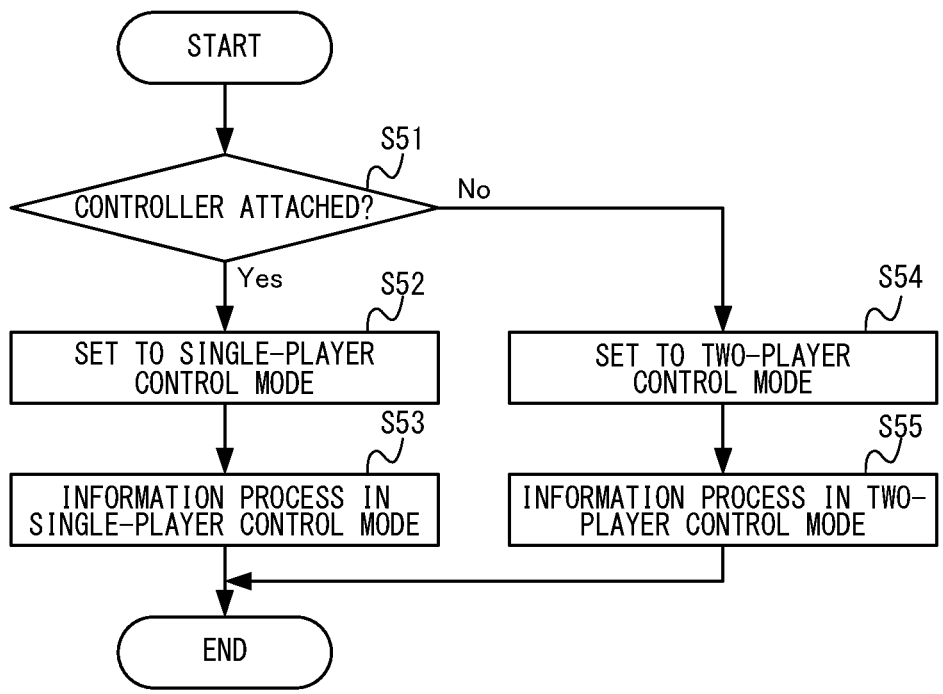
FIG. 47 is a flow chart showing an example flow of an information process executed on the main unit.

FIG. 47 is a flow chart showing an example flow of an information process executed on the main unit 2. As is the series of processes shown in FIG. 45, the series of information processes shown in FIG. 47 is executed by an application program or an OS program executable on the information processing device 1, for example. As is the series of processes shown in FIG. 45, the series of information processes shown in FIG. 47 is also started in response to a user instruction to launch an application program or in response to the power of the main unit 2 being turned ON.

In the series of information processes shown in FIG. 47, first, in step S51, the CPU 81 determines whether or not whether or not a controller is attached to the main unit 2. In the present embodiment, the CPU 81 determines whether the left and right controllers 3 and 4 are both attached to the main unit 2 or at least one of the left and right controllers 3 and 4 is removed from the main unit 2. Note however that in other embodiments, the CPU 81 may determine whether at least one of the left and right controllers 3 and 4 is attached to the main unit 2 or the left and right controllers 3 and 4 are both removed from the main unit 2. If the determination result of step S51 is affirmative, the process of step S52 is executed. On the other hand, if the determination result of step S51 is negative, the process of step S54 is executed.

In step S52, the CPU 81 sets the control mode of the information process to the single-player control mode. That is, if step S52 is executed, since a controller is attached to the main unit 2, it is assumed that a single user performs operations by using the attached controller. The single-player control mode is a mode in which there is one control object, for example. For example, in the game program, the CPU 81 starts a game in which there is one player character. In an application in which operations are performed by using a cursor displayed on the screen, the CPU 81 displays a cursor. Following step S52, the process of step S53 is executed.

In step S53, the CPU 81 executes a predetermined process in the single-player control mode. That is, the CPU 81 obtains operation data from the left and right controllers 3 and 4, and executes a predetermined process based on the operation data. Note that there is no particular limitation on the content of the predetermined process. Now, in the single-player control mode, one control object (e.g., one player character or one cursor) is controlled based on operation data obtained from two controllers 3 and 4. Note that in step S53, the predetermined process described above is repeatedly executed. When a condition for ending the predetermined process is satisfied (e.g., when there is a user instruction to end the application), the CPU 81 ends the process of step S53, thereby ending the series of information processes shown in FIG. 47.

On the other hand, in step S54, the CPU 81 sets the control mode of the information process to the two-player control mode. That is, if step S54 is executed, it means that (at least one) controller is removed from the main unit 2, and it is therefore assumed that a total of two users are performing operations, wherein one user uses the removed controller while the other user uses the other controller. The two-player control mode is a mode in which there are two control objects, for example. For example, in the game program, the CPU 81 starts a game in which there are two player characters. In an application in which operations are performed by using a cursor displayed on the screen, the CPU 81 displays two cursors. Following step S54, the process of step S55 is executed.

In step S55, the CPU 81 executes a predetermined process in the two-player control mode. That is, the CPU 81 obtains operation data from the left and right controllers 3 and 4, and executes a predetermined process based on the operation data. Note that there is no particular limitation on the content of the predetermined process. In the two-player control mode, a first control object (e.g., one player character or one cursor) is controlled based on operation data obtained from the left controller 3, and a second control object, different from the first control object, is controlled based on operation data obtained from the right controller 4. Note that in step S55, as in step S53, the predetermined process is repeatedly executed. When a condition for ending the predetermined process is satisfied (e.g., when there is a user instruction to end the application), the CPU 81 ends the process of step S55, thereby ending the series of information processes shown in FIG. 47.

As described above, in the present embodiment, when a program is launched, the attached state of controllers is sensed, and a control mode is set depending on the attached state (step S52, S54). Thus, an appropriate control mode is selected automatically without the user selecting the control mode, and it is therefore possible to save the trouble for the user.

Note that in FIG. 47, the main unit 2 determines the attached state of controllers at the start of the execution of a program (step S51). Now, in other embodiments, the main unit 2 may determine the attached state of controllers at a predetermined timing during the execution of a program. Then, in response to the attached state of controllers being changed, the main unit 2 may change the control mode. Note that there is no particular limitation on the predetermined timing. For example, when a game application is executed, the main unit 2 may determine the attached state of controllers at the point in time when one play of the game is complete, or may determine the attached state of controllers at the point in time when a predetermined instruction is given by a user.

In FIG. 47, the main unit 2 changes the number of users to perform operations depending on the attached state of controllers. There is no particular limitation on the content of the process to be changed depending on the attached state of controllers. For example, in other embodiments, the interpretation (specifically, the interpretation by the main unit 2) of an operation on a controller may be changed depending on the attached state of controllers. Specifically, when the left controller 3 is attached to the main unit 2, the CPU 81 may interpret the operation of tilting the analog stick 32 in the upper direction (i.e., in the y-axis direction shown in FIG. 1) as being an input of the upper direction. On the other hand, when the left controller 3 is removed from the main unit 2, the CPU 81 may interpret the operation of tilting the analog stick 32 in the upper direction as being an input of the left direction (assuming that the controller is held in a landscape position as shown in FIG. 35).

Note that each of the three series of processes shown in FIG. 45 to FIG. 47 may be executed in any phase on the main unit 2. That is, these three series of processes may each be executed in a different phase (i.e., in the execution of a different program). Two or three of these series of processes may be executed simultaneously (e.g., within a single program). For example, the main unit 2 may execute a process that combines together processes of FIG. 46 and FIG. 47 when a certain application is executed. Specifically, in steps S53 and S55 shown in FIG. 47, the CPU 81 may execute the predetermined process described above based on operation data obtained from the processes of steps S41 to S43 shown in FIG. 46.

[5. Other Devices Included in Information Processing System]

[5-1. Other Types of Controllers]

As described above, in the present embodiment, the controllers 3 and 4 can be attached and detached to and from the main unit 2. Therefore, there may be provided a left controller different from the left controller 3 shown in FIG. 5, and the other left controller may be attached to the main unit 2. Moreover, there may be provided a right controller different from the right controller 4 shown in FIG. 6, and the other right controller may be attached to the main unit 2. That is, in the present embodiment, controllers attached to the main unit 2 may be detached therefrom and other controllers may be attached thereto.

Figure 48:
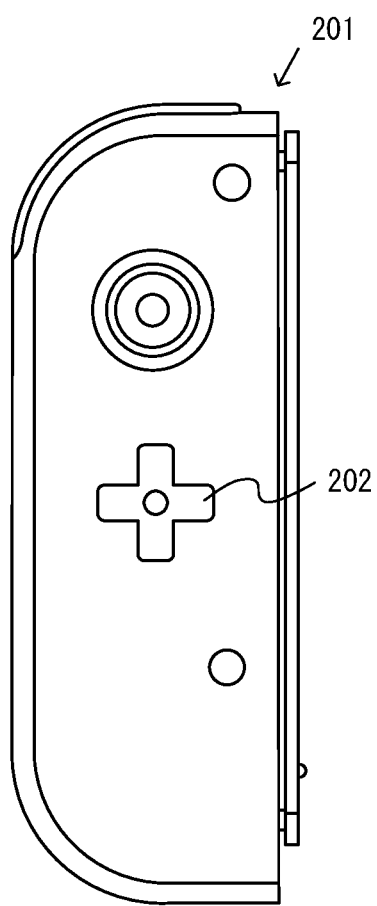
FIG. 48 is a diagram showing another non-limiting example left controller.
Figure 49:
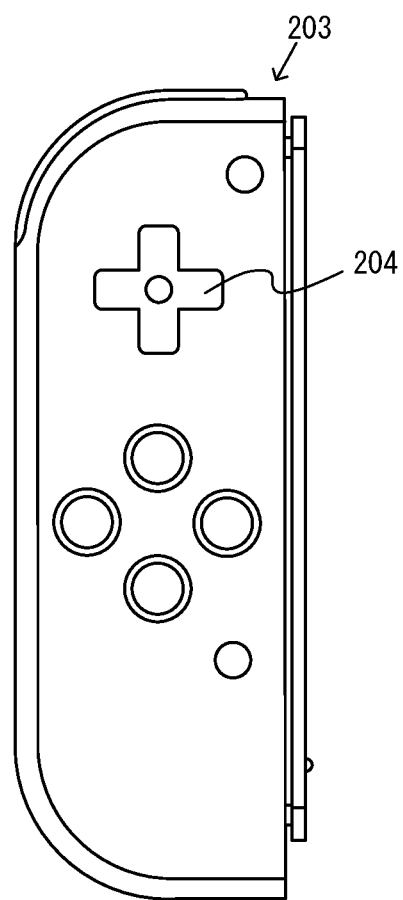
FIG. 49 is a diagram showing another non-limiting example left controller.

FIG. 48 and FIG. 49 are diagrams each showing another example left controller. A left controller 201 shown in FIG. 48, as compared with the left controller 3 shown in FIG. 5, includes a cross-shaped key 202, instead of the operation buttons 33 to 36. A left controller 203 shown in FIG. 49, as compared with the left controller 3 shown in FIG. 5, includes a cross-shaped key 204, instead of the analog stick 32. Thus, another controller may have a different function from the controllers 3 and 4 shown in FIG. 5 and FIG. 6. Thus, the information processing system may include other controllers having different functions from the controllers 3 and 4, in addition to (or instead of) the controllers 3 and 4.

Figure 50:
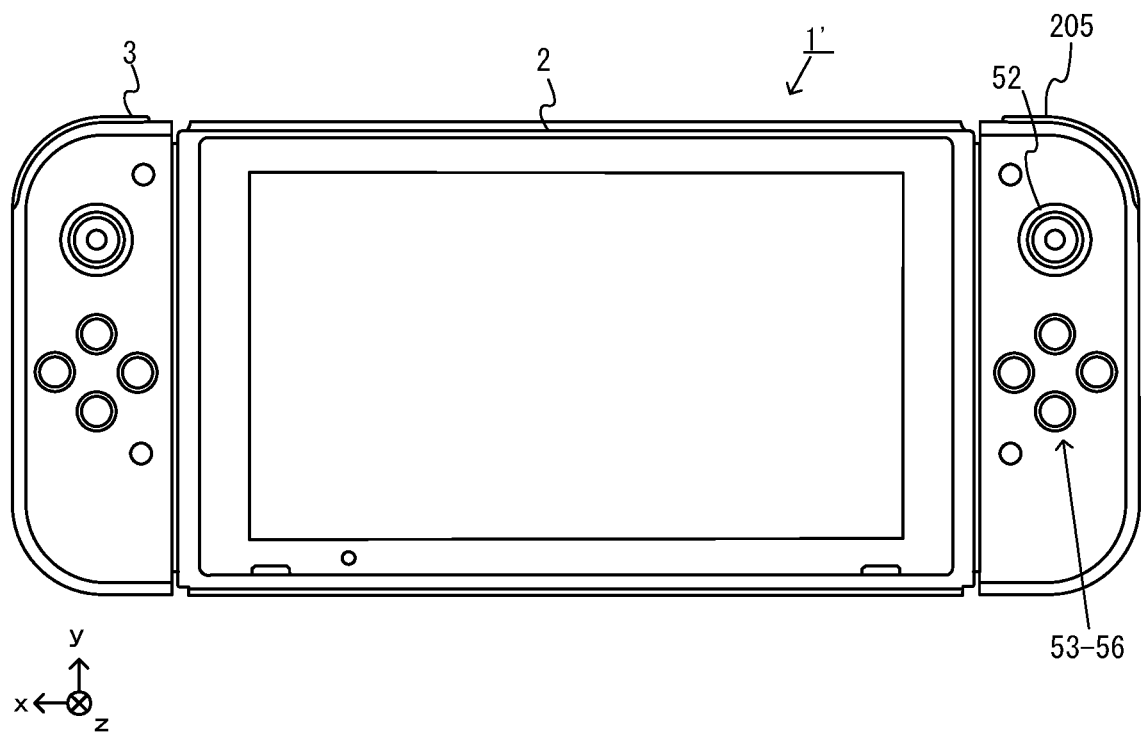
FIG. 50 is a diagram showing an example information processing device with a right controller different from that of FIG. 1 attached thereto.

FIG. 50 is a diagram showing an example information processing device with a right controller that is different from that of FIG. 1. In FIG. 50, another right controller 205, instead of the right controller 4 shown in FIG. 6, is attached to the main unit 2. On the right controller 205, as compared with the right controller 4 shown in FIG. 6, the arrangement of the analog stick 52 and the four operation buttons 53 to 56 is reversed. Thus, for an information processing device 1' shown in FIG. 50, the arrangement of the analog stick and the four operation buttons is symmetric between the left controller and the right controller. That is, in the present embodiment, the arrangement of the operation section on the information processing device 1 can be changed by changing the controller to be attached to the main unit 2. Thus, the information processing system may include other controllers having different arrangements from the controllers 3 and 4, in addition to (or instead of) the controllers 3 and 4.

Figure 51:
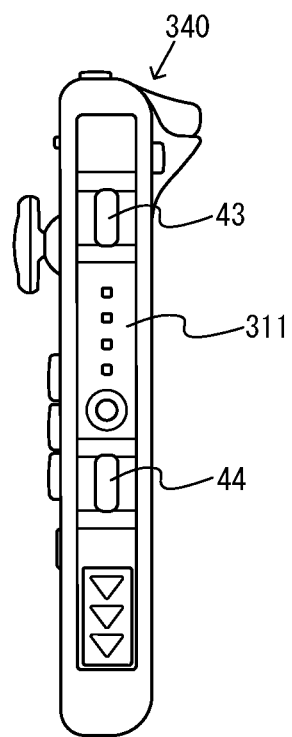
FIG. 51 is a diagram showing another example non-limiting left controller.

FIG. 51 is a diagram showing another example left controller. A left controller 340 shown in FIG. 51 is different from the left controller 3 of the first configuration example and that of the second configuration example in terms of the positions of the operation sections provided on the slider 311 (specifically, the second L button 43 and the second R button 44). Specifically, on the left controller 340, the second L button 43 and the second R button 44 are asymmetrically disposed toward the upper side (i.e., the y-axis positive direction side). According to the first configuration example and the second configuration example, the second L button 43 and the second R button 44 are arranged substantially in symmetry with respect to the center of the left controller 3 in the up-down direction. On the other hand, on the left controller 340, the second L button 43 is arranged on the upper side of the center of the left controller 340 in the up-down direction, and the second R button 44 is arranged on the lower side of the center. The distance from the center to the second L button 43 is longer than the distance from the center to the second R button 44.

On the left controller 340, the operation sections provided on the primary surface (specifically, the analog stick 32 and the operation buttons 33 to 36) are also disposed toward the upper side (this similarly applies also to the left controller 3). Thus, when the left controller 340, removed from the main unit 2, is held by both hands in a landscape position (see FIG. 35), a user operates the operation buttons 33 to 36 arranged near the center of the left controller 340 (in the up-down direction) using the right hand, and the analog stick 32 arranged near the upper end of the left controller 340 using the left hand (see FIG. 35). That is, a user operates the operation sections of the left controller 340, which are disposed toward the upper side (disposed toward the left side as seen from the user). Therefore, if the second L button 43 and the second R button 44 are disposed toward the upper side, as are the operation section on the primary surface, as shown in FIG. 51, the second L button 43 and the second R button 44 can be operated more easily. Thus, by arranging the second L button 43 and the second R button 44 as they are on the left controller 340, it is possible to improve the controllability when the controller is removed and used in a landscape position.

Note that although FIG. 51 shows the left controller 340 as an example, the second L button 65 and the second R button 66 of the right controller may also be disposed toward the upper side, as with the left controller 340.

As described above, in the present embodiment, there may be provided different types of controllers having different functions and/or arrangements. Then, a user can use any of the different kinds of controllers by attaching the controller to the main unit 2. Thus, it is possible to provide a portable device with which it is possible to change the controller device (i.e., the controller) in accordance with, for example, user preference or the content of the application to be executed on the information processing device 1.

[5-2. Accessory for Controllers]

Figure 52:
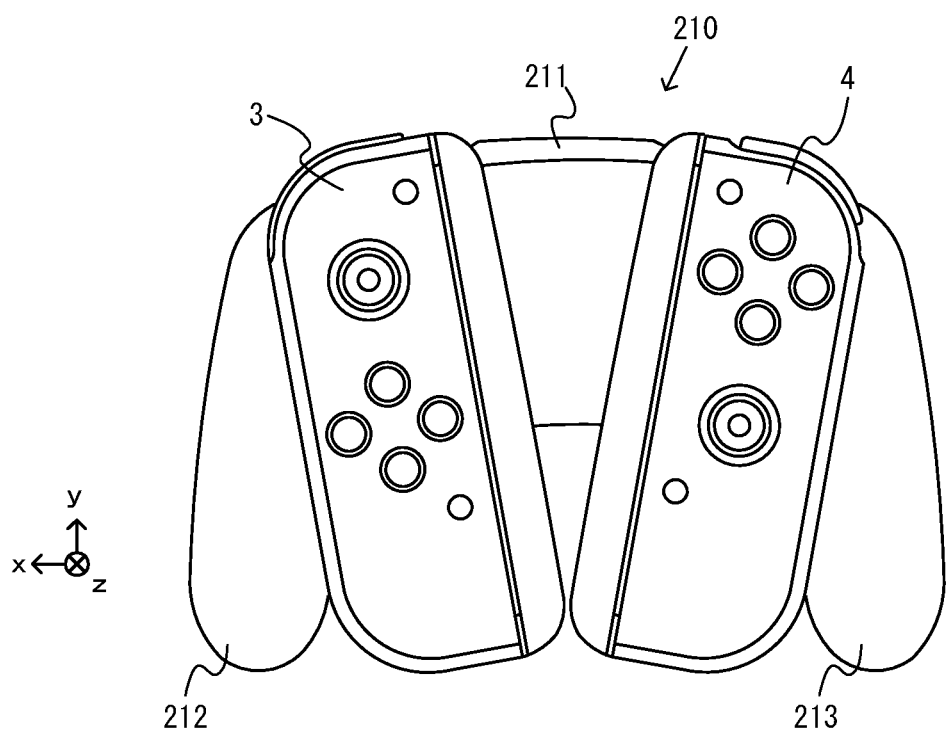
FIG. 52 is a diagram showing an example accessory to which controllers can be attached.

The information processing device 1 may include an accessory configured so that the controllers 3 and 4, having been removed from the main unit 2, can be attached to the accessory. FIG. 52 is a diagram showing an example accessory to which controllers can be attached. As shown in FIG. 52, an extension grip 210, which is an example accessory, is an accessory to be used by a user for performing operations. The extension grip 210 includes a housing 211. The left controller 3 can be attached to the housing 211, and the right controller 4 can be attached thereto. Therefore, the extension grip 210 allows a user to perform operations while holding two controllers 3 and 4, having been removed from the main unit 2, as an integral unit.

Note that as mechanisms for allowing controllers to be attached thereto, the extension grip 210 includes mechanisms similar to those of the main unit 2 (specifically, the left rail member 15, the engagement hole 16, the stopper 18, the right rail member 19, the engagement hole 20 and the stopper 22). Thus, the controllers 3 and 4 can be attached to the extension grip 210, as they are attached to the main unit 2.

As shown in FIG. 52, the extension grip 210 includes grip portions to be held by a user. Specifically, the extension grip 210 accommodates the left controller 3 attached thereto on the left side of the center of the extension grip 210 in the left-right direction (the x-axis direction shown in FIG. 52). The extension grip 210 includes a left grip portion 212 provided on the left side (in other words, on the outer side in the left-right direction) of the area where the left controller 3 is attached. The extension grip 210 accommodates the right controller 4 attached thereto on the right side of the extension grip 210 in the left-right direction. The extension grip 210 includes a right grip portion 213 provided on the right side (in other words, on the outer side in the left-right direction) of the area where the right controller 4 is attached. Therefore, by holding the grip portions 212 and 213, a user can easily operate the controllers 3 and 4 attached to the extension grip 210.

Although not shown in the figure, the extension grip 210 includes a left-side terminal similar to the left-side terminal 17 of the main unit 2 at such a location that allows the left-side terminal to be connected to the terminal 42 of the left controller 3 attached to the extension grip 210. The extension grip 210 also includes a right-side terminal similar to the right-side terminal 21 of the main unit 2 at such a location that allows the right-side terminal to be connected to the terminal 64 of the right controller 4 attached to the extension grip 210. Therefore, when the controllers 3 and 4 are attached to the extension grip 210, the extension grip 210 and the controllers 3 and 4 are electrically connected to each other. Therefore, when the controllers and the extension grip 210 are connected to each other, they can communicate with each other and can supply power to each other.

Moreover, although not shown in the figure, the extension grip 210 includes a power terminal similar to the power terminal 134 of the cradle 5. Therefore, by connecting to a charging device (not shown) (e.g., an AC adaptor) to the power terminal, the extension grip 210 can receive power supply from the charging device via the power terminal. Then, the power supplied from the power terminal is supplied by the extension grip 210 to the left controller 3 and the right controller 4 via the left-side terminal and the right-side terminal. Therefore, by connecting the extension grip 210 to a charging device, it is possible to charge the left controller 3 and the right controller 4 attached to the extension grip 210.

As described above, the extension grip 210 has the function of charging controllers attached thereto. That is, the extension grip 210 includes a charging control section (i.e., the power terminal, and the left-side terminal or the right-side terminal), which uses power supplied to the extension grip 210 to charge controllers attached to the extension grip 210. Then, controllers can be charged while being attached to the extension grip. This improves the usability of the controllers.

Note however that in other embodiments, the extension grip 210 does not have the charging function. Then, the extension grip 210 does not need to include electronic members such as terminals. By using no electronic members, it is possible to simplify the configuration of the extension grip 210.

When the controllers 3 and 4 are attached to the extension grip 210, the controllers 3 and 4 and the main unit 2 communicate with each other in wireless communication (as when the controllers 3 and 4 are removed from the main unit 2). That is, even when attached to the extension grip 210, the controllers 3 and 4 can communicate with the main unit 2.

Specifically, in the present embodiment, a controller transmits, to the main unit 2, attachment information regarding its attachment to another device. For example, when a controller is attached to another device, the attachment information indicates the device (and/or the type of the device) to which the controller is attached, and when a controller is not attached to another device, the attachment information indicates that the controller is not attached to another device. The attachment information may be transmitted together with the operation data (or while being included in the operation data), for example.

Thus, when a controller senses the attachment of the controller to the extension grip 210, the controller transmits, to the main unit 2 via wireless communication, a notification indicating that the controller has been attached to the extension grip 210. Specifically, the controller transmits, to the main unit 2, the attachment information indicating that the controller is attached to the extension grip 210.

Note that there is no particular limitation on the method for a controller to identify the device to which the controller is attached. In the present embodiment, in response to a controller being attached to another device, the controller obtains identification information identifying the other device from the other device (herein, the extension grip 210). The identification information is, for example, identification information assigned to each device (more specifically, identification information unique to the device). Note that in the present embodiment, the identification information includes information indicating the type of the device so that it is possible to identify the type of the device from the identification information. Based on the identification information, a controller determines (or senses) that the device to which the controller has been attached is the extension grip 210, i.e., that the device has been attached to the extension grip 210. Note that when a controller is removed from the extension grip 210, the controller transmits, to the main unit 2 via wireless communication, a notification indicating that the controller has been removed from the extension grip 210. That is, the controller transmits, to the main unit 2, the attachment information indicating that the controller is not attached to another device.

Now, the main unit 2 may change the interpretation of operations performed on a controller depending on the device to which the controller is attached. That is, the main unit 2 may change the method of identifying the content of input (in other words, the content of a user instruction) based on the operation data from a controller depending on the device to which the controller is attached. For example, in the example shown in FIG. 52, the left and right controllers 3 and 4 are attached to the extension grip 210 while being slightly inclined with respect to the up-down direction. Therefore, when the analog stick is tilted in the directly upward direction with respect to the extension grip 210 (the y-axis positive direction shown in FIG. 52), the tilt is not in the directly upward direction with respect to the controller. Therefore, when a controller is attached to the extension grip 210, the main unit 2 preferably changes the interpretation of directional inputs on the analog stick, as compared with a case in which the controller is not attached to the extension grip 210 (e.g., when the controller is attached to the main unit 2). For example, the main unit 2 may change the direction of tilt of the analog stick that is interpreted as being an input in the directly upward direction.

Thus, when a controller is attached to the extension grip 210, the main unit 2 changes the interpretation of a directional input on the analog stick, as compared with a case in which the controller is attached to the main unit 2. Specifically, when a controller is attached to the extension grip 210, the main unit 2 modifies the tilt direction of the analog stick represented by the operation data by rotating the tilt direction by a predetermined angle. Note that the predetermined angle is, for example, the angle of inclination of the controller attached to the extension grip 210 with respect to the attitude of the controller when attached to the main unit 2. The predetermined angle may be preset based on the structure of the extension grip 210. The main unit 2 uses the modified tilt direction as the direction input by a user. That is, the main unit 2 executes an information process using the modified tilt direction as an input. Thus, when an analog stick is tilted in the directly upward direction with respect to the extension grip 210, the input direction is regarded as being the directly upward direction, thus allowing an information process to be executed appropriately.

When a controller is attached to the extension grip 210, the main unit 2 modifies the values of the detection results of the acceleration sensor and the angular velocity sensor of the controller. That is, the main unit 2 modifies the detection result of the acceleration sensor by rotating the direction of acceleration (i.e., the detection result of the acceleration sensor) by the above predetermined angle in a rotational direction about an axis extending in the front-rear direction of the controller (the z-axis direction shown in FIG. 1). The main unit 2 modifies the detection result of the angular velocity sensor by rotating the axis of rotation of the angular velocity (i.e., the detection result of the angular velocity sensor) by the above predetermined angle in a rotational direction about an axis extending in the front-rear direction of the controller (the z-axis direction shown in FIG. 1). Then, the main unit 2 calculates the movement and/or the attitude of the controller (in other words, the extension grip 210) based on the modified values of the acceleration and/or the angular velocity.

Note that the main unit 2 may calculate the movement and/or the attitude of the controller without modifying the values of the detection results of the acceleration sensor and the angular velocity sensor, and modify the calculated movement and/or the calculated attitude. That is, when the main unit 2 calculates the movement based on the detection results of the acceleration sensor and/or the angular velocity sensor, the main unit 2 modifies the calculated movement by rotating the calculated movement direction by the above predetermined angle in a rotational direction about an axis extending in the front-rear direction of the controller. When the main unit 2 calculates the attitude based on the detection results of the acceleration sensor and/or the angular velocity sensor, the main unit 2 modifies the calculated attitude by rotating the calculated attitude by a predetermined angle in a rotational direction about an axis extending in the front-rear direction of the controller.

As described above, in the present embodiment, the left controller 3 is attached to the extension grip 210 while being inclined in the first direction from a predetermined reference attitude (i.e., the attitude in which the up-down direction of the left controller 3 coincides with the up-down direction of the extension grip 210; or the attitude when the left controller 3 is attached to the main unit 2) (see FIG. 52). The right controller 4 is attached to the extension grip 210 while being inclined in a direction opposite to the first direction from a predetermined reference attitude (i.e., the attitude in which the up-down direction of the right controller 4 coincides with the up-down direction of the extension grip 210). Thus, controllers can be attached to the accessory with an easy-to-operate inclination.

In the present embodiment, when at least one of the left controller 3 and the right controller 4 is attached to the extension grip 210, the main unit 2 executes a predetermined information process by modifying the operation data from the attached controller and/or information obtained from the operation data. For example, the main unit 2 performs a modifying process for modifying the inclination of the controller with respect to the predetermined reference attitude. More specifically, the main unit 2 performs a modifying process so that the result of the information process when a predetermined operation is performed on a controller attached to the extension grip 210 is generally equal to that when the predetermined operation is performed on the controller being in the predetermined reference attitude. Thus, since a user can similarly operate a controller whether the controller is attached to an accessory while being inclined from the predetermined reference attitude or the controller is not attached to the accessory (or attached to the main unit 2), thereby improving the controllability of a controller attached to an accessory.

Moreover, in the present embodiment, the main unit 2 modifies a part of the operation data representing an operation performed on a directional input section (i.e., an analog stick). Thus, the analog stick can be operated in a similar fashion whether the controller is attached to the accessory while being inclined from the predetermined reference attitude or the controller is not attached to the accessory (or attached to the main unit 2).

In the present embodiment, also when the left and right controllers 3 and 4 are both attached to the extension grip 210, as when the left and right controllers 3 and 4 are both attached to the main unit 2, these two controllers are registered as a pair. Specifically, if one of the left and right controllers has been attached to the extension grip 210, when an indication that the other controller is attached to the extension grip 210 is received, the main unit 2 registers these two controllers as a pair. Then, a user can register two controllers as a pair by attaching them to the extension grip 210, as well as by attaching them to the main unit 2.

Note that in other embodiments, the extension grip 210 may include a communication section capable of communicating with the main unit 2 in wireless communication. Then, the extension grip 210 may obtain operation data from the controllers 3 and 4 attached to the extension grip 210, and transmit the obtained operation data to the main unit 2 via the communication section.

Note that the main unit 2 may communicate with devices that cannot be attached to the main unit 2 (e.g., the extension grip 210) in wireless communication, as well as communicating with controllers that can be attached to the main unit 2 in wireless communication. For example, the main unit 2 may receive via wireless communication operation data from a controller device that cannot be attached to the main unit 2, and execute an information process based on the operation data. Then, operations can be performed on the main unit 2 by using a wider variety of controller devices.

The extension grip 210 may include an operation section (e.g., buttons and an analog stick, etc.). Then, the extension grip 210 allows for a wider variety of operations using controllers. Note that information representing an operation performed on the operation section may be obtained by a controller attached to the extension grip 210 (if there are a plurality of controllers attached to the extension grip 210, one of the controllers), and transmitted from the controller to the main unit 2. Such information may be transmitted together with (or being included in) operation data of the controller. If the extension grip 210 includes a communication section capable of communicating with the main unit 2 in wireless communication, information representing an operation performed on the operation section may be transmitted directly from the extension grip 210 to the main unit 2 (i.e., without passing through a controller).

Figure 53:
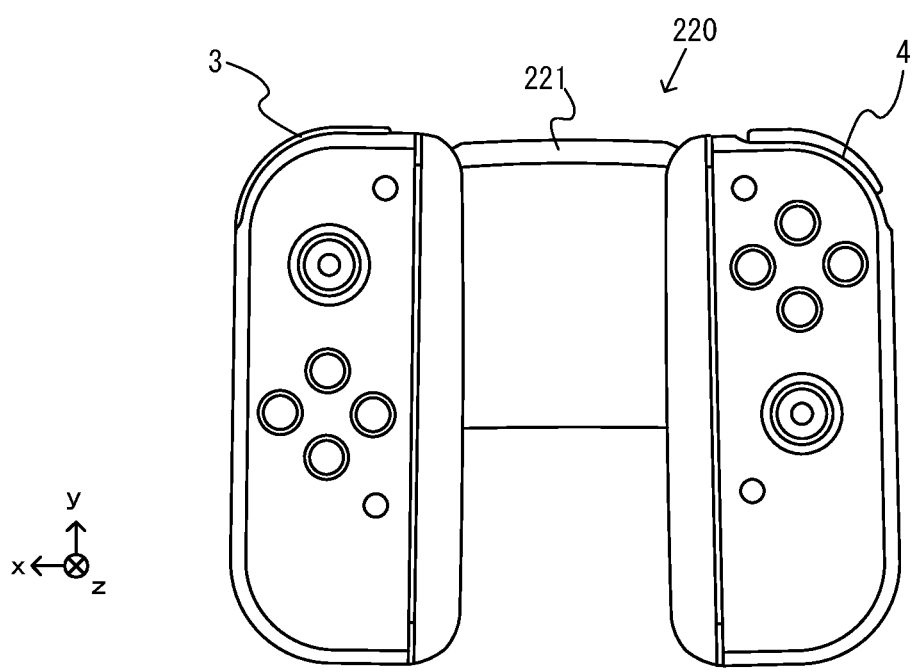
FIG. 53 is a diagram showing another example accessory.

Note that an accessory controller device such as the extension grip described above may be configured without grip portions. Then, the accessory controller device may be configured so that the housings of the controllers are used as grip portions. FIG. 53 is a diagram showing another example accessory controller device. In FIG. 53, an attachment 220 includes a housing 221 to which the left controller 3 and the right controller 4 can be attached, as with the extension grip 210 shown in FIG. 52. Note that the attachment 220 has similar mechanisms to those of the extension grip 210 for allowing controllers to be attached thereto.

The attachment 220 shown in FIG. 53 includes no grip portion. Therefore, a user holds the left controller 3 and the right controller 4 attached to the attachment 220. This also enables the user to hold the two controllers 3 and 4 removed from the main unit 2 as an integral unit.

Figure 54:
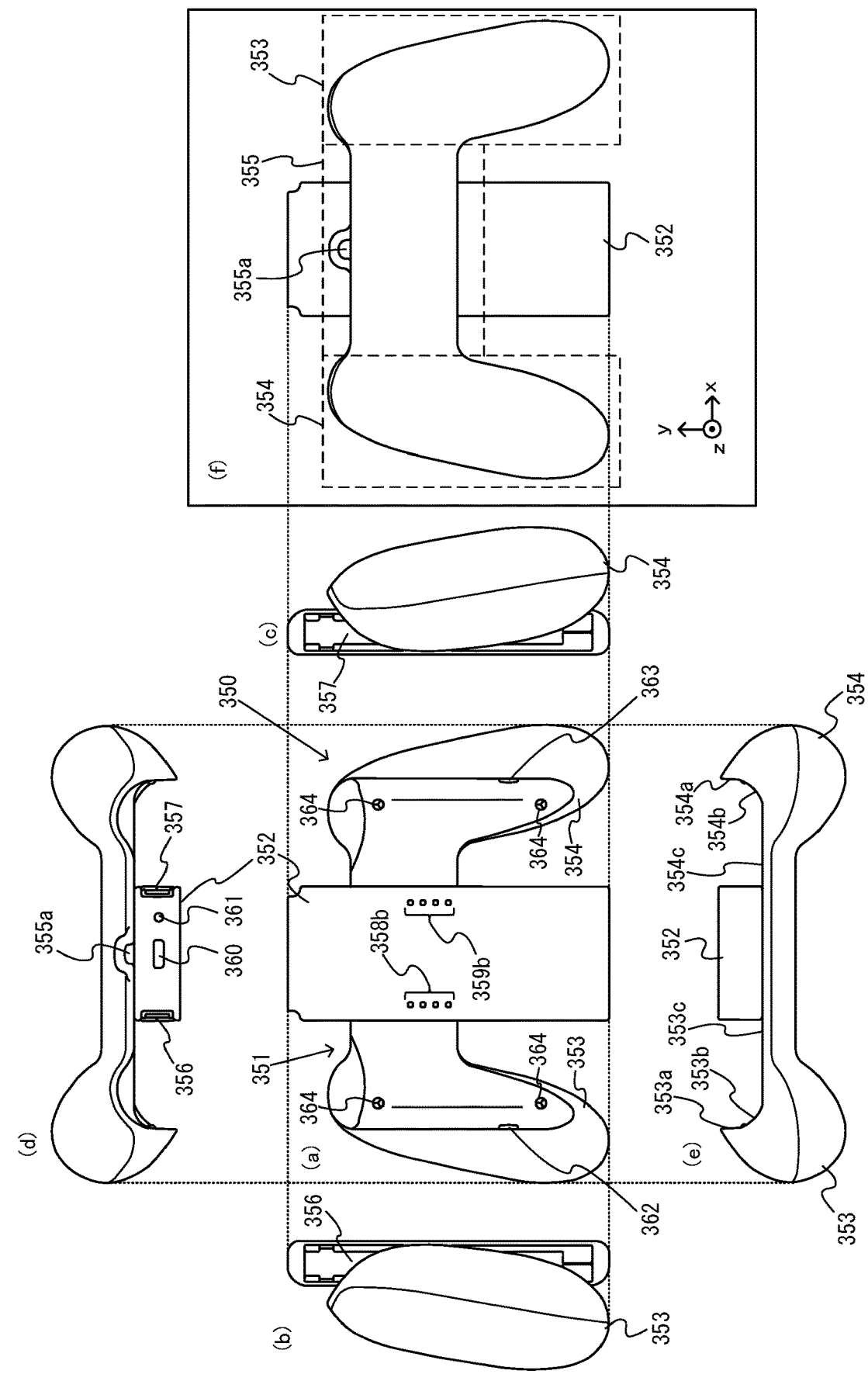
FIG. 54 is a six-sided view showing another non-limiting example extension grip.
Figure 55:
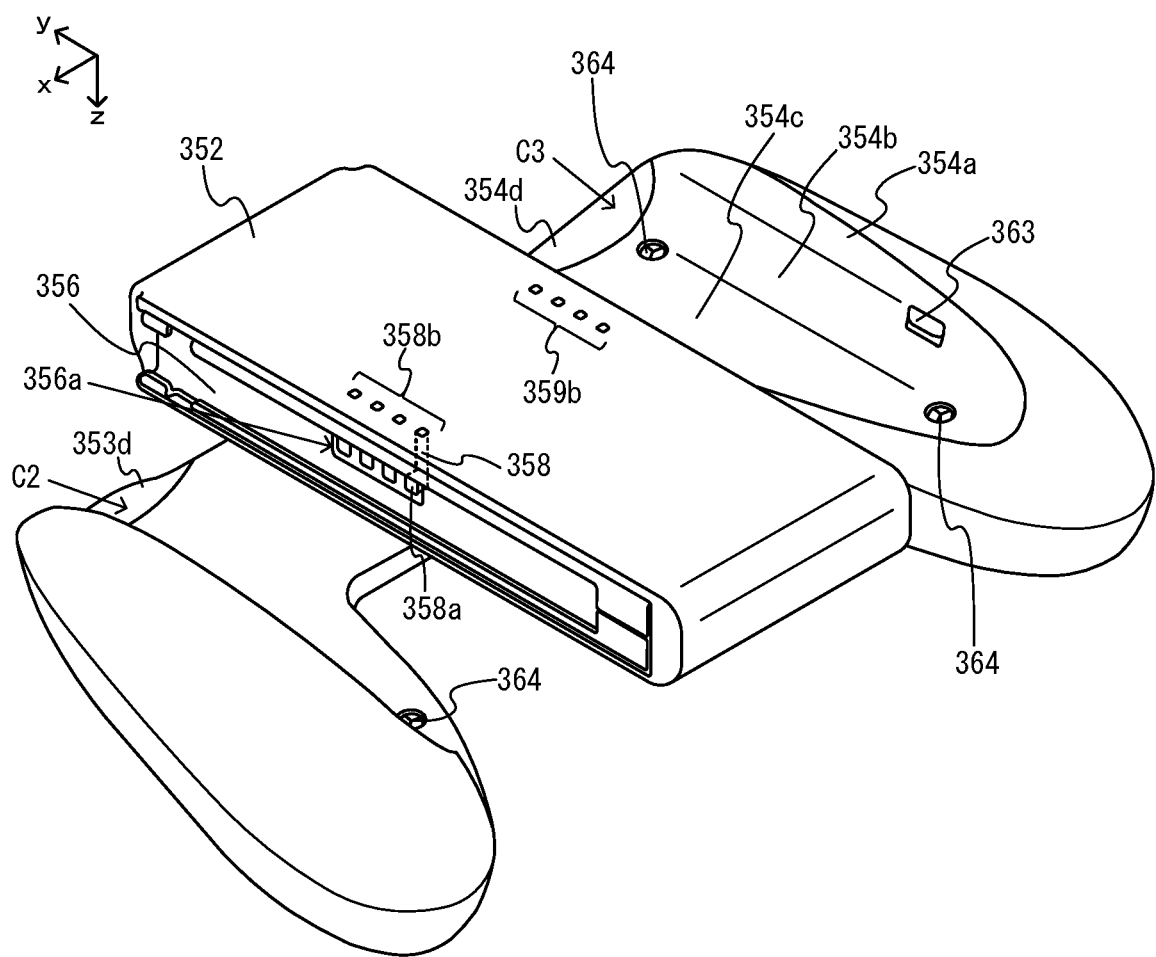
FIG. 55 is a perspective view showing an example of the extension grip shown in FIG. 54.

FIG. 54 is a six-sided view showing another example extension grip. FIG. 55 is a perspective view showing an example of the extension grip shown in FIG. 54. As is the extension grip 210 shown in FIG. 52, an extension grip 350 shown in FIG. 54 is an extension device that allows the controllers 3 and 4, removed from the main unit 2, to be operated while being attached thereto. Note that the extension grip 350 can be said to be a supporting device for supporting controllers. Referring now to FIG. 54 to FIG. 59, the extension grip 350 will be described, focusing on what was not discussed in conjunction with the extension grip 210.

(General Configuration of Extension Grip 350)

As shown in FIG. 54, the extension grip 350 includes a main section 351 and a support section 352. The main section 351 includes a left grip portion 353 to be held by a user using the left hand, and a right grip portion 354 to be held by the user using the right hand. Therefore, the main section 351 can be said to be a holding portion. The main section 351 includes a connection portion 355.

The connection portion 355 connects between the left grip portion 353 and the right grip portion 354. The connection portion 355 is a member extending in the horizontal direction (i.e., the x-axis direction shown in FIG. 54), for example, with the left grip portion 353 provided at the left end portion of the connection portion 355 and the right grip portion 354 provided at the right end portion of the connection portion 355. The left grip portion 353 has a shape extending in the up-down direction (i.e., the y-axis direction shown in FIG. 54). As does the left grip portion 353, the right grip portion 354 has a shape extending in the up-down direction. Note that strictly speaking, the left grip portion 353 and the right grip portion 354 are slightly inclined from the up-down direction. Specifically, the left grip portion 353 and the right grip portion 354 each extend downward from the connection portion 355 while gradually moving away from the connection portion 355. By shaping the grip portions 353 and 354 as described above, a user can comfortably hold the grip portions 353 and 354 and comfortably operate the controllers 3 and 4 attached to the extension grip 350.

As shown in FIG. 55, the left grip portion 353 and the right grip portion 354 each extend downward from where they are connected to the connection portion 355. The lower end (i.e., the end on the y-axis negative direction side) of the connection portion 355 is located on the upper side of the lower end of the left grip portion 353 and the right grip portion 354. More specifically, the lower end of the connection portion 355 is located on the upper side of the center of the grip portions 353 and 354 in the up-down direction. Then, a user can securely hold the grip portions 353 and 354 while wrapping fingers around the grip portions 353 and 354 beneath the connection portion 355. Therefore, it is possible to improve the controllability of the extension grip 350.

In the present embodiment, the main section 351 is formed by one housing (in other words, a housing formed as an integral unit). In the present embodiment, the housing of the main section 351 is formed by a resin. Note that in other embodiments, the main section 351 may include a plurality of housings (e.g., one housing for each of the portions 353 to 355) that are connected together.

The support section 352 is a member for supporting the controllers 3 and 4. As shown in FIG. 54 and FIG. 55, the support section 352 is connected to the main section 351 (specifically, the connection portion 355 of the main section 351). The support section 352 (in other words, the housing of the support section 352) has a generally rectangular parallelepiped outer shape, and the reverse surface (i.e., the surface on the z-axis positive direction side) thereof is connected to the front surface of the connection portion 355 (i.e., the surface on the z-axis negative direction side). Note that in the present embodiment, the housing of the support section 352 is formed by a resin.

As described above, the extension grip 350 includes the main section 351 and the support section 352 connected together. That is, in the extension grip 350, the housing of the main section 351 and the housing of the support section 352 are formed separately, and these housings are connected together. Note that the support section 352 may be movably connected to the main section 351 (FIG. 58), the details of which will be described later. In other embodiments, the main section 351 and the support section 352 may be formed as an integral unit. For example, the main section 351 and the support section 352 may be formed by a single housing.

As shown in the lower side view of FIG. 54 ((e) of FIG. 54) and FIG. 55, the lower end portion of the main section 351 and the lower end portions of the grip portions 353 and 354 are provided at different positions in the front-rear direction (i.e., the z-axis direction) in the present embodiment. These lower end portions a provided at substantially the same position in the up-down direction (i.e., the y-axis direction). Therefore, the extension grip 350 can stand by itself while the lower end portion of the main section 351 and the lower end portions of the grip portions 353 and 354 are in contact with the floor surface. Thus, a user can place the extension grip 350 (and the controllers attached to the extension grip 350) upright, and can therefore place the extension grip 350 without taking up a large space.

As shown in the back view of FIG. 54 ((f) of FIG. 54), a hole 355a is formed in the connection portion 355 of the main section 351. The hole 355a is formed for a thread, such as a strap, or the like, to pass therethrough. There is no particular limitation on the position of the hole 355a. In the present embodiment, it is formed at a position on the back side (i.e., the z-axis positive direction side) of the support section 352.

(Elements Regarding Attachment of Controller)

Next, elements allowing controllers to be attached to the extension grip 350 will be described. The extension grip 350 can allow the left controller 3 and the right controller 4 of the second configuration example described above to be attached thereto at the same time. Specifically, the extension grip 350 includes a left rail member 356 and a right rail member 357.

As shown in the left side view of FIG. 54 ((b) of FIG. 54), the left rail member 356 is provided so as to extend in the up-down direction (i.e., the y-axis direction) on the left side surface (i.e., the surface on the x-axis positive direction side) of the support section 352. As a mechanism for the attachment of the left controller 3, the left rail member 356 includes the same mechanism as the left rail member 300 of the main unit 2 of the second configuration example described above. That is, the left rail member 356 includes the same components as the bottom surface portion 301, the side surface portion 302, the top surface portion 303 and the facing portion 304 of the left rail member 300 of the main unit 2. Therefore, the left rail member 356 can slidably engage with the slider 311 of the left controller 3. With the facing portion of the left rail member 356, it is possible to limit the slide movement of the slider 311 of the left controller 3. Therefore, a user can attach the left controller 3 to the extension grip 350 in a similar manner to that when the left controller 3 is attached to the main unit 2.

As with the left rail member 300 of the main unit 2, the left rail member 356 includes a stop-receiving portion (in other words, the cut-out portion C1 shown in FIG. 9), and when the left controller 3 is attached to the extension grip 350, the stop member 319 of the slider 311 of the left controller 3 engages with the stop-receiving portion of the left rail member 356. That is, the stop member 319 resists the slide movement of the slider 311 in the removal direction. Thus, the left controller 3 can be engaged with (in other words, locked to) the extension grip 350.

As does the left rail member 300 of the main unit 2, the left rail member 356 includes terminals (left-side terminals 367 to be described later). Although not shown in the figure, as with the left rail member 300 of the main unit 2, the left-side terminals 367 are provided on the facing surface of the facing portion. Therefore, when the left controller 3 is attached to the extension grip 350, the left-side terminals 367 are electrically connected to the terminals 42 of the left controller 3. Thus, the left controller 3 can be charged by the extension grip 350, the details of which will be described later.

Note that the left rail member 356 of the extension grip 350 is different from the left rail member 300 of the main unit 2 in terms of the following two points. First, a leaf spring, like the leaf spring 305 on the left rail member 300 of the main unit 2, is absent on the bottom surface portion of the left rail member 356 of the extension grip 350 (for the reason to be described later). Second, as shown in FIG. 55, a hole 356a is formed on the bottom surface portion of the left rail member 356 of the extension grip 350 at a position where light-receiving surfaces 358a of lightguide members 358 are provided on the left side surface of the housing of the support section 352. The hole 356a is formed so that the light-receiving surfaces 358a of the lightguide members 358 are exposed on the left side surface of the support section 352, the details of which will be described later.

As shown in the right side view of FIG. 54 ((c) of FIG. 54), the right rail member 357 is provided so as to extend in the up-down direction (i.e., the y-axis direction) on the right side surface (i.e., the surface on the x-axis negative direction side) of the support section 352. As a mechanism for the attachment of the right controller 4, the right rail member 357 includes the same mechanism as the right rail member of the main unit 2 of the second configuration example described above. Therefore, the right rail member 357 can slidably engage with the slider 331 of the right controller 4. With the facing portion of the right rail member 357, it is possible to limit the slide movement of the slider 331 of the right controller 4. Moreover, with the stop-receiving portion of the right rail member 357, the right controller 4 can be engaged with (in other words, locked to) the extension grip 350. Moreover, as does the right rail member of the main unit 2, the right rail member 357 includes terminals (right-side terminals 368 to be described later), and when the right controller 4 is attached to the extension grip 350, the right-side terminals 368 are electrically connected to terminals 64 of the right controller 4.

The configuration of the right rail member 357 is the same as the configuration of the left rail member 356. Each of the rail members 356 and 357 has a shape that is in symmetry with respect to an axis extending parallel to the up-down direction (i.e., the y axis). Therefore, with the extension grip 350, the same member can be used for the left rail member 356 and for the right rail member 357, thereby improving the efficiency of the production. Note that in other embodiments, the right rail member 357 does not need to have the same configuration as that of the left rail member 356. For example, the stop-receiving portion may be provided only on one of the two top surface portions for the left rail member 356 and the right rail member 357, and the stop-receiving portions may be provided at different positions for the left rail member 356 and for the right rail member 357 (specifically, positions opposite to each other).

Figure 56:
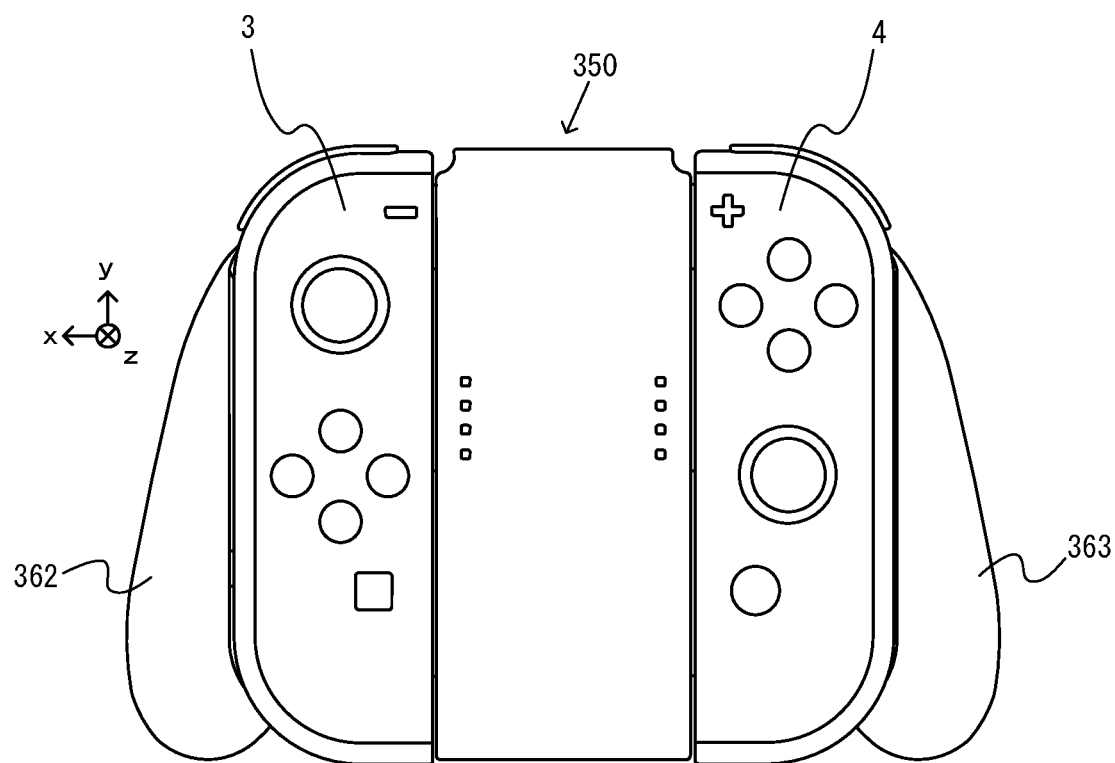
FIG. 56 is a diagram showing an example where two controllers are attached to the extension grip shown in FIG. 54.

As shown in FIG. 54, the slide direction of the left rail member 356 and the slide direction of the right rail member 357 are substantially parallel to each other. FIG. 56 is a diagram showing an example in which two controllers are attached to the extension grip 350. Since the slide directions of the two rail members 356 and 357 are parallel to each other, the controllers 3 and 4 attached to the extension grip 350 are supported by the extension grip 350 in the same direction, as shown in FIG. 56.

The left rail member 356 and the right rail member 357 are both configured so that the slider of the controller can be inserted from the upper side (i.e., the y-axis direction side). That is, in the support section 352, the facing portion of the left rail member 356 and the facing portion of the right rail member 357 are provided at the same lower end (see the left side view and the right side view of FIG. 54). Therefore, a user can attach the left controller 3 and the right controller 4 in the same direction, and it is therefore possible to improve the usability of the extension grip 350.

Note that the left rail member 356 and the right rail member 357 are formed by a metal, as the rail member of the main unit 2. On the other hand, the housing of the support section 352 is formed by a resin. That is, a resin is used for members that define the outer shape (in other words, the surface) of the support section 352, except for rail members.

As shown in FIG. 54, the main section 351 (more specifically, the connection portion 355) has a left support surface on the left side of the support section 352. The left support surface includes a first surface 353a, a second surface 353b, a third surface 353c and a fourth surface 353d. The first surface 353a is provided on the right side of the left end of the left grip portion 353. The first surface 353a is formed to be continuous with the second surface 353b, and the second surface 353b is formed to be continuous with the third surface 353c. Note that the second surface 353b extends rightward from the first surface 353a, and the third surface 353c extends rightward from the second surface 353b. The left support surface is a surface provided in conformity with the side surface and the reverse surface of the left controller 3 attached to the extension grip 350. Note that the left support surface does not need to support the left controller 3 attached to the extension grip 350 in the strict sense. That is, the left support surface may only extend along the main section 310 of the left controller 3 without being in contact with the left controller 3 attached to the extension grip 350.

The first surface 353a of the left support surface is provided so as to face the bottom surface of the left rail member 356 (in other words, the left side surface of the support section 352). In other words, the first surface 353a is formed substantially parallel to the bottom surface of the left rail member 356. The first surface 353a is provided along the left side surface of the left controller 3 attached to the extension grip 350. The first surface 353a is provided on the left side (i.e., the x-axis positive direction side) of the left side surface of the left controller 3 attached to the extension grip 350.

The controllers 3 and 4 in the second configuration example are rounded in an area over a side surface (that is opposite from the side surface where the slider is provided) and the reverse surface (FIG. 14 and FIG. 25). That is, the side surface on the opposite side and the reverse surface are connected together by a connecting surface that is a curved surface. The second surface 353b of the left support surface is provided along the connecting surface of the left controller 3 attached to the extension grip 350. The second surface 353b is provided on the left side (this can be said to be the rear side (i.e., the z-axis positive direction side) or the rear-left side) of the connecting surface of the left controller 3 attached to the extension grip 350. The third surface 353c of the left support surface is provided along the reverse surface of the left controller 3 attached to the extension grip 350. The third surface 353c is provided on the rear side of the reverse surface of the left controller 3 attached to the extension grip 350.

By providing the left support surface as described above, there is no large gap between the left controller 3 and the left grip portion 353 when the left controller 3 is attached to the extension grip 350 (see FIG. 56). Then, a user can hold the extension grip 350 and the controllers attached thereto as if they were a single controller. In other words, a user can hold the controllers as if the user were holding grip portions directly connected to the controllers. Then, it is possible to provide an extension grip allowing controllers to be used with a good controllability.

As shown in FIG. 55, a cut-out portion C2 is formed at the upper end portion of the left support surface of the main section 351. In other words, the cut-out portion C2 is formed at the upper end portion of a surface that is defined by the first surface 353a to the third surface 353c. The cut-out portion C2 is formed so as to avoid the projection portion 314 provided on the reverse surface of the left controller 3 attached to the extension grip 350 (in other words, the ZL button 39 provided on the projection portion 314). Specifically, the upper end portion of the surface that is defined by the first surface 353a to the third surface 353c is formed so as to avoid the projection portion 314 provided on the reverse surface of the left controller 3 attached to the extension grip 350. The first surface 353a to the third surface 353c of the left support surface are formed so that the position of the projection portion 314 of the left controller 3 attached to the extension grip 350 is the position of the upper side of these surfaces.

By forming the cut-out portion C2 in the main section 351 as described above, the left controller 3 with operation sections provided on the reverse surface can be attached to the extension grip 350. With the left controller 3 attached to the extension grip 350, a user can operate operation sections (e.g., the ZL button 39) provided on the reverse surface of the left controller 3. Moreover, if the boundary portion between the cut-out portion C2 and the third surface 353c (in other words, the connecting portion between the fourth surface 353d and the third surface 353c) is in contact with the projection portion 314, the projection portion 314 of the left controller 3 can be supported by the boundary portion. That is, when the left controller 3 is attached to the extension grip 350, the boundary portion can support the projection portion 314 from below. Thus, it is possible to more firmly connect together the left controller 3 and the extension grip 350.

The fourth surface 353d of the left support surface is provided so as to extend toward the distal end (i.e., the z-axis positive direction side) from the upper side of the surface that is defined by the first surface 353a to the third surface 353c. In other words, the fourth surface 353d of the left support surface is connected to the upper side of the surface that is defined by the first surface 353a to the third surface 353c, and is provided to be sunken from the surface. Thus, the fourth surface 353d is provided along the projection portion 314 of the left controller 3 attached to the extension grip 350. Then, with the left controller 3 attached to the extension grip 350, there is no large gap between the projection portion 314 of the left controller 3 and the left grip portion 353. Then, it is possible to reduce the awkwardness to be felt by a user when operating the ZL button 39 provided on the projection portion 314, and it is possible to further improve the controllability of the controller 3 attached to the extension grip 350.

As shown in FIG. 54, an elastic member 362 is provided on the first surface 353a of the left support surface. The elastic member 362 is provided so as to protrude from the first surface 353a. The elastic member 362 is formed by a rubber, for example. With the left controller 3 attached to the extension grip 350, the left controller 3 is pressed (in other words, biased) by the elastic member 362 toward the support section 352 (in other words, toward the inside of the extension grip 350). Then, it is possible to reduce the looseness between the extension grip 350 and the left controller 3, and it is possible to more firmly connect the left controller 3 to the extension grip 350. It is also possible to reduce the chattering produced when the left controller 3 is vibrated by the vibrator 107.

As shown in the front view of FIG. 54 ((a) of FIG. 54), the elastic member 362 is provided on the lower side (i.e., the y-axis negative direction side) of the center of the left rail member 356 in the up-down direction. Then, it is possible to shorten the period over which the slider 311 of the left controller 3, which is inserted into and slid along the left rail member 356, is in contact with the elastic member 362 when the left controller 3 is attached to the extension grip 350. Then, it is possible to reduce the wear of the elastic member 362. Moreover, the left controller 3 can be smoothly attached to the extension grip 350.

In other embodiments, there may be any number of elastic members provided on the left support surface (specifically, the first surface 353a), and there may be a plurality of elastic members. Note that also when a plurality of elastic members are provided, the elastic members can be provided on the lower side of the center of the left rail member 356 in the up-down direction, as in the present embodiment. Then, it is possible to shorten the period of time over which the slider 311 of the left controller 3 is in contact with the elastic members. In other embodiments, there is no particular limitation on the position at which the elastic member is provided. For example, the elastic member may be provided on the second surface 353b and/or the third surface 353c in addition to the first surface 353a (or instead of the first surface 353a).

Note that since the elastic member 362 is provided, the left rail member 356 of the extension grip 350 does not need to include a member equivalent to the leaf spring 305 of the main unit 2. Note that in other embodiments, an elastic member similar to the leaf spring 305 may be provided on the bottom surface of the left rail member 356.

As shown in FIG. 54 and FIG. 55, the main section 351 includes a right support surface on the right side of the support section 352. The right support surface is configured to have a similar function to that of the left support surface described above. Specifically, it is formed in left-right symmetry with the left support surface described above (with respect to the center of the extension grip 350). That is, the right support surface includes a first surface 354a, a second surface 354b, a third surface 354c and a fourth surface 354d. The shape of the first surface 354a of the right support surface is in left-right symmetry with that of the first surface 353a of the left support surface, the shape of the second surface 354b of the right support surface is in left-right symmetry with that of the second surface 353b of the left support surface, the shape of the third surface 354c of the right support surface is left-right symmetry with that of the third surface 353c of the left support surface, and the shape of the fourth surface 354d of the right support surface is in left-right symmetry with that of the fourth surface 353d of the left support surface. Thus, also with the right controller 4, as with the left controller 3, a user can hold the extension grip 350 and the right controller 4 attached thereto as if they were a single controller.

With the right support surface having such a shape as described above, a cut-out portion C3 is formed in the main section 351, as shown in FIG. 55. Then, the right controller 4 with operation sections provided on the reverse surface thereof can be attached to the extension grip 350, and a user can operate operation sections (e.g., the ZR button 61) provided on the reverse surface of the right controller 4 attached to the extension grip 350.

An elastic member 363 similar to the elastic member 362 of the left support surface is provided on the first surface 354a of the right support surface. Therefore, with the right controller 4 attached to the extension grip 350, the right controller 4 is pressed by the elastic member 363 toward the support section 352 (in other words, toward the inside of the extension grip 350). Then, it is possible to reduce the looseness between the extension grip 350 and the right controller 4. Moreover, it is possible to more firmly connect the right controller 4 to the extension grip 350, and it is possible to reduce the chattering produced when the right controller 4 is vibrated by the vibrator 107.

As shown in FIG. 54 and FIG. 55, a plurality (herein, four) of screw holes are formed on the left support surface and the right support surface (specifically, the third surfaces 353c and 354c), and screws 364 are screwed into the screw holes. Note that the housing of the main section 351 is formed by a front-side housing member and a rear-side housing member. The screws 364 are for connecting together the front-side housing member and the rear-side housing member. As shown in FIG. 55, the screws 364 are provided so as not to protrude from the left support surface or the right support surface. In other words, the screws 364 are provided at positions sunken from the left support surface and the right support surface. Then, when the slider of the controller is inserted into the rail member of the extension grip 350, it is possible to reduce the possibility that the screws 364 come into contact with the controller, and it is possible to smoothly attach the controller to the extension grip 350.

A supporting device such as the extension grip 350 may have no grip portion. For example, the extension grip 350 may only include the support section 352, and not include the main section 351. Then, a user can perform operations by holding the controllers 3 and 4 attached to the support section 352. Also in this way, a user can hold, as an integral unit, two controllers 3 and 4 removed from the main unit 2, and can perform operations while fixing the positional relationship between the two controllers 3 and 4. Therefore, it is possible to improve the controllability when the two controllers 3 and 4 are used removed from the main unit 2. Note that a supporting device having no grip portion may have a configuration in which the first surface of the left support surface and the right support surface described above is absent, and therefore the elastic member on the first surface is also absent. With such a configuration, the supporting device may include an elastic member similar to the leaf spring 305 described above provided on the bottom surface of the rail member. Then, controllers can be firmly connected to the extension grip 350.

(Elements Regarding Charging)

Next, elements for allowing controllers to be charged by the extension grip 350 will be described. The extension grip 350 is capable of charging controllers attached thereto by providing power supply to the controllers.

Figure 57:
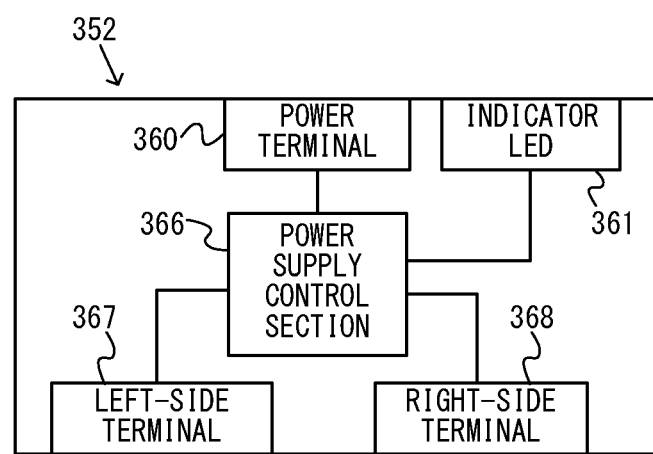
FIG. 57 is a block diagram showing an example internal configuration of the extension grip shown in FIG. 54.

FIG. 57 is a block diagram showing an example internal configuration of the extension grip 350. In the present embodiment, the elements shown in FIG. 57 are provided on the support section 352. Note that in other embodiments, some of the elements shown in FIG. 57 may be provided on the main section 351.

As shown in FIG. 57, the extension grip 350 includes a power terminal 360. The power terminal 360 is similar to the power terminal 134 of the cradle 5. Therefore, by connecting a charging device (e.g., an AC adaptor, etc.) (not shown) to the power terminal 360, the extension grip 350 can receive power supply from the charging device via the power terminal 360. Note that there is no particular limitation on the position at which the connector of the power terminal 360 (in other words, the connector including the power terminal 360) is provided. In the present embodiment, as shown in the top view of FIG. 54 ((d) of FIG. 54), the connector of the power terminal 360 is provided on the upper surface (i.e., the surface on the y-axis positive direction side) of the support section 352. Then, even if the charging device is connected to the power terminal 360 while the extension grip 350 is in use, it does not interfere with operations and it is possible to maintain the controllability of the extension grip 350.

The extension grip 350 includes a power supply control section 366. The power supply control section 366 is electrically connected to the power terminal 360, an indicator LED 361, the left-side terminals 367 and the right-side terminals 368. The power supply control section 366 is a power control circuit formed by an electronic circuit, for example. The power supply control section 366 controls the power supply to the controllers connected to the extension grip 350 (more specifically, the charging for the controllers). That is, the power supply control section 366 supplies power from the power terminal 360 to the left controller 3 and the right controller 4 via the left-side terminals 367 and the right-side terminals 368, thereby charging the left controller 3 and the right controller 4. The power supply control section 366 also controls the indicator LED 361 in order to indicate, to the user, the charging status for the controllers 3 and 4.

The left-side terminals 367 are terminals provided on the left rail member 356 described above. The right-side terminals 368 are terminals provided on the right rail member 357 described above. Note that the number of terminals of the left-side terminals 367 and the right-side terminals 368 may be different from that of the left-side terminals 17 and the right-side terminals 21 of the main unit 2. For example, the left-side terminals 367 and the right-side terminals 368 may only include those that are used for charging, of all the ten left-side terminals 17 of the main unit 2.

The indicator LED 361 is an indicator section for indicating predetermined information (specifically, information regarding charging) to the user. As shown in the top view of FIG. 54 ((d) of FIG. 54), the indicator LED 361 is provided on the surface (i.e., the upper surface) of the support section 352 on which the power terminal 360 is provided. Note that there is no particular limitation on the position at which the indicator LED 361 is provided, and the indicator LED 361 may be provided on a different surface from the surface on which the power terminal 360 is provided in other embodiments.

Next, the operation in which the extension grip 350 charges the controllers attached thereto will be described. In order to charge the controllers 3 and 4 attached to the extension grip 350, a user further connects the charging device (e.g., an AC adaptor, etc.) to the power terminal 360. Thus, the extension grip 350 can receive power supply from the charging device via the connector of the power terminal 360.

When the power supply via the power terminal 360 is available, the power supply control section 366 determines whether or not to charge. In the present embodiment, the determination is made based on information regarding charging (referred to as the charging information) received from the controllers attached to the extension grip 350.

In the present embodiment, when attached to the extension grip 350, the controllers 3 and 4 each transmit, to the extension grip 350, charging information representing whether the controller needs to be charged. Specifically, when its battery level is not sufficiently high, the controller 3 or 4 transmits, to the extension grip 350, charging information indicating that charging is needed. On the other hand, when its battery level is sufficiently high (e.g., after charging is finished), the controller 3 or 4 transmits to the extension grip 350, charging information indicating that charging is not needed. Note that there is no particular limitation on the timing with which controllers transmit the charging information. For example, charging information may be transmitted periodically (specifically, at a rate of once per a predetermined period of time), or may be transmitted when a predetermined condition is satisfied (specifically, when the controller is connected to another device and/or when charging is finished).

The power supply control section 366 determines to charge when it receives charging information indicating that charging is needed from at least one controller. On the other hand, when charging information indicating that charging is needed is not received from any of the controllers (i.e., when charging information indicating that charging is not needed is received or when no charging information is received because no controller is attached), the power supply control section 366 determines not to charge. In this case, the power supply control section 366 does not start charging.

When the power supply control section 366 determines to charge, the power supplied from the power terminal 360 is supplied to the left controller 3 and/or the right controller 4 via the left-side terminals 367 and/or the right-side terminals 368. The battery of the left controller 3 is charged with the power supplied from the extension grip 350 via the terminals 42. The battery of the right controller 4 is charged with the power supplied from the extension grip 350 via the terminals 64. Thus, the left controller 3 and/or the right controller 4 are charged.

Note that the power supply control section 366 supplies power to the controller that has transmitted the charging information indicating that charging is needed. That is, if charging information indicating that charging is needed has been received from the controllers 3 and 4, the power supply control section 366 supplies power to both the controllers 3 and 4, and if charging information indicating that charging is needed has been received from one of the controllers 3 and 4, the power supply control section 366 supplies power to the one of the controllers.

There is no particular limitation on the condition for the extension grip 350 to charge controllers. For example, in other embodiments, the power supply control section 366 may charge controllers not based on information from the controllers (e.g., unconditionally charge the controllers attached).

When at least one controller is being charged, the power supply control section 366 controls the indicator LED 361 to be lit in a predetermined manner (e.g., to be lit steadily or to blink). That is, the indicator LED 361 indicates that a controller or controllers are being charged until charging of both of the two game controllers is finished. Then, the indicator LED 361 is turned OFF when charging of both of the two game controllers is finished.

Thus, in the present embodiment, when at least one of two controllers that can be attached to the extension grip 350 is being charged, it is indicated to a user by means of the indicator LED 361 that the controller or controllers are being charged. When charging has started for two controllers, charging of one of the controllers may finish first while the other controller is still being charged. According to the present embodiment, in such a case, it is continuously indicated to a user by means of the indicator LED 361 that the controller or controllers are being charged. Therefore, it is possible to reduce the possibility that a user discontinues charging (specifically, by removing the controller or the charging device from the extension grip 350) even though charging has not been finished for the other controller. In the present embodiment, since the charging status for two game controllers can be indicated by means of one indicator LED, it is possible to simplify the configuration of the extension grip 350 and reduce the production cost.

Note that in other embodiments, when charging is finished for all of the controllers attached, the power supply control section 366 may control the indicator LED 361 to be lit in a different manner from that during charging (e.g., to blink with a different blinking interval or to be lit in a different color). For example, the indicator LED 361 may be controlled to blink during charging, and to be lit steadily when charging is finished for all of the controllers attached. Then, it is possible to indicate to a user that charging is finished.

In other embodiments, the extension grip 350 may include a plurality of indicator LEDs. For example, the extension grip 350 may include a first indicator LED corresponding to the left controller 3 and a second indicator LED corresponding to the right controller 4. Then, the power supply control section 366 uses the first indicator LED to indicate that the left controller 3 is being charged, and the second indicator LED to indicate that the right controller 4 is being charged. Then, it is possible to separately indicate to a user the charging status of each controller. The first indicator LED may be provided on the left side of the center of the extension grip 350 (more specifically, the support section 352) and the second indicator LED may be provided on the right side of the extension grip 350 (more specifically, the support section 352). Thus, it is possible to indicate to the user how the controllers and the indicator LEDs are associated with each other.

In other embodiments, the extension grip 350 may not have the charging function. Then, the extension grip 350 does not need to have electronic members such as terminals. Employing the configuration with no electronic member, it is possible to simplify the configuration of the extension grip 350.

(Elements Regarding Lightguide)

The extension grip 350 includes elements for allowing a user to see the light from the indicator LEDs of the controllers attached thereto. The indicator LED of each of the controllers 3 and 4 may be lit to indicate the number assigned to the controller, or may be lit to indicate the remaining battery level of the controller. In such a case, with the configuration described above, a user can see the light from the indicator LED of each controller even if the controller is attached to the extension grip 350. This will be described below in detail.

As shown in FIG. 55, the hole 356a is formed on the bottom surface of the left rail member 356. Light-receiving ports (i.e., holes in which the light-receiving surfaces 358a of the lightguide member 358 shown in FIG. 55 are provided) are formed in an area of the left side surface of the housing of the support section 352 that is exposed through the hole 356a. The number of the light-receiving ports is equal to the number (herein, four) of the indicator LEDs 45 of the left controller 3. The light-receiving ports are formed at positions that are substantially opposing the indicator LEDs 45 of the left controller 3 attached to the extension grip 350.

On the other hand, light-exiting ports (i.e., holes in which light-exiting surfaces 358*b* of the lightguide member 358 shown in FIG. 55 are provided) are formed on the front surface of the support section 352. The light-exiting ports correspond to four light-receiving ports, and the number of the light-exiting ports is equal to the number (herein, four) of the light-receiving ports. Inside the support section 352, each light-exiting port is connected to a light-receiving port associated with the light-exiting port. Note that there is no particular limitation on the positions at which the light-exiting ports are formed, and the positions may be on any surface that is different from the surface on which the rail member is provided. For example, in other embodiments, the light-exiting ports may be formed on the upper surface, the lower surface or the reverse surface of the support section 352.

As shown in FIG. 55, each light-receiving port and a light-exiting port associated with the light-receiving port are connected together via the lightguide member 358. Specifically, the lightguide member 358 is provided in a space (specifically, a tunnel-shaped space) connecting between the light-receiving port and the light-exiting port, with the light-receiving surfaces 358*a* of the lightguide member 358 being provided near the light-receiving ports and the light-exiting surfaces 358*b* of the lightguide member 358 being provided near the light-exiting ports (see FIG. 55. Note that a dotted line in FIG. 55 represents where the lightguide member 358 is placed for one of the four light-receiving ports). The lightguide member 358 is a transparent member formed by a resin, for example. The lightguide member 358 guides light incident upon the light-receiving surfaces 358*a* to the light-exiting surfaces 358*b* by virtue of internal reflection, and the light exits the light-exiting surfaces 358*b*. Note that the lightguide member 358 may be any member capable of guiding the light incident upon the light-receiving surfaces 358*a* to the light-exiting surfaces 358*b*. For example, in other embodiments, the lightguide member 358 may be a mirror provided on the wall of the holes connecting between the light-receiving ports and the light-exiting ports.

When the indicator LEDs 45 of the left controller 3 attached to the extension grip 350 are lit, the light from an indicator LED 45 is incident upon the light-receiving surface 358*a* facing the indicator LED 45, and is output from the light-exiting surface 358*b* through the lightguide member 358. Thus, a user can see the light from the indicator LEDs 45 of the left controller 3, and can receive information that is indicated by the indicator LEDs 45.

The description above is directed to a configuration by which light from the indicator LEDs 45 of the left controller 3 is presented to a user. The extension grip 350 includes a similar configuration to that described above for presenting, to a user, light from the indicator LEDs 67 of the right controller 4 attached thereto. That is, although not shown in the figure, a hole similar to the hole 356*a* of the left rail member 356 is formed on the bottom surface of the right rail member 357, and four light-receiving ports are formed in an area on the housing of the support section 352 that is exposed through the hole. The light-receiving ports are connected to the light-exiting ports (i.e., holes in which light-exiting surfaces 359*b* of the lightguide member shown in FIG. 55 are provided) formed on the front surface of the support section 352. Then, a lightguide member is provided in a space connecting between the light-receiving port and the light-exiting port. With the configuration described above, when the indicator LED 67 of the right controller 4 attached to the extension grip 350 emits light, the light from the indicator LED 67 is output from the light-exiting surface 359*b* through the lightguide member.

Note that in the present embodiment, the light-receiving surface of the lightguide member is provided at a position sunken from the bottom surface of the rail member (in other words, at a position closer to the center of the support section 352 in the left-right direction). Then, it is possible to reduce the possibility that the lightguide member comes into contact with the controller when inserting the slider of the controller into the rail member of the extension grip 350, thereby allowing the controller to be smoothly attached to the extension grip 350.

As described above, with the extension grip 350, when an indicator LED of the controller attached to the extension grip 350 emits light, the light is output from the light-exiting surface corresponding to the indicator LED. Then, even when the controller is attached to the extension grip 350, it is possible to present, to a user, information indicated by indicator LEDs. For example, when indicator LEDs represent information such as the number assigned to the controller or the charging status of the controller, it is possible to indicate this information to a user even when the controller is attached to the extension grip 350. According to the present embodiment, by the provision of the lightguide member, it is possible to present, to a user, information indicated by indicator LEDs of the controller attached to the extension grip 350 using a simple configuration (e.g., as compared with an embodiment in which information regarding indicator LEDs is received from the controller so as to control indicator LEDs of the extension grip based on the received information).

Note that in other embodiments, partitions may be provided between a plurality of light-receiving ports (in other words, a plurality of light-receiving surfaces) arranged next to each other. Then, it is possible to reduce the possibility that light from one indicator LED is incident upon another light-receiving surface that is different from the corresponding light-receiving surface, and it is possible to reduce the possibility that light is output from a light-exiting surface that does not correspond to the indicator LED that is emitting light.

In other embodiments, the extension grip 350 may only include one set of a light-receiving surface and a light-exiting surface for one controller even if the controller includes a plurality of indicator LEDs. Then, when any of a plurality of indicator LEDs of the controller emits light, the light is output from the light-exiting surface of the extension grip 350. Although it is not possible to indicate which one of the indicator LEDs of the controller is emitting light, it is possible to indicate to a user that at least one of the indicator LEDs is emitting light. Depending on the content of information to be indicated by indicator LEDs to a user, the configuration described above may suffice.

In other embodiments, the extension grip 350 may receive information regarding the light emission of the indicator LEDs of the controller (in other words, the information indicated by the indicator LEDs) from the controller via the terminals 367 or 368. Then, the extension grip 350 may include an indicator section (e.g., indicator LEDs), and may use the indicator section to give the indication based on the received information.

(Elements Regarding Communication with Main Unit 2)

Note that when the controllers 3 and 4 are attached to the extension grip 350, the controllers 3 and 4 and the main unit 2 communicate with each other using wireless communication, as when the controllers 3 and 4 are attached to the extension grip 210 shown in FIG. 52. That is, even when attached to the extension grip 350, the controllers 3 and 4 can communicate with the main unit 2.

Note that in other embodiments, the extension grip 350 may include a communication section for allowing the extension grip 350 to communicate with the main unit 2 using wireless communication. Then, the extension grip 350 may obtain operation data from the controllers 3 and 4 attached to the extension grip 350, and transmit the obtained operation data to the main unit 2 via the communication section.

The extension grip 350 may include operation sections (e.g., buttons, an analog stick, etc.). Then, the extension grip 350 can give a wider variety to the operation using the controller. Note that as in the case in which the extension grip 210 includes operation sections shown in FIG. 52, information representing operations performing using the operation sections may be transmitted to the main unit 2 via the controller attached to the extension grip 350 or may be transmitted from the extension grip 350 directly to the main unit 2 if the extension grip 350 includes the communication section described above.

(Elements Allowing Support Section to be Movable with Respect to Main Section)

Figure 58:
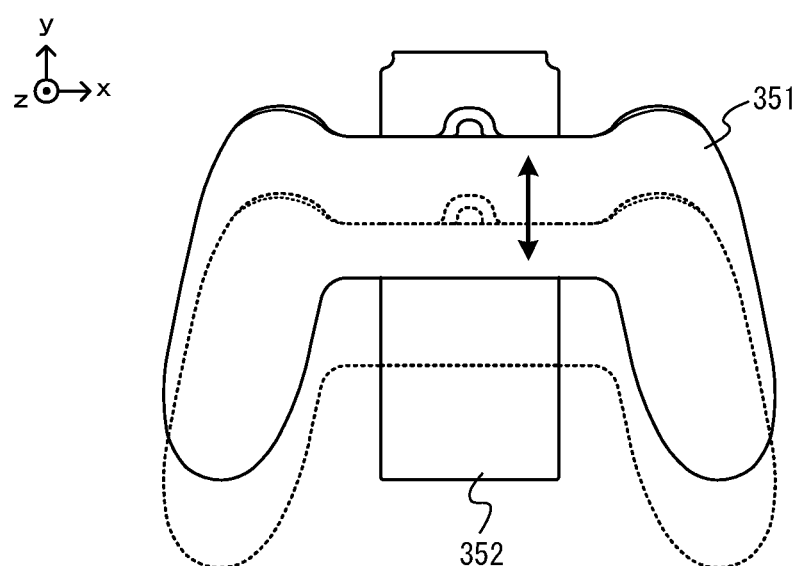
FIG. 58 is a diagram showing an example configuration of an extension grip of which a main section is movable.

Note that in other embodiments, in the extension grip 350 shown in FIG. 54, the main section 351 may be movable with respect to the support section 352 (or, it can be said that the support section 352 may be movable with respect to the main section 351). FIG. 58 is a diagram showing an example configuration of an extension grip of which the main section is movable. As shown in FIG. 58, the main section 351 may be movable with respect to the support section 352 in the up-down direction (i.e., the y-axis direction). For example, the position at which the main section 351 is connected to the support section 352 may be variable.

Specifically, the main section 351 and the support section 352 may be connected to each other via a slide mechanism that can slide in the up-down direction. Then, the extension grip 350 includes a mechanism for limiting (in other words, locking) the slide movement of the support section 352 at a plurality of positions (which may be any positions) within the range of slide movement. For example, the extension grip 350 may include a mechanism for allowing the main section 351 to slide with respect to the support section 352 by loosening a screw, while locking the slide movement of the main section 351 with respect to the support section 352 by tightening the screw. For example, one of the main section 351 and the support section 352 may include a stop member capable of engaging with the other one of the main section 351 and the support section 352 at a plurality of positions within the range of slide movement.

In other embodiments, the extension grip 350 may be configured so that the main section 351 can be attached to the support section 352 at a plurality of different positions with respect to the up-down direction. For example, screw holes may be provided on the reverse surface of the support section 352 at a plurality of different positions in the up-down direction, so that the main section 351 can be attached to the support section 352 by screwing a screw in one of the screw holes.

As described above, the extension grip 350 may be configured so that the distance in the up-down direction between a grip portion of the main section 351 and a controller attached to the support section 352 is variable. Then, it is possible to adjust the distance to an appropriate distance for each user (e.g., to a distance suitable for the size of the hands of the user, etc.), thus improving the controllability of the extension grip 350.

Figure 59:
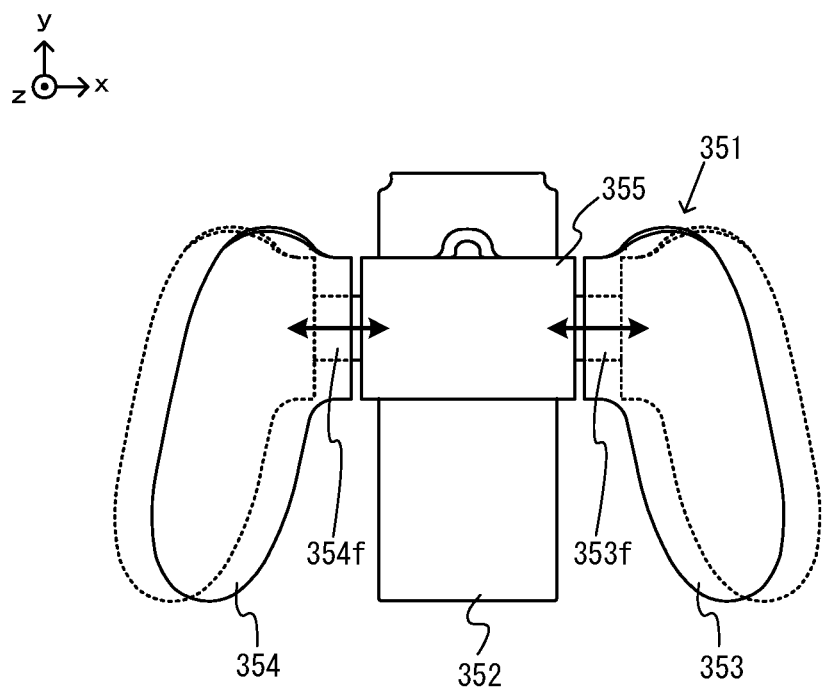
FIG. 59 is a diagram showing an example configuration of an extension grip in which the distance between a grip portion and a controller is variable.

In other embodiments, with the extension grip 350 shown in FIG. 55, the distance between a grip portion and a controller attached to the extension grip 350 (in other words, the rail member of the extension grip 350) may be variable. FIG. 59 is a diagram showing an example configuration of an extension grip in which the distance between a grip portion and a controller is variable. As shown in FIG. 59, the grip portions 353 and 354 may be movable in the left-right direction (i.e., the x-axis direction) in the main section 351. That is, the connection portion 355 may be connected to the grip portions 353 and 354 so as to be movable in the left-right direction. Note that it can be said that with the configuration shown in FIG. 59, the distance between the left and right grip portions 353 and 354 is variable.

There is no particular limitation on the mechanism that allows the grip portions 353 and 354 to be movable. For example, the connection portion 355 and the grip portions may be connected to each other by a slide mechanism that can slide in the left-right direction (in other words, the direction in which the interval between the connection portion and the grip portions is varied).

Specifically, as shown in FIG. 59, the left grip portion 353 may include an arm 353$f$ and the right grip portion 354 may include an arm 354$f$. The arms 353$f$ and 354$f$ are inserted into holes (not shown) provided on the left and right side surfaces of the connection portion 355, and are connected so as to be slidable in the left-right direction with respect to the connection portion 355. Then, the connection portion 355 includes a mechanism for limiting (in other words, locking) the slide movement of the grip portions 353 and 354 at a plurality of positions (which may be any positions) within the range of slide movement of the grip portions 353 and 354. Although not shown in the figure, for example, the connection portion 355 may include a mechanism for allowing the grip portions to slide with respect to the connection portion 355 by loosening a screw, while preventing the grip portions from sliding with respect to the connection portion 355 by tightening the screw. For example, one of the connection portion 355 and the grip portions may include a stop member capable of engaging with the other one of the connection portion 355 and the grip portions at a plurality of positions within the range of slide movement.

In other embodiments, the connection portion 355 may be configured to be stretchable in the left-right direction. That is, the connection portion 355 may include a mechanism that makes variable the length of the connection portion 355 in the left-right direction.

As described above, the extension grip 350 may include a mechanism capable of varying the distance between controllers attached thereto and the grip portions (in other words, the interval between the two grip portions 353 and 354). Then, it is possible to adjust the distance between controllers attached to the extension grip 350 and the grip portions to an appropriate distance for each user (e.g., to a distance suitable for the size of the hands of the user, etc.), thus improving the controllability of the extension grip 350.

With the extension grip 350, as with the extension grip 210 shown in FIG. 52, the controllers 3 and 4 can be used while they are attached to the extension grip 350. Then, it is possible to perform operations while fixing the positional relationship between the two controllers 3 and 4, and it is therefore possible to improve the controllability of the two controllers 3 and 4 when removed from the main unit 2.

The extension grip 350 described above can be used as a charging device for the controllers. For example, when the battery of a controller has run out when the controller is used while removed from the main unit 2, a user can attach the controller to the extension grip 350 with an AC adaptor, etc., connected to the power terminal 360 thereof to charge the controller.

Note that a slide member similar to the rail member described above (i.e., the left rail member 300, etc.) may be provided on a charging device used for the purpose of charging controllers connected thereto, as well as the extension grip 350 used for the purpose of operating controllers connected thereto. Then, the charging device may include one rail member or may include a plurality of rail members so as to simultaneously charge a plurality of controllers. With charging devices, as opposed to the main unit 2 and extension grips, the rail members do not need to be provided at positions in left-right symmetry.

[5-3. Accessory for Main Unit]

The information processing system may include an accessory to which the main unit 2 can be attached. An HMD accessory to be described below as an example accessory can be used as a so-called HMD (head mounted display) with the main unit 2 attached thereto.

Figure 60:
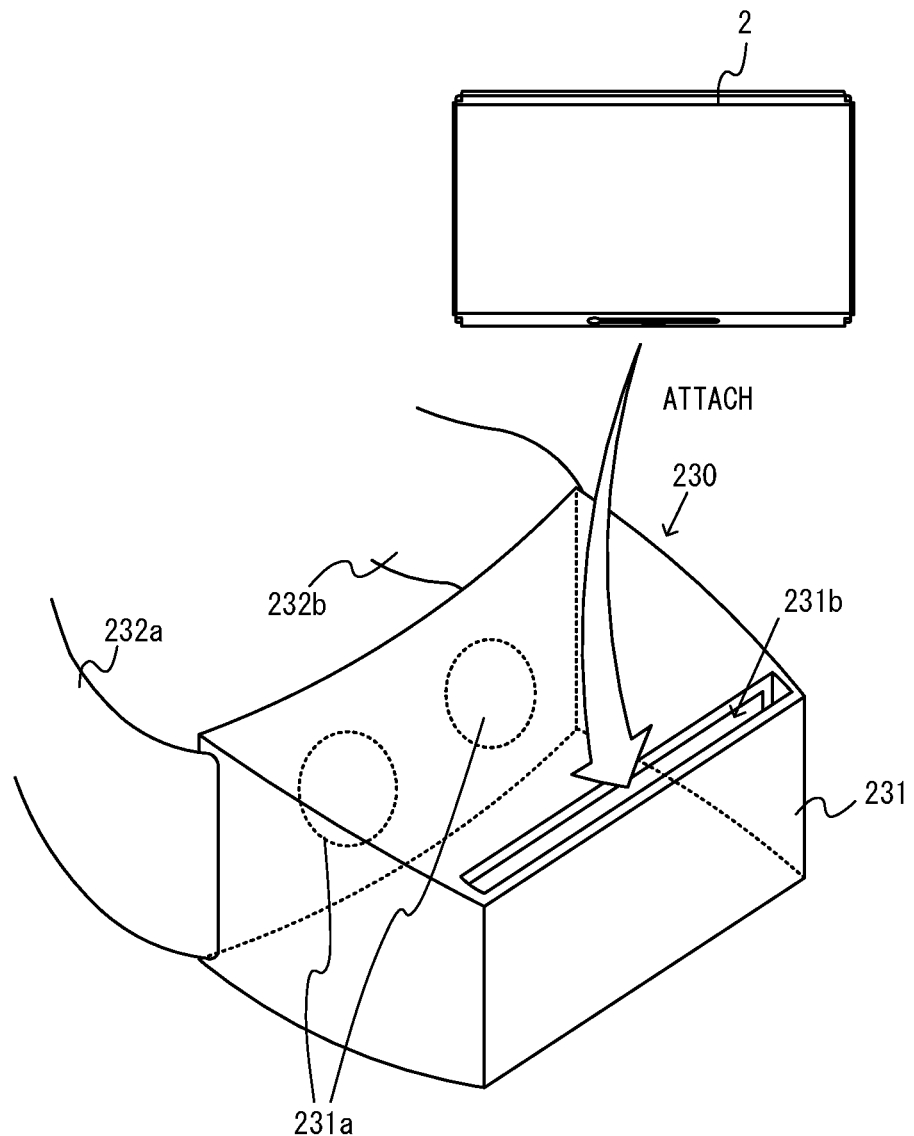
FIG. 60 is a diagram showing an example accessory to which the main unit can be attached.

FIG. 60 is a diagram showing an example HMD accessory to which the main unit 2 can be attached. An HMD accessory 230 shown in FIG. 60 includes a housing 231 and belts 232a and 232b. One end of the belt 232a is attached to one end of the housing 231, and one end of the belt 232b is attached to the other end of the housing 231. Although not shown in the figure, the other end of the belt 232a can be removably connected to the other end of the belt 232b. Thus, the housing 231 can be mounted on the head of the user by connecting together the two belts 232a and 232b around the head of the user. Note that there is no particular limitation on the mechanism for allowing the HMD accessory 230 to be mounted on the head of the user.

As shown in FIG. 60, the housing 231 includes two openings 231a. The openings 231a are located so as to face the eyes of the user with the housing 231 mounted on the head of the user. Although not shown in the figure, the HMD accessory 230 includes a lens provided in each of the openings 231a.

Moreover, as shown in FIG. 60, the housing 231 includes an insertion slot 231b for receiving the main unit 2 attached thereto (or inserted thereinto). That is, the main unit 2 can be attached to the HMD accessory 230 by inserting the main unit 2 into the insertion slot 231b. If the main unit 2 is attached so that the display 12 is facing the openings 231a, the display 12 can be viewed through the lenses through the openings 231a. That is, the housing 231 supports the display 12 so that the user can view the display 12 of the main unit 2.

With such a configuration, a user can view images on the display 12 when the HMD accessory 230 with the main unit 2 attached thereto is mounted on the head of the user. That is, the HMD accessory 230 with the main unit 2 attached thereto functions as a so-called HMD. Note that the HMD accessory 230 may present images of a wide viewing angle to a user by enlarging the viewing angle of the images on the display 12 through the lenses. This can enhance the sense of immersion for a user looking at the images. Note that the main unit 2 may perform a predetermined conversion process on the images displayed on the display 12 so that appropriate images are viewed through the lenses.

Note that in the present embodiment, the main unit 2 includes the acceleration sensor 89 and the angular velocity sensor 90, and can calculate the movement and/or the attitude of the main unit 2 based on the detection results of these sensors. Therefore, the main unit 2 can calculate the movement and/or the attitude of the HMD accessory 230 to which the main unit 2 is attached, and perform a predetermined process in accordance with the movement and/or the attitude. Note that the predetermined process, for example, is a process of controlling a virtual camera for producing images to be displayed on the display 12 based on the movement and/or the attitude of the HMD accessory 230, and more specifically is a process of changing the line-of-sight direction of the virtual camera depending on the attitude, for example.

In other embodiments, if the main unit 2 does not have sensors for sensing the movement and/or the attitude of the main unit 2 (e.g., an acceleration sensor and/or an angular velocity sensor), the HMD accessory 230 may include the sensors. Then, the HMD accessory 230 may transmit the detection results of the sensors (or information obtained by performing a predetermined process on the detection results) to the main unit 2. The main unit 2 may calculate the movement and/or the attitude of the HMD accessory 230 based on the information transmitted from the HMD accessory 230.

In the present embodiment, the controllers 3 and 4 may be used while they are removed from the main unit 2. Therefore, even with the main unit 2 attached to the HMD accessory 230, the controllers 3 and 4 can be used as controller devices. That is, a user can operate the controllers using the hands while the HMD accessory 230 with the main unit 2 attached thereto is mounted on the head of the user.

As described above, the information processing device 1 of the present embodiment, with the use of the HMD accessory 230 described above, can be used in a mode in which it is used as an HMD. In the present embodiment, since the controllers can be removed from the main unit 2, it is possible to reduce the weight of the device or devices to be mounted on the head of the user. A user can perform operations using removed controllers.

[6. Functions/Effects and Variations of Present Embodiment]

In the present embodiment described above, the information processing device 1 includes the main unit 2, the left controller (referred to also as the first controller device) 3, and the right controller (referred to also as the second controller device) 4. Since the information processing device 1 includes a plurality of devices, it can be referred to also as an information processing system. The main unit includes a display (i.e., the display 12). The left controller 3 can be attached to and detached from the main unit 2, and the right controller 4 can be attached to and detached from the main unit 2 (FIG. 2). The left controller 3 transmits first operation data representing an operation performed on the left controller 3 to the main unit 2, whether it is attached to the main unit 2 or not. The right controller 4 transmits second operation data representing an operation performed on the right controller 4 to the main unit 2, whether it is attached to the main unit 2 or not. The main unit displays, on the display, the execution result of a predetermined information process (step S44) based on the first operation data transmitted from the left controller 3 and the second operation data transmitted from the right controller 4 (step S45). Thus, with the left controller 3 and the right controller 4 attached to the main unit 2, the main unit 2 is capable of displaying, on the display, images based on operations performed on the left controller 3 and the right controller 4 (FIG. 33). The main unit 2 is also capable of displaying, on the display, images based on operations performed on the left controller 3 and the right controller 4 when the left controller 3 and the right controller 4 are removed from the main unit 2 (FIG. 34).

As described above, the information processing device 1 can be used both in the mode in which the controllers 3 and 4 are attached to the main unit 2 and in the mode in which the controllers 3 and 4 are removed from the main unit. Thus, since a plurality of modes of use are realized with a single information processing device 1, the information processing device 1 can be used in a wider variety of manners.

The "image based on operations" may be images obtained by an information process that is performed based on an operation (e.g., images obtained by an operation performed on an application used for obtaining and viewing information from the Internet) or images produced by an information process that is performed based on an operation (e.g., game images produced in accordance with a game operation performed on a game application).

In the above description, the main unit 2 may be used in the mode in which the left controller 3 and the right controller 4 are attached to the main unit 2 and in the mode in which the left controller 3 and the right controller 4 are removed from the main unit 2, and it is not necessary that both of these modes be available under certain conditions. For example, only one of the two modes may be available in a predetermined application running on the main unit 2. That is, the main unit 2 may run an application that is available only in the mode in which the left controller 3 and the right controller 4 are attached to the main unit 2, and may run another application that is available only in the mode in which the left controller 3 and the right controller 4 are removed from the main unit 2.

In the above description, the main unit 2 may include an information processing unit (e.g., the CPU 81) instead of a display.

The left controller 3 includes a first input section (e.g., the analog stick 32) and a second input section (e.g., the operation buttons 33 to 36). The right controller 4 includes a third input section (e.g., the analog stick 52) of the same type as the first input section and a fourth input section (e.g., the operation buttons 53 to 56) of the same type as the second input section.

Note that an "input section" is any means that outputs information representing a user input and/or information with which it is possible to calculate (or estimate) a user input. For example, an input section may be a button, a directional input section such as an analog stick, a touch panel, a microphone, a camera, a sensor capable of calculating the movement of the controller, for example, (e.g., an acceleration sensor and an angular velocity sensor), and the like.

As described above, the left controller 3 and the right controller 4 include two sets of input sections of the same type. Therefore, using the input sections described above, a user can use two controllers in a similar manner. For example, if a single user uses a controller, it is convenient because the user can perform operations in a similar manner using either one of two controllers. Also conveniently, two users can each use one controller, for example.

In the above description, "input sections being of the same type" is not limited to cases in which the two input sections are the same input sections, but may also include cases in which two input sections have functions and/or applications of the same type. For example, if the first input section is an analog stick that can be tilted up, down, left and right, the third input section may be a slide stick that can be slid up, down, left and right or a cross-shaped key capable of making an input of up, down, left and right.

In the embodiment described above, the input mechanism of the first input section and the input mechanism of the third input section (e.g., the operation button 33 and the operation button 53 or the analog stick 32 and the analog stick 52) are substantially the same. The input mechanism of the second input section and the input mechanism of the fourth input section are substantially the same. Thus, the two controllers will have two types of input sections that can be operated in a similar fashion. Therefore, a user can use two controllers in a similar fashion, thereby improving the controllability of the controllers.

In the embodiment described above, the first input section has substantially the same shape as the third input section. Also, the second input section has substantially the same shape as the fourth input section. Thus, the two controllers will have two types of input sections that can be operated in a similar fashion. Therefore, a user can use two controllers in a similar fashion, thereby improving the controllability of the controllers.

If the left controller 3 and the right controller 4 are removed from the main unit 2, the positional relationship between the first input section and the second input section of the left controller 3 placed in a certain orientation is the same as the positional relationship between the third input section and the fourth input section of the right controller 4 placed in a certain orientation. For example, consider a case in which the left side surface the left controller 3 is facing a user and the right side surface of the right controller 4 is facing another user, as shown in FIG. 35 and FIG. 37. Then, the positional relationship between the first input section (i.e., the analog stick 32) and the second input section (i.e., the operation buttons 33 to 36) is the same as the positional relationship between the third input section (i.e., the analog stick 52) and the fourth input section (i.e., the operation buttons 53 to 56).

Then, users can use the left controller 3 and the right controller 4 in a similar fashion. Thus, it is possible to improve the controllability of the controllers. For example, in the example shown in FIG. 35, with either one of the two controllers, a user can operate the analog stick with the left hand and the operation buttons with the right hand.

With the left controller 3 and the right controller 4 attached to the main unit 2, the positional relationship between the first input section (i.e., the analog stick 32) and the second input section (i.e., the operation buttons 33 to 36) is opposite from the positional relationship between the third input section (i.e., the analog stick 52) and the fourth input section (i.e., the operation buttons 53 to 56) (see FIG. 1).

Thus, if the controllers 3 and 4 are attached to the main unit 2, if a user holds the controllers 3 and 4 respectively with the left hand and the right hand, the user is allowed to easily operate different input sections with the left hand and with the right hand. Thus, it is possible to improve the controllability of the information processing device 1 with controllers attached thereto.

Now, assume a configuration in which the positional relationship between the first input section and the second input section is the same as the positional relationship between the third input section and the fourth input section. Even with such a configuration, a user may tend to operate the left and right controllers in a similar fashion (e.g., operating the analog stick with the left hand and the operation buttons with the right hand). Then, if the controllers have a similar shape to that of the present embodiment (i.e., one side surface is rounded), one controller will be held with the rounded side surface facing away from the user while the other controller will be held with the rounded side surface facing toward the user. That is, this configuration has a problem in that when users hold controllers removed from the main unit 2, the direction of the rounded side surface of one controller will be opposite to that of the other controller, which makes it less easy for a user to understand the appropriate orientation in which to hold a controller.

Moreover, with such a configuration, if sub-buttons (the second L button and/or the second R button in the embodiment described above) are provided on each controller, the sub-buttons will be provided on the rounded side surface (as in the present embodiment) for one controller, whereas the sub-buttons will be provided on the opposite side surface from the rounded side surface for the other controller. With such a configuration, however, the sub-buttons of one controller will be exposed even when the controller is attached to the main unit 2, and the sub-buttons may possibly be operated in error in the attached state.

In contrast, according to the present embodiment employing a configuration in which the positional relationship between the first input section and the second input section is opposite from the positional relationship between the third input section and the fourth input section, it is possible to prevent the two problems described above.

In the embodiment described above, the first input section and the third input section are each a directional input section for receiving a directional input. More specifically, the directional input section may include an operation member (e.g., a stick member) that can be tilted or slid in a predetermined direction. Then, a user can make directional inputs by using the left controller 3 or the right controller 4.

In the embodiment described above, the second input section and the fourth input section are each a button that can be pressed. Thus, a user can make button inputs by using the left controller 3 or the right controller 4.

In the embodiment described above, a controller is attached integrally to the main unit 2 with a surface of the housing of the controller (e.g., the right side surface for the left controller 3) facing a surface of the main unit 2 (see FIG. 2). Thus, with the controller attached to the main unit 2, a user can handle the controller and the main unit as an integral unit, thereby improving the controllability.

In the embodiment described above, the left controller 3 is attached to the main unit 2 so as to be facing one of a left side surface and a right side surface of the main unit 2 (specifically, the left side surface). The right controller 4 is attached to the main unit 2 so as to be facing the other one of the left side surface and the right side surface of the main unit 2 (i.e., the right side surface). Then, a user can operate the two controllers attached to the main unit 2 respectively with the left hand and the right hand, thereby providing the information processing device 1 with a good controllability.

The controller includes a light-emitting portion (e.g., the indicator LED 45 for the left controller 3) provided on a surface of the slider 311 for notifying a user of predetermined information. Then, predetermined information (e.g., the status of the information processing device 1) can be indicated to the user using the controller.

Note that the light-emitting portion may indicate the communication status between the main unit 2 and the controller. For example, in the embodiment described above, the indicator LED indicates a number that is assigned to the controller as a result of communication (more specifically, the number represented by the number information described above). For example, the indicator LED may indicate the status of wireless communication between the information processing device 1 and the controller. Specifically, the indicator LED may indicate whether or not wireless communication is available at that point in time or may indicate whether or not pairing has been done.

The controller includes operation sections provided on a surface of the slider 311 (e.g., the second L button 43 and the second R button 44 for the left controller 3). Note that the "operation section" for example means any input section operated by a user, such as buttons, a stick, etc. Thus, more operation sections are available when the controller is removed from the main unit 2 than when the controller is attached to the main unit 2. Therefore, a user is allowed to perform a variety of operations even when the controller is removed from the main unit 2, and it is possible to improve the controllability of the controller.

Note that in other embodiments, the main unit 2 may include operation sections (e.g., buttons) provided on the engaged surface (i.e., the left side surface or the right side surface of the main unit 2) to which the left controller 3 or the right controller 4 is attached. Note that the operation section may be a button having a particular function, which may specifically be a power button, a home button or a sleep button. For example, in the embodiment described above, the power button 28 may be provided on the left side surface or the right side surface of the main unit 2. Then, the power button 28 cannot be operated when the left controller 3 or the right controller 4 is attached, thereby preventing an erroneous operation by a user. Note that when an operation section is provided on a side surface of the main unit 2, the operation section may be provided on the rail member or on another portion of the housing other than the rail member.

Note that an operation section having the same function as the operation section described above may be provided on the left controller 3 and/or the right controller 4. For example, in other embodiments, a power button having the same function as the power button 28 may be provided on the left controller 3 and/or the right controller 4. Then, the function of the input section is available to the user even when the left controller 3 and the right controller 4 are in the attached state.

In other embodiments, the main unit 2 may include a terminal for connecting other devices provided on the engaged surface (i.e., the left side surface or the right side surface of the main unit 2) to which the left controller 3 or the right controller 4 is attached. For example, in the embodiment described above, the first slot 23 and/or the second slot 24 (in other words, terminals provided in the slots) may be provided on the left side surface or the right side surface of the main unit 2. Then, with the controller attached to the main unit 2, the terminals can be protected by the controller. If a slot is provided on the left side surface or the right side surface of the main unit 2, it is possible to prevent a device inserted in the slot (e.g., a card storage medium) from coming off of the main unit 2, when the controller is attached to the main unit 2.

In the embodiment described above, connecting portions (i.e., the upper left portion and the lower left portion) between the first side surface (i.e., the left side surface) of the four side surfaces of the left controller 3 and side surfaces adjacent thereto (i.e., the upper side surface and the lower side surface) have a more rounded shape than connecting portions (i.e., the upper right portion and the lower right portion) between the second side surface (i.e., the right side surface) opposite from the first side surface and side surfaces adjacent thereto (i.e., the upper side surface and the lower side surface) (see FIG. 5). Moreover, connecting portions between the third side surface (i.e., the right side surface) of the four side surfaces of the right controller 4 and side surfaces adjacent thereto (i.e., the upper side surface and the lower side surface) have a more rounded shape than connecting portions (i.e., the upper side surface and the lower side surface) between the fourth side surface (i.e., the left side surface) opposite from the third side surface and side surfaces adjacent thereto (see FIG. 6). Thus, the controller has a rounded shape on one side thereof, and it is therefore easy for a user to understand the orientation in which to hold the controller removed from the main unit 2. This also makes it easier for a user to hold the controller removed from the main unit 2.

Moreover, in the embodiment described above, the left controller 3 is attached to the main unit 2 with the second side surface of the left controller 3 facing the fifth side surface (i.e., the left side surface) of the four side surfaces of the main unit 2 (see FIG. 2). Moreover, the right controller 4 is attached to the main unit 2 with the fourth side surface of the right controller 4 facing the sixth side surface (i.e., the right side surface) opposite from the fifth side surface of the main unit 2 (see FIG. 2).

Then, with the controllers 3 and 4 attached to the main unit 2 (see FIG. 1), the information processing device 1 will have an overall shape such that the left side and the right side thereof are rounded, making it easier for a user to hold. The left side of the left controller 3 is more rounded than the right side thereof, whereas the right side of the right controller 4 is more rounded than the left side thereof (FIG. 5 and FIG. 6). Thus, since the left controller 3 has a different overall shape than that of the right controller 4, it is possible to reduce the possibility that a user mistakes the left and right controllers for each other when attaching them to the main unit 2.

In the embodiment described above, the right controller 4 includes an input section having a first function that the left controller 3 does not have (in the embodiment described above, the plus button 57, the home button 58 and the infrared image-capturing section 123). In other words, in the embodiment described above, the left controller 3 includes one or more input sections having a predetermined number of types of functions (13 in the embodiment described above, including nine buttons, the analog stick 32, the acceleration sensor 104 and the angular velocity sensor 105). In contrast, the right controller 4 includes one or more input sections having a number (different from the predetermined number) of types of functions (15 in the embodiment described above, including 11 buttons, the analog stick 52, the acceleration sensor 114, the angular velocity sensor 115 and the infrared image-capturing section 123). Thus, when each controller has some functions that the other controller does not have (as compared with a case in which the controllers both have the same functions), it is possible to simplify the configuration of the controllers.

Note that the "input section having the first function" may be an image-capturing device (e.g., the infrared image-capturing section 123) or a button. The button may be a button having a particular function (e.g., a power button or a home button), for example.

In the embodiment described above, the left controller 3 includes input sections having the second function different from the first function (e.g., the analog stick 32 and the buttons 33 to 38 in the embodiment described above), and the right controller 4 includes input sections having the second function (e.g., the analog stick 52 and the buttons 53 to 56, 60 and 61 in the embodiment described above). Then, a user can use the second function on either controller, thereby improving the controllability, whereas the first function is omitted for one of the controllers, thereby simplifying the configuration of the controller.

In the embodiment described above, communication between the main unit 2 and a controller when the controller is attached to the main unit 2 uses a first communication scheme (specifically, wired communication), and communication between the main unit 2 and a controller when the controller is removed from the main unit 2 uses a second communication scheme (specifically, wireless communication) different from the first communication scheme. Then, by changing the communication scheme between when the controller is attached to the main unit 2 and when the controller is removed from the main unit 2, the controller can communicate in either case. The controller can easily communicate with the main unit 2 in wired communication when it is attached to the main unit 2, and the controller can communicate with the main unit 2 in wireless communication when it is removed from the main unit 2.

In the embodiment described above, the wired communication between the main unit and the controller is a communication connection via a wired communication channel formed by electrically connecting the first terminal of the main unit 2 (specifically, the left-side terminal 17 or the right-side terminal 21) and the second terminal of the controller (specifically, the terminal 42 or 64). The wired communication as used herein means communication via a cable connection between devices, and also means communication via a connection between a terminal (e.g., a connector) of one device and a terminal (e.g., a connector) of the other device.

In the embodiment described above, when the controller is attached to the main unit 2, the first terminal of the main unit 2 (i.e., the left-side terminal 17 or the right-side terminal 21) and the second terminal of the controller (i.e., the terminal 42 or 64) are electrically connected to each other by being in contact with each other. Then, when the controller is attached to the main unit 2, wired communication and/or power supply are implemented via the terminals connected together.

In the embodiment described above, when the controller is attached to the main unit 2, the first terminal of the main unit 2 and the second terminal of the controller are electrically connected together, and the communication between the main unit 2 and the controller and the power supply from the main unit 2 to the controller are implemented via the first terminal and the second terminal. Then, it is possible to increase the opportunity to charge the controller and thus to reduce the possibility of the controller running out of battery. When a user attaches controllers to the main unit 2 so as to use the information processing device 1 as an integral portable device, the controllers can be charged without the user knowing. Therefore, the user does not need to perform a separate operation for charging the controller, thus saving the trouble for the user.

In the embodiment described above, the information processing device 1 includes a first sensing section (e.g., the CPU 81 executing step S3) for sensing the attachment of the left controller 3 to the main unit 2, and a second sensing section (e.g., the CPU 81 executing step S3) for sensing the attachment of the right controller 4 to the main unit 2. The main unit 2 registers a pair of a left controller and a right controller based on the sensing results from the first sensing section and the second sensing section (see step S4). Therefore, a user can register a pair through a straightforward, easy operation of attaching two controllers, to be used as a pair, to the main unit 2.

In the embodiment described above, when the left controller 3 and the right controller 4 are attached to the main unit 2, the main unit 2 registers the left controller 3 and the right controller 4 attached thereto as a pair (see step S3, S4). Thus, a user can register a pair of controllers through a straightforward operation.

Note that the first sensing section and the second sensing section may or may not simultaneously sense the attachment of the controllers to the main unit 2. That is, two controllers that are not at the same time attached to the main unit 2 may be registered as a pair.

The main unit 2 may execute a predetermined information process based on operation data received from two pairs of controllers. For example, the main unit 2 receives operation data from each of a left controller and a right controller that are registered as a first pair, and receives operation data from each of a left controller and a right controller that are registered as a second pair. The main unit 2 may execute a predetermined information process using, as a set of data, operation data received from controllers that are registered as a first pair, and using, as another set of data, operation data received from controllers that are registered as a second pair. Then, the information processing device can use operation data from a plurality of controllers while distinguishing between operation data from different registered pairs.

In the embodiment described above, when receiving operation data from each of the left controller 3 and the right controller 4 that are removed from the main unit 2 and registered as a pair, the main unit 2 executes a predetermined information process using the two pieces of operation data received as a set of data (see FIG. 37(*b*)). Thus, a user can perform operations using controllers registered as a pair. For example, a user can control one object by using a pair of controllers.

In the embodiment described above, the main unit 2 includes the housing 11 provided with a first engagement portion (which can also be referred to as the attachment and detachment mechanism; specifically, the left rail member 15) to be engaged with the housing (specifically, the slider 40 provided on the housing 31) of the left controller 3, and a second engagement portion (specifically, the right rail member 19) to be engaged with the housing (specifically, the slider 62 provided on the housing 51) of the right controller 4.

In the above description, the first engagement portion and the second engagement portion are to be engaged with controller housings (including members provided on the housings), and are not to be engaged with connectors of the controllers. That is, in the present embodiment, the main unit 2 is configured so that controllers can be attached to and detached from the main unit 2 by the method of engaging the engagement portions with the controllers, which is different from the method of connecting the connectors of the main unit 2 with those of the controllers (the engagement method and the method of connecting the connectors may be both used at the same time). Then, the main unit 2 and the controllers can be firmly connected together.

Note that in other embodiments, the main unit 2 may include only one engagement portion to be engaged with the housing of the controller or may include three or more engagement portions.

In the embodiment described above, the left controller 3 includes the housing 31 provided with a third engagement portion (specifically, the slider 40) to be engaged with the first engagement portion of the main unit 2. The right controller 4 includes the housing 51 provided with a fourth engagement portion (specifically, the slider 62) to be engaged with the second engagement portion of the main unit 2. Thus, members are provided also on the controller side, which members are to be engaged with the engagement portions on the main unit 2 side are provided, and it is therefore possible to more firmly connect the main unit 2 and the controllers together.

In the embodiment described above, the main unit 2 selectively outputs the execution result of the information process to either the display (the display 12) or a display device (the TV 6) separate from the main unit 2 (see FIG. 44). This enables two different modes of use, including a mode in which images are displayed on the display of the main unit 2, and another mode in which images are displayed on a display device separate from the main unit 2.

In the embodiment described above, the engagement portion of the main unit 2 is a rail member (referred to also as the first slide member) provided on a surface of the housing 11 of the main unit 2. The controller includes a slider (referred to also as the second slide member) which slidably and detachably engages with the rail member. In the embodiment described above, the rail member and the slider together form a slide mechanism (see FIG. 7). Thus, the slide mechanism allows for firm locking between the main unit 2 and the controllers and allows for easy attachment and detachment of the controllers.

In the embodiment described above, the rail member is formed so that the slider can slidably engage with the rail member in a predetermined direction (specifically, the y-axis direction shown in FIG. 1), and so that the slider can be inserted and detached into and from the rail member via one end thereof in the predetermined direction (see FIG. 2). Thus, it is possible to easily attach and detach controllers to and from the main unit 2 via the end.

Moreover, in the embodiment described above, the rail member is provided so as to extend in the up-down direction of the main unit 2 so that the slider can be inserted and detached into and from the rail member via the upper end thereof (see FIG. 2). Thus, controllers can be conveniently attached and detached to and from the main unit 2 while the main unit 2 is placed upright. For example, in the present embodiment, controllers can be attached and detached to and from the main unit 2 while the main unit 2 is attached to the cradle 5.

In the embodiment described above, the slide member of the main unit 2 is provided so as to extend generally over the entirety (e.g., so that the length of the slide member is at least one 80% or more of the length of the housing 11 of the main unit 2) of a surface of the housing 11 of the main unit 2 in a predetermined direction (specifically, the up-down direction) (see FIG. 3). Thus, when a controller is attached to the main unit 2, the controller is connected generally over the entirety of the aforementioned surface of the main unit 2, thereby allowing the controller to be firmly connected to the main unit 2.

In the embodiment described above, the first slide member of the main unit 2 (i.e., the rail member) has a C-shaped cross section, and the second slide member of the controller (i.e., the slider) has a T-shaped cross section. Note that in other embodiments, the first slide member of the main unit 2 may have a T-shaped cross section, and the second slide member of the controller may have a C-shaped cross section.

In the embodiment described above, the controller includes a terminal (e.g., the terminal 42 or 64) for communication with the main unit 2. The main unit 2 includes a terminal (i.e., the left-side terminal 17 or the right-side terminal 21) provided on the housing 11 at such a location that allows the terminal to be connected to a terminal of a controller when the controller is attached to the main unit 2. Thus, when the controller is attached to the main unit 2, the terminals are connected together, enabling wired communication.

In the embodiment described above, the information processing device 1 can be said to be a game system capable of executing game applications. When at least the left controller 3 and the right controller 4 are removed from the main unit 2 (in other words, when the two controllers are both removed from the main unit 2), the left controller 3 and the right controller 4 each transmit operation data representing operations performed on the left controller 3 and the right controller 4 to the main unit 2 via wireless communication. Thus, in the embodiment described above, it is possible to provide a novel game system that can be used with two controllers removed.

In the embodiment described above, the information processing device 1 can be said to be a hand-held information processing device including a main section (i.e., the main unit 2) having a display (i.e., the display 12), a first controller section (i.e., the left controller 3) and a second controller section (i.e., the right controller 4) for performing a predetermined information process in response to an operation performed on either the first controller section or the second controller section. When the first controller section and the second controller section are removed from the main section, the main unit 2 performs a predetermined information process based on operation data representing an operation performed on either the first controller section or the second controller section, and displays the results of the information process on the display. Thus, in the embodiment described above, it is possible to provide a novel information processing device that can be used in a mode in which two controller sections are removed.

In the above description, the first controller section and the second controller section are arranged so that when the first controller section is attached to the main section, a user (i.e., the user holding the information processing device) can operate the first controller section with one hand and operate the second controller section with the other hand (see FIG. 33). Thus, it is possible to provide a novel information processing device that can be used both in a mode in which the controller sections are attached to the main section and in a mode in which the controller sections are removed from the main section.

The information processing system of the present embodiment includes the main unit 2, and controllers (specifically, the left controller 3 and the right controller 4; referred to also as controller devices) that can be attached to and detached from the main unit 2. The main unit 2 includes the display 12 (referred to also as the display). When controllers are attached to the main unit 2, the main unit 2 can display, on the display 12, images that are obtained based on operations performed on the controllers. When the controllers are removed from the main unit 2, the main unit 2 can display, on an external display device (specifically, the TV 6) separate from the main unit 2, images that are obtained based on operations performed on the controllers. Note that in the above description, there may be one controller that can be attached to the main unit or there may be a plurality of controllers that can be attached to the main unit.

As described above, the information processing device 1 can be used both in a mode in which controllers are attached to the main unit 2 and in a mode in which the controllers are removed from the main unit. Thus, since a plurality of modes of use are realized with a single information processing device 1, the information processing device 1 can be used in a wider variety of manners. As described above, when the controllers are removed from the main unit 2, an external display device can be used as the display device. Thus, a user can provide, as the external display device, a display device having a larger screen size than the display 12, so that it is possible to display the images on a larger screen.

In the embodiment described above, the information processing system can communicate with the TV 6, and further includes the cradle 5 (referred to also as an add-on device) to and from which the main unit 2 can be attached and detached. The main unit 2 detects the attachment of the main unit 2 to the cradle 5, and determines whether the images obtained based on operations performed on the controllers is displayed on the display 12 or displayed on the TV 6 based at least on the detection results (step S21, S25, S29). Thus, the main unit 2 can determine the image display output based on whether or not the main unit 2 is attached to the cradle 5.

Note that in the above description, there is no particular limitation on the method for determining the image display output. As in the embodiment described above, the main unit 2 may select the TV 6 as the image display output at least on the condition that the main unit 2 is attached to the cradle 5. In other embodiments, the main unit 2 may select the TV 6 as the image display output when the main unit 2 is attached to the cradle 5. That is, the main unit 2 may output the images to the TV 6 via the cradle 5 in response to the attachment of the main unit 2 to the cradle 5.

In other embodiments, the main unit 2 may be capable of communicating directly with the TV 6. For example, the main unit 2 and the TV 6 may be capable of communicating with each other in wireless communication. Also in such a case, as in the embodiment described above, the main unit 2 may determine the image display output based on the attached state of the main unit 2 to the cradle 5.

The add-on device (e.g., the cradle) may be any add-on device to and from which the main unit 2 can be attached and detached. The add-on device may or may not have the function of charging the main unit 2, as in the present embodiment.

In the embodiment described above, the cradle 5 is enabled to communicate with the main unit 2 at least on the condition that the main unit 2 is attached thereto. If the main unit 2 has determined to display the images based on operations performed on the controllers on the TV 6, the main unit 2 outputs the images to the TV 6 via the cradle 5. Thus, the main unit 2 can display the images on the TV 6 by outputting the images to the TV 6 via the cradle 5. Therefore, the main unit 2 does not need to communicate with the TV 6, thereby simplifying the configuration of the main unit 2.

The information processing system of the embodiment described above includes the main unit 2, the left controller 3 (referred to also as the first controller device), the right controller 4 (referred to also as the second controller device), and an accessory (e.g., the extension grip 210 or the attachment 220). The left controller 3 can be attached to and detached from the main unit 2 or the accessory. The right controller 4 can be attached to and detached from the main unit 2 or the accessory. The main unit 2 includes the display 12 (referred to also as the display), and displays, on the display 12, the execution result of a predetermined information process based on operations performed on the left controller 3 and the right controller 4. The left controller 3 and the right controller 4 can be attached to the accessory at the same time (see FIG. 52). Thus, by using the accessory, a user can hold the two controllers 3 and 4, removed from the main unit 2, as an integral unit. That is, it is possible to improve the controllability of the controllers when removed from the main unit 2.

In the embodiment described above, the left controller 3 is attached to the accessory on the left side of the center of the accessory, and the right controller 4 is attached to the accessory on the right side of the center of the accessory (see FIG. 52, FIG. 53). Thus, a user can operate the left controller 3 attached to the accessory with the left hand, and operate the right controller 4 attached to the accessory with the right hand. That is, a user can operate the controllers in a similar fashion to that when the controllers are not attached to the accessory, thereby providing an accessory having a good controllability.

In the embodiment described above, the accessory includes a first grip portion (i.e., the left grip portion 212) provided on the left side and a second grip portion (i.e., the right grip portion 213) provided on the right side. Then, a user can operate the controllers while holding the grip portions respectively with the left hand and the right hand, thereby providing an accessory having a good controllability.

In the embodiment described above, the first grip portion is provided on the left side of the area where the left controller 3 is attached. The second grip portion is provided on the right side of the area where the right controller 4 is attached (see FIG. 52). Therefore, by holding the grip portions, a user can easily operate the controllers 3 and 4 attached to the accessory.

(Functions/Effects Regarding Controller Terminals, Etc.)

In the embodiment described above, a game controller (e.g., the left controller 3 or the right controller 4) is removably attachable to a main unit (e.g., the main unit 2) having a main unit-side slide member (e.g., the left rail member 300) and configured to execute a game process.

The game controller includes:
an operation section (e.g., the analog stick 32, 52, the operation buttons 33 to 39, 43, 44, 46, 47, 53 to 61, 65, 66, 69); and
a controller-side slide member (e.g., the slider 311, 331) protruding from a first surface of the game controller and configured to slidably engage with the main unit-side slide member in a slide direction (e.g., the up-down direction shown in FIG. 14, i.e., the y-axis direction).

The controller-side slide member has a first end and a second end in the slide direction, and the game controller is configured to be attached to the main unit by inserting the controller-side slide member into the main unit-side slide member from the first end (e.g., the lower end of the slider 331 shown in FIG. 14, i.e., the end on the y-axis negative direction side).

The controller-side slide member includes:
a protruding portion (e.g., the protruding portion 321) protruding from the first end side of the controller-side slide member in the slide direction and having a facing surface (e.g., the facing surface 321a) that faces the first surface (e.g., the right side surface of the left controller 3 or the left side surface of the right controller 4) of the game controller; and
at least one terminal (e.g., the terminal 42, 64) between the facing surface and the first surface, wherein the terminal is configured to be electrically connected to the main unit.

Thus, the game controller can be easily attached to the main unit by means of the slide mechanism, and it is therefore possible to provide a game controller having a high usability. Then, a user can also connect terminals together through the operation of inserting and sliding the controller-side slide member against the main unit-side slide member. Therefore, a user can easily perform the attachment operation, which includes the operation of connecting terminals together. With the provision of the protruding portion on the controller-side slide member, it is possible to reduce the possibility that the terminals come into contact with a hand of a user or other objects, thereby always protecting the terminals.

The term "slide member" may refer to the rail member or the slider as used in the embodiment described above. Note that in the embodiment described above, a slide member provided on the main unit 2 side and a slide member provided on the controller side are referred to as a "rail member" and a "slider", respectively, so that these members can easily be distinguished from each other. The shape of the rail member and that of the slider are not limited to those of the embodiment described above. For example, a slide member having a cross section shaped as shown in FIG. 11 may be referred to as a "slider", and a slide member having a T-shaped cross section as shown in FIG. 22 may be referred to as a "rail member".

Figure 61:
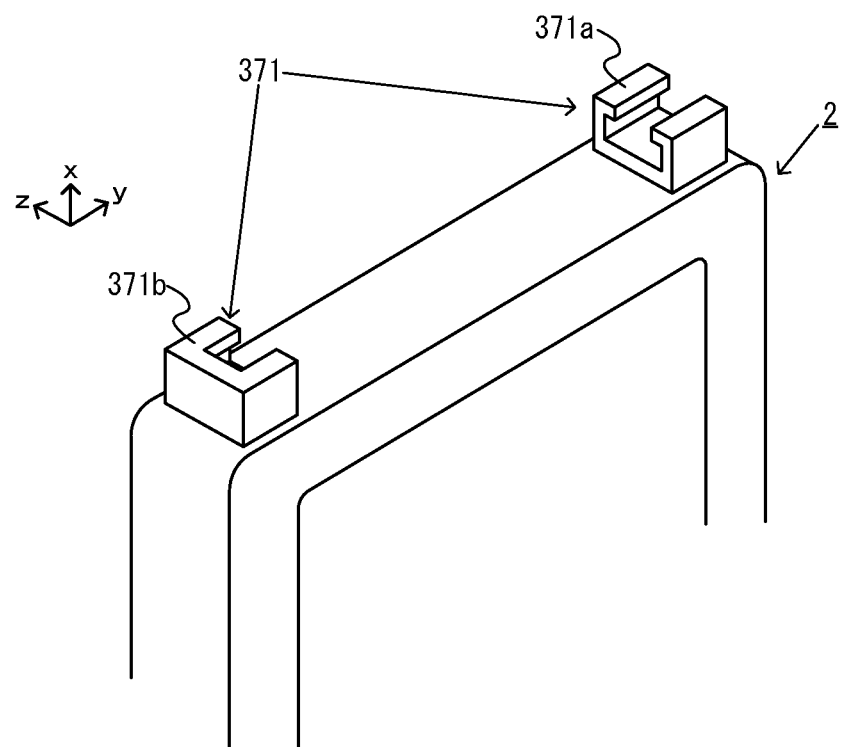
FIG. 61 is a diagram showing another example slide member provided on the non-limiting main unit.

Moreover, a slide member is not limited to those that have a shape elongated in the slide direction, as does the rail member or the slider of the embodiment described above. FIG. 61 is a diagram showing another example slide member provided on the main unit. The main unit 2 may include a slide member 371 shown in FIG. 61, instead of the rail member of the embodiment described above.

As shown in FIG. 61, the slide member 371 includes an upper slide member 371a provided on an upper portion of the left side surface of the main unit 2, and a lower slide member 371b provided on a lower portion of the left side surface of the main unit 2. Each of the slide members 371a and 371b includes a bottom surface portion, a side surface portion and a top surface portion, as does the left rail member 300 described above. Therefore, each of the slide members 371a and 371b slidably engages with the slider 311 as the slider 311 of the left controller 3 is inserted into the groove formed by the bottom surface portion and the side surface portion. With the slider 311 inserted in the groove of the slide members 371a and 371b, the slider 311 is securely locked by the top surface portion so as not to come off in the direction perpendicular to the slide direction. The lower slide member 371b includes a facing portion similar to that of the left rail member 300 described above. Therefore, when the slider 311 is inserted into the groove of the slide members 371a and 371b, the slider 311 can be slid to a position at which the slider 311 is in contact with the facing portion, and the slide movement is limited to this position. Thus, the slide member 371 shown in FIG. 61 can also slidably engage with the slider 311 of the left controller 3, as does the left rail member 300.

Figure 62:
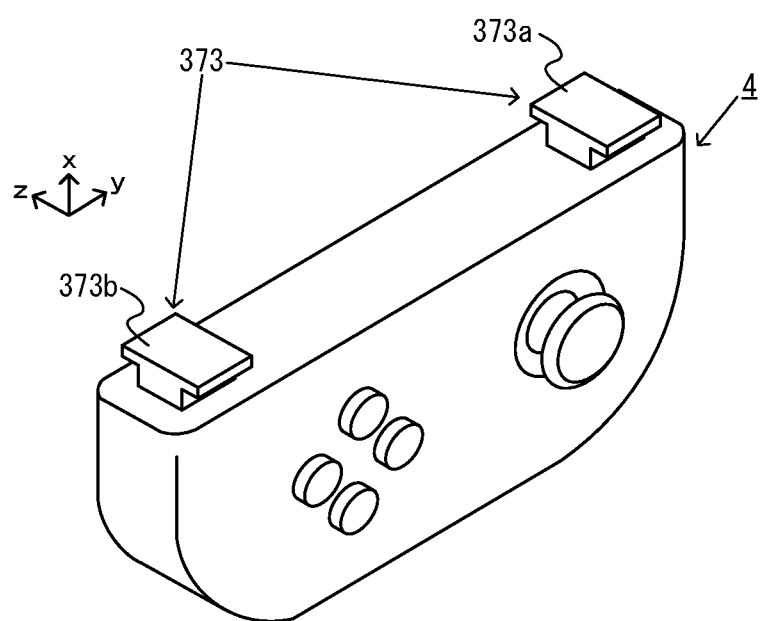
FIG. 62 is a diagram showing another example slide member provided on the non-limiting right controller.

FIG. 62 is a diagram showing another example slide member provided on the right controller 4. The right controller 4 may include a slide member 373 shown in FIG. 62, instead of the slider 331 of the embodiment described above.

As shown in FIG. 62, the slide member 373 includes an upper slide member 373a provided on an upper portion of the left side surface of the right controller 4, and a lower slide member 373b provided on a lower portion of the left side surface of the right controller 4. Each of the slide members 373a and 373b includes a shaft and a top surface portion similar to those of the slider 331 described above. Therefore, the slide members 373a and 373b slidably engage with the left rail member 300 by being inserted into the left rail member 300 of the main unit 2. With the slide members 373a and 373b inserted in the groove of the left rail member 300, the slide members 373a and 373b is securely locked by the top surface portion so as not to come off in the direction perpendicular to the slide direction. Thus, the slide member 373 shown in FIG. 62 can also slidably engage with the left rail member 300 of the main unit 2, as does the slider 331.

As described above, a slide member does not need to be formed by a single member extending in the slide direction, but may be formed by a plurality of members arranged with each other in the slide direction. Note that when a slide member is formed by a plurality of members, the upper end of the slide member refers to the upper end of one of the plurality of members that is located uppermost, and the lower end of the slide member refers to the lower end of another one of the plurality of members that is located lowermost. In this case, the center of a slide member in a predetermined direction refers to the central position therebetween the opposite ends in the predetermined direction of the slide member including a plurality of members. For example, the center of the slide member in the up-down direction refers to the central position between the upper end position of the uppermost one of the plurality of members and the lower end position of the lowermost one of the plurality of members.

A slide member may be formed as an integral unit with the housing of a device (e.g., the main unit 2 or the controller) on which the slide member is provided. For example, although the bottom surface of the slide member is separate from the housing of the device on which the slide member is provided in the embodiment described above, the housing of the device on which the slide member is provided may be the bottom surface of the slide member in other embodiments. For example, for the main unit 2, the side surface portion 302 of the rail member described above may be provided directly on the side surface of the housing 11 of the main unit 2. Moreover, the side surface portion may be formed as an integral unit with the housing 11. In other embodiments, the side surface of the housing and the bottom surface portion of the rail member may together form the bottom surface of the slide member. For example, with the extension grip 350 (FIG. 54) of the embodiment described above, the bottom surface of the slide member is formed by the bottom surface portion of the left rail member 356 and the housing (of the support section 352) exposed through the hole 356a formed in the bottom surface portion together (see FIG. 55).

Figure 63:
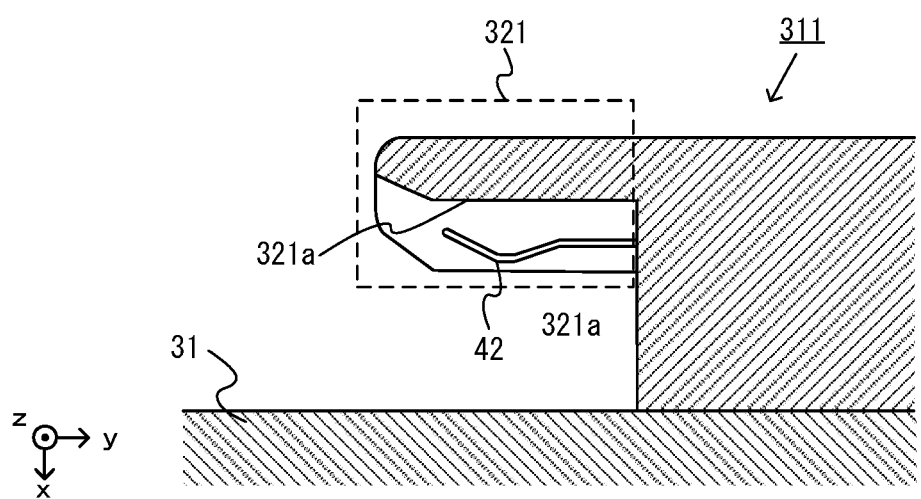
FIG. 63 is a diagram showing an example terminal arrangement according to another non-limiting embodiment.

The terminal may be provided so that at least a portion thereof lies between the facing surface and the first surface, and it is not limited to the embodiment in which it is provided on the facing surface as in the embodiment described above. FIG. 63 is a diagram showing an example terminal arrangement in other embodiments. In other embodiments, the terminal 42 may be arranged as shown in FIG. 63, instead of the arrangement of the terminal 42 shown in FIG. 15. In FIG. 63, the terminal 42 is provided at a position away from the facing surface in the left-right direction (i.e., the x-axis direction). In FIG. 63, a surface of the terminal 42 that is facing toward the first surface is in contact with the left-side terminal 17 (as in the embodiment described above). The position of the left-side terminal 17 of the main unit 2 is adjusted in accordance with the arrangement of the terminal 42 shown in FIG. 63. That is, since the terminal 42 in FIG. 63 is shifted in the x-axis negative direction as compared with the terminal 42 shown in FIG. 15, the left-side terminal 17 of the main unit 2 is accordingly shifted in the x-axis negative direction from the position shown in FIG. 12. Note that in other embodiments, a surface of the terminal 42 that is facing toward the facing surface 321a may be in contact with the left-side terminal 17. In FIG. 63, the facing surface 321a may or may not include the slots 321b.

As in the embodiment described above and the example shown in FIG. 63, the terminal may be provided so that at least a portion of a surface (of the terminal) that is facing toward the first surface of the controller lies between the facing surface and the first surface (in this case, the surface of the terminal facing toward the facing surface may be arranged between the facing surface and the first surface or may be arranged on the inner side of the protruding portion). Then, with the provision of the protruding portion, it is possible to reduce the possibility that a surface of the terminal to be in contact with another terminal comes into contact with a hand of a user or other objects, thereby efficiently protecting the terminal.

In the embodiment described above, the terminal extends along the facing surface. Then, since the terminal is arranged closer to the facing surface, it is possible to more efficiently protect the terminal.

In the embodiment described above, the terminal is on the facing surface. Then, since the terminal is arranged closer to the opposing surface, it is possible to more efficiently protect the terminal.

In the embodiment described above, the terminal is configured to flex into a slot in the facing surface. Then, it is possible to reduce the force to act upon a terminal when the terminal comes into contact with another terminal.

In the embodiment described above, a side of the terminal that faces the first surface is exposed. Then, the terminal can come into contact with another terminal (e.g., the left-side terminal 17 of the main unit 2 or the right-side terminal 21), using a surface of the terminal that faces the first surface.

In the embodiment described above, the protruding portion includes a wall (e.g., the wall portion 322) on the facing surface that protrudes from the facing surface, the wall being on one side or on both sides of the terminal with respect to a direction substantially perpendicular to the slide direction (e.g., the z-axis direction shown in FIG. 15). Then, it is possible with the wall to reduce the possibility that the terminal comes into contact with a hand of a user or other objects, thereby more reliably protecting the terminal.

In the embodiment described above, an inner wall of the wall facing the terminal flares away from the terminal in a direction that is toward a distal end of the protruding portion (FIG. 16). Then, the inner wall provides alignment between the main unit and the game controller, making it easier for the terminal of the main unit and the terminal of the game controller to properly come into contact with each other.

In the embodiment described above, a distal end of the terminal is between a center of the controller-side slide member and a distal end (e.g., the distal end of the distal end portion 323 shown in FIG. 15) of the protruding portion (FIG. 15, FIG. 16). Then, since there is a gap between the distal end of the protruding portion and the distal end of the terminal, it is possible to further reduce the possibility that the terminal comes into contact with a hand of a user or other objects, thereby more reliably protecting the terminal.

In the embodiment described above, the protruding portion is tapered toward the distal end (FIG. 15). Then, the end portion provides alignment between the main unit and the game controller, making it easier for the terminal of the main unit and the terminal of the game controller to properly come into contact with each other.

In the embodiment described above, an end portion of the protruding portion has a second surface (e.g., the slope 323*a* shown in FIG. 15) that is sloped away from the first surface toward the distal end of the protruding portion. Then, the end portion provides alignment between the main unit and the game controller, making it easier for the terminal of the main unit and the terminal of the game controller to properly come into contact with each other.

In the embodiment described above, an intersection between the facing surface and a second surface at the distal end may be a chamfer. Then, the intersection provides smooth alignment between the main unit and the game controller.

In the embodiment described above, the terminal is one of a plurality (e.g., ten) of terminals between the facing surface and the first surface. The plurality of terminals are arranged next to each other in a direction that is substantially parallel to the facing surface and substantially perpendicular to the slide direction (e.g., the z-axis direction shown in FIG. 16), the terminals being exposed on one side (e.g., the y-axis negative direction side shown in FIG. 16) that corresponds to the first end side of the controller-side slide member. This makes it easier for the terminals of the game controller to come into contact with the terminals of the main unit which come from the first end side.

The operation section is on a front surface (e.g., the surface on the z-axis negative direction side shown in FIG. 14) of the game controller. The first surface is a side surface (e.g., the right side surface of the left controller 3 or the left side surface of the right controller 4) relative to the front surface. Then, with the game controller attached to the main unit, a user can easily operate the operation section provided on the front surface of the game controller.

In the embodiment described above, the controller-side slide member is a rail extending substantially parallel to the slide direction (e.g., the slider 311 shown in FIG. 14 or the slider 331 shown in FIG. 25). Then, the game controller can be easily attached to the main unit by inserting the rail into the main unit-side slide member.

In the embodiment described above, the rail extends from near a first end (e.g., the upper end of the left controller 3 shown in FIG. 14) to near a second end (e.g., the lower end of the left controller 3 shown in FIG. 14) of the first surface in the slide direction. Then, the game controller can be connected firmly to the main unit, and it is possible to reduce the possibility that the game controller comes off the main unit.

In the embodiment described above, a cross section of the controller-side slide member taken perpendicular to the slide direction has a shape where a width of a first portion adjacent to the first surface (e.g., the length of the shaft 325 in the z-axis direction shown in FIG. 21) is narrower than a width of a second portion that is farther away from the first surface than the first portion (e.g., the length of the top surface portion 326 in the z-axis direction shown in FIG. 21). Then, it is possible to reduce the possibility that the controller-side slide member comes off the main unit-side slide member in the direction perpendicular to the slide direction.

In the embodiment described above, a protruding portion protruding in the slide direction is absent at the second end of the controller-side slide member (e.g., the upper end of the slider 331 shown in FIG. 14, i.e., the end on the y-axis positive direction side). Then, even if the controller-side slide member is inserted into the main unit-side slide member from the second end, it is possible to reduce the possibility that the controller-side slide member contacts and damages members (e.g., terminals, etc.) of the main unit.

In the embodiment described above, an end surface of the controller-side slide member at the second end is a flat surface extending from the first surface. Then, even if the controller-side slide member is inserted into the main unit-side slide member from the second end, it is possible to reduce the possibility that the controller-side slide member contacts and damages members (e.g., terminals, etc.) of the main unit.

In the embodiment described above, the game controller further includes a stop member (e.g., the stop member 319 or 339) that resists a slide movement of the controller-side slide member against the main unit-side slide member in a direction opposite to a direction in which the controller-side slide member is inserted into the main unit-side slide member when the controller-side slide member has been inserted up to a predetermined position into the main unit-side slide member (e.g., in the attached state described above). Then, it is possible with the stop member to reduce the possibility that the controller-side slide member comes off the main unit-side slide member.

In the embodiment described above, the game controller further includes a stop member (e.g., the stop member 319 or 339) configured to stop the main unit-side slide member when the controller-side slide member has been inserted up to a predetermined position into the main unit-side slide member (e.g., in the attached state described above), wherein the stop member protrudes from the controller-side slide member in a direction that is perpendicular to the slide direction and parallel to the first surface (e.g., the z-axis direction shown in FIG. 21). Then, it is possible with the stop member to reduce the possibility that the controller-side slide member comes off the main unit-side slide member.

In the embodiment described above, the stop member is on the second end side (e.g., the upper end side shown in FIG. 14, i.e., the y-axis positive direction side) of a center of the controller-side slide member in the slide direction. Then, the stop member does not come into contact with the main unit unless the controller-side slide member is inserted to a certain degree into the main unit-side slide member, thereby making it less easy for the stop member to come into contact with the main unit. That is, it is possible to make it easier for the controller-side slide member to be moved smoothly into the main unit-side slide member.

In the embodiment described above, the stop member protrudes from the first surface of the game controller (see FIG. 22) or from a side surface of the controller-side slide member substantially perpendicular to the first surface (see FIG. 21). Then, it is possible to reduce the possibility that the stop member is damaged by being in contact with other objects.

In the embodiment described above, the terminal is on the facing surface (see FIG. 15, FIG. 16). A surface on a reverse side of the protruding portion of the facing surface comprises a metal member (e.g., the reinforcement member 312 or 332) over at least a part of an area where the terminal is on the facing surface, and a remaining portion of the protruding portion comprises a resin member. Then, it is possible to increase the mechanical strength of the protruding portion (specifically, a portion where the terminal is provided).

In the embodiment described above, the game controller further includes an insulator (e.g., the insulation sheet 316) between the terminal and the metal member. Then, it is possible to reduce the possibility that the terminal is electrically affected by the metal member, and it is therefore possible to improve the accuracy of communication between the game controller and the main unit.

In the embodiment described above, the game controller further includes a water-resisting member (e.g., the insulation sheet 316) between the terminal and the metal member. Then, it is possible to reduce the possibility that water touches the terminal to deteriorate (i.e., rust) the terminal.

In the embodiment described above, the game controller further includes an electronic circuit (e.g., the electronic circuit 318) including a ground portion (e.g., the ground land portion 318b). The terminal is a ground terminal electrically connected to the ground portion. The metal member further includes a ground connecting portion (e.g., the ground connection portion 312d) electrically connected to the ground portion. Then, it is possible to reduce the possibility of the metal member being electrically charged, and it is therefore possible to reduce the possibility that the terminal is electrically affected by the metal member. It is therefore possible to improve the accuracy of communication between the game controller and the main unit.

In the embodiment described above, the game controller has side surfaces. The first surface is one of the side surfaces (e.g., the right side surface of the left controller 3 or the left side surface of the right controller 4). The operation section includes a first input section (e.g., the first L button 38, the ZL button 39, the first R button 60 or the ZR button 61) on one of the side surfaces that corresponds to the second end side in the slide direction (e.g., the upper end side shown in FIG. 14, i.e., the y-axis positive direction side). Then, the game controller can easily be attached to the main unit in a case in which a user holds a game controller in such a manner (e.g., the manner shown in FIG. 33) that the first input section is operated using the index finger.

In the embodiment described above, the controller-side slide member is configured to be inserted into the main unit-side member on at least one of left and right side surfaces relative to a surface of the main unit (e.g., the front surface of the main unit 2) that includes a display (e.g., the display 12) (see FIG. 3) and from an upper side of the main unit-side slide member (see FIG. 2). Then, the game controller can be attached to and detached from the main unit while the main unit is put down, and it is possible to improve the usability of the information processing device including the main unit and the game controller.

In the embodiment described above, the operation section includes a directional input section (e.g., the analog stick 32 or 52) enabling inputs of at least four directions of up, down, left and right. Thus, the game controller includes a directional input section with which it is possible to easily make directional inputs, thereby improving the input function of the information processing device.

In the embodiment described above, the directional input section outputs a two-dimensional value representing a direction and a quantity that have been input (e.g., the direction and the magnitude corresponding to the tilt direction and the tilt amount of the stick member of the analog stick). Thus, the game controller includes a directional input section with which it is possible to make detailed directional inputs, thereby improving the input function of the information processing device.

In the embodiment described above, the directional input section is an input device including an input member (e.g., the stick member of the analog stick) that is configured to be tilted or slid, from a reference position, in at least four directions of up, down, left and right. Thus, the game controller includes a directional input section with which it is possible to more easily make directional inputs, thereby improving the input function of the information processing device.

In the embodiment described above, the operation section includes a save-an-image input section (e.g., the record button 37) for giving an instruction to save an image being displayed on the display (e.g., the display 12) of the main unit. Thus, the game controller has a function of accepting an input instruction to save an image, thereby improving the usability of the information processing device.

In the embodiment described above, the game controller further includes an infrared image-capturing device (e.g., the infrared image-capturing section 123). Thus, the game controller has the image-capturing function, thereby improving the usability of the information processing device.

In the embodiment described above, the operation section includes a second input section (e.g., the second L button 43 or 65, the second R button 44 or 66) on a surface of the controller-side slide member that faces the same direction as the first surface. Then, when the game controller is removed from the main unit, the second input section can be operated, and it is therefore possible to improve the usability of the information processing device. Moreover, an input section that is not used when the game controller is attached to the main unit is provided at such a position that the input section cannot be operated when the game controller is attached to main unit, thereby efficiently using the area of a game controller and efficiently arranging input sections on a game controller.

(Functions/Effects Regarding Stop Member of Controller)

In the embodiment described above, a game controller (e.g., the left controller 3 or the right controller 4) is removabley attachable to a main unit (e.g., the main unit 2) having a main unit-side slide member (e.g., the left rail member 300) and configured to execute a game process.

The game controller includes:
an operation section (e.g., the analog stick 32, 52, the operation buttons 33 to 39, 43, 44, 46, 47, 53 to 61, 65, 66, 69); and
a controller-side slide member (e.g., the slider 311, 331) protruding from a first surface of the game controller and configured to slidably engage with the main unit-side slide member in a slide direction (e.g., the up-down direction shown in FIG. 14, i.e., the y-axis direction).

The controller-side slide member has a first end and a second end in the slide direction, and the game controller is configured to be attached to the main unit by inserting the controller-side slide member into the main unit-side slide member from the first end (e.g., the lower end of the slider 331 shown in FIG. 14, i.e., the end on the y-axis negative direction side).

The game controller includes a stop member (e.g., the stop member 319 or 339) configured to resist a slide movement, in an opposite direction, of the controller-side slide member against the main unit-side slide member, the opposite direction being a direction opposite to a direction in which the controller-side slide member is inserted into main unit-side slide member.

The stop member is configured to protrude from the first surface of the game controller (see FIG. 22) or from a side surface of the controller-side slide member, which side surface is substantially perpendicular to the first surface (see FIG. 21), and the stop member is on the second end side of a center of the controller-side slide member in the slide direction (e.g., on the upper side of the slider 311 shown in FIG. 14).

Then, it is possible with the stop member to reduce the possibility that the controller-side slide member comes off the main unit-side slide member. Since the stop member is allowed to protrude from the first surface or the side surface of the controller-side slide member, it is possible to reduce the possibility that the stop member is damaged by being in contact with other objects. Moreover, since the stop member is provided on the second end side of the center of the controller-side slide member in the slide direction, it is possible to make it less easy for the stop member to come into contact with the main unit. That is, it is possible to make it easier for the controller-side slide member to be moved smoothly into the main unit-side slide member.

Note that "the stop member being allowed to protrude from a surface" means to include both the first embodiment in which the stop member may be protruding from a surface (specifically, the protruding state described above) or not protruding from a surface (specifically, the accommodated state described above), and the second embodiment in which the stop member is always protruding from a surface. The second embodiment is for example an embodiment in which the stop member can move between (a) the protruding state described above, and (b) a state in which it is protruding from the surface but is closer to the surface than in the protruding state (in other words, a state in which the stop member is not completely accommodated).

In the embodiment described above, the stop member is movable between a first position (e.g., the position shown in FIG. 21(a)) and a second position (e.g., the position shown in FIG. 21(b)). The stop member in the first position is more protruding from at least one of the first surface of the game controller and the side surface of the controller-side slide member as compared with the stop member in the second position. The stop member is biased toward a protruding state in the first position. Then, when inserting the controller-side slide member into the main unit-side slide member, the stop member moves into the second position depending on the situation, thereby allowing the controller-side slide member to be inserted smoothly. With the stop member being movable, it is possible to reduce the possibility that the stop member is damaged by being in contact with other objects.

In the embodiment described above, the stop member is configured to move to a position, as the second position, at which the stop member is in an accommodated state in which the stop member is accommodated inside the game controller (FIG. 21(b)). Then, with the stop member in the accommodated state, the controller-side slide member can be more smoothly inserted into the main unit-side slide member. With the stop member in the accommodated state, it is possible to further reduce the possibility that the stop member is damaged by being in contact with other objects.

In the embodiment described above, the game controller further includes a movable member (e.g., the release button 313 or 333) that is configured to be moved by an operation by a user, wherein the stop member is moved at least from the first position to the second position in response to the movable member being operated by a user. Then, it is possible, by a user operation, to weaken or release the engagement of the stop member. Thus, a user can easily perform the operation of removing the game controller from the main unit.

In the embodiment described above, the movable member is biased to be placed at a reference position (e.g., the state shown in FIG. 27(a)), and is configured to move at least from the reference position in response to an operation by a user. The stop member is coupled to the movable member, and the stop member is in the first position when the movable member is placed at the reference position and the stop member comes into the second position in response to the movable member moving from the reference position. Then, since the position of the movable member changes depending on whether the stop member is in the first position or in the second position, a user can recognize the state of the stop member (i.e., whether it is in the first position or in the second position) depending on the position of the movable member.

In the embodiment described above, the stop member is formed so that at least a portion of an end portion thereof on the first end side in the slide direction (e.g., the end portion having the slope 319a shown in FIG. 23), a thickness of the stop member in a moving direction from the first position to the second position decreases toward a distal end thereof. Then, when inserting the controller-side slide member into the main unit-side slide member, the stop member 319 is unlikely to be interfered by the main unit. Thus, the controller-side slide member can be smoothly inserted into the main unit-side slide member.

In the embodiment described above, the movable member is on a surface on a reverse side of the front surface (of the game controller) (see FIG. 14). Then, when a user holds the information processing device with the game controller attached to the main unit, the user can easily operate the movable member. Thus, it is possible to provide an information processing device having a high usability and having a movable member that is easy to operate.

Note that in other embodiments, the movable member may be on the front surface (of the game controller). Then, when a user holds the information processing device with the game controller attached to the main unit, the user can see the movable member. Thus, it is possible to provide an information processing device having a high usability and having a movable member that is easy to operate.

Note that in other embodiments, the movable member is on both the front surface (of the game controller) and on a surface on a reverse side of the front surface.

In the embodiment described above, the game controller further includes a projection in the vicinity of the movable member of the game controller, wherein the projection (e.g., the projection portion 314 or 334 and/or the ZL button 39 or the ZR button 61) projects past a surface that the movable member is on. Then, it is possible with the projection to reduce the possibility that the movable member is operated in error. Thus, it is possible to reduce the possibility that the erroneous operation of the movable member releases the engagement of the stop member, resulting in the game controller being removed from the main unit.

The embodiment described above the projection is a button (i.e., the ZL button 39 or the ZR button 61).

In the embodiment described above, the game controller includes a depressed portion (e.g., the depressed portion H shown in FIG. 21) defined by the first surface and the controller-side slide member so as to have a C-shaped cross section along a direction perpendicular to the slide direction. The stop member, in the protruding state, protrudes from at least one of surfaces defining the depressed portion (FIG. 21 or FIG. 22). Then, it is possible to reduce the possibility that the stop member is damaged by being in contact with other objects.

In the embodiment described above, the stop member does not protrude out of a space in the depressed portion into a space outside the game controller in the protruding state (FIG. 21 or FIG. 22). Then, it is possible to further reduce the possibility that the stop member is damaged by being in contact with other objects.

In the embodiment described above, the stop member is configured to protrude, in a protruded state, from the controller-side slide member in a direction perpendicular to the slide direction and parallel to the first surface (e.g., the z-axis direction shown in FIG. 21). Then, it is possible to reduce the possibility that the stop member is damaged by being in contact with other objects.

In the embodiment described above, the stop member is at an end portion on the second end side of a center of the controller-side slide member in the slide direction (e.g., the upper end of the slider 311 shown in FIG. 14). This allows the controller-side slide member to be moved more smoothly against the main unit-side slide member.

In the embodiment described above, the game controller further includes at least one terminal (e.g., the terminal 42 or 46) that is on the first end side (e.g., the lower end side) of the stop member in the slide direction and that is electrically connectable to the main unit. Then, it is possible to reduce the possibility that the stop member comes into contact with the main unit, and it is possible to reduce the possibility that the terminal of the main unit is damaged.

In the embodiment described above, the terminal is at an end portion on the first end side of the controller-side slide member. Then, it is possible to reduce the possibility that the controller-side slide member comes into contact with the main unit, and it is possible to reduce the possibility that the terminal of the main unit is damaged.

(Functions/Effects Regarding Operation Sections Provided on Slide Member of Controller)

In the embodiment described above, a game controller (e.g., the left controller 3 or the right controller 4) is is removably attachable to a main unit (e.g., the main unit 2) having a main unit-side slide member (e.g., the left rail member 300) and configured to execute a game process.

The game controller includes a controller-side slide member (e.g., the slider 311, 331) protruding from a first surface of the game controller and being configured for slidably engaging with the main unit-side slide member in a slide direction (e.g., the up-down direction shown in FIG. 14, i.e., the y-axis direction).

The controller-side slide member has first and second ends and includes, as surfaces facing substantially in the same direction as the first surface, a lower surface (e.g., the lower-tier surface 311f shown in FIG. 24) and an upper surface (e.g., the upper-tier surface 311d shown in FIG. 24), a first distance between the lower surface and the first surface being less than a second distance between the upper surface and the first surface, the lower surface extending from the first end to the second end of the controller-side slide member in a direction substantially perpendicular to the slide direction.

The game controller includes a first operation control (e.g., the second L button 43 or 65 or the second R button 44 and 66 shown in FIG. 14 or FIG. 25) provided on the lower surface, the first operation control being configured so as not to project past the upper-tier surface.

According to the above description, an input section that is not used when the game controller is attached to the main unit is provided at such a position (i.e., the lower-tier surface) that the input section cannot be operated when the game controller is attached to the main unit. This makes it possible to efficiently use the area of a game controller and efficiently arrange input sections on a game controller. According to the above description, since the first operation control is provided on the lower-tier surface, the controller-side slide member can be slid smoothly against the main unit-side slide member. Moreover, since the lower-tier surface is provided to extend from one end to the other end in the direction substantially perpendicular to the slide direction, it is easier for a user to operate the first operation control.

In the embodiment described above, the first operation control is configured so as not to protrude past the upper surface. This allows the controller-side slide member to be slid more smoothly against the main unit-side slide member.

In the embodiment described above, the first operation control extends away from the first surface by a distance greater than the first distance and less than or equal to the second distance. This allows the controller-side slide member to be slid more smoothly against the main unit-side slide member.

In the embodiment described above, the controller-side slide member has a first end and a second end in the slide direction, and the controller-side slide member includes a first lower surface on the first end side of a center of the controller-side slide member in the slide direction, and a second lower surface on the second end side of the center of the controller-side slide member in the slide direction (FIG. 14, FIG. 25). The first operation control includes a first input section (e.g., the second L button 43 or 65) on the first lower surface, and a second input section (e.g., the second R button 44 and 66) on the second lower surface. Then, when the game controller is removed from the main unit, a user can operate the first input section using one hand, and the second input section using the other hand (FIG. 35). Thus, it is possible to improve the controllability of the game controller.

In the embodiment described above, the game controller further includes a light-emitter (e.g., the indicator LED 45 or 67) on the upper surface between the first input section and the second input section configured for notifying a user of information. Then, even when the first input section and the second input section are operated by a user, the light-emitting portion is unlikely to be hidden by a hand of the user. That is, it is possible to reduce the possibility that the visibility of the light-emitting portion is reduced when input sections are provided.

In the embodiment described above, the controller-side slide member defines a sloped surface (e.g., the slope 311e shown in FIG. 24) connecting the lower surface and the upper surface. Then, it is possible to reduce the awkwardness to be felt by a user when operating the first operation control.

In the embodiment described above, the game controller is configured to be attached to the main unit by engaging the controller-side slide member with the main unit-side slide member.

The game controller includes:
  a light-emitter on the upper surface configured for notifying a user of information; and
  a light emission control (e.g., the communication control section 101 or 111) configured for controlling the light-emitter to emit light at least on a condition that the game controller is not attached to the main unit, and for controlling the light-emitter not to emit light when the game controller is attached to the main unit.

Thus, it is possible to reduce the power consumption of the game controller by controlling the light-emitting portion so that the light-emitting portion does not emit light when there is little need to emit light.

In the embodiment described above, the game controller further includes a second operation control (e.g., the analog stick 32, 52, the operation buttons 33 to 39, 47, 53 to 61) on a surface (e.g., the front surface or the upper side surface) of the game controller that is different from the first surface. Then, the second operation control can be operated when the game controller is attached to the main unit and when it is removed from the main unit, and it is possible to improve the controllability of the game controller with the provision of such a second operation control on the game controller.

In the embodiment described above, the second operation control is on a front surface of the game controller. The first surface is a side surface relative to the front surface. Then, a user can operate the first operation control provided on the side surface (e.g., using the index finger) while operating the second operation control provided on the front surface (e.g., using the thumb). Thus, it is possible to provide a game controller having a good controllability when the game controller is removed from the main unit.

The embodiment described above is applicable to, for example, a game controller, with the aim of allowing for a controller to be easily attached to an information processing device.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing apparatus configured to connect to a cradle, the information processing apparatus comprising:
   a processor; and
   a cooling fan, wherein
   the processor controls the cooling fan so that when the information processing apparatus is not connected to the cradle, rotations per minute of the cooling fan are lower than when the information processing apparatus is connected to the cradle.

2. The information processing apparatus according to claim 1, further comprising a display, wherein
   when the information processing apparatus is not connected to the cradle, the information processing apparatus outputs an image to the display, and
   when the information processing apparatus is connected to the cradle, the information processing apparatus outputs an image to an external display connected to the information processing apparatus via the cradle.

3. The information processing apparatus according to claim 1, wherein
   when the information processing apparatus is not connected to the cradle, an upper limit of a clock frequency of the processor is more limited than when the information processing apparatus is connected to the cradle.

4. An information processing apparatus configured to connect to a cradle, the information processing apparatus comprising:
   a processor; and
   a cooling fan, wherein
   the processor controls the cooling fan so that when the information processing apparatus is not connected to the cradle, rotations per minute at which the cooling fan is allowed to operate are lower than when the information processing apparatus is connected to the cradle.

5. The information processing apparatus according to claim 4, further comprising a display, wherein
   when the information processing apparatus is not connected to the cradle, the information processing apparatus outputs an image to the display, and
   when the information processing apparatus is connected to the cradle, the information processing apparatus outputs an image to an external display connected to the information processing apparatus via the cradle.

6. The information processing apparatus according to claim 4, wherein
   when the information processing apparatus is not connected to the cradle, an upper limit of a clock frequency of the processor is more limited than when the information processing apparatus is connected to the cradle.

* * * * *